United States Patent [19]

Steiner

[11] 4,196,476
[45] Apr. 1, 1980

[54] REPRODUCTION MACHINE WITH SELECTIVELY DISCLOSABLE PROGRAMS

[75] Inventor: Edward L. Steiner, Macedon, N.Y.

[73] Assignee: Xerox Corporation, Stamford, Conn.

[21] Appl. No.: 829,017

[22] Filed: Aug. 30, 1977

[51] Int. Cl.² .......................... G06F 9/06; G06F 3/00; G03G 15/00
[52] U.S. Cl. .................................. 364/900; 355/14 R
[58] Field of Search ......................................... 355/14; 364/200 MS File, 900 MS File

[56] References Cited

U.S. PATENT DOCUMENTS

| | | | |
|---|---|---|---|
| 3,562,717 | 2/1971 | Harmon et al. | 364/200 |
| 4,015,245 | 3/1977 | Mercurio | 364/200 |
| 4,023,901 | 5/1977 | Kulbida et al. | 355/14 |
| 4,034,194 | 7/1977 | Thomas et al. | 364/900 X |
| 4,035,072 | 7/1977 | Deetz et al. | 355/14 |

Primary Examiner—Harvey E. Springborn
Attorney, Agent, or Firm—John E. Beck; Frederick E. McMullen; Ronald F. Chapuran

[57] ABSTRACT

An electrostatographic type copying or reproduction machine incorporating a programmable digital computer to operate various machine components. The computer includes a memory which contains a plurality of different operating programs with each program instructing the machine to operate in a different manner. Provision is made for selectively permitting the user to access the programs of lesser complexity, while providing access to all of the programs to trained service personnel. The service personnel can expand or restrict the number of programs that the user is permitted to use depending on her familiarity with the machine.

12 Claims, 57 Drawing Figures

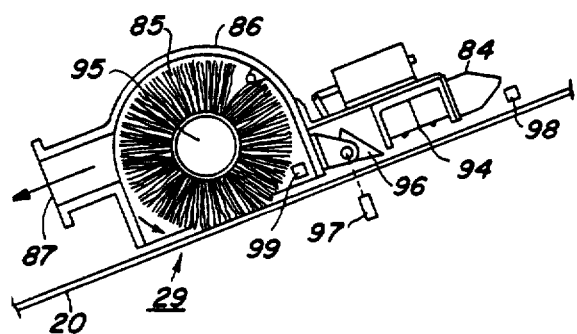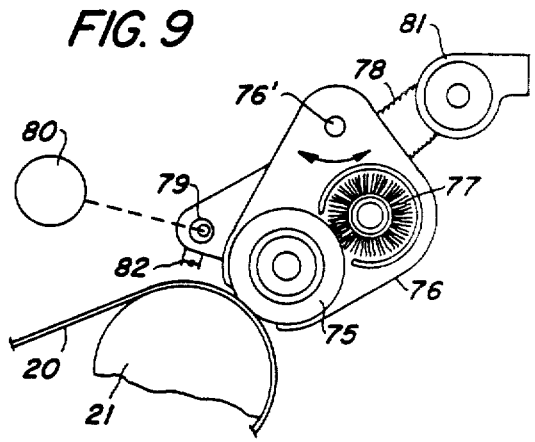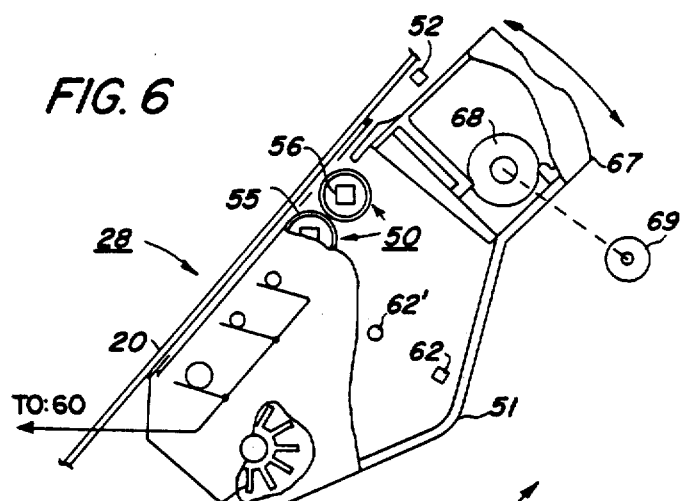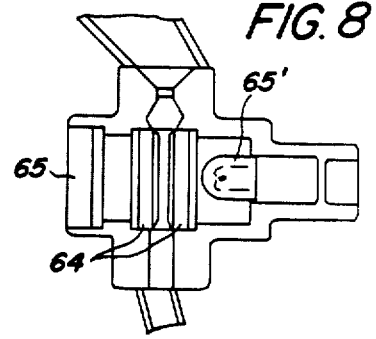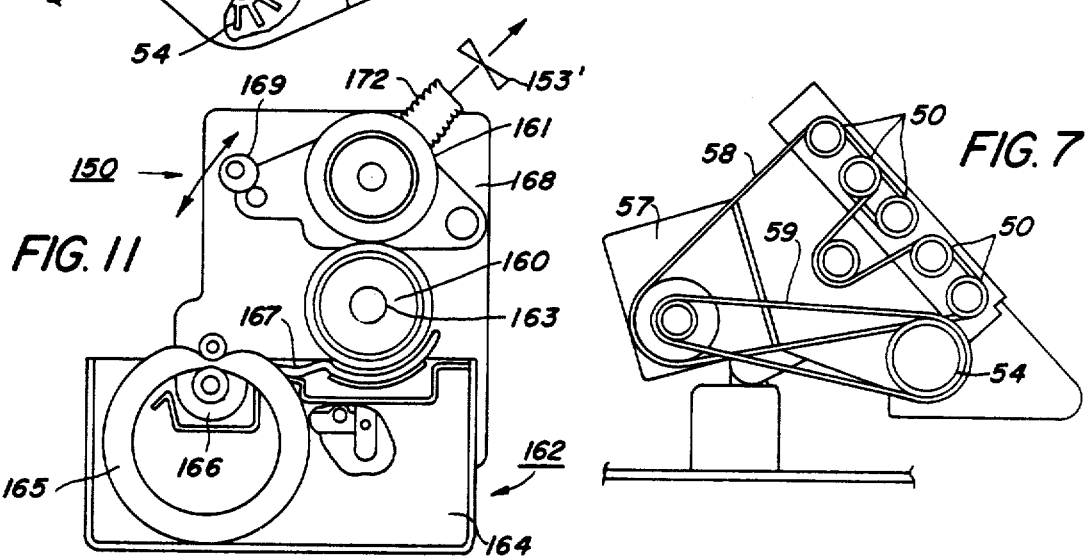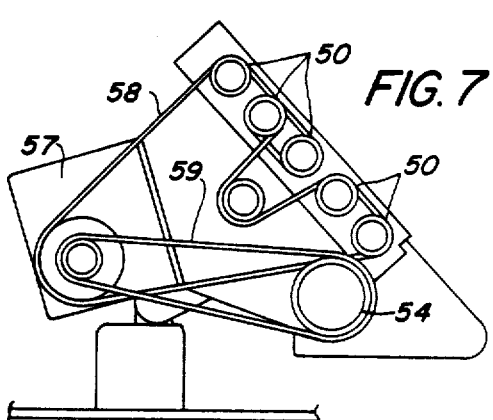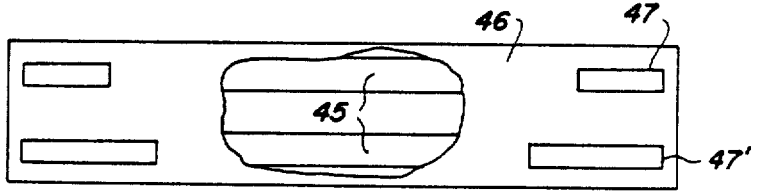

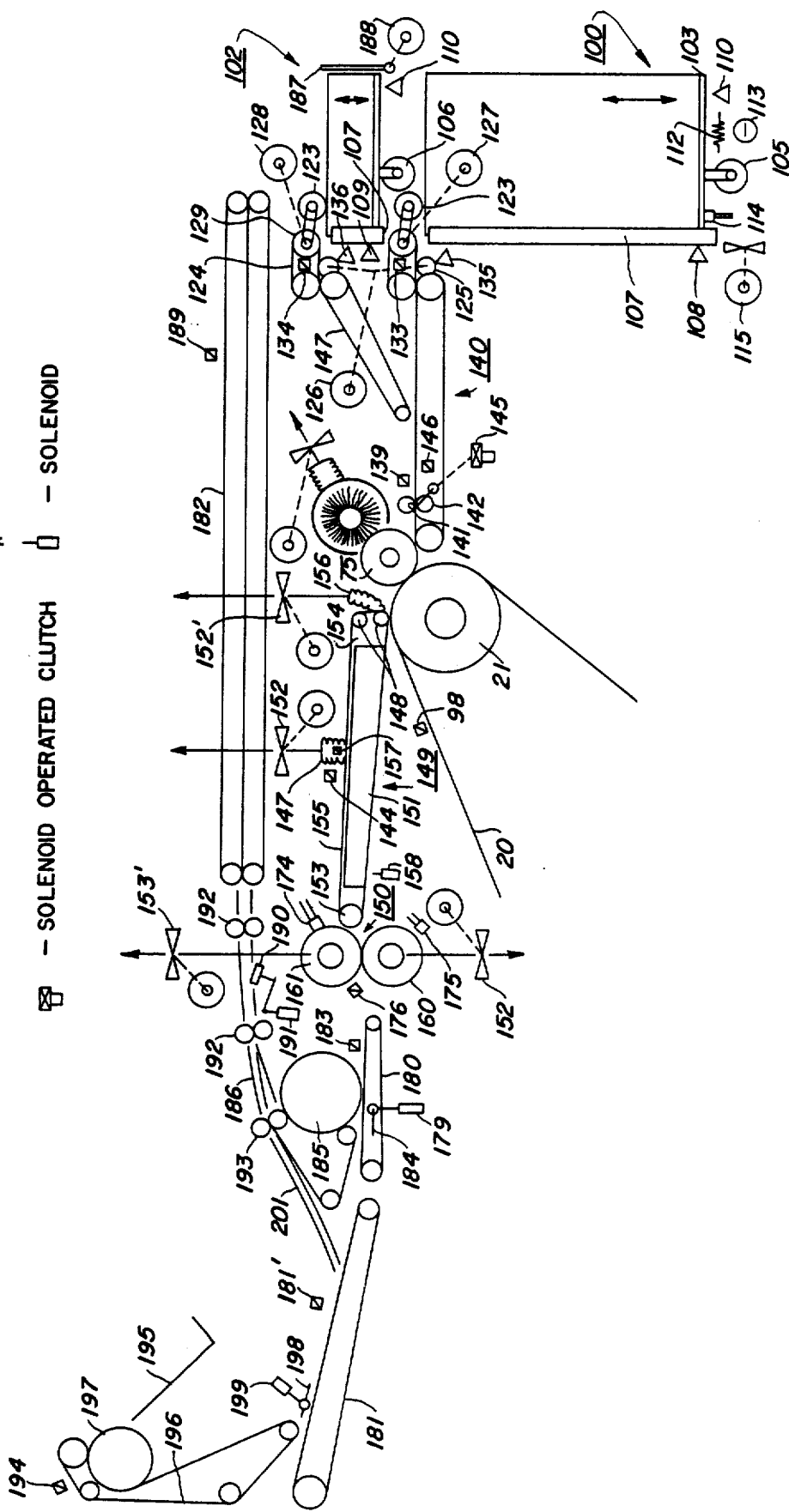

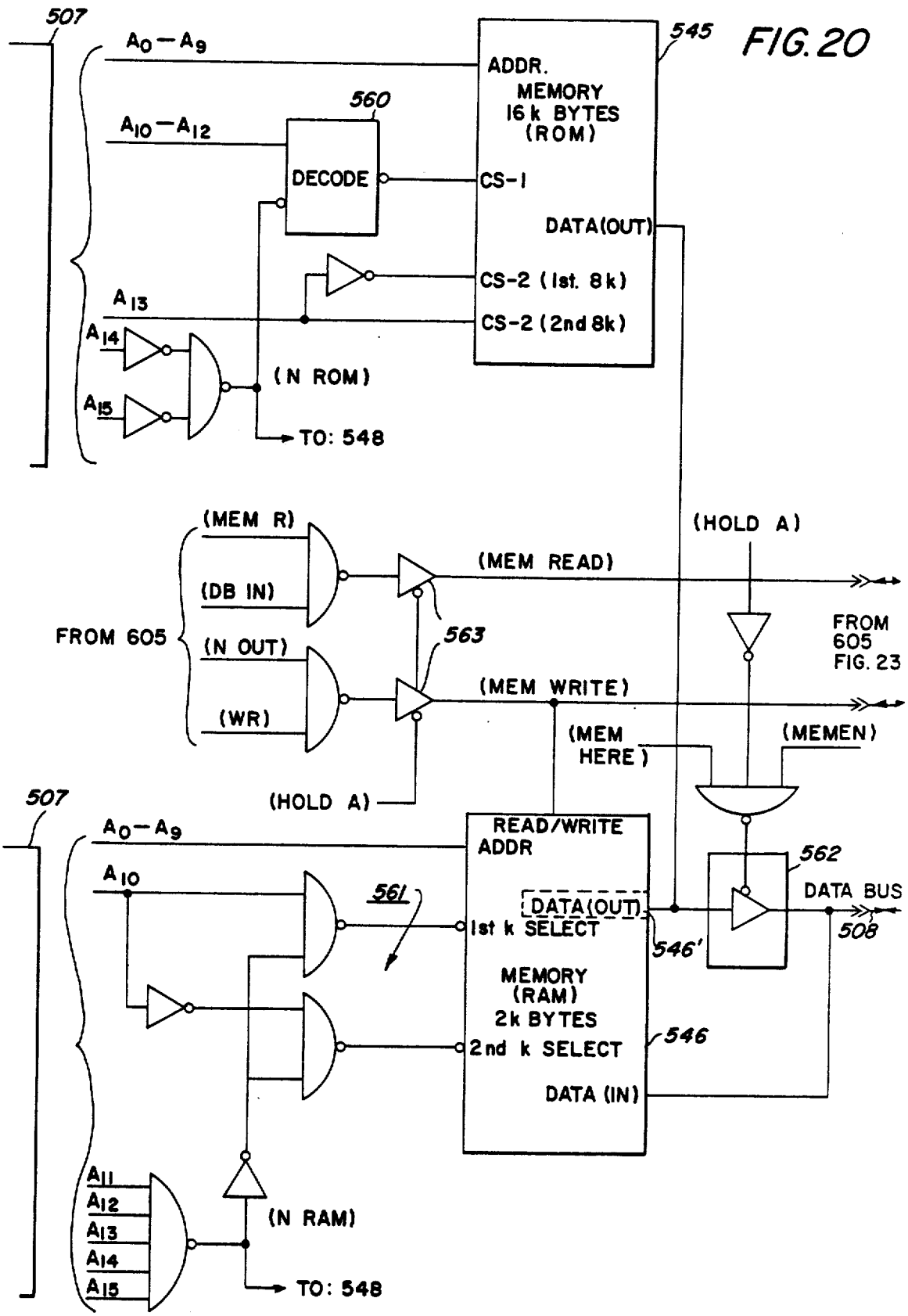

MEMORY READY

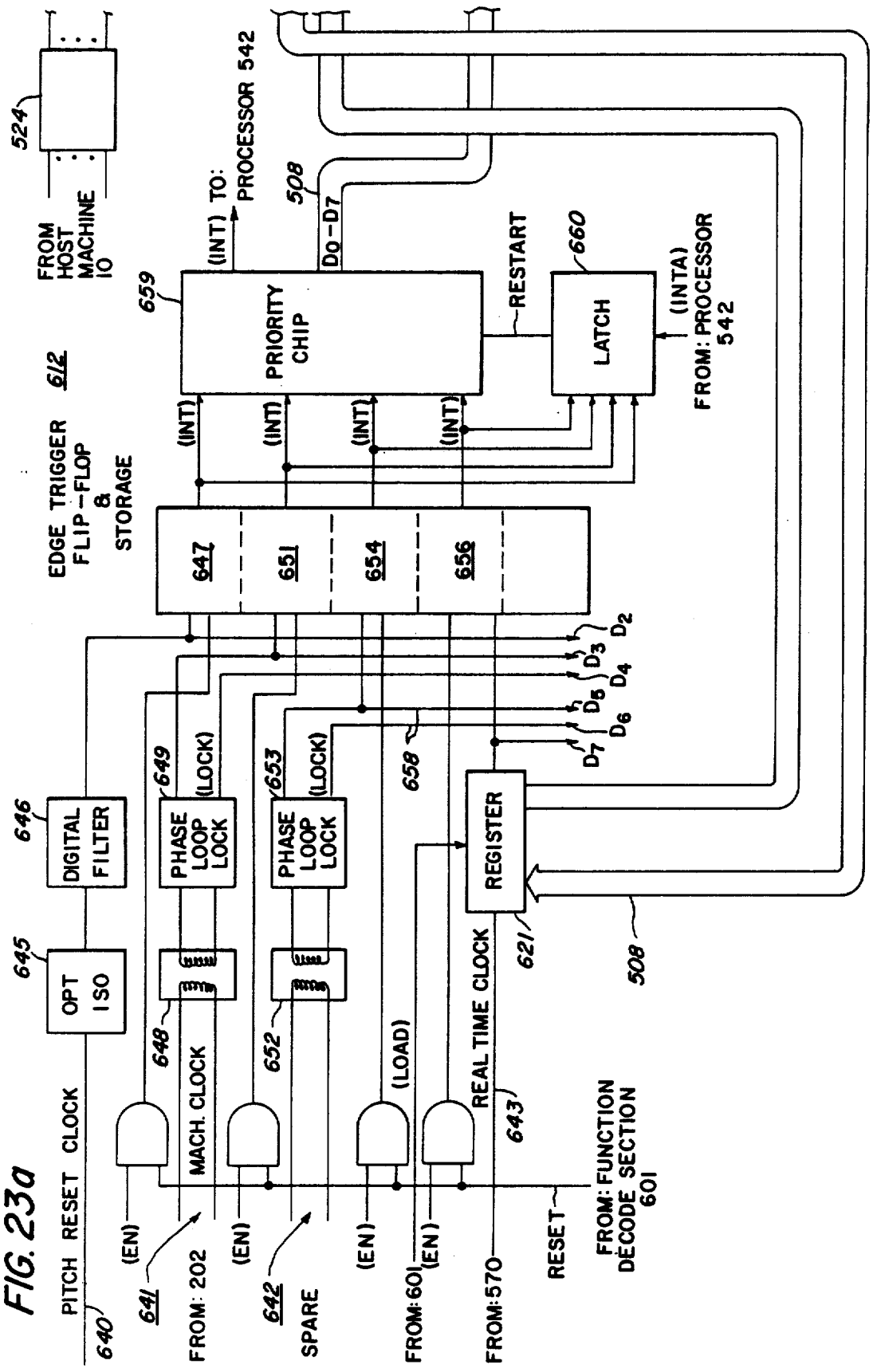

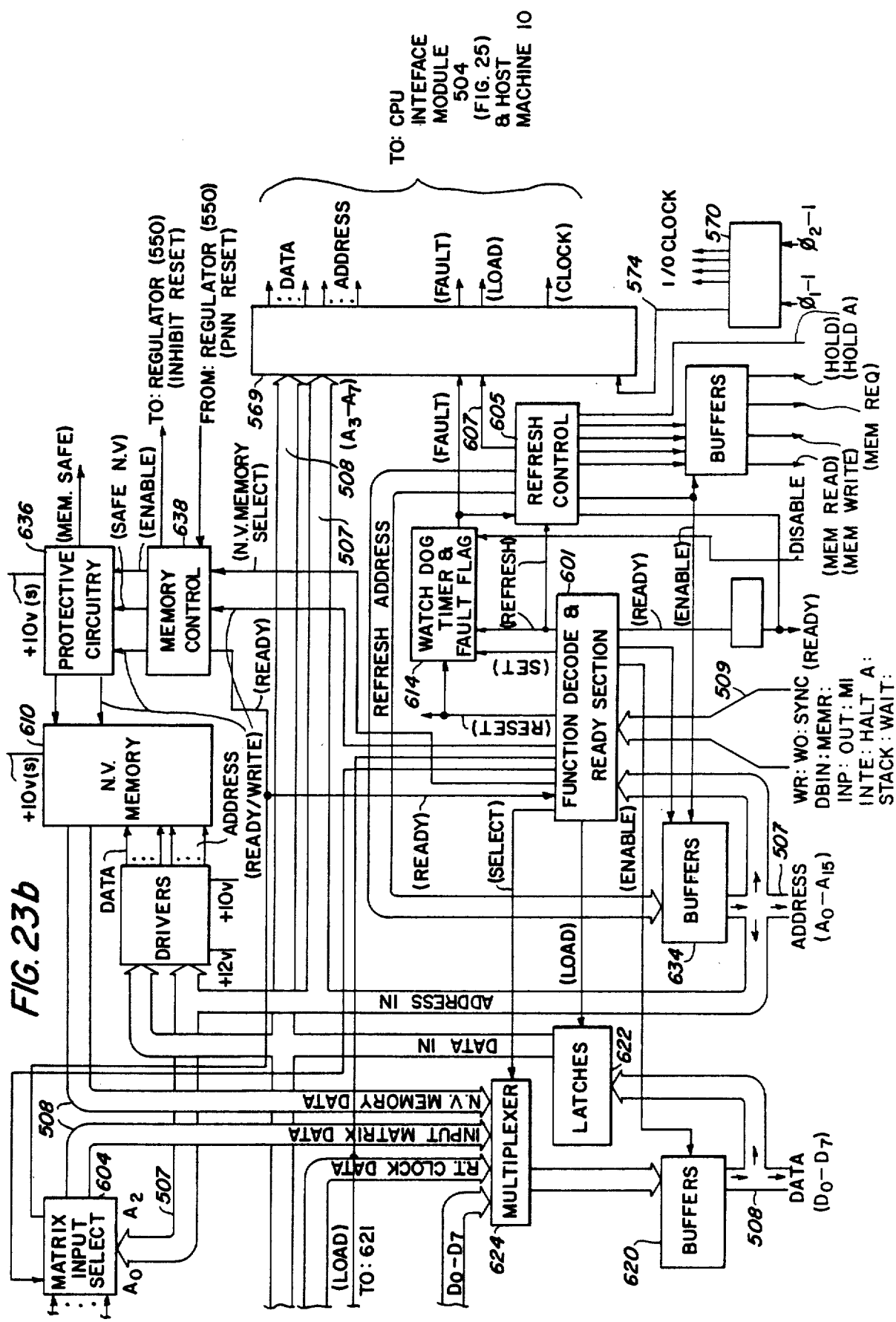

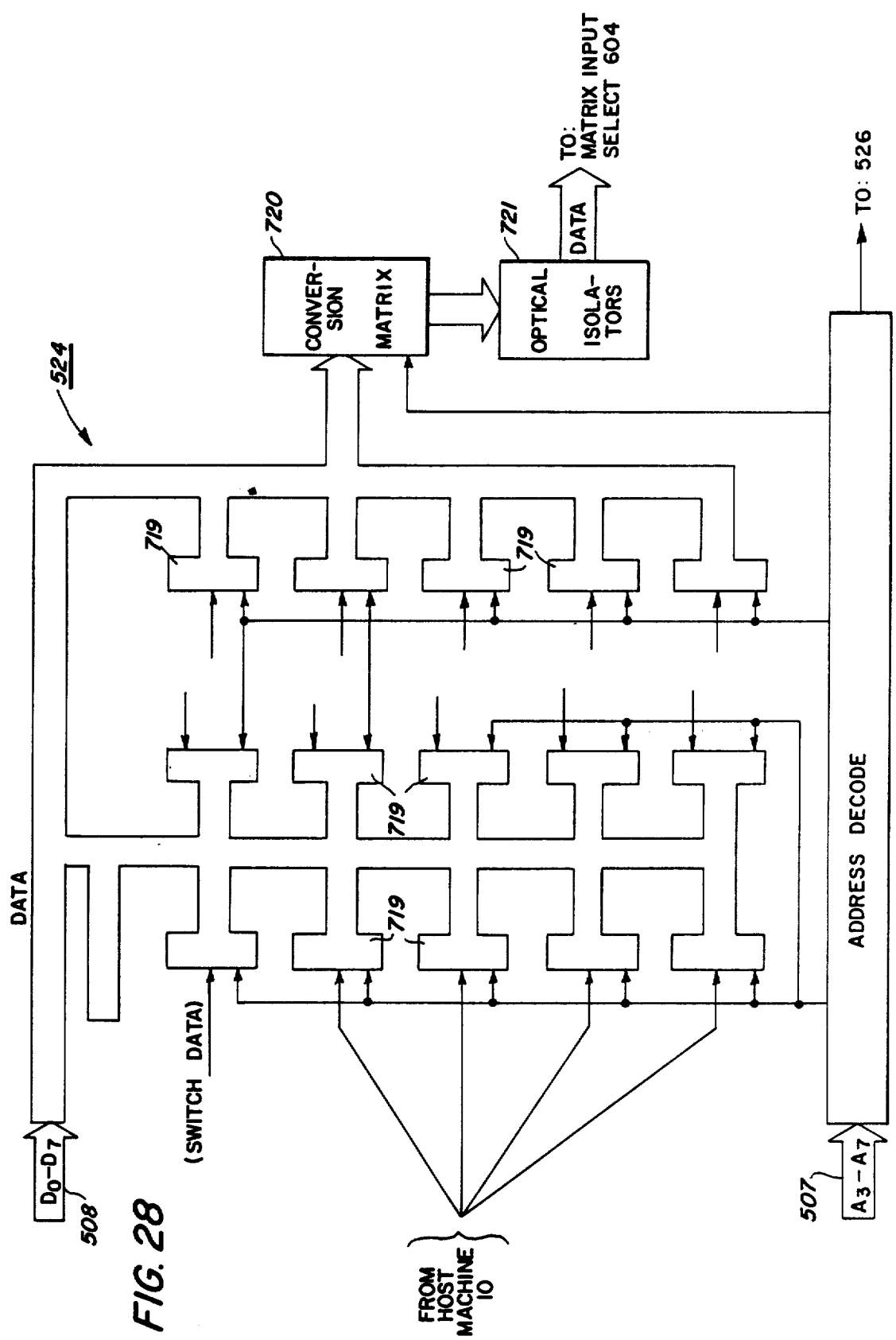

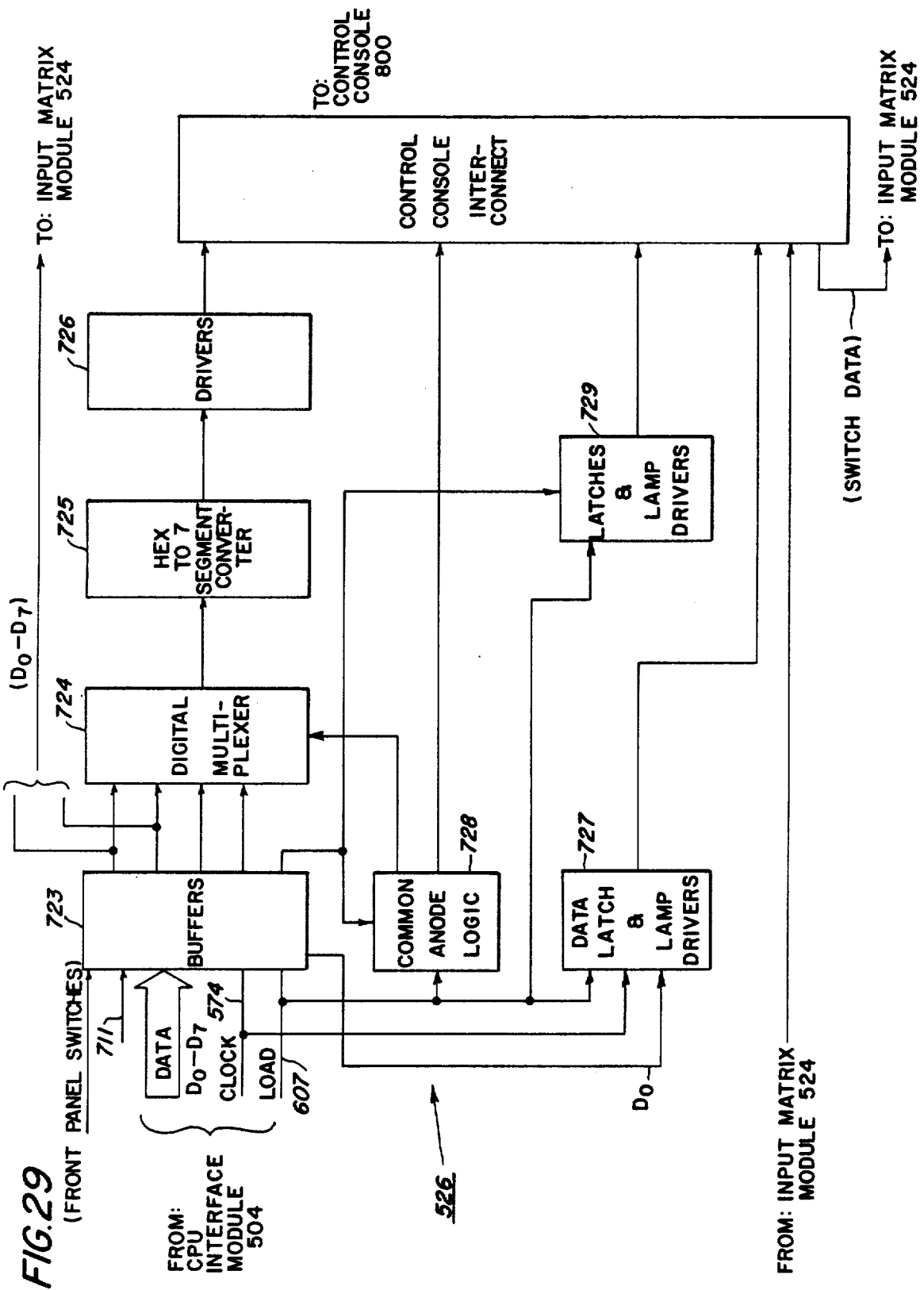

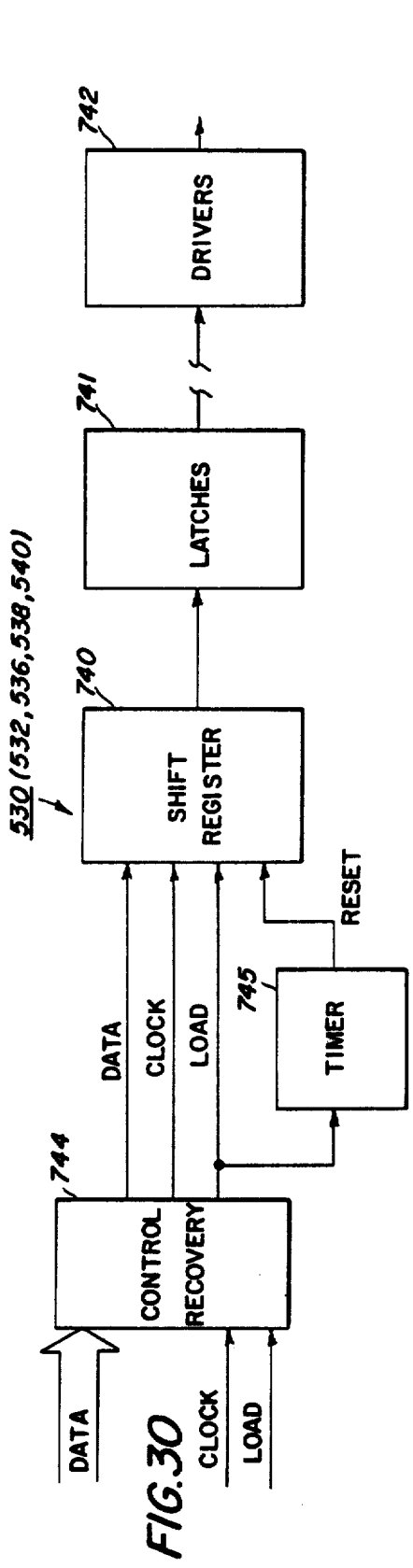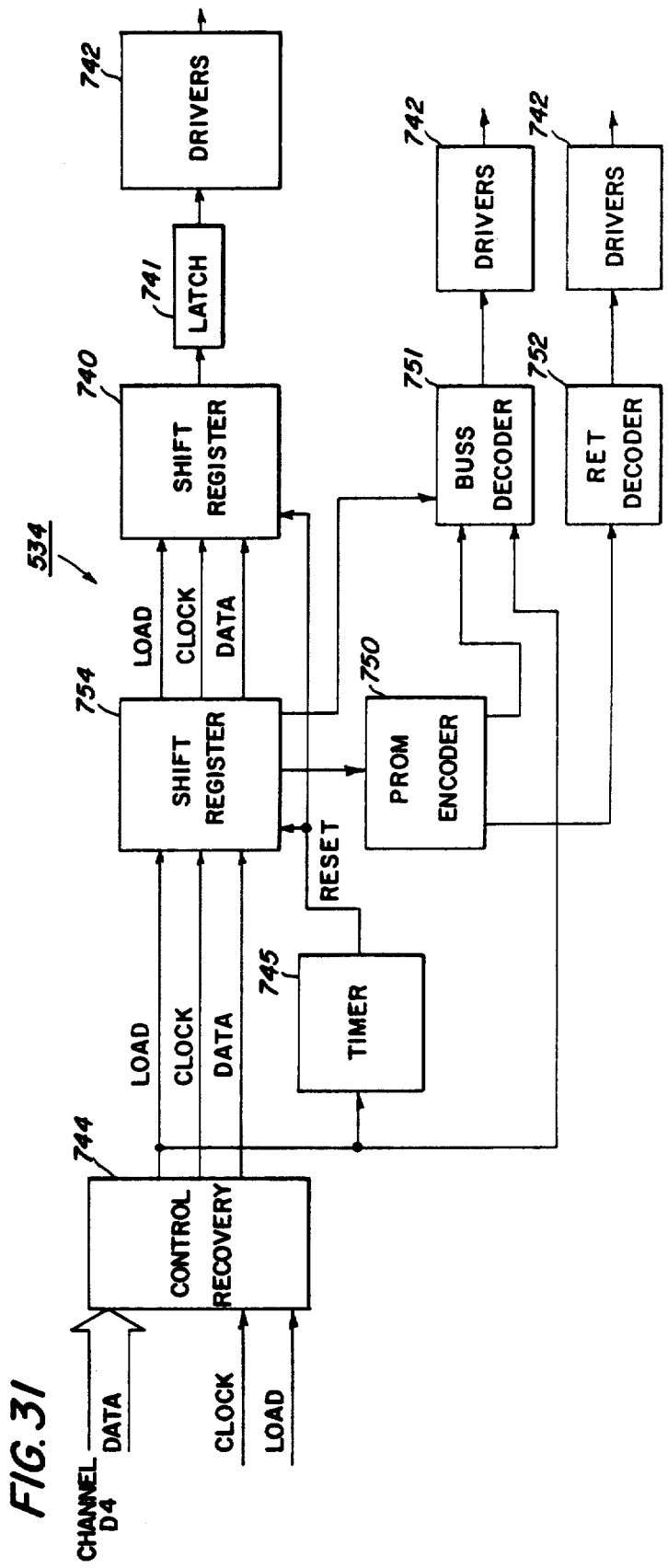

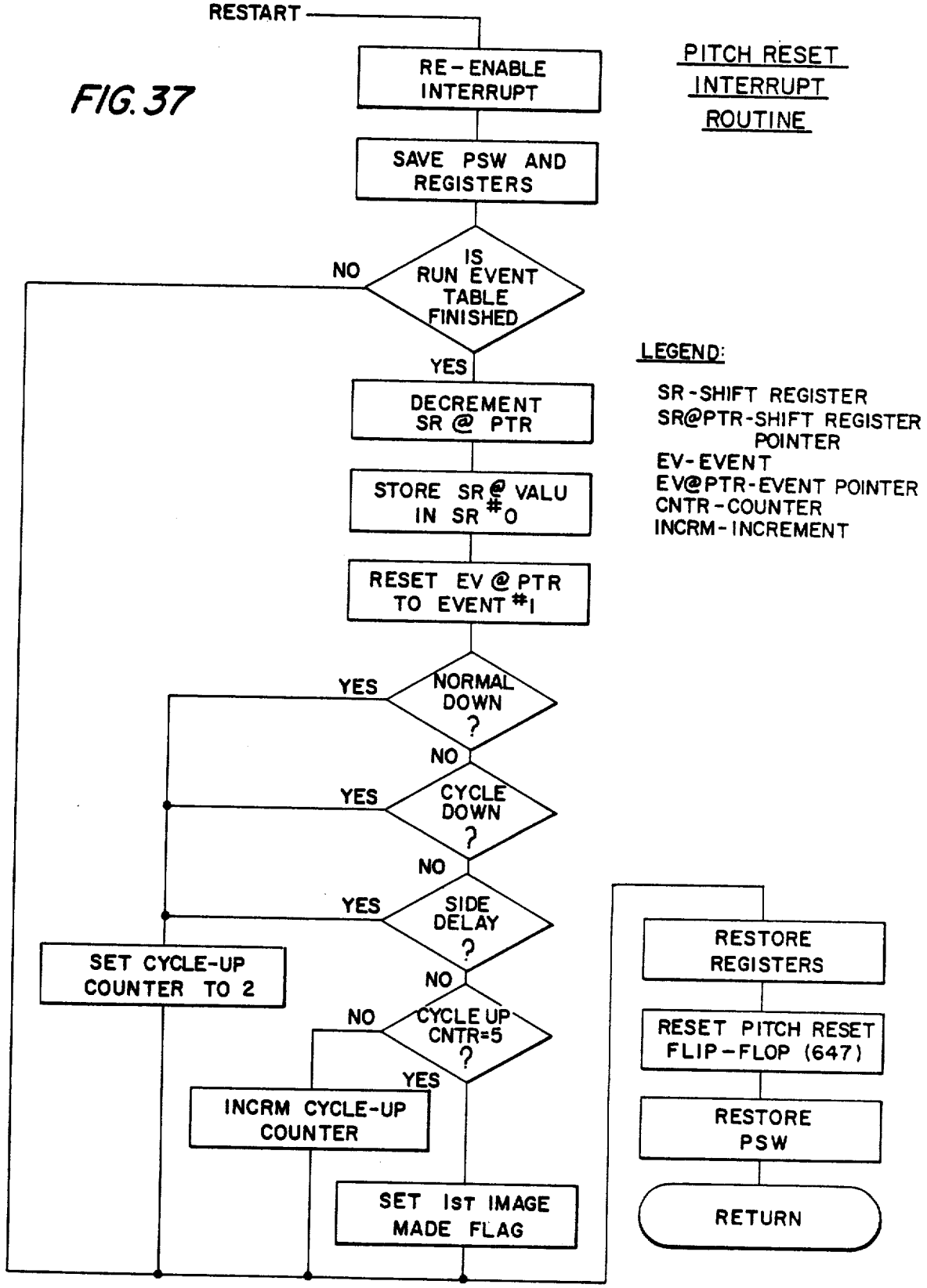

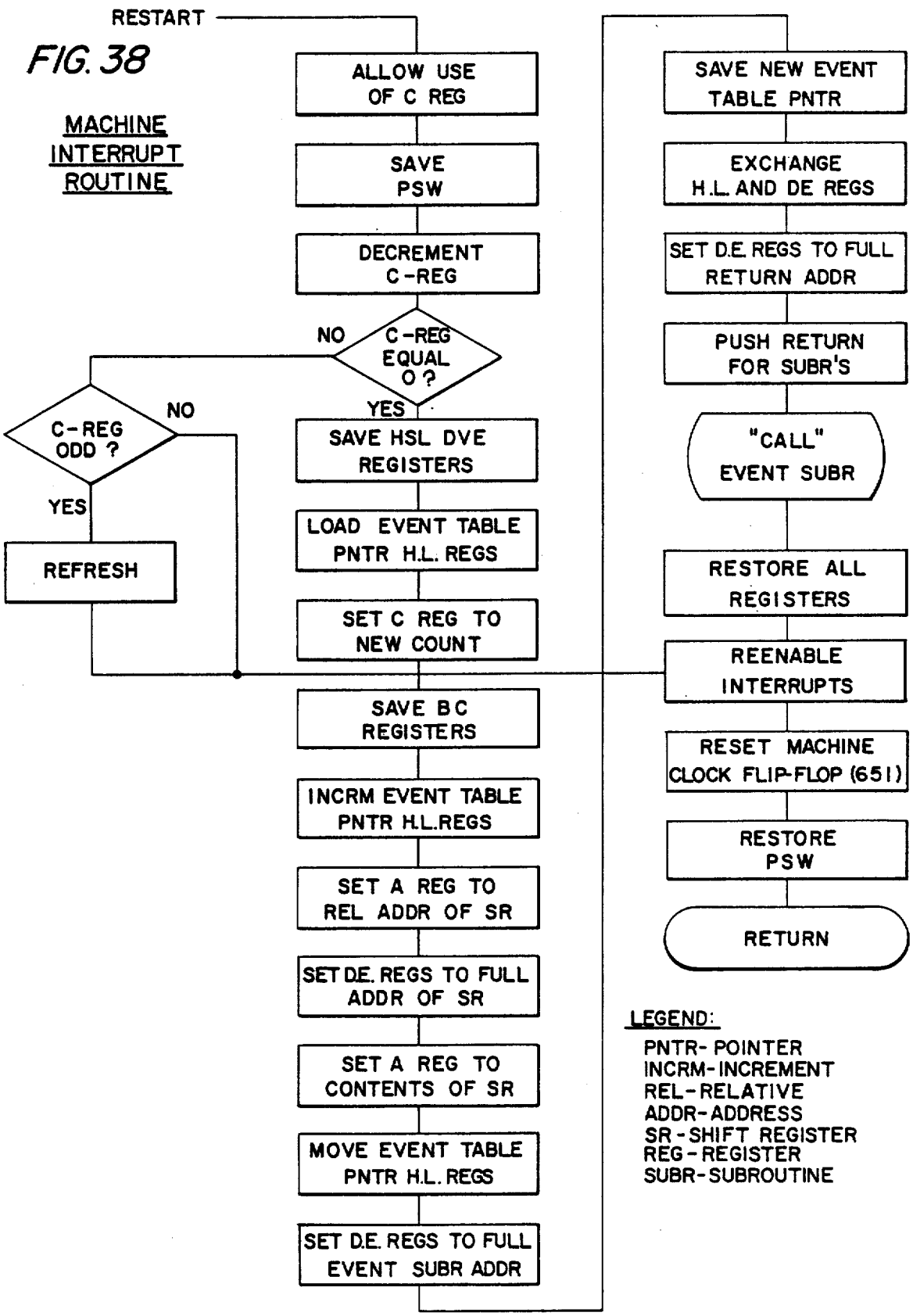

REPRODUCTION MACHINE WITH SELECTIVELY DISCLOSABLE PROGRAMS

BACKGROUND OF THE INVENTION

This invention relates to electrostatographic xerographic type reproduction machines, and more particularly, to an improved control system for such machines.

Present day reproduction machines are extremely complex devices. They often include, in addition to the processor, input/output devices such as automatic original document handlers, sorters, staplers, and other finishing devices designed to minimize operator time in producing copies. Accordingly, these machines contain a large number of components which must be activated in a strict timed sequence to insure proper operation. It has been suggested to utilize a programmable controller or digital computer to accomplish this task. However, such computers heretofore contained only one operating program specifically designed to only control the operation of the machine to produce copies in one particular manner. Therefore, these machines have not possessed the necessary flexibility to perform other tasks which differ from the set machine operation for the particular machine configuration.

Unfortunately, as the complexity of these machines increase, so does the potential for malfunctions. Accordingly, it would be desirable to provide a means for operating the machine in a different manner, not make copies, but for diagnosing the cause of malfunction which has heretofore been a burdensome task due to the complexity of the machine.

OBJECTS AND SUMMARY OF THE INVENTION

Therefore, it is an object of this invention to provide a plurality of selectively accessible operating programs for instructing a digital computer to operate the machine in a different manner.

It is another object of this invention to provide at least one selectively accessible program for use in diagnosing machine malfunctions.

It is still another object of this invention to accomplish the above objectives wherein the operating programs are accessible through an operator console on the machine.

It is a further object of this invention to provide a plurality of diagnostic programs, only some of which are accessible by the user.

It is still another object of this invention to provide means for expanding or restricting the number of programs accessible to the user.

These and other objects of this invention are accomplished by storing at least two different operating programs in a memory, with each program instructing a computer to control the operation of machine components in a different manner. Means are also provided to permit the user to selectively access the program desired, preferably by activating selection devices in the operator console. In one embodiment, one of the programs is accessed and utilized to control the machine to make copies, whereas at least one other program operates the machine components in a preselected sequence so as to permit identification of the cause of machine malfunctions. Another feature of this invention selectively permits the operator to gain access to some of the programs, while denying access to others. Moreover, means are provided to expanding or restricting the number of programs to which the user may gain access.

BRIEF DESCRIPTION OF THE DRAWINGS

Other objects and advantages will be apparent from the ensuing description and drawings in which:

FIG. 5 is an enlarged view showing details of the photoreceptor edge fadeout mechanism for the apparatus shown in FIG. 1;

FIG. 6 is an enlarged view showing details of the developing mechanism for the apparatus shown in FIG. 1;

FIG. 7 is an enlarged view showing details of the developing mechanism drive;

FIG. 8 is an enlarged view showing details of the developability control for the apparatus shown in FIG. 1;

FIG. 9 is an enlarged view showing details of the transfer roll support mechanism for the apparatus shown in FIG. 1;

FIG. 10 is an enlarged view showing details of the photoreceptor cleaning mechanism for the apparatus shown in FIG. 1;

FIG. 11 is an enlarged view showing details of the fuser for the apparatus shown in FIG. 1;

FIG. 12 is a schematic view showing the paper path and sensors of the apparatus shown in FIG. 1;

FIG. 19b is a chart illustrating the output wave form of the clock shown in FIG. 19a;

FIG. 20 is a logic schematic of the CPU memory;

FIGS. 23a and 23b comprise a block diagram of the controller I/O module;

FIG. 28 is a block diagram of the main panel interface module;

FIG. 29 is a block diagram of the input matrix module;

FIG. 30 is a block diagram of a typical remote;

FIG. 31 is a block diagram of the sorter remote;

FIG. 37 is a flow charge of the pitch interrupt routine;

FIG. 38 is a flow chart of the machine clock interrupt routine;

DETAILED DESCRIPTION OF THE PREFERRED EMBODIMENT OF THE INVENTION

Figure 1:
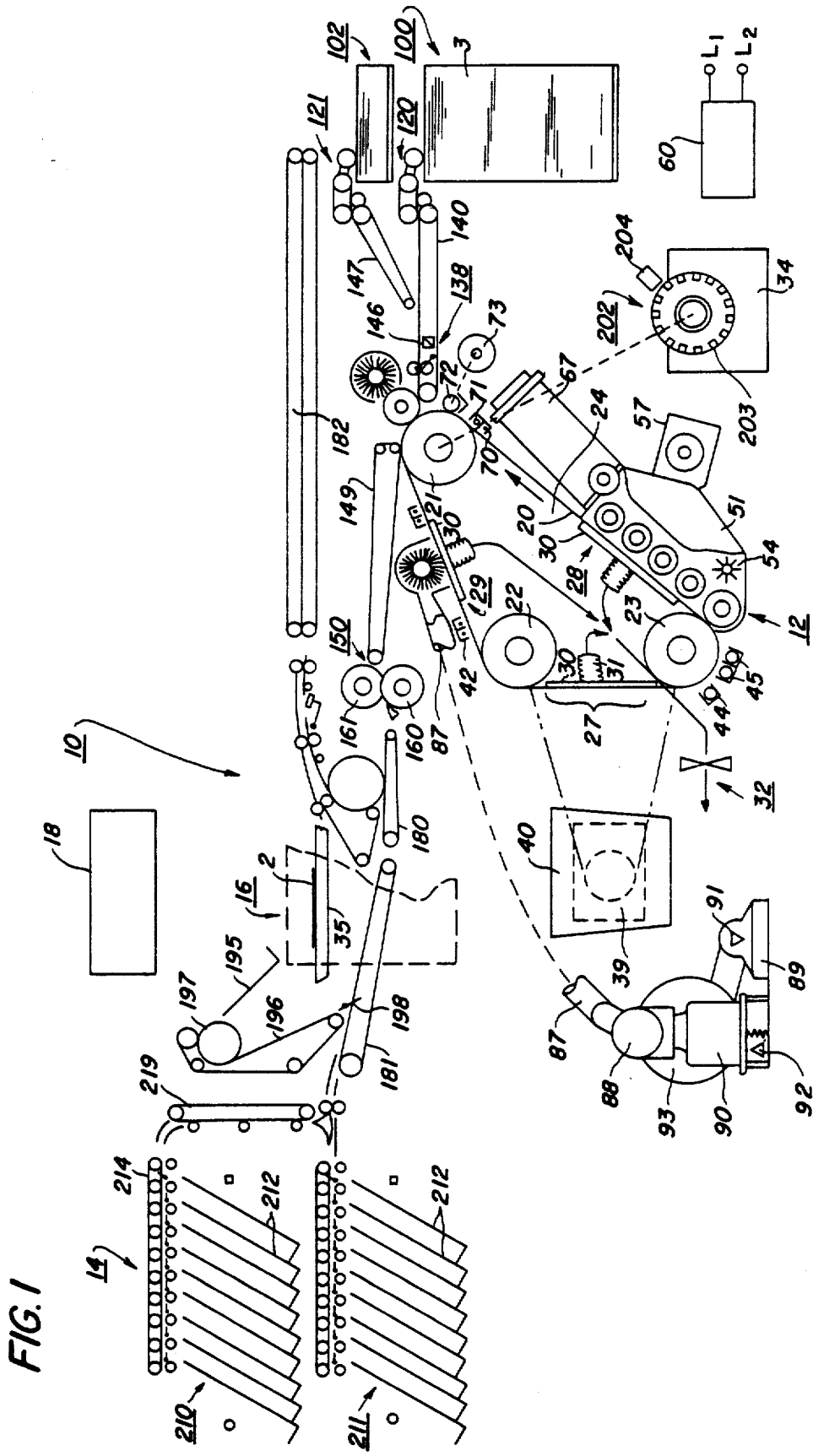
FIG. 1 is a schematic representation of an exemplary reproduction apparatus incorporating the control system of the present invention.
Figure 2:
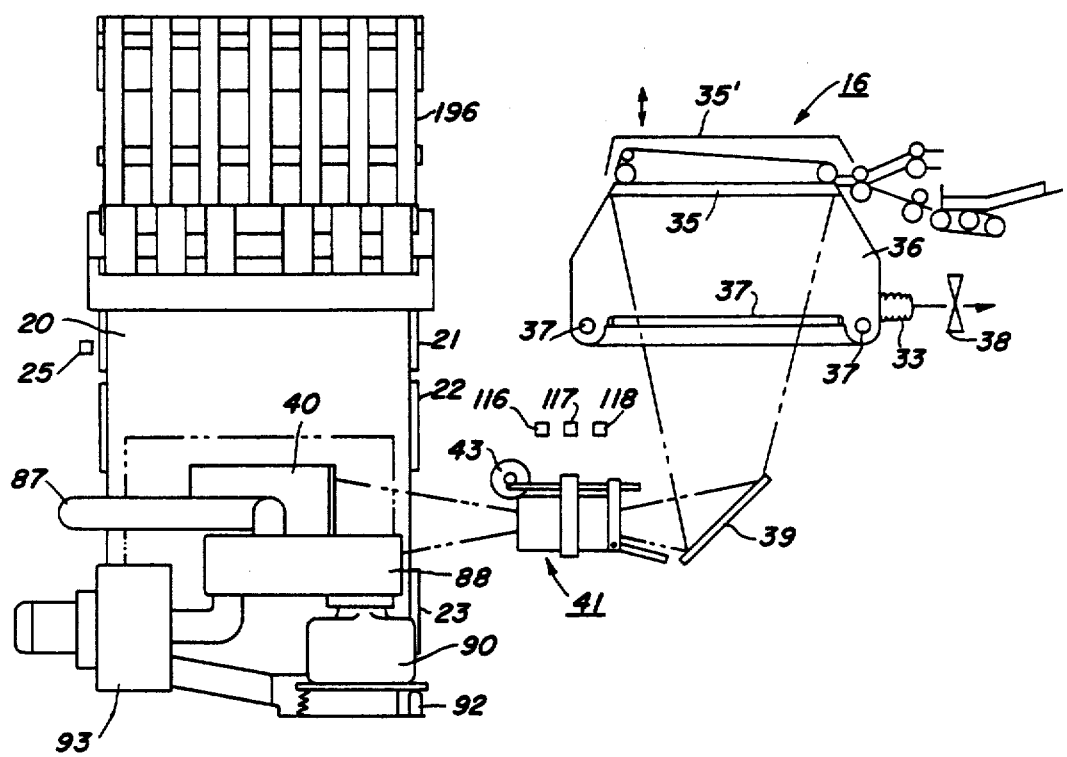
FIG. 2 is a vertical sectional view of the apparatus shown in FIG. 1 along the image plane.
Figure 3:
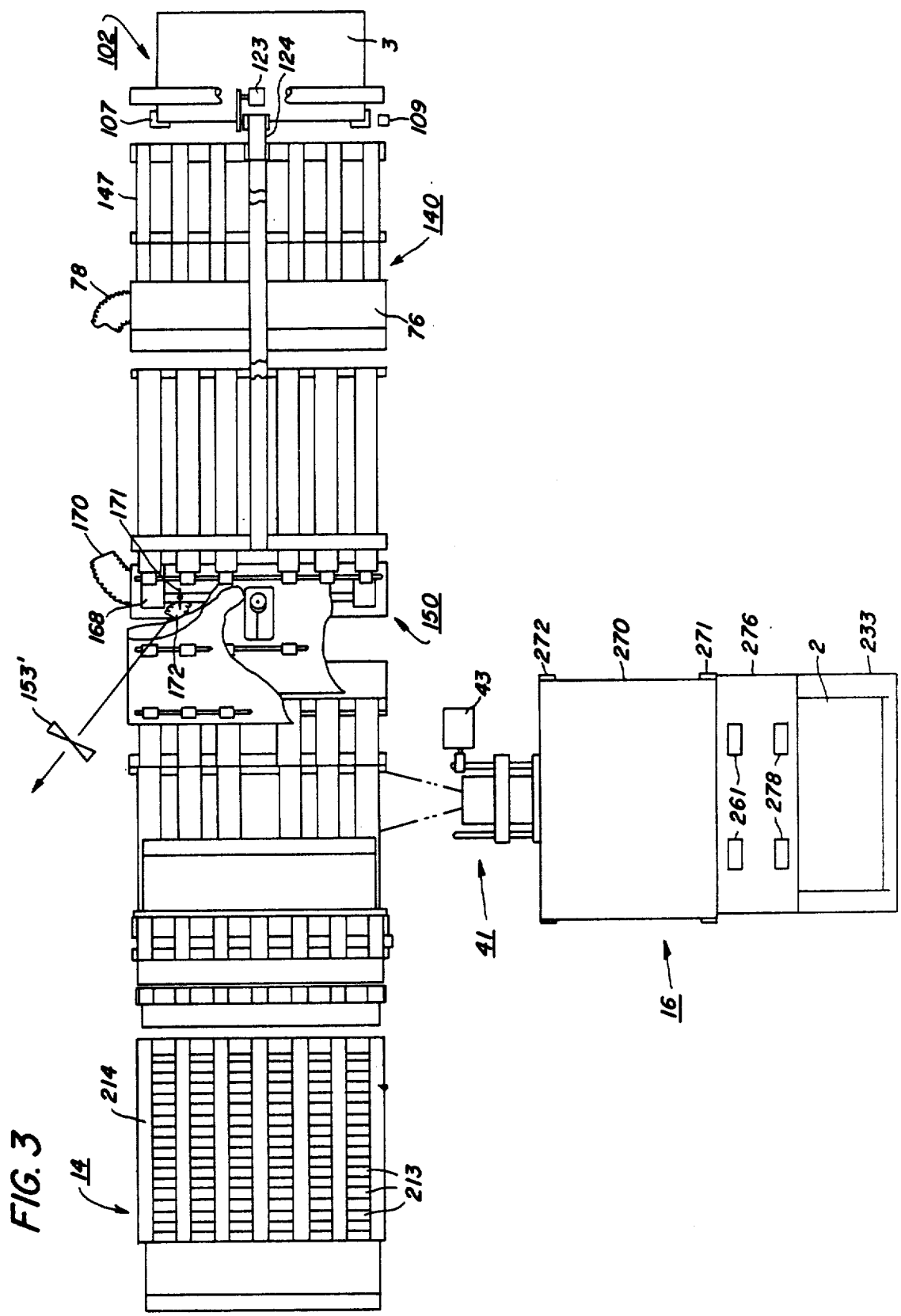
FIG. 3 is a top plane view of the apparatus shown in FIG. 1.

Referring particularly to FIGS. 1-3 of the drawings, there is shown, in schematic outline, an electrostatic reproduction system or host machine, identified by numeral 10, incorporating the control arrangement of the present invention. To facilitate description, the reproduction system 10 is divided into a main electrostatic xerographic processor 12, sorter 14, document handler 16, and controller 18. Other processor, sorter and/or document handler types and constructions, and different combinations thereof may instead by envisioned.

PROCESSOR

Processor 12 utilizes a photoreceptor in the form of an endless photoconductive belt 20 supported in generally triangular configuration by rolls 21, 22, 23. Belt supporting rolls 21, 22, 23 are in turn rotatably journaled on subframe 24.

In the exemplary processor illustrated, belt 20 comprises a photoconductive layer of selenium, which is the light receiving surface and imaging medium, on a conductive substrate. Other photoreceptor types and forms, such as comprising organic materials or of multilayers or a drum may instead be envisioned. Still other forms may comprise scroll type arrangements wherein webs of photoconductive material may be played in and out of the interior of supporting cylinders.

Figure 4:
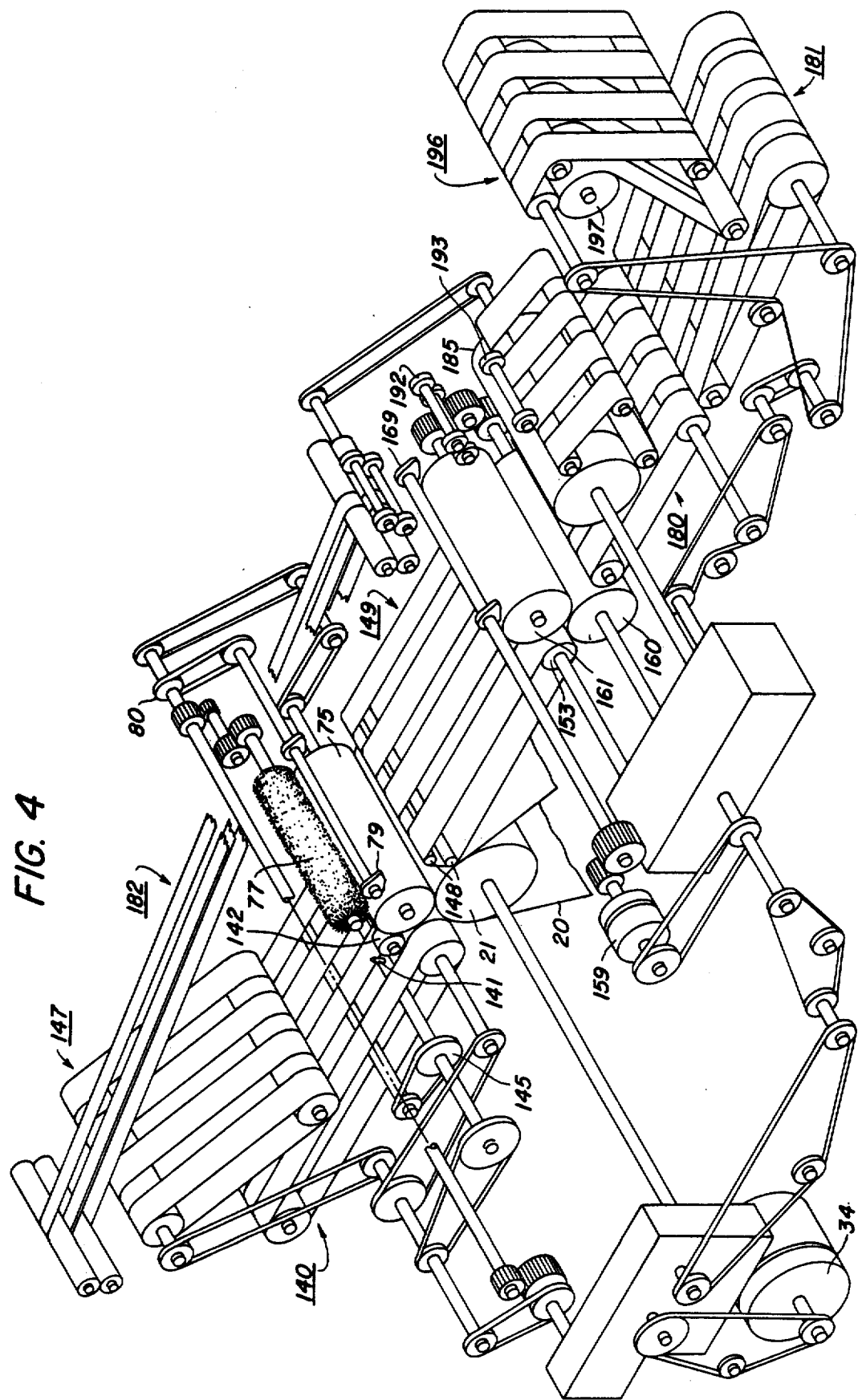
FIG. 4 is an isometric view showing the drive train for the apparatus shown in FIG. 1.

Suitable biasing means (not shown) are provided on subframe 24 to tension the photoreceptor belt 20 and insure movement of belt 20 along a prescribed operating path. Belt tracking switch 25 (shown in FIG. 2) monitors movement of belt 20 from side to side. Belt 20 is supported so as to provide a trio of substantially flat belt runs opposite exposure, developing, and cleaning stations 27, 28, 29 respectfully. To enhance belt flatness at these stations, vacuum platens 30 are provided under belt 20 at each belt run. Conduits 31 communicate vacuum platens 30 with a vacuum pump 32. Photoconductive belt 20 moves in the direction indicated by the solid line arrow, drive thereto being effected through roll 21, which in turn is driven by main drive motor 34, as seen in FIG. 4.

Processor 12 includes a generally rectangular, horizontal transparent platen 35 on which each original 2 to be copied is disposed. A two or four sided illumination assembly, consisting of internal reflectors 36 and flash lamps 37 (shown in FIG. 2) disposed below and along at least two sides of platen 35, is provided for illuminating the original 2 on platen 35. To control temperatures within the illumination space, the assembly is coupled through conduit 33 with a vacuum pump 38 which is adapted to withdraw overly heated air from the space. To retain the original 2 in place on platen 35 and prevent escape of extraneous light from the illumination assembly, a platen cover 35' may be provided.

The light image generated by the illumination system is projected via mirrors 39, 40 and a variable magnification lens assembly 41 onto the photoreceptive belt 20 at the exposure station 27. Reversible motor 43 is provided to move the main lens and add on lens elements that comprise the lens assembly 41 to different predetermined portions and combinations to provide the preselected image sizes corresponding to push button selectors 818, 819, 820 on operator module 800. (See FIG. 32) Sensors 116, 117, 118 signal the present disposition of lens assemby 41. Exposure of the previously charged belt 20 selectively discharges the photoconductive belt to produce on belt 20 an electrostatic latent image of the original 2. To prepare belt 20 for imaging, belt 20 is uniformly charged to a preselected level by charge corotron 42 upstream of the exposure station 27.

To prevent development of charged but unwanted image areas, erase lamps 44, 45 are provided. Lamp 44, which is referred to herein as the pitch fadeout lamp, is supported in transverse relationship to belt 20, lamp 44 extending across substantially the entire width of belt 20 to erase (i.e. discharge) areas of belt 20 before the first image, between successive images, and after the last image. Lamps 45, which are referred to herein as edge fadeout lamps, serve to erase areas bordering each side of the images. Referring particularly to FIG. 5, edge fadeout lamps 45, which extend transversely to belt 20, are disposed within a housing 46 having a pair of transversely extending openings 47, 47' of differing length adjacent each edge of belt 20. By selectively actuating one or the other of the lamps 45, the width of the area bordering the sides of the image that is erased can be controlled.

Referring to FIGS. 1, 6 and 7, magnetic brush rolls 50 are provided in a developer housing 51 at developing station 28. Housing 51 is pivotally supported adjacent the lower end thereof with interlock switch 52 to sense disposition of housing 51 in operative position adjacent belt 20. The bottom of housing 51 forms a sump within which a supply of developing material is contained. A rotatable auger 54 in the sump area serves to mix the developing material and bring the material into operative relationship with the lowermost of the magnetic brush rolls 50.

As will be understood by those skilled in the art, the electrostatically attractable developing material commonly used in magnetic brush developing apparatus of the type shown comprises a pigmented resinous powder, referred to as toner, and larger granular beads referred to as carrier. To provide the necessary magnetic properties, the carrier is comprised of a magnetizable material such as steel. By virtue of the magnetic fields established by developing rolls 50 and the interrelationship therebetween, a blanket of developing material is formed along the surfaces of developing rolls 50 adjacent the belt 20 and extending from one roll to another. Toner is attracted to the electrostatic latent image from the carrier bristles to produce a visible powder image on the surface of belt 20.

Magnetic brush rolls 50 each comprise a rotatable exterior sleeve 55 with relatively stationary magnet 56 inside. Sleeves 55 are rotated in unison and at substantially the same speed as belt 20 by a developer drive motor 57 through a belt and pulley arrangement 58. A second belt and pulley arrangement 59 drives auger 54.

To regulate development of the latent electrostatic images on belt 20, magnetic brush sleeves 55 are electrically biased. A suitable power supply 60 is provided for this purpose with the amount of bias being regulated by controller 18.

Developing material is returned to the upper portion of developer housing 51 for reuse. A photocell 62 monitors the level of developing material in housing 51 with lamp 62' therefor spaced opposite to the photocell 62. The disclosed machine is also provided with automatic developability control which maintains an optimum proportion of toner-to-carrier material by sensing toner concentration and replenishing toner, as needed. As shown in FIG. 8, the automatic develpability control comprises a pair of transparent plates 64 mounted in spaced, parallel arrangement in developer housing 51 such that a portion of the returning developing material passes therebetween. A suitable circuit, not shown, alternately places a charge on the plates 64 to attract toner thereto. Photocell 65 on one side of the plate pair senses the developer material as the material passes therebetween. Lamp 65' on the opposite side of plate pair 64 provides reference illumination. In this arrangement, the returning developing material is alternately attracted and repelled to and from plates 64. The accumulation of toner, i.e. density determines the amount of light transmitted from lamp 65' to photocell 65. Photocell 65 monitors the density of the returning developing material with the signal output therefrom being used by controller 18 to control the amount of fresh or make-up toner to be added to developer housing 51 from toner supply container 67.

To discharge toner from container 67, rotatable dispensing roll 68 is provided in the inlet to developer housing 51. Motor 69 drives roll 68. When fresh toner is required, as determined by the signal from photocell 65, controller 18 actuates motor 69 to turn roll 68 for a timed interval. The rotating roll 68, which is comprised of a relatively porous sponge-like material, carries toner particles thereon into developer housing 51 where it is discharged. Pre-transfer corotron 70 and lamp 71 are provided downstream of magnetic brush rolls 50 to regulate developed image charges before transfer.

A magnetic pick-off roll 72 is rotatably supported opposite belt 20 downstream of pre-transfer lamp 71, roll 72 serving to scavenge leftover carrier from belt 20 preparatory to transfer of the developed image to the copy sheet 3. Motor 73 turns roll 72 in the same direction and at substantially the same speed as belt 20 to prevent scoring or scratching of belt 20. One type of magnetic pick-off roll is shown in U.S. Pat. No. 3,834,804, issued Oct. 10, 1974 to Bhagat et al.

Referring to FIGS. 4, 9 and 12, to transfer developed images from belt 20 to the copy sheets 3, a transfer roll 75 is provided. Transfer roll 75, which forms part of the copy sheet feed path, is rotatably supported within a transfer roll housing 76 opposite belt support roll 21. Housing 76 is pivotally mounted for swinging movement about axis 76' to permit the transfer roll assembly to be moved into and out of operative relationship with belt 20. A transfer roll cleaning brush 77 is rotatably journalled in transfer roll housing 76 with the brush periphery in contact with transfer roll 75. Transfer roll 75 is driven through contact with belt 20 while cleaning brush 77 is coupled to main driven motor 34. To remove toner, housing 76 is connected through conduit 78 with vacuum pump 81. To facilitate and control transfer of the developed images from belt 20 to the copy sheets 3, a suitable electrical bias is applied to transfer roll 75.

To permit transfer roll 75 to be moved into and out of operative relationship with belt 20, cam 79 is provided in driving contact with transfer roll housing 76. Cam 79 is driven from motor 34 through an electromagnetically operated one revolution clutch 80. Spring means (not shown) serves to maintain housing 76 in driving engagement with cam 79.

To facilitate separation of the copy sheets 3 from belt 20 following transfer of developed images, a detack corotron 82 is provided. Corotron 82 generates a charge designed to neutralize or reduce the charges tending to retain the copy sheet on belt 20. Corotron 82 is supported on transfer roll housing 76 opposite belt 20 and downstream of transfer roll 75.

Referring to FIGS. 1, 2 and 10, to prepare belt 20 for cleaning, residual charges on belt 20 are removed by discharge lamp 84 and preclean corotron 94. A cleaning brush 85, rotatably supported within an evacuated semi-circular shaped brush housing 86 at cleaning station 29, serves to remove residual developer from belt 20. Motor 95 drives brush 85, brush 85 turning in a direction opposite that of belt 20.

Vacuum conduit 87 couples brush housing 86 through a centrifugal type separator 88 with the suction side of a vacuum pump 93. A final filter 89 on the outlet of pump 93 traps particles that pass through separator 88. The heavier toner particles separated by separator 88 drop into and are collected in one or more collecting bottles 90. Pressure sensor 91 monitors the condition of final filter 89 while a sensor 92 monitors the amount of toner particles in collecting bottles 90.

To obviate the danger of copy sheets remaining on belt 20 and becoming entangled with the belt cleaning mechanism, a deflector 96 is provided upstream of cleaning brush 85. Deflector 96, which is pivotally supported on the brush housing 86, is operated by solenoid 97. In the normal or off position, deflector 96 is spaced from belt 20 (the solid line position shown in the drawings). Energization of solenoid 97 pivots deflector 96 downwardly to bring the deflector leading edge into close proximity to belt 20.

Sensors 98, 99 are provided on each side of deflector 96 for sensing the presence of copy material on belt 20. A signal output from upstream sensor 98 triggers solenoid 97 to pivot deflector 96 into position to intercept the copy sheet on belt 20. The signal from sensor 98 also initiates a system shutdown cycle (mis-strip jam) wherein the various operating components are, within a prescribed interval, brought to a stop. The interval permits any copy sheet present in fuser 150 to be removed, sheet trap solenoid 158 (FIG. 12) having been actuvated to prevent the next copy sheet from entering fuser 150 and becoming trapped therein. The signal from sensor 99, indicating failure of deflector 96 to intercept or remove the copy sheet from belt 20, triggers an immediate or hard stop (sheet on selenium jam) of the processor. In such instances the power to drive motor 34 is interrupted to bring belt 20 and the other components driven therefrom to an immediate stop.

Referring particularly to FIGS. 1 and 12, copy sheets 3 comprise precut paper sheets supplied from either main or auxiliary paper trays 100, 102. Each paper tray has a platform or base 103 for supporting in stack-like fashion a quantity of sheets. The tray platforms 103 are supported for vertical up and down movement by motors 105, 106 being provided to raise and lower the platform. Side guide pairs 107, in eacy tray 100, 102 delimit the tray side boundaries, the guide pairs being adjustable toward and away from one another in accommodation of different size sheets. Sensors 108, 109 respond to the position of each side guide pair 107, the output of sensors 108, 109 serving to regulate operation of edge fadeout lamps 45 and fuser cooling valve 171 (FIG. 3). Lower limit switches 110 on each tray prevent overtravel of the tray platform in a downward direction.

A heater 112 is provided below the platform 103 of main tray 100 to warm the tray area and enhance feeding of sheets therefrom. Humidstat 113 and thermostat 114 control operation of heater 112 in response to the temperature/humidity conditions of main tray 100. Fan 115 is provided to circulate air within tray 100.

To advance the sheets 3 from either main or auxiliary tray 100, 102, main and auxiliary sheet feeders 120, 121 are provided. Feeders 120, 121 each include a nudger roll 123 to engage and advance the topmost sheet in the paper tray forward into the nip formed by a feed belt 124 and retard roll 125. Retard rolls 125, which are driven at an extremely low speed by motor 126, cooperate with feed belts 124 to restrict feeding of sheets from trays 100, 102 to one sheet at a time.

Feed belts 124 are driven by main and auxiliary sheet feed motors 127, 128 respectively. Nudger rolls 123 are supported for pivotal movement about the axis of feed belt drive shaft 129 with drive to the nudger rolls taken from drive shaft 129. Stack height sensors 133, 134 are provided for the main and auxiliary trays, the pivoting nudger rolls 123 serving to operate sensors 133, 134 in response to the sheet stack height. Main and auxiliary tray misfeed sensors 135, 136 are provided at the tray outlets.

Main transport 140 extends from main paper tray 100 to a point slightly upstream of the nip formed by photoconductive belt 20 and transfer roll 75. Transport 140 is driven from main motor 34. To register sheets 3 with the images developed on belt 20, sheet register fingers 141 are provided, fingers 141 being arranged to move into and out of the path of the sheets on transport 140 once each revolution (see also FIG. 4). Registration fingers 141 are driven from main motor 34 through electromagetic clutch 145 (seen in FIG. 4). A timing or reset switch 146 is set once on each revolution of sheet register fingers 141. Sensor 139 monitors transport 140 for jams. Further amplification of sheet register system may be found in U.S. Pat. No. 3,781,004, issued Dec. 25, 1973 to Buddendeck et al.

Pinch roll pair 142 is interspaced between transport belts that comprise main transport 140 on the downstream side of register fingers 141. Pinch roll pair 142 are driven from main motor 34.

Auxiliary transport 47 extends from auxiliary tray 102 to main transport 140 at a point upstream of sheet register fingers 141. Transport 147 is driven from motor 34.

To maintain the sheets in driving contact with the belts of transports 140, 147, suitable guides or retainers (not shown) may be provided along the belt runs.

The image bearing sheets leaving the nip formed by photoconductive belt 20 and transfer roll 75 are picked off by belts 155 of the leading edge of vacuum transport 149. Belts 155, which are perforated for the admission of vacuum therethrough, ride on forward roller pair 148 and rear roll 153. A pair of internal vacuum plenums 151, 154 are provided, the leading plenum 154 cooperating with belts 155 to pick up the sheets leaving the belt/transfer roll nip. Transport 149 conveys the image bearing sheets to fuser 150. Vacuum conduits 147, 156 communicate plenums 151, 154 with vacuum pumps 152, 152'. A pressure sensor 157 monitors operation of vacuum pump 152. Sensor 144 monitors transport 149 for jams.

To prevent the sheet on transport 149 from being carried into fuser 150 in the event of a jam or malfunction, a trap solenoid 158 is provided below transport 149. Energization of solenoid 158 raises the armature thereof into contact with the lower face of plenum 154 to intercept and stop the sheet moving therepast.

Referring particularly to FIGS. 3, 4, 11 and 12, fuser 150 comprises a lower heated fusing roll 160 and upper pressure roll 161. Rolls 160, 161 are supported for rotation in fuser housing 162. The core of fusing roll 160 is hollow for receipt of heating rod 163 therewithin.

Housing 162 includes a sump 164 for holding a quantity of liquid release agent, herein termined oil. Dispensing belt 165, moves through sump 164 to pick up the oil, belt 165 being driven by motor 166. A blanket-like wick 167 carries the oil from belt 165 to the surface of fusing roll 160.

Pressure roll 161 is supported within an upper pivotal section 168 of housing 162. This enables pressure roll 161 to be moved into and out of operative contact fusing roll 160. Cam shaft 169 in fuser housing 162 serves to move housing section 168 and pressure roll 161 into operative relationship with fusing roll 160 against a suitable bias (not shown). Cam shaft 169 is coupled to main motor 34 through an electromagnetically operated one revolution clutch 159.

Fuser housing section 168 is evacuated. For this purpose a conduit 170 couples housing section 168 with vacuum pump 153. The ends of housing section 168 are separated into vacuum compartments opposite the ends of pressure roll 161 thereunder to cool the roll ends where smaller size copy sheets 3 are being processed. Vacuum valve 171 (FIG. 3) in conduit 172 regulates communication of the vacuum compartments with vacuum pump 153' in response to the size sheets as sensed by side guide sensors 108, 109 in paper trays 100, 102.

Fuser roll 160 is driven from main motor 34. Pressure roll 161 is drivingly coupled to fuser roll 160 for rotation therewith.

Thermostat 174 (FIG. 12) in fuser housing 162 controls operation of heating rod 163 in response to temperature. Temperature sensor 175 protects against fuser over-temperature. To protect against trapping of a sheet in fuser 150 in the event of a jam, sensor 176 is provided.

Following fuser 150, the sheet is carried by post fuser transport 180 to either discharge transport 181, or where duplex or two sided copies are desired, to return transport 182. Sheet sensor 183 monitors passage of the sheets from fuser 150. Transports 180, 181 are driven from main motor 34. Sensor 181' monitors transport 181 for jams. Suitable retaining means may be provided to retain the sheets on transports 180, 181.

A deflector 184, when extended, directs sheets on transport 180 onto conveyor roll 185 and into chute 186 leading to return transport 182. Solenoid 179, when energized raises deflector 184 into the sheet path. Return transport 182 carries the sheets back to auxiliary tray 102. Sensor 189 monitors transport 182 for jams. Taper stops 187 of tray 102 is supported for oscillating movement. Motor 188 drives stops 187 back and forth tap sheets returned to auxilliary tray 102 into alignment for refeeding.

To invert duplex copy sheets following fusing of the second or duplex image, a displaceable sheet stop 190 is provided adjacent the discharge end of chute 186. Stop 190 is pivotally supported for swinging movement into and out of chute 186. Solenoid 191 is provided to move stop 190 selectively into or out of chute 186. The sheet trapped in chute 186 by stop 190 is removed by pinch roll pairs 192, 193 and fed out through chute 201 onto discharge transport 181. Pinch roll pairs 192, 193 serve to draw the sheet trapped in chute 186 by stop 190 and carry the sheet forward onto discharge transport 181. Further description of the inverter mechanism may be found in U.S. Pat. No. 3,856,295, issued Dec. 24, 1974, to John H. Looney.

Output tray 195 receives unsorted copies. Transport 196 a portion of which is wrapped around a turn around roll 197, serves to carry the finished copies to tray 195. Sensor 194 monitors transport 196 for jams. To route copies into output tray 195, a deflector 198 is provided. Deflector solenoid 199, when energized, turns deflector 198 to intercept sheets on conveyor 181 and route the sheets onto conveyor 196.

When output tray 195 is not used, the sheets are carried by conveyor 181 to sorter 14.

SORTER

Figure 13:
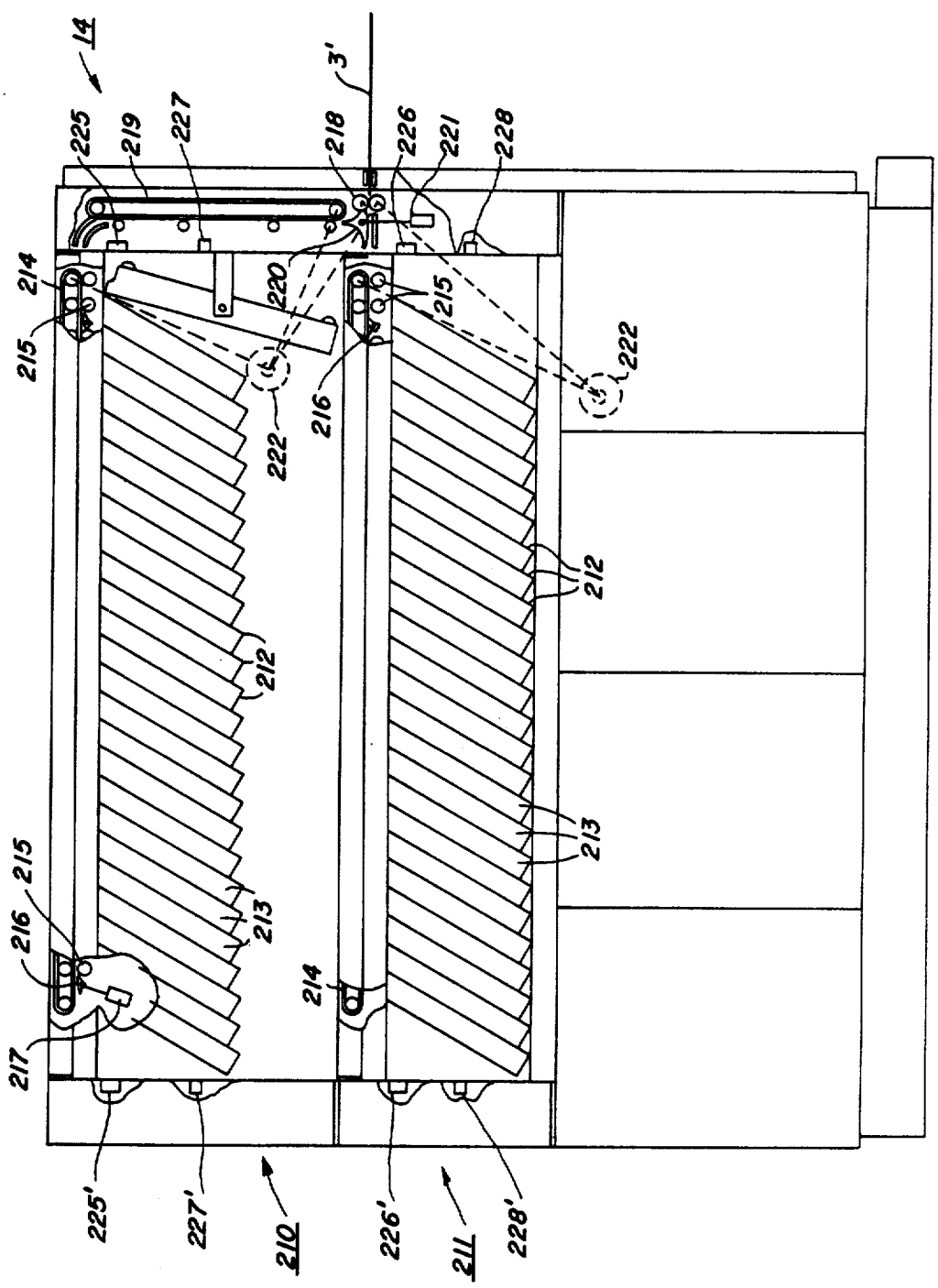
FIG. 13 is an enlarged view showing details of the copy sorter for the apparatus shown in FIG. 1.

Referring particularly to FIG. 13, sorter 14 comprises upper and lower bin arrays 210, 211. Each bin array 210, 211 consists of series of spaced downwardly inclined trays 212, forming a series of individual bins 213 for receipt of finished copies 3'. Conveyors 214 along the top of each bin array, cooperate with idler rolls 215 adjacent the inlet to each bin to transport the copies into juxtaposition with the bins. Individual defelctors 216 at each bin cooperate, when depressed, with the adjoining idler roll 215 to turn the copies into the bin associated therewith. An operating solenoid 217 is provided for each deflector.

A driven roll pair 218 is provided at the inlet to sorter 14. A generally vertical conveyor 219 serves to bring copies 3' to the upper bin array 210. Entrance deflector 220 routes the copies selectively to either the upper or lower bin array 210, 211 respectively. Solenoid 221 operates deflector 220.

Motor 222 is provided to drive the conveyors 214 and 219 of upper bin array 210 and conveyor 214 of lower bin array 211. Roll pair 218 is drivingly coupled to both motor 222.

To detect entry of copies 3' in the individual bins 213, a photoelectric type sensor 225, 226 is provided at one end of each bin array 210, 211 respectively. Sensor lamps 225', 226' are disposed adjacent the other end of the bin array. To detect the presence of copies in the bins 213, a second set of photoelectric type sensors 227, 228 is provided for each bin array, on a level with a tray cutout (not shown). Sensor lamps 227', 228' are disposed opposite sensors 227, 228.

DOCUMENT HANDLER

Figure 14:
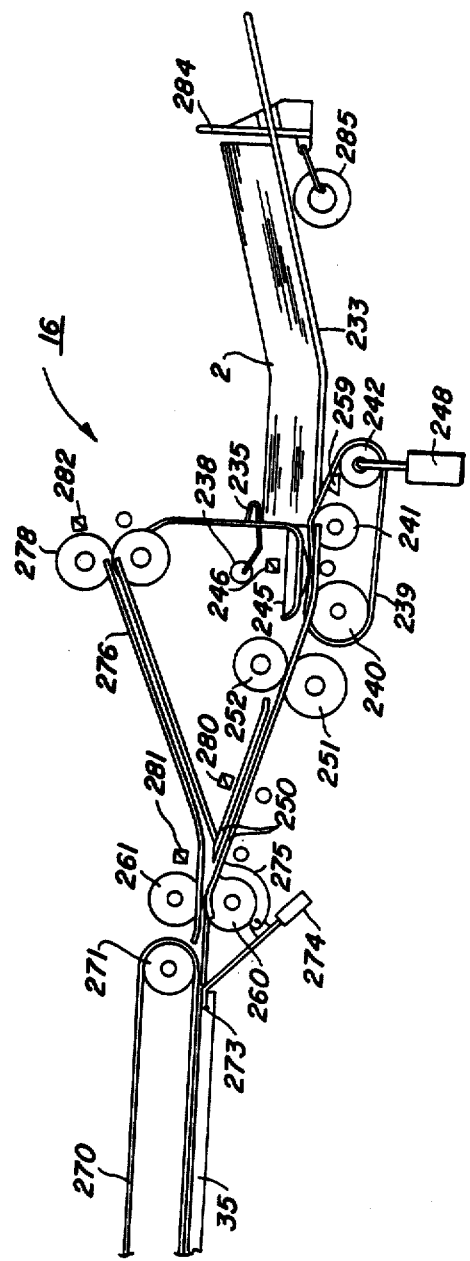
FIG. 14 is a schematic view showing details of the document handler for the apparatus shown in FIG. 1.
Figure 15:
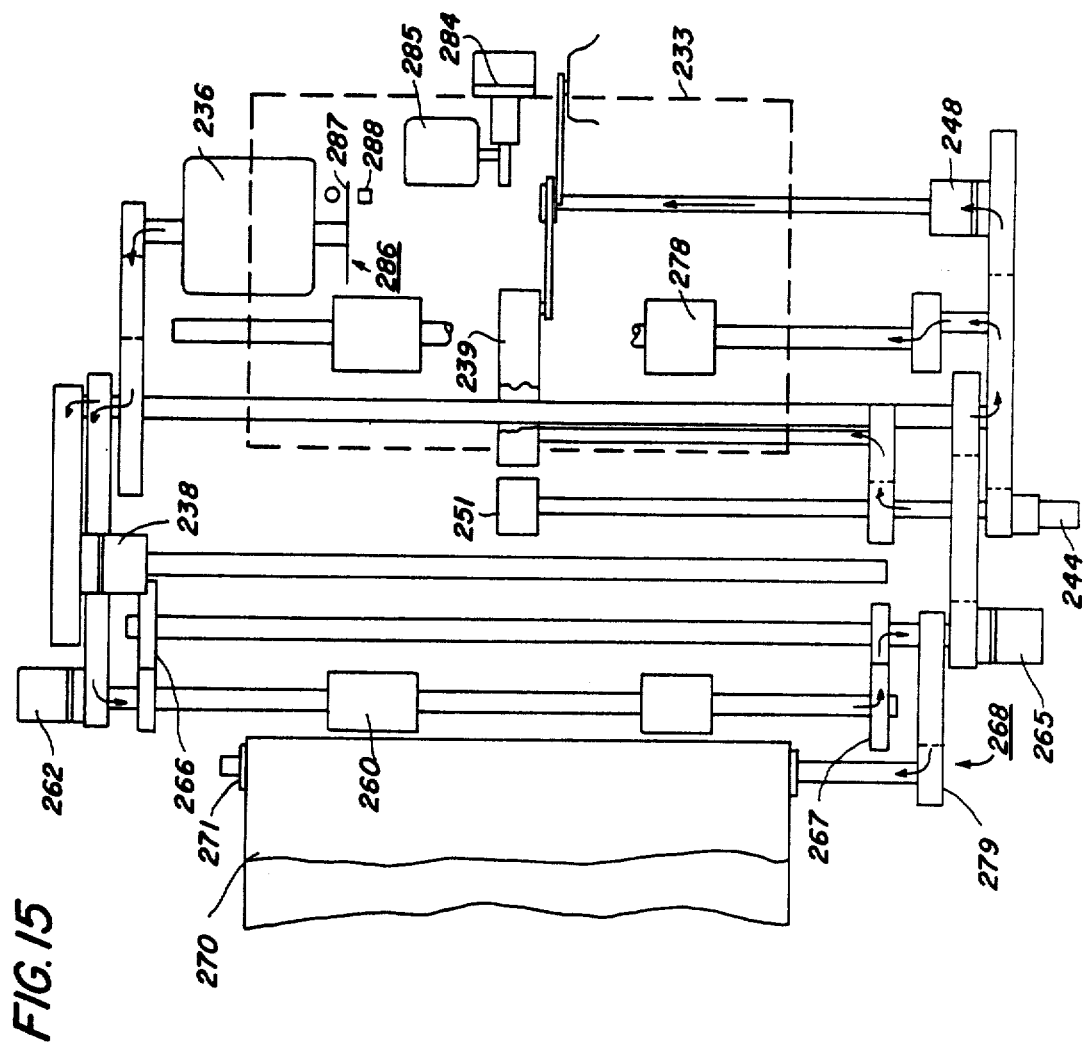
FIG. 15 is a view showing details of the drive mechanism for the document handler shown in FIG. 14.

Referring particularly to FIGS. 14 and 15, document handler 16 includes a tray 233 into which originals or documents 2 to be copied are placed by the operator following which a cover (not shown) is closed. A movable bail or separator 235, driven in an oscillatory path from motor 236 through a solenoid operated one revolution clutch 238, is provided to maintain document separation.

A document feed belt 239 is supported on drive and idler rolls 240, 241 and kicker roll 242 under tray 233, tray 233 being suitably apertured to permit the belt surface to project therewithin. Feedbelt 239 is driven by motor 236 through electromagnetic clutch 244. Guide 245, disposed near the discharge end of feed belt 239, cooperates with belt 239 to form a nip between which the documents pass.

A photoelectric type sensor 246 is disposed adjacent the discharge end of belt 239. Sensor 246 responds on failure of a document to feed within a predetermined interval to actuate solenoid 248 to raise kicker roll 242 and increases the surface area of feed belt 239 in contact with the documents. Another sensor 259 located underneath tray 233 provides an output signal when the last document 2 of each set has left the tray 233.

Document guides 250 route the document fed from tray 233 via roll pair 251, 252 to platen 35. Roll 251 is drivingly coupled to motor 236 through electromagnetic clutch 244. Contact of roll 251 with roll 252 turns roll 252.

Roll pair 260, 261 at the entrance to platen 35 advance the document onto platen 35, roll 260 being driven through electromagnetic clutch 262 in the forward direction. Contact of roll 260 with roll 261 turns roll 261 in the document feeding direction. Roll 260 is selectively coupled through gearset 268 with motor 236 through electromagnetic clutch 265 so that on engagement of clutch 265 and disengagement of clutch 262, roll 260 and roll 261 therewith turn in the reverse direction to carry the document back to tray 233 via return chute 276. One way clutches 266, 267 permit free wheeling of the roll drive shafts.

The document leaving roll pair 260, 261 is carried by platen feed belt 270 onto platen 35, belt 270 being comprised of a suitable flexible material having an exterior surface of xerographic white. Belt 270 is carried about drive and idler rolls 271, 272. Roll 271 is drivingly coupled to motor 236 for rotation in either a forward or reverse direction through clutches 262, 265. Engagement of clutch 262 operates through belt and pulley drive 279 to drive belt in the forward direction, engagement of clutch 265 operates through drive 279 to drive belt 270 in the reverse direction.

To locate the document in predetermined position on platen 35, a register 273 is provided at the platen inlet for engagement with the document trailing edge. For this purpose, control of platen belt 270 is such that following transporting of the document onto platen 35 and beyond register 273, belt 270 is reversed to carry the document backwards against register 273.

To remove the document from platen 35 following copying, register 273 is retracted to an inoperative position. Solenoid 274 is provided for moving register 273.

A document deflector 275, is provided to route the document leaving platen 35 into return chute 276, deflector 275 being raised by solenoid 274 when withdrawing register 273. For this purpose, platen belt 270 and pinch roll pair 260, 261 are reversed through engagement of clutch 265. Discharge roll pair 278, driven by motor 236, carry the returning document into tray 233.

To monitor movement of the documents in document handler 16 and detect jams and other malfunctions, photoelectric type sensors 246 and 280, 281 and 282 are disposed along the document routes.

To align documents 2 returned to tray 233, a document patter 284 is provided adjacent one end of tray 233. Patter 284 is oscillated by motor 285.

TIMING

To provide the requisite operational synchronization between host machine 10 and controller 18 as will appear, processor or machine clock 202 is provided. Referring particularly to FIG. 1(a), clock 202 comprises a toothed disc 203 drivingly supported on the output shaft of main drive motor 34. A photoelectric type signal generator 204 is disposed astride the path followed by the toothed rim of disc 203, generator 204 producing, whenever drive motor 34 is energized, a pulse like signal output at a frequency correlated with the speed of motor 34.

As described, a second machine clock, termed a pitch reset clock 138 herein, and comprising timing switch 146 is provided. Switch 146 cooperates with sheet register fingers 141 to generate an output pulse once each revolution of fingers 141. As will appear, the pulse like output of the pitch reset clock is used to reset or resynchronize controller 18 with host machine 10.

Figure 17:
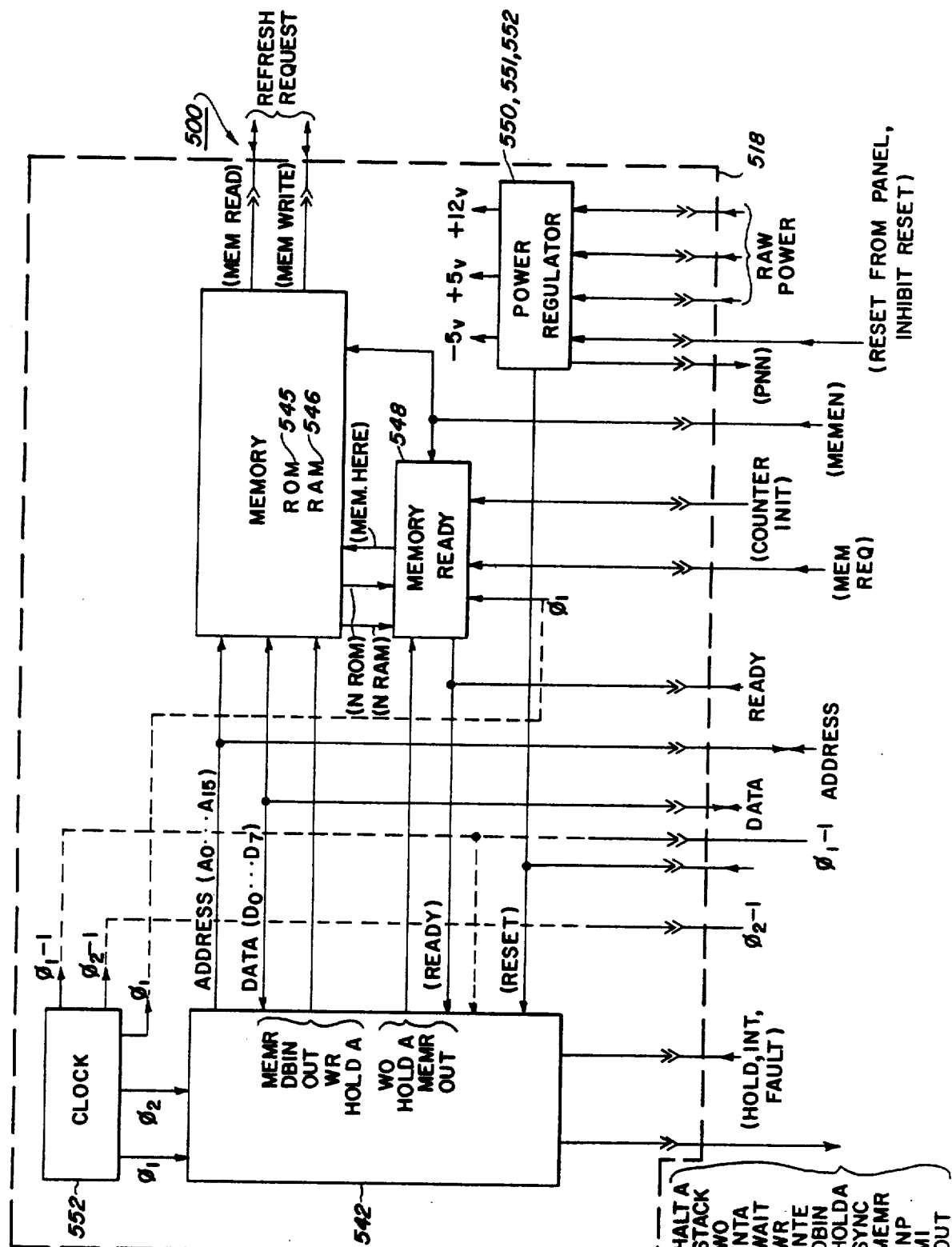
FIG. 17 is a block diagram of the controller CPU.

Referring to FIG. 15, a document handler clock 286 consisting of apertured disc 287 on the output shaft of document handler drive motor 236 and cooperating photoelectric type signal generator 288 is provided. As in the case of machine clock 202, document handler clock 286 produces an output pulse train from which components of the document handler may be synchronized. A real time clock such as clock 552 of FIG. 17, is utilized to control internal operations of the controller 18 as is known in the art. The real time clock is also utilized to time the operation of some of the machine components as will be described.

CONTROLLER

Figure 16:
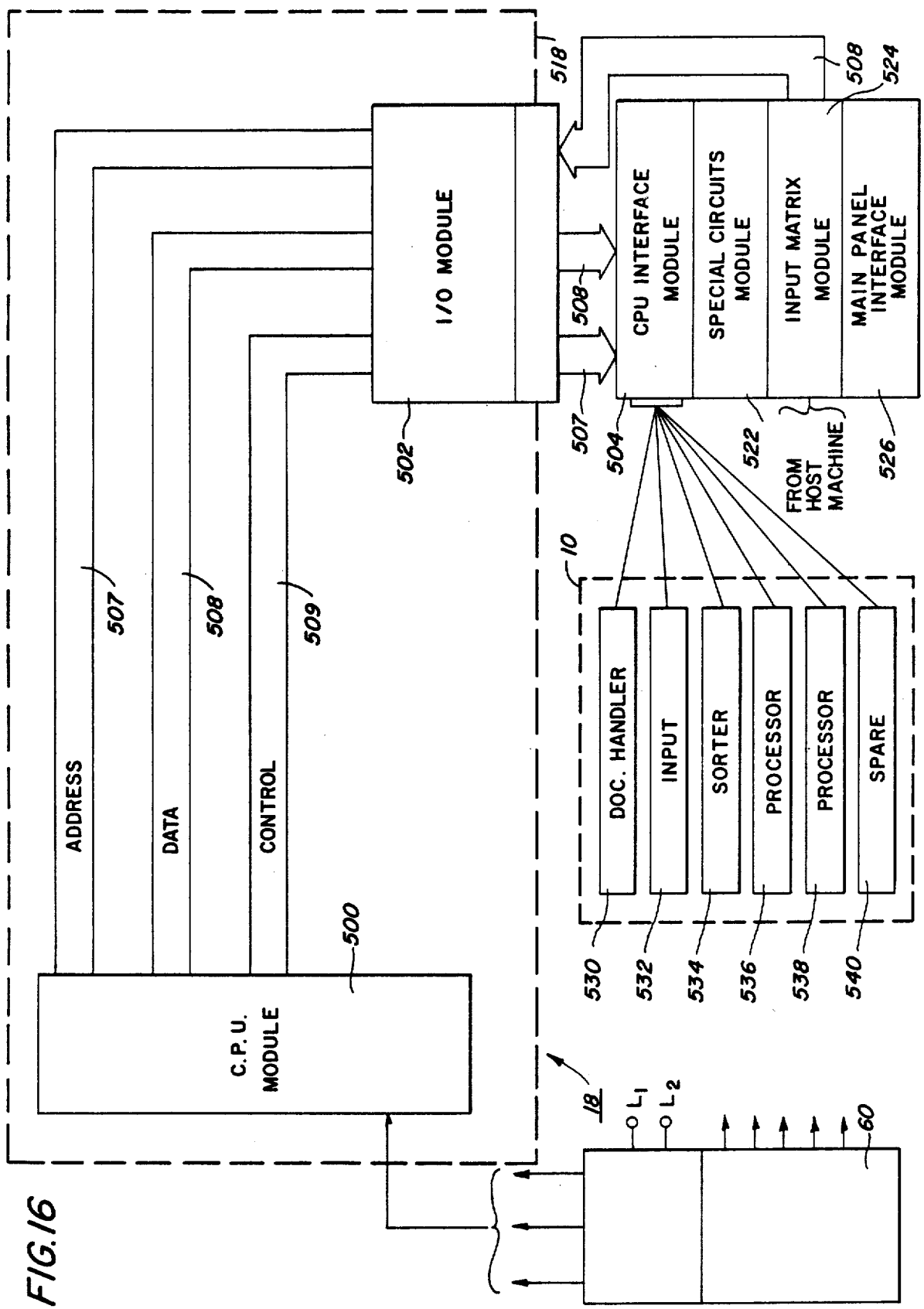
FIG. 16 is a block diagram of the controller for the apparatus shown in FIG. 1.

Referring to FIG. 16, controller 18 includes a Central Processor Unit (CPU) Module 500, Input/Output (I/O) Module 502, and Interface 504. Address, Data and Control Buses 507, 508, 509 respectively operatively couple CPU Module 500 and I/O Module 502. CPU Module 500 I/O Module 502 are disposed within a shield 518 to prevent noise interference.

Interface 504 couples I/O Module 502 with special circuits module 522, input matrix module 524, and main panel interface module 526. Module 504 also couples I/O Module 502 to the operating sections of the machine, namely, document handler section 530, input section 532, sorter section 534 and processor sections 536, 538. A spare section 540, which may be used for monitoring operation of the host machine, or which may be later utilized to control other devices, is provided.

Figure 18A:
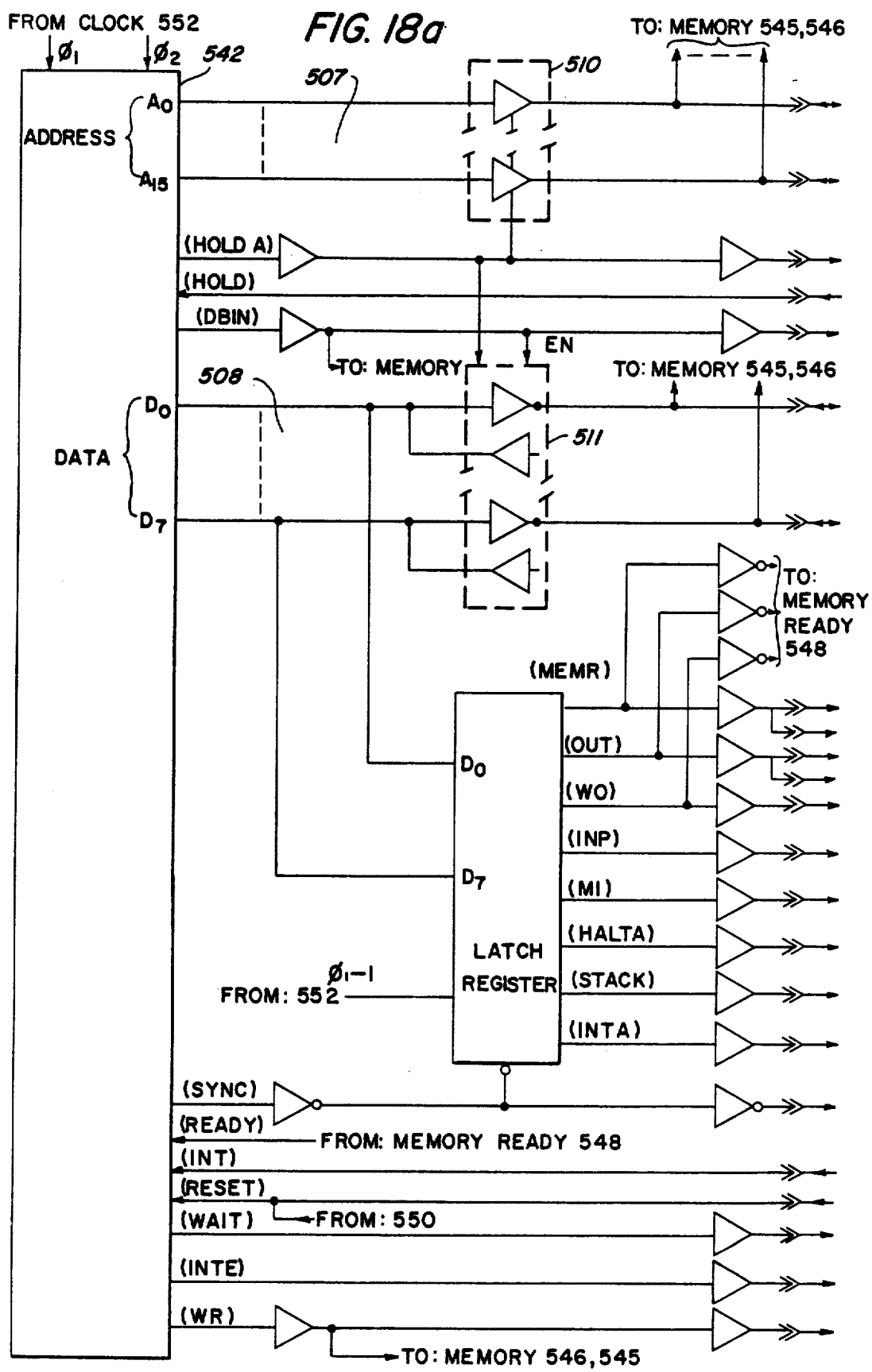
FIG. 18a is a block diagram showing the CPU microprocessor input/output connections.

Referring to FIGS. 17, 18(a), CPU module 500 comprises a processor 542 such as an Intel 8080 microprocessor manufactured by Intel Corporation, Santa Clara, Calif., 16K Read Only Memory (herein ROM) and 2K Random Access Memory (herein RAM) sections 545, 546, Memory Ready section 548, power regulator section 550, and onboard clock 552. Bipolar tri-state buffers 510, 511 in Address and Data buses 507, 508 disable the bus on a Direct Memory access (DMA) signal (HOLDA) as will appear. While the capacity of memory sections 545, 546 are indicated throughout as being 16K and 2K respectively, other memory sizes may be readily contemplated.

Figure 19A:
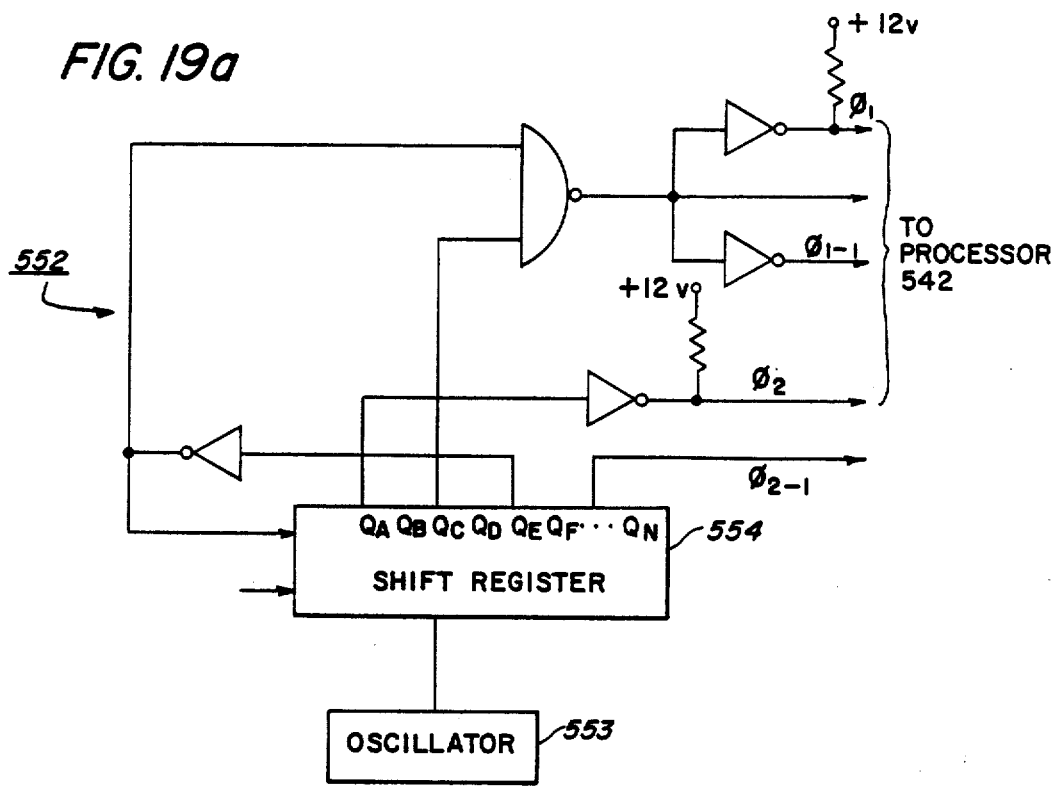
FIG. 19a is a logic schematic of the CPU clock.
Figure 19B:
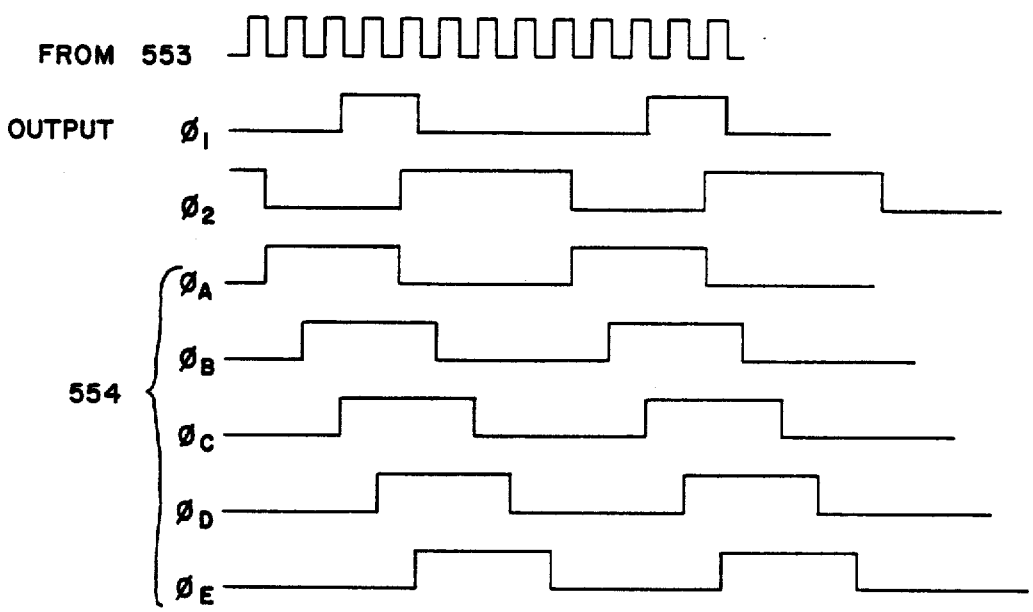

Referring particularly to FIG. 19(a,b), clock 552 comprises a suitable clock oscillator 553 feeding a multibite (Qa-Qn) shift register 554. Register 554 includes an internal feedback path from one bit to the serial input of register 554. Output signal waveforms $\phi_1, \phi_2, \phi_{1-1}$ and $\phi_{2-1}$ are produced for use by the system.

Referring to FIG. 20, the memory bytes in ROM section 545 are implemented by address signals (Ao–A 15) from processor 542, selection being effected by 3 to 8 decode chip 560 controlling chip select 1 (CS-1) and a 1 bit selection (A 13) controlling chip select 2 (CS-2). The most significant address bits (A 14, A 15) select the first 16K of the total 64 bytes of the addressing space. The memory bytes in RAM section 546 are implemented by Address signals (Ao–A 15) through selector circuit 561. Address bit A 10 serves to select the memory bank while the remaining five most significant bits (A 11–A 15) select the last 2K bytes out of the 64K bytes of addressing space. RAM memory section 546 includes a 40 bit output buffer (DATA OUT) the output of which is tied together with the output from ROM memory section 545 and goes to tri-state buffer 562 to drive Data bus 508. Buffer 562 is enabled when either memory section 545 or 546 is being addressed and either a (MEM READ) or DMA (HOLD A) memory request exists. An enabling signal (MEMEN) is provided from the machine control or service panel (not shown) which is used to permit disabling of buffer 562 during servicing of CPU Module 500. Write control comes from either processor 542 (MEM WRITE) or from DMA (HOLD A) control. Tri-state buffers 563 permit Refresh Control 605 of I/O Module 502 (FIG. 23b) to access MEM READ and MEM WRITE control channels directly on a DMA signal (HOLD A) from processor 542 as will appear.

Figure 21:
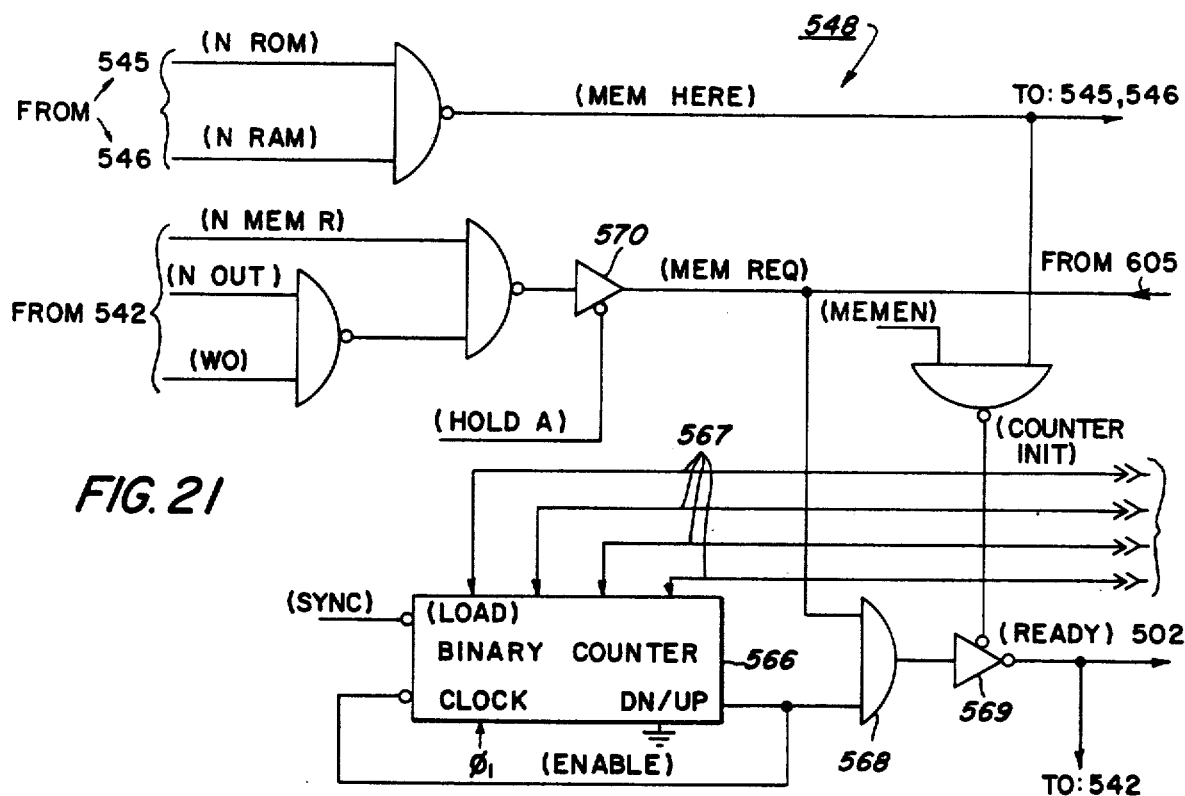
FIG. 21 is a logic schematic of the CPU memory ready.

Referring to FIG. 21, memory ready section 548 provides a READY signal to processor 542. A binary counter 566, which is initialized by a SYNC signal ($\phi$,) to a prewired count as determined by input circuitry 567, counts up at a predetermined rate. At the maximum count, the output at gate 568 comes true stopping the counter 566. If the cycle is a memory request (MEM REQ) and the memory location is on board as determined by the signal (MEM HERE) to tri-state buffer 569, a READY signal is sent to processor 542. Tri-state buffer 570 in MEM REQ line permits Refresh Control 605 of I/O Module 502 to access the MEM REQ channel directly on a DMA signal (HOLD A) from processor 542 as will appear.

Figure 22A:
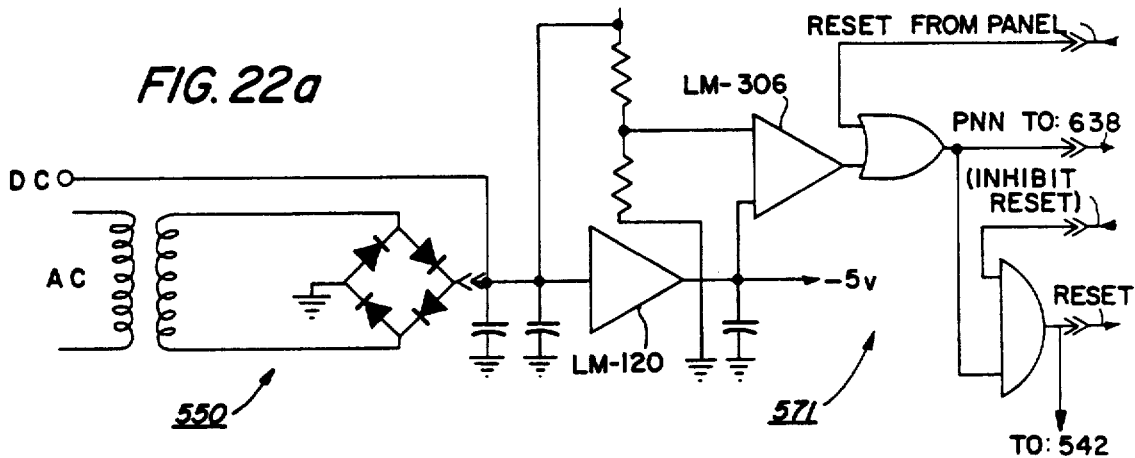
FIGS. 22a, 22b, 22c are logic schematics of the CPU power supply stages.
Figure 22B:
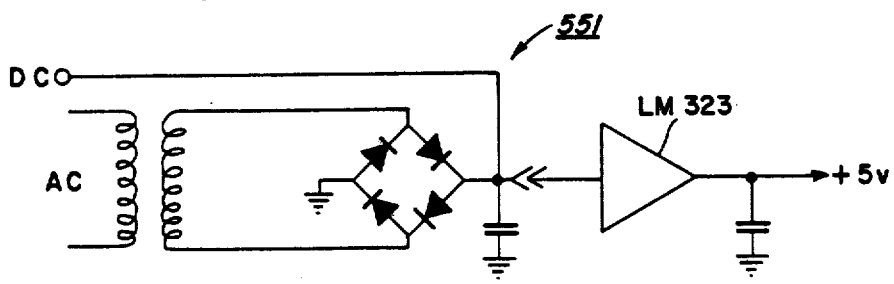
Figure 22C:
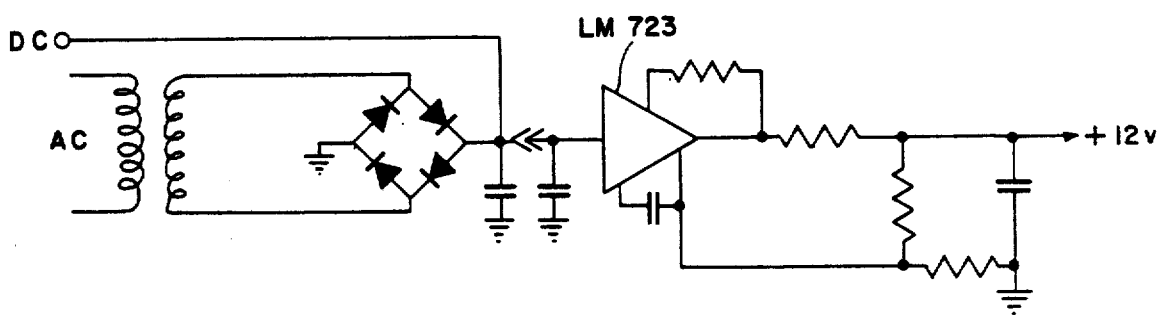

Referring to FIG. 22(a,b,c) and 23b, power regulators 550, 551, 552 provide the various voltage levels, i.e. +5 v, +12 v, −5 v D.C. required by the module 500. Each of the three on board regulators 550, 551, 552 employ filtered D.C. inputs. Power Not Normal (PNN) detection circuitry 571 is provided to reset processor 542 during the power up time. Reset control from the machine service panel (not shown) is also provided via PNN. An enabling signal (INHIBIT RESET) from Memory Control 638 allows completion of a write cycle in Non Volatile (N.V.) Memory 610 of I/O Module 502.

Figure 18B:
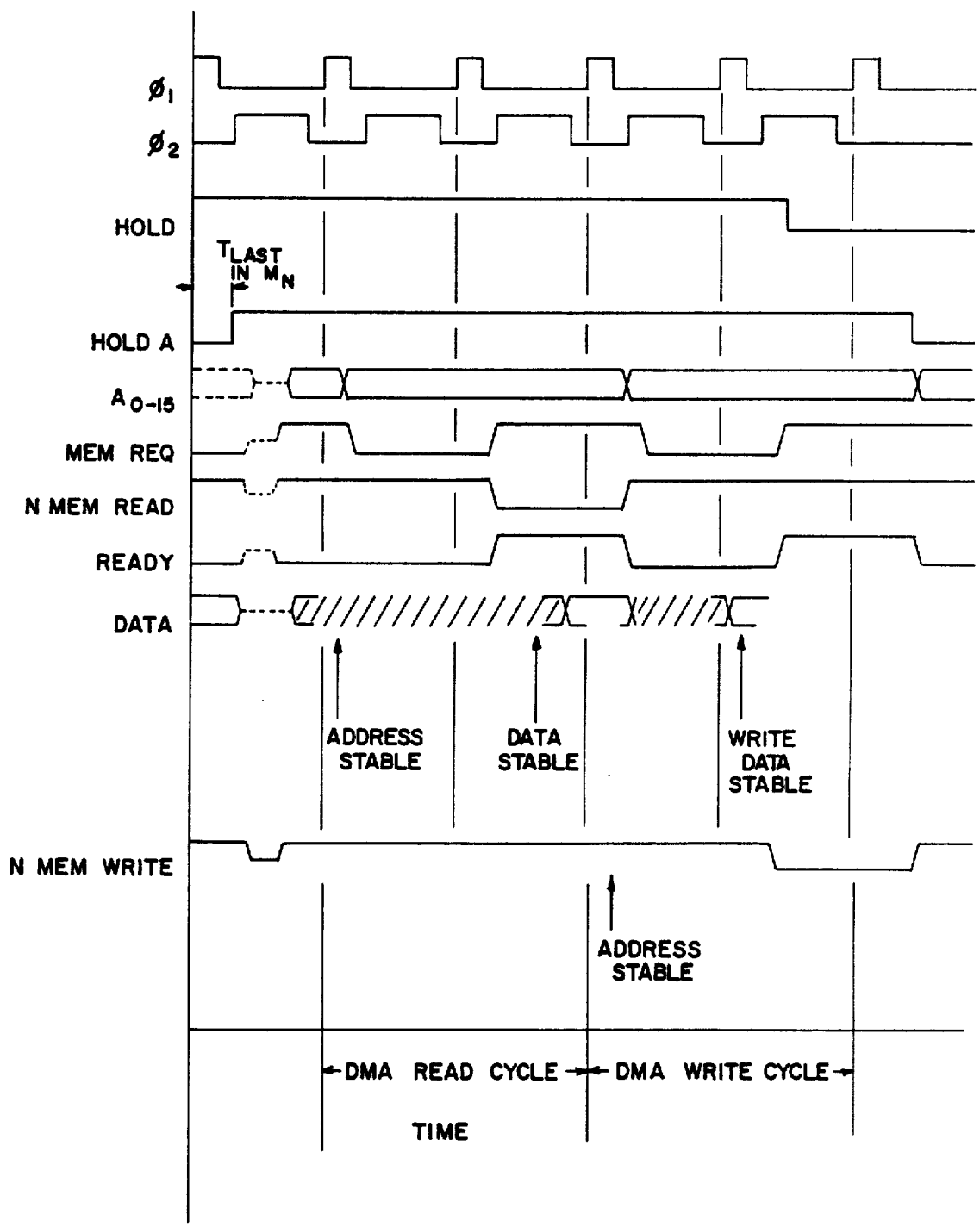
FIG. 18b is a timing chart of Direct Memory access (DMA) Read and Write cycles.

Referring to FIGS. 18a, 20, 21, and the DMA timing chart (FIG. 18b) data transfer from RAM section 546 to host machine 10 is effected through Direct Memory Access (DMA), as will appear. To initiate DMA, a signal (HOLD) is generated by Refresh Control 605 (FIG. 23b). On acceptance, processor 542 generates a signal HOLD ACKNOWLEDGE (HOLD A) which works through tri-state buffers 510, 511 and through buffers 563 and 570 to release Address bus 507, Data bus 508 and MEM READ, MEM WRITE, and MEM REQ channels (FIGS. 20, 21) to Refresh Control 605 of I/O Module 502.

Referring to FIG. 23(a,b), I/O Module 502 interfaces with CPU module 500 through bi-directional Address and, Data buses 507, 508, respectively, and Control bus, 509. I/O Module 502 appears to CPU module 500 as a memory portion. Data transfers between CPU and I/O modules 500, 502, and commands to I/O module 502 except for output refresh are controlled by memory reference intructions executed by CPU module 500. Output refresh which is initiated by one of several uniquely decoded memory reference commands, enables Direct Memory access (DMA) by I/O module 502 of RAM section 546.

I/O module 502 includes Matrix Input select 604 (through which inputs from the host machine 10, are received), Refresh Control 605, Nonvolatile (NV) memory 610, Interrupt Control 612 (FIG. 23a), Watch dog Timer and failure Flag 614 and clock 570.

A Function Decode Section 601 receives and interprets commands from CPU section 500 by decoding information on address bus 507 along with control signals from processor 542 on control bus 509. On command, decode section 601 generates control signals to perform the function indicated. These functions include (a) controlling tri-state buffers 620 to establish the direction of data flow in Data bus 508; (b) strobing data from Data bus 508 into buffer latches 622; (c) controlling multiplexer 624 to put data from Interrupt Control 612, Real Time clock register 621, Matrix Input Select 604 or N.V. memory 610 onto data bus 508; (d) actuating refresh control 605 to initiate a DMA operation; (e) actuating buffers 634 to enable address bits Ao-A 7 to be sent to the host machine 10 for input matrix read operations; (f) commanding operation of Matrix Input Select 604; (g) initiating read or write operation of N.V. memory 610 through Memory Control 638; (h) loading Real Time clock register 621 (FIG. 23a) from data bus 508; and (i) resetting the Watch Dog timer and setting the Fault Failure flag 614. In addition, section 601 includes logic to control and synchronize the READY control line to CPU module 500, the READY line being used to advise module 500 when data placed on the Data bus by I/O module 502 is valid.

Watch dog timer and failure flag 614, which serves to detect certain hardwired and software malfunctions, comprises a free running counter which under normal circumstances is periodically reset by an output refresh command (REFRESH) from Function Decode Section 601. If an output refresh command is not received within a preset time interval, (i.e. 25 m sec) a fault flip flop is set and a signal (FAULT) sent to the host machine 10. The signal (FAULT) also raises the HOLD line (via Refresh Control 605) to disable CPU Module 500. Clearing of the fault flip flop may be by cycling power or generating a signal (RESET). A selector (not shown) may be provided to disable (DISABLE) the watch dog timer when desired. The fault flip flop may also be set by a command from the CPU Module to indicate that the operating program detected a fault.

Matrix Input select 604 which controls receipt of data from host machine 10 has capacity to read up to 32 groups of 8 discrete inputs from host machine 10. Lines $A_3$ through $A_7$ of Address bus 507 are routed to host machine 10 via CPU Interface Module optical isolator 569 and 504 to select the desired group of 8 inputs. The selected inputs from machine 10 are received by matrix 604 via Input Matrix Module 524 (FIG. 28) and are placed by matrix 604 onto data bus 508 and sent to CPU Module 500 via multiplexer 624. Bit selection is effected by lines $A_0$ through $A_2$ of Address bus 507.

Output refresh control 605, when initiated, transfers either 16 or 32 sequential words from the memory output buffer (DATA OUT) of RAM memory section 546 to host machine 10 at the predetermined clock rate in line 574. Direct Memory access (DMA) is used to facilitate transfer of the data at a relatively high rate. On a Refresh signal from Function Decode Section 601, Refresh Control 605 generates a HOLD signal to processor 542. On acknowledgement (HOLD A) processor 542 enters a hold condition. In this mode, CPU Module 500 releases address and data buses 507, 508 through actuation of tri-state buffers 510, 511 as described to the high impedance state giving I/O module 502 control thereover. I/O module 502 then sequentially accesses the 32 memory words from output buffer (DATA OUT) of RAM section 546 (REFRESH ADDRESS) and transfers the contents to the host machine 10 via data bus 508 and optical isolator 569. CPU Module 500 is dormant during this period.

On capture of the address and data buses 507, 508, a control signal (LOAD) from Refresh Control 605 together with a clock signal (CLOCK) in line 574 are utilized to generate eight 32 bit serial words which are transmitted serially via CPU Interface Module 504 to the host machine remote locations where serial to parallel transformation is performed. Alternatively, the data may be stored in addressable latches and distributed in parallel directly to the required destinations.

Figure 24:
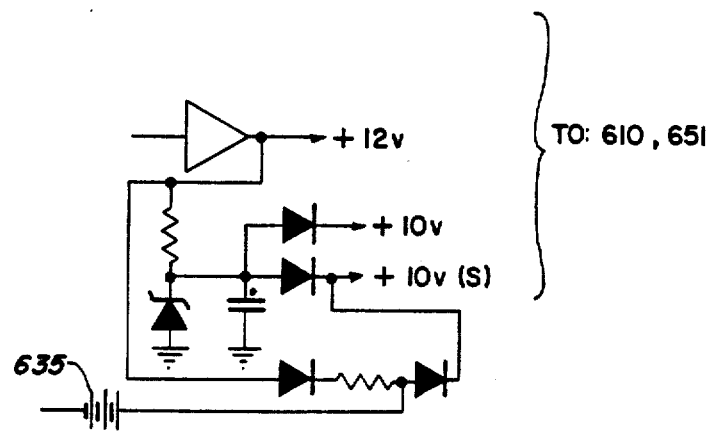
FIG. 24 is a logic schematic of the nonvolatile memory power supply.

N.V. memory 610 comprises a predetermined number of bits of non-volatile memory stored in I/O module 502 under Memory Control 638. N.V. memory 610 appears to CPU module 500 as part of the CPU module memory complement and therefore may be accessed by the standard CPU memory reference instruction set. Referring particularly to FIG. 24, to sustain the contents of N.V. memory 610 should system power be interrupted, one or more rechargeable batteries 635 are provided exterior to I/O module 502. CMOS protective circuitry 636 couples batteries 635 to memory 610 to preserve memory 610 on a failure of the system power. A logic signal (INHIBIT RESET) prevents the CPU Module 500 from being reset during the N.V. memory write cycle interval so that any write operation in progress will be completed before the system is shut down.

For tasks that require frequent servicing, high speed response to external events, or synchronization with the operation of host machine 10, a multiple interrupt system is provided. These comprise machine based interrupts, herein referred to as Pitch Reset interrupt and the Machine interrupt, as well as a third clock driven interrupt, the Real Time interrupt.

Referring particularly to FIG. 23(a) the highest priority interrupt signal, Pitch reset signal 640, is generated by the signal output of pitch reset clock 138. The clock signal is fed via optical isolator 645 and digital filter 646 to edge tripper flip flop 647.

The second highest priority interrupt signal, machine clock signal 641, is sent directly from machine clock 202 through isolation transformer 648 to a phase locked loop 649. Loop 649, which serves as bandpath filter and signal conditioner, sends a square wave signal to edge trigger flip flop 651. The second signal output (LOCK) serves to indicate whether loop 649 is locked onto a valid signal input or not.

The lowest priority interrupt signal, Real Time Clock signal 643, is generated by register 621. Register 621 which is loaded and stored by memory reference instructions from CPU module 500 is decremented by a clock signal in line 643 which may be derived from I/O Module clock 570, which is driven, in turn, by clock 552. On the register count reaching zero, register 621 sends an interrupt signal to edge trigger flip flop 656. A spare interrupt 642 is also provided.

Setting of one or more of the edge trigger flip flops 647, 651, 654, 656 by the interrupt signals 640, 641, 642, 643 generates a signal (INT) via priority chip 659 to processor 542 of CPU Module (FIG. 18a). On acknowledgement, processor 542, issues a signal (INTA) transferring the status of the edge trigger flip flops 647, 651, 654, 656 to a four bit latch 660 to generate an interrupt instruction code (RESTART) onto the data bus 508.

Each interrupt is assigned a unique RESTART instruction code. Should an interrupt of higher priority be triggered, a new interrupt signal (INT) and RESTART instruction code are generated resulting in a nesting of interrupt software routines whenever the interrupt recognition circuitry is enabled within the CPU 500.

Priority chip 659 serves to establish a handling priority in the event of simultaneous interrupt signals in accordance with the priority schedule described.

Once triggered, the edge trigger flip flop 647, 651, 654 or 656 must be reset in order to capture the next occurrence of the interrupt associated therewith. Each interrupt subroutine serves, in addition to performing the functions programmed, to reset the flip flops (through the writing of a coded byte in a uniquely selected address) and to re-enable the interrupt (through execution of a re-enabling instruction). Until re-enabled, initiation of a second interrupt is precluded while the first interrupt is in progress.

Lines 658 permit interrupt status to be interrogated by CPU module 500 on a memory reference instruction.

I/O Module 502 includes a suitable pulse generator or clock 570 for generating the various timing signals required by module 502. Clock 570 is driven by the pulse-like output $\phi_{1-1}, \phi_{2-1}$ of processor clock 552 (FIG. 19a). As described, clock 570 provides a reference clock pulse (in line 574) for synchronizing the output refresh data and is the source of clock pulses (in line 643) for driving Real Time register 621.

Figure 25:
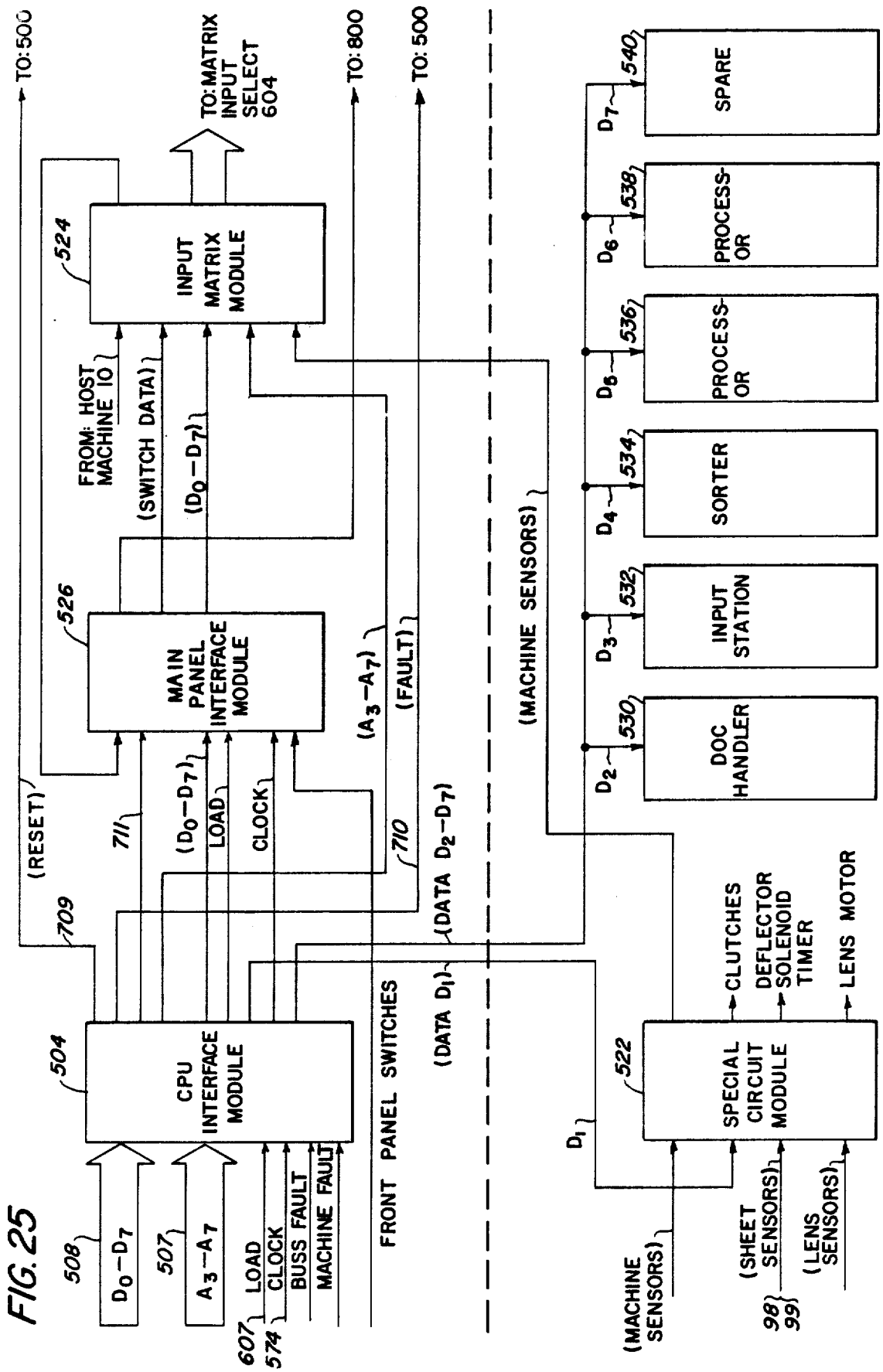
FIG. 25 is a block diagram of the apparatus interface and remote output connections.
Figure 26:
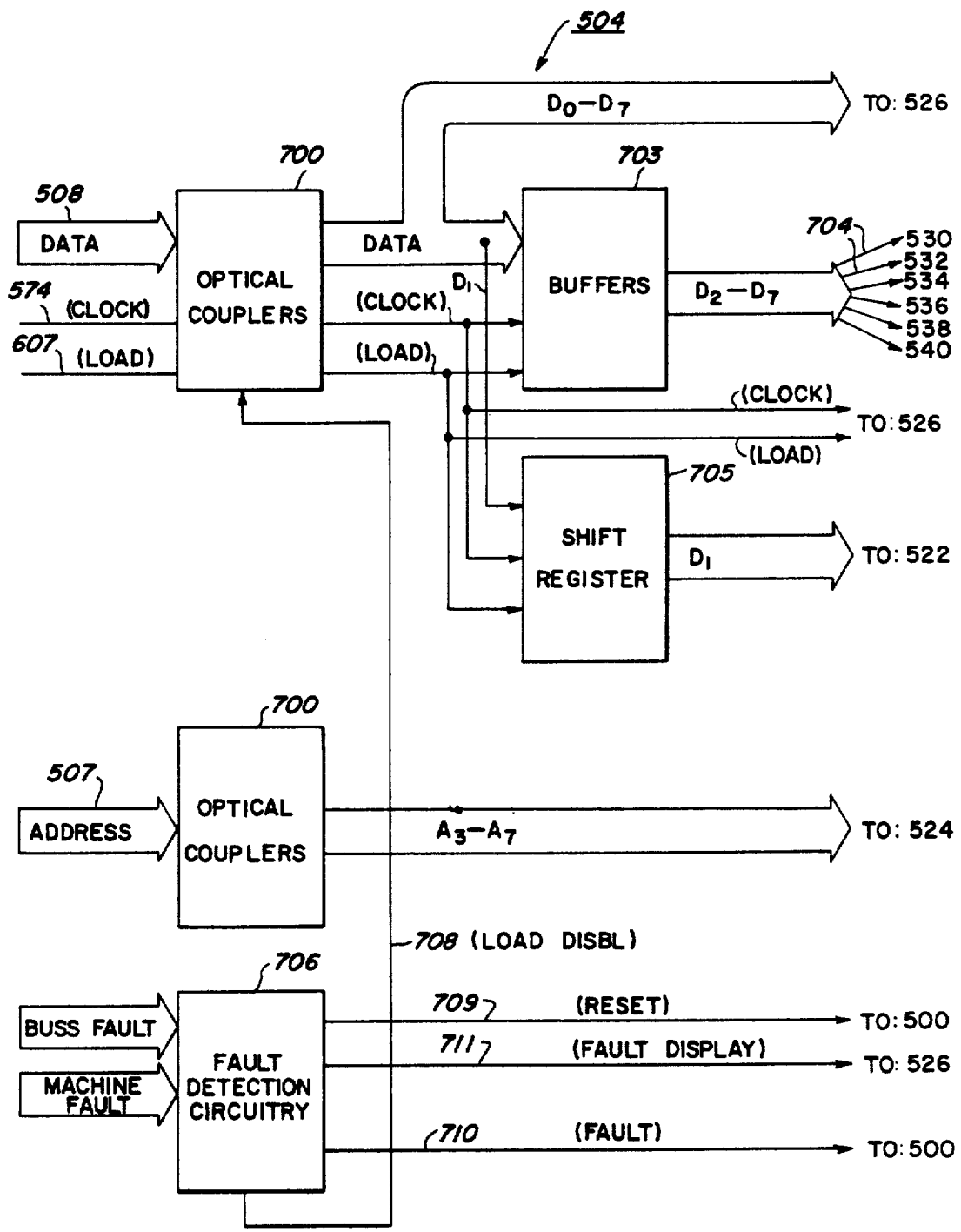
FIG. 26 is a block diagram of the CPU interface module.

CPU interface module 504 interfaces I/O module 502 with the host machine 10 and transmits operating data stored in RAM section 546 to the machine. Referring particularly to FIGS. 25 and 26, data and address information are inputted to module 504 through suitable means such as optical type couplers 700 which convert the information to single ended logic levels. Data in bus 508 on a signal from Refresh Control 605 in line 607 (LOAD), is clocked into module 546 at the reference clock rate in line 574 parallel by bit, serial by byte for a preset byte length, with each data bit of each successive byte being clocked into a separate data channel D0–D7. As best seen in FIG. 25, each data channel D0–D7 has an assigned output function with data channel D0 being used for operating the front panel lamps 830 in the digital display, (see FIG. 32), data channel D1 for special circuits module 522, and remaining data channels D2–D7 allocated to the host machine operating sections 530, 532, 534, 536, 538 and 540. Portions of data channels D1–D7 have bits reserved for front panel lamps and digital display.

Since the bit capacity of the data channels D2–D7 is limited, a bit buffer 703 (FIG. 26) is preferably provided to catch any bit overflow in data channels D2–D7.

Inasmuch as the machine output sections 530, 532, 534, 536, 538 and 540 are electrically a long distance away, i.e. remote, from CPU interface module 504, and the environment is electrically "noisy", the data stream in channels D2–D7 is transmitted to remote sections 530, 532, 534, 536, 538 and 540 via a shielded twisted pair 704. By this arrangement, induced noise appears as a differential input to both lines and is rejected. The associated clock signal for the data is also transmitted over line 704 with the line shielded carrying the return signal currents for both data and clock signals.

Data in channel $D_1$ destined for special circuits module 522 is inputted to shift register type storage circuitry 705 for transmittal to module 522. Display data $D_0-D_7$ is also inputted to main panel interface module 526. Address information in bus 507 is converted to single ended output by couplers 700 and transmitted to Input Matrix Module 524 to address host machine inputs.

CPU interface module 504 includes fault detector circuitry 706 for monitoring both faults occurring in host machine 10 and faults or failures along the buses, the latter normally comprising a low voltage level or failure in one of the system power lines. Machine faults may comprise a fault in CPU module 500, a belt mistrack signal from sensor 27 (see FIG. 2), opening one of the machine doors or covers as responded to by conventional cover interlock sensors (not shown), a fuser over temperature as detected by sensor 175, etc. In the event of a bus fault, a reset signal (RESET) is generated automatically in line 709 to CPU module 500 (see FIGS. 17 and 18a) until the fault is removed. In the event of a machine fault, a signal is generated in line 710 to actuate a suitable relay (not shown) controlling power to all or a portion of host machine 10. A load disabling signal (LOAD DISBL) is inputted to DATA receiving optical couplers 700 via line 708 in the event of a fault in CPU module 500 to terminate input of data to host machine 10. Other fault conditions are monitored by the software background program. In the event of a fault, a signal is generated in line 711 to the digital display on control console 800 (via main panel interface module 526) signifying a fault.

Figure 27:
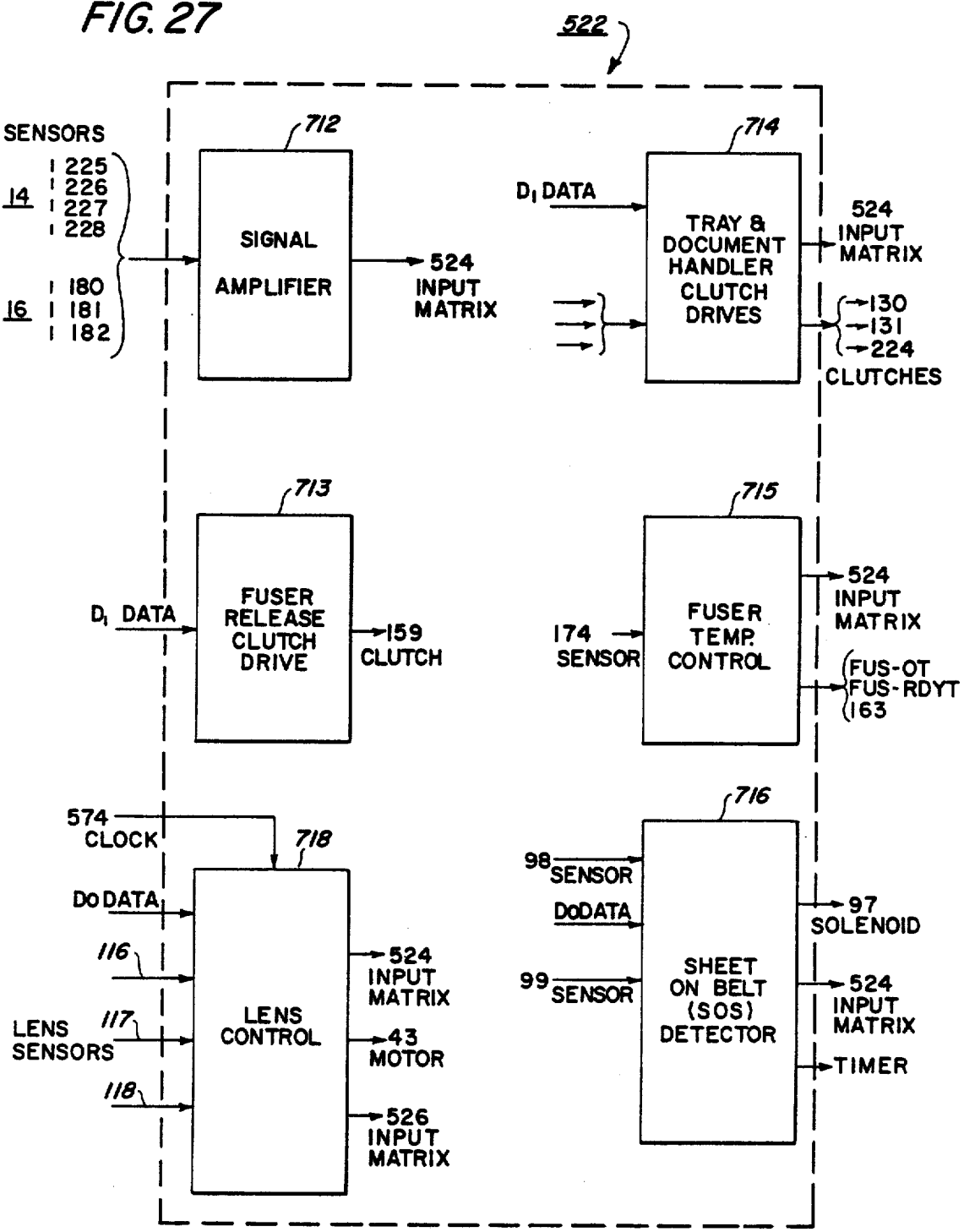
FIG. 27 is a block diagram of the apparatus special circuits module.

Referring particularly to FIGS. 25 and 27, special circuits module 522 comprises a collection of relatively independent circuits for either monitoring operation of and/or driving various elements of host machine 10. Module 522 incorporates suitable circuitry 712 for amplifying the output of sensors 225, 226, 227, 228 and 280, 281, 282 of sorter 14 and document handler 16 respectively; circuitry 713 for operating fuser release clutch 159; and circuitry 714 for operating main and auxiliary paper tray feed roll clutches 130, 131 and document handler feed clutch 244.

Additionally, fuser detection circuitry 715 monitors temperature conditions of fuser 150 as responded to by sensor 174. On overheating of fuser 150, a signal (FUSOT) is generated to turn heater 163 off, actuate clutch 159 to separate fusing and pressure rolls 160, 161; trigger trap solenoid 158 to prevent entrance of the next copy sheet into fuser 150, and initiate a shutdown of host machine 10. Circuitry 715 also cycles fuser heater 163 to maintain fuser 150 at proper operating temperatures and signals (FUS-RDYT) host machine 10 when fuser 150 is ready for operation.

Circuitry 716 provides closed loop control over sensor 98 which responds to the presence of a copy sheet 3 on belt 20. On a signal from sensor 98, solenoid 97 is triggered to bring deflector 96 into intercepting position adjacent belt 20. At the same time, a backup timer (not shown) is actuated. If the sheet is lifted from the belt 20 by deflector 96 within the time allotted, a signal from sensor 99 disables the timer and a misstrip type jam condition of host machine 10 is declared and the machine is stopped. If the signal from sensor 99 is not received within the allotted time, a sheet on selenium (SOS) type jam is declared and an immediate machine stop is effected.

Circuitry 718 controls the position (and hence the image reduction effected) by the various optical elements that comprise main lens 41 in response to the reduction mode selected by the operator and the signal inputs from lens position responsive sensors 116, 117, 118. The signal output of circuitry 718 serves to operate lens drive motor 43 as required to place the optical elements of lens 41 in proper position to effect the image reduction programmed by the operator.

Referring to FIG. 28, input matrix module 524 provides analog gates 719 for receiving data from the various host machine sensors and inputs (i.e. sheet sensors 135, 136; pressure sensor 157; etc), and data (SWITCH DATA) from the various switches on Console 800 (FRONT PANEL SWITCHES FIG. 25) module 524 serving to convert the signal input to a byte oriented output for transmittal to I/O module 502 under control of Input Matrix Select 604 (FIG. 23b). The byte output to module 524 is selected by address information inputted on bus 507 and decoded on module 524. Conversion matrix 720, which may comprise a diode array, converts the input logic signals of "0" to logic "1" true. Data from input matrix module 524 is transmitted via optical isolators 721 to Input Matrix Select 604 of I/O module 502 (FIG. 23b). From there, the data is transmitted through Multiplexer 624 and buffers 620 to CPU Module 500.

Referring particularly to FIG. 29, main panel interface module 526 serves as interface between CPU interface module 504 and operator control console 800 for display purposes and as interface between input matrix module 524 and the console switches. As described, data channels D0-D7 have data bits in each channel associated with the control console digital display or lamps. This data is clocked into buffer circuitry 723 and from there, for digital display, data in channels D1-D7 is inputted to multiplexer 724. Multiplexer 724 selectively multiplexes the data to HEX to 7 segment converter 725. Software controlled output drivers 726 are provided for each digit which enable the proper display digit in response to the data output of converter 725. This also provides blanking control for leading zero suppression or inter digit suppression.

Buffer circuitry 723 also enables through anode logic 728 the common digit anode drive. The signal (LOAD) to latch and lamp driver control circuit 729 regulates the length of the display cycle.

For console lamps 830, data in channel D0 is clocked to shift regiser 727 whose output is connected by drivers to the console lamps. Access by input matrix module 524 to the control switches and keyboard (FRONT PANEL SWITCHES) is through main panel interface module 526.

The machine output sections 530, 532, 534, 536, 538, 540 are interfaced with I/O module 502 by CPU interface module 504. At each interrupt/refresh cycle, data is outputted to sections 530, 532, 534, 536, 538, 540 at the clock signal rate in line 574 over data channels D2, D3, D4, D5, D6, D7 respectively.

Referring to FIG. 30, wherein a typical output section i.e. document handler section 530 is shown, data inputted to section 530 is stored in shift register/latch circuit combination 740, 741 pending output to the individual drivers 742 associated with each machine component. Preferably d.c. isolation between the output sections is maintained by the use of transformer coupled differential outputs and inputs for both data and clock signals and a shielded twisted conductor pair. Due to transformer coupling, the data must be restored to a d.c. waveform. For this purpose, control recovery circuitry 744, which may comprise an inverting/non-inverting digital comparator pair and output latch is provided.

The LOAD signal serves to lockout input of data to latches 741 while new data is being clocked into shift register 740. Removal of the LOAD signal enables commutation of the fresh data to latches 741. The LOAD signal also serves to start timer 745 which imposes a maximum time limit within which a refresh period (initiated by Refresh Control 605) must occur. If refresh does not occur within the prescribed time limit, timer 745 generates a signal (RESET) which sets shift register 740 to zero.

With the exception of sorter section 534 discussed below, output sections 532, 536, 538 and 540 are substantially identical to document handler section 530.

Referring to FIG. 31 wherein like numbers refer to like parts, to provide capacity for driving the sorter deflector solenoids 217, a decode matrix arrangement consisting of a Prom encoder 750 controlling bus decoder (BUS DECODER) 751 and return decoder, 752 (RET DECODER) is provided. The output of decoders 751, 752 drive the sorter solenoids 217 of upper and lower bin arrays 210, 211 respectively. Data is inputted to encoder 750 by means of shift register 754.

Figure 32:
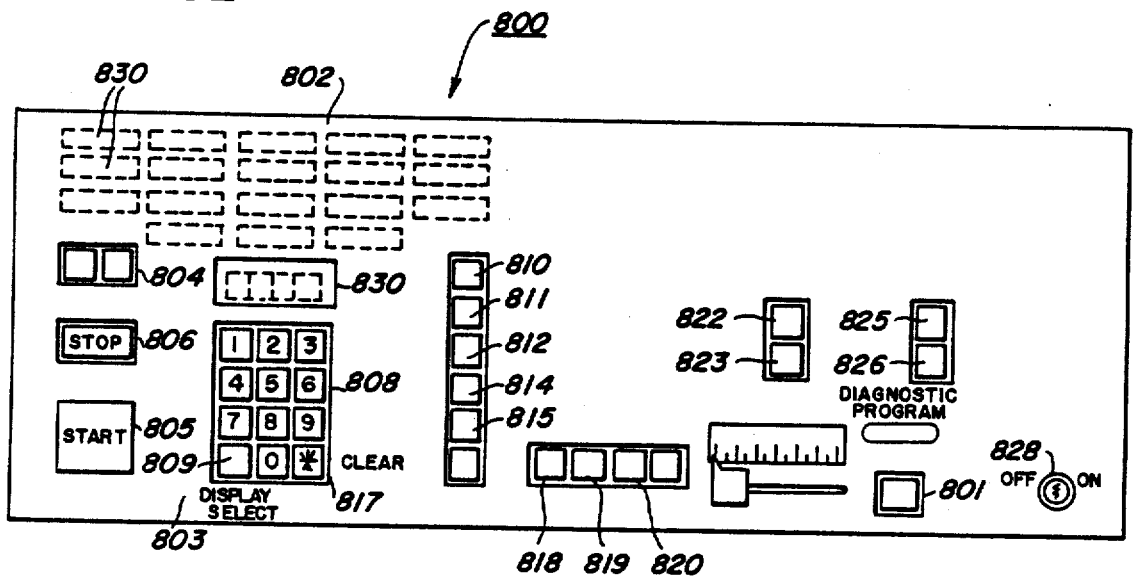
FIG. 32 is a view of the control console for inputting copy run instructions to the apparatus shown in FIG. 1.

Referring now to FIG. 32, control console 800 serves to enable the operator to program or condition host machine 10 to perform the copy run of runs desired. At the same time, various indicators on console 800 reflect the operational status of machine 10. Console 800 includes a bezel housing 802 suitably supported on host machine 10 at a convenient point with decorative front or face panel 803 on which the various machine programming buttons and indicators appear. Programming buttons include power on/off buttons 804, start print (PRINT) buttons 805, stop pring (STOP) button 806 and keyboard copy quantity selector 808. A series of feature select buttons consisting of auxiliary paper tray button 810, two sided copy button 811, copy lighter button 814, and copy darker button 815, are provided.

Additionally, image size selector buttons 818, 819, 820; multiple or single document select buttons 822, 823 for operation of document handler 16; and sorter sets or stacks buttons 825, 826 are provided. An on/off service selector 828 is also provided for activation during machine servicing. Other buttons and selection devices are also provided as will be later described.

Indicators comprise program display lamps 830 and displays such as READY, WAIT, SIDE 1, SIDE 2, ADD PAPER, CHECK STATUS PANEL, PRESS FAULT CODE, QUANTITY COMPLETED, CHECK DOORS, UNLOAD AUX TRAY, CHECK DOCUMENT PATH, CHECK PAPER PATH, JOB INCOMPLETE and UNLOAD SORTER. Other display information may be envisioned.

MACHINE OPERATION

As will appear, host machine 10 is conveniently divided into a number of operational states. The copy control program is divided into background routines and foreground routines with operational control normally residing in the background routine or routines appropriate to the particular machine state then in effect. The output buffer (DATA OUT) of RAM memory section 546 is used to transfer/refresh control data to the various remote locations in host machine 10, control data from both background and foreground routines being inputted to RAM memory section 546 for subsequent transmittal to host machine 10. Transmittal/refresh of control data presently in the output buffer (DATA OUT) of section 546 is effected through Direct Memory access (DMA) under the aegis of a Machine Clock interrupt routine.

Foreground routine control data which includes a Run Event Table built in response to the particular copy run or runs programmed, is transferred to output buffer (DATA OUT) of RAM section 546 by means of a multiple prioritized interrupt system wherein the background routine in process is temporarily interrupted while fresh foreground routine control data is inputted to the RAM output buffer following which the interrupted background routine is resumed.

The copy control program for host machine 10 is divided into a collection of foreground tasks, some of which are driven by the several interrupt routines, and others by the background or non-interrupt routines. Foreground tasks are tasks that generally require frequent servicing, high speed response, or synchronization with the host machine 10. Background routines are related to the state of host machine 10, different background routines being performed with different machine states. The copy control program includes a single background software routine (STCK) composed of specific subroutines associated with the principal operating states of host machine 10 is provided. A byte called STATE contains a number indicative of the current operating state of host machine 10. The machine STATES are as follows:

| STATE NO. | MACHINE STATE | CONTROL SUBR. |
|---|---|---|
| 0 | Software Initialize | INIT |
| 1 | System Not Ready | NRDY |
| 2 | System Ready | RDY |
| 3 | Print | PRINT |
| 4 | System Running, Not Print | RUNNPRT |
| 5 | Service | TECHREP |

Figure 33:
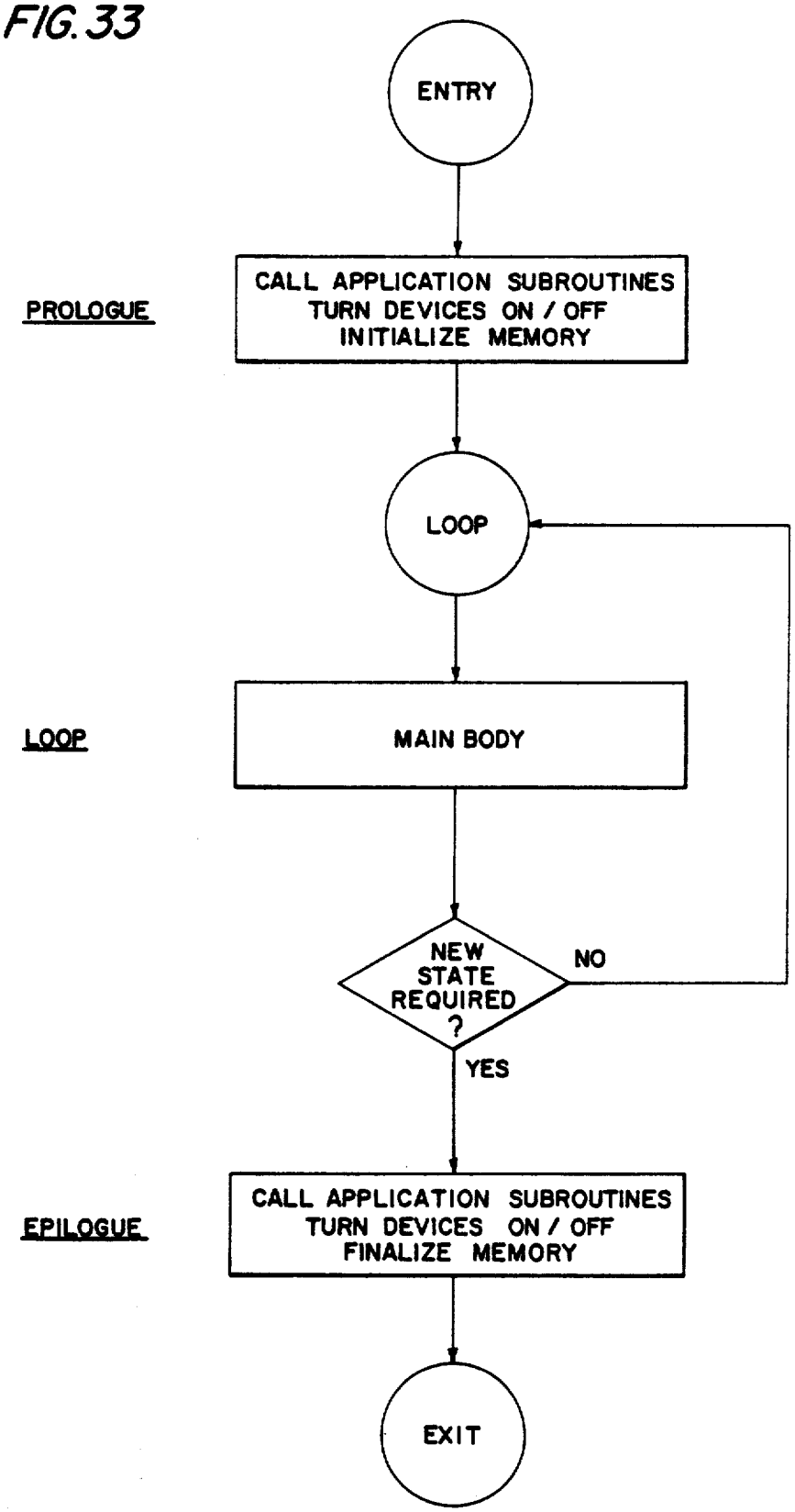
FIG. 33 is a flow chart illustrating a typical machine state.

Referring to FIG. 33, each STATE is normally divided into PROLOGUE, LOOP and EPILOGUE sections. As will be evident from the exemplary background program STCK reproduced in Table I, entry into a given STATE (PROLOGUE) normally causes a group of operations to be performed, these consisting of operations that are performed once only at the entry into the STATE. For complex operations, a CALL is made to an applications subroutine therefor. Relatively simpler operations (i.e. turning devices on or off, clering memory, presetting memory, etc.) are done directly.

Once the STATE PROLOGUE is completed, the main body (LOOP) is entered. The routine remains in this LOOP until a change of STATE request is received and honored. On a change of STATE request, the STATE EPILOGUE is entered wherein a group of operations are performed, following which the STATE moves into the PROLOGUE of the next STATE to be entered.

Figure 34:
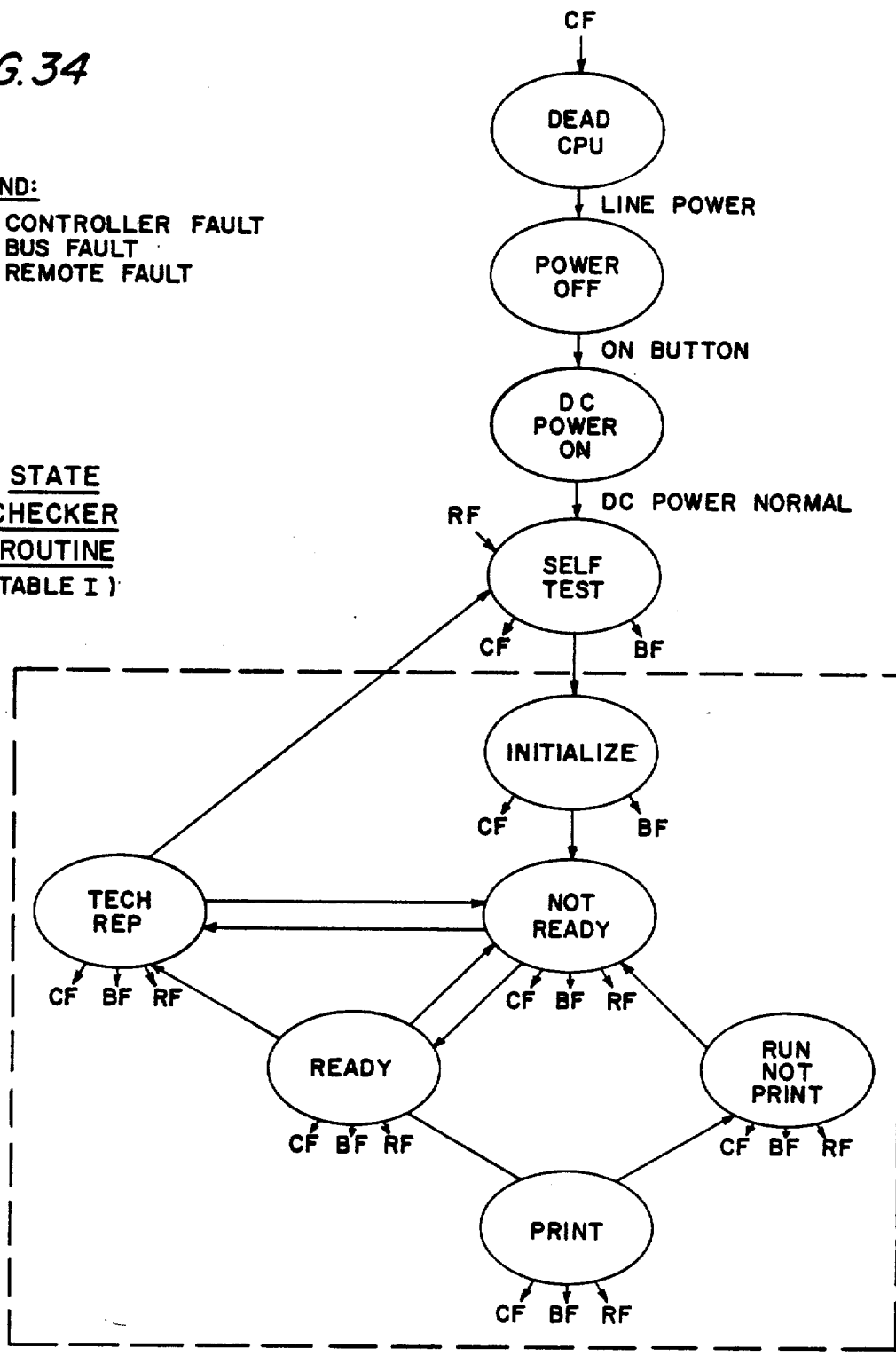
FIG. 34 is a flow chart of the machine state routine.

Referring to FIG. 34 and the routines reproduced in Table I. On actuation of the machine POWER-ON button 804 (FIG. 32), the software Initialize STATE (INIT) is entered. In this STATE, the controller is initialized and a software controlled self test subroutine is entered. If the self test of the controller is successfully passed, the System Not Ready STATE (NRDY) is entered. If not, a fault condition is signaled.

In the System Not Ready STATE (NRDY), background subroutines are entered. These include setting of Ready flags, control registers, timers, and the like; turning on power supplies, the fuser, etc., initializing the Fault Handler, checking for paper jams (left over from a previous run), door and cover interlocks, fuser temperatures, etc. During this period, the WAIT lamp on console 800 is lit and operation of host maching 10 precluded.

When all ready conditions have been checked and found acceptable, the controller moves to the System Ready State (RDY). The READY lamp on console 800 is lit and final ready checks made. Host Machine 10 is now ready for operation upon completion of the conditioning of the machine for the desired copy run, loading of one or more originals 2 into document handler 16 (if selected by the operator), and actuation of START PRINT button 805. As will appear hereinafter, the next state is PRINT wherein the particular copy run selected is carried out.

While the machine is completing a copy run, the controller normally enters the Run Not Print State (RUNNPRT) where the controller calculates the number of copies delivered, resets various flags, stores certain machine event information in the memory, as well as generally conditioning the machine for another copy run, if desired. The controller then returns to the System Not Ready State (NRDY) to recheck for ready conditions prepatory for another copy run, with the same state sequence being repeated until the machine is turned off by actuation of POWER OFF button 804 or a malfunction inspired shutdown is triggered. Hence, the copy control program comprises the routines in states 0–4. In contrast, the last state (TECH REP-5) is a machine servicing state wherein different operating programs can be accessed as will later be described.

Referring particularly to FIG. 32 and Tables II, III, IV, V, VI and VII, the machine operator uses control console 800 to condition the machine for the copy run desired. Conditioning may be done during either the System Not Ready (NRDY) or System Ready (RDY) states, although the machine will not operate during the System Not Ready state should START PRINT button 805 be pushed. The copy run conditioning includes selecting (using keyboard 808) the number of copies to be made, and such other ancillary features as may be desired, i.e. use of auxiliary paper tray 102, (push button 810), image size selection (push button 818, 819, 820), document handler/sorter selection (push buttons 822, 823, 825, 826), copy density (push buttons 814, 815), duplex or two sided copy button 811, etc. On completion of the copy run START PRINT button 805 is actuated to start the copy run selected (presuming the READY lamp is on and an original or originals 2 have been placed in tray 233 of document handler 16 if the document handler has been selected).

After the operator selects the various features, controller 18 enters a Digit Input routine in which the conditioning information is transferred to RAM section 546. The copy run conditioning data passes via Main Panel Interface Module 526 to Input Matrix Module 524 and from there is addressed through Matrix Input Select 604, Multiplexer 624, and Buffers 620 of I/O Module 502 to RAM section 546 of CPU Module 500.

On entering PRINT STATE, a Run Event Table (FIG. 35) comprised of foreground tasks is built for operating in cooperation with the background tasks the various components of host machine 10 in an integrated manner to produce the copies desired. The run Event Table is formed by controller 18 through merger of a Fixed Pitch Event Table (TABLE II) (stored in ROM 545 and Non Volatile Memory 610) and a Variable Pitch Event Table (TABLE III) in a fashion appropriate to the parameters of the job selected.

The Fixed Pitch Event Table (TABLE II) is comprised of machine events whose operational timing is fixed during each pitch cycle such as the timing of bias to transfer roll 75, (TRN 2 CURR), actuating toner concentration sensor 65 (ADC ACT), loading roll 161 of fuser 150 (FUS*LOAD), and so forth, irrespective of the particular copy run selected. The Variable Pitch Table (TABLE III) is comprised of machine events whose operational timing varies with the individual copy run, i.e. timing of pitch fadeout lamp 44 (FO-*ONBSE) and timing of flash illumination lamps 37 (FLSH BSE). The variable Pitch Table is built by the Pitch Table Builder (TABLE IV) from the copy run conditioning information coupled with event address information from ROM section 545, sorted by absolute clock count (via the routine shown in TABLE V), and stored in RAM section 546 (via the routine shown in TABLE VI). The Fixed Pitch Event Table and Variable Pitch Table are merged with the relative clock count differences between Pitch events calculated to form a Run Event Table (TABLE VII).

Figure 35:
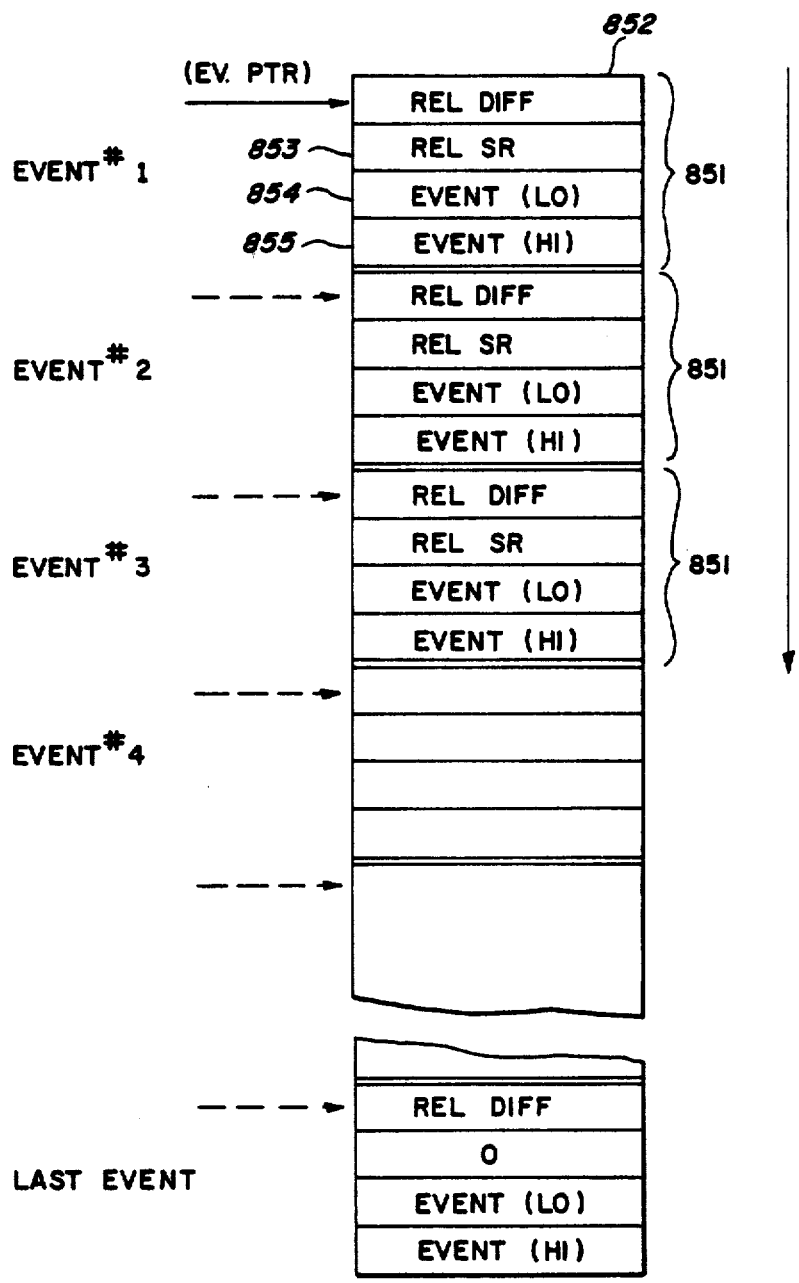
FIG. 35 is a view showing the event table layout.
Figure 36:
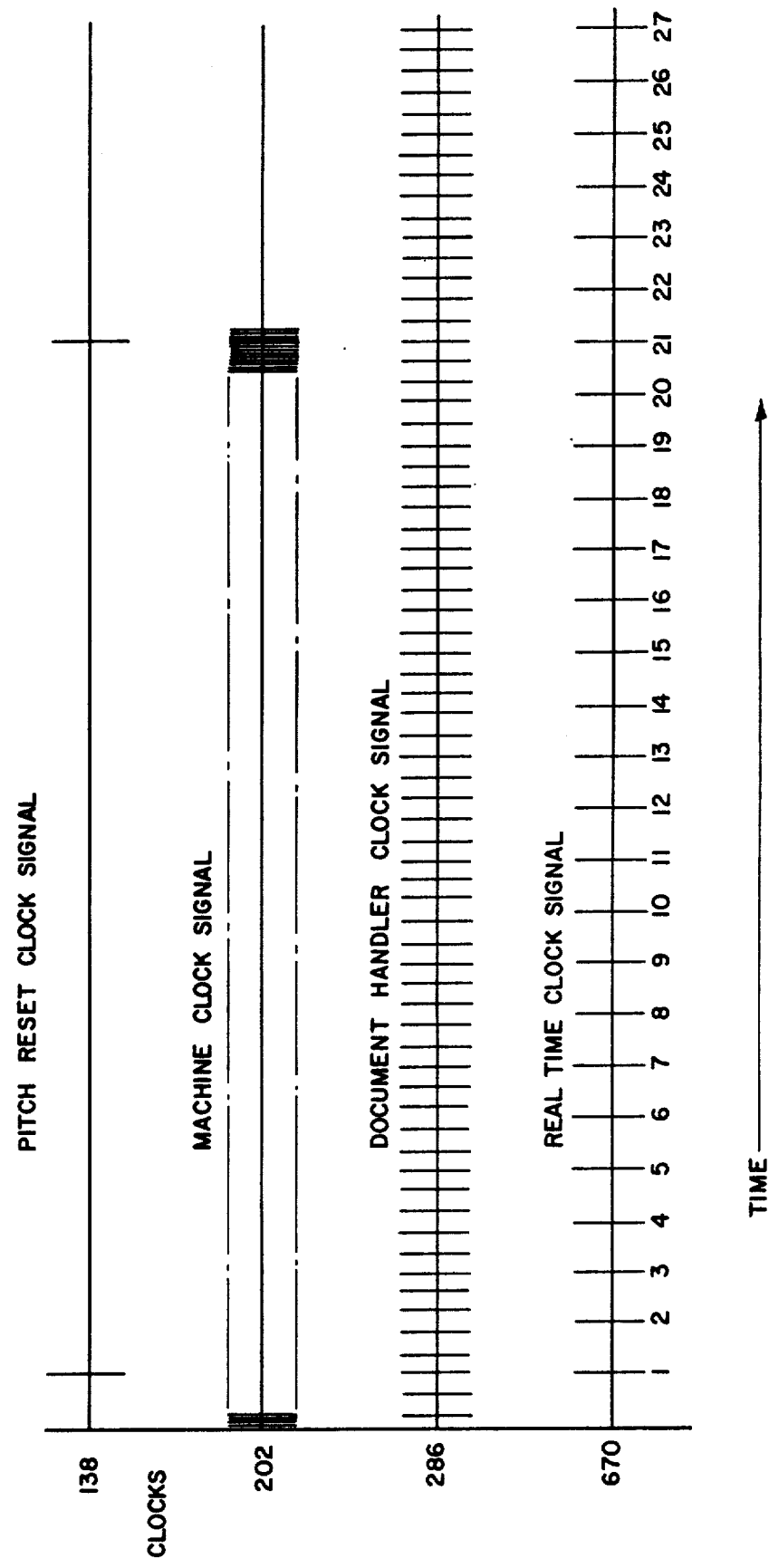
FIG. 36 is a chart illustrating the relative timing sequences of the clock interrupt pulses.

Referring particularly to FIG. 35, the Run Event Table consists of successive groups of individual events 851. Each event 851 is comprised of four data blocks, data block 852 containing the number of clock pulses (from machine clock 202) to the next schedule pitch event (REL DIFF), data block 853 containing the shift register position associated with the event (REL SR), and data blocks 854, 855 (EVENT LO) (EVENT HI) containing the address of the event subroutine.

In machine states other than PRINT, data blocks 852, 853 (REL DIFF) (REL SR) are set to zero. Data blocks 854, 855 hold the address information for the Non-Print state event.

Control Data in the Run Event Table represents a portion of the foreground tasks and is transferred to the output buffer 546' of RAM memory section 546 by the Pitch Reset and Machine Clock interrupt routines. Other control data, representing foreground tasks not in the Run Event Table is transferred to RAM output buffer 546' by the Real Time Clock interrupt routine. Transfer of the remainder of the control data to output buffer 546' is by means of background (non-interrupt) routines.

Transfer of control data from output buffer 546' of RAM memory section 546 to the various locations in host machine 10 is through output Refresh via Direct Memory access (DMA) in response to machine clock interrupt signals as will appear. The interrupt routines are initiated by the respective interrupt signals.

Referring particularly to FIG. 23 and 35–37 and TABLES VII, VIII the interrupt having the highest priority, the Pitch Reset interrupt (signal 640), is operable only during the PRINT state, and occurs once each revolution of sheet register fingers 141 as responded to by sensor 146 of pitch reset clock 138. At each pitch reset interrupt signal, after a determination of priority by Priority Chip 659 in the event of multiple interrupt signals, an interrupt signal (INT) is generated. The acknowledgement signal (INTA) from processor 542 initiates the pitch reset interrupt routine.

On entering the pitch reset routine, the interrupt is re-enabled and the contents of the program working registers stored. A check is made to determine if building of the Run Event Table is finished. Also checks are made to insure that a new shift register schedules have been built and at least 910 clock counts since the last pitch reset have elapsed. If not, an immediate machine shutdown is initiated.

Presuming that the above checks are satisfactory, the shift register pointer (SR PTR), which is the byte variable containing the address of a pre-selected shift register position (SR O), is decremented by one and adjusted for overflow and the shift register contents are updated with a byte variable (SR+VALUV) containing the new shift register value to be shifted in following the next pitch reset interrupt. The event pointer (EV*PTR), a two byte variable containing the full address of the next scheduled event, is reset to Event #1. The count in the C register equals the time to the first event.

Machine Cycle Down, Normal Down, and Side One Delay checks are made, and if negative, the count on a cycle up counter (CYC UP CT) is checked. If the count is less than a predetermined control count (i.e. 5), the counter (CYC UP CT) is incremented by one. When the count on the cycle up counter equals the control count, an Image Made Flag is set.

If a Normal Down, Cycle Down, or Side One Delay has been initiated, the cycle up counter (CYC UP CT) is reset to a preset starting count (i.e. 2). The pitch reset interrupt routine is exited with restoration of the working registers and resetting of pitch reset flip flop 647.

The Machine Clock Interrupt routine, which is second in priority, is operative in all operational states of host machine 10. Although nominally driven by machine clock 202, which is operative only during Print state when processor main drive motor 34 is energized, machine clock pulses are also provided by phase locked loop 649 when motor 34 is stopped.

Referring particularly to FIG. 38 and TABLE IX, entry to the Machine Clock interrupt routine there shown is by a signal (INTA) from processor 542 following a machine clock interrupt signal 642 as described earlier. On entry, the event control register (C REG) is obtained and the working register contents stored. The C REG is decremented by one, the register having been previously set to a count corresponding to the next event in the Event Run Table.

The control register (C REG) is checked for zero. If the count is not zero and is an odd number, an output refresh cycle is initiated to effect transfer/refresh of data in RAM output buffer 546' to host machine 10. If the number is even, or following an output refresh, the interrupt system is re-enabled, the machine clock interrupt flip flop 651 is reset and the working registers are restored. Return is then made to the interrupted routine.

If the control register (C REG) count is zero, the Event Pointer (EV*PTR), which identifies the clock count (in data block 852) for the next scheduled event (REL DIFF), is loaded and the control register (C REG) reset to a new count equal to the time to the next event. The Event Pointer (EV*PTR) is incremented to the relative shift register address for the event (REL SR, data block 853), and the shift register address information is set in appropriate shift registers (B, D, E, A registers).

The event Pointer (EV*PTR) is incremented successively to the event subroutine address information (EVENT LO) (EVENT HI) in the Event Run Table, and the address information therefrom loaded into a register pair (D & E registers). The Event Pointer (EV PTR) is incremented to the first data block (REL DIFF) of the next succeeding event in the Run Event Table, saved, and the register pair (H & L registers) that comprise the Event Pointer are loaded with the event subroutine address from the register pair (D & E registers) holding the information. The register pair (D & E registers) are set to the return address for the Event Subroutine. Using the address information, the Event Subroutine is called and the subroutine data transferred to RAM output buffer 546' for transfer to the host machine on the next Output Refresh.

Following this, the Machine Clock interrupt routine is exited as described earlier.

The Output Refresh cycle alluded to earlier functions, when entered, to transfer/refresh data from the output buffer of 546' RAM section 546 to host machine 10. Direct Memory Access (DMA) is used to insure a high data transfer rate.

On a refresh, Refresh Control 605 (see FIG. 23) raises the HOLD line to processor 542, which on completion of the operation then in progress, acknowledges by a HOLD A signal. With processor 542 in a hold mode and Address and Data buses 507, 508 released to I/O Module 502 (through operation of tri-state buffers 510, 511, 563, 570), the I/O module then sequentially accesses the output buffer 546' of RAM section 546 and transfers the contents thereof to host machine 10. Data previously transferred is refreshed.

The Real Time Interrupt, which carries the lowest priority, is active in all machine states. Primarily, the interrupt acts as an interval timer by decrementing a series of timers which in turn serve to control initiation of specialized subroutines used for control and error checking purposes.

Figure 39A:
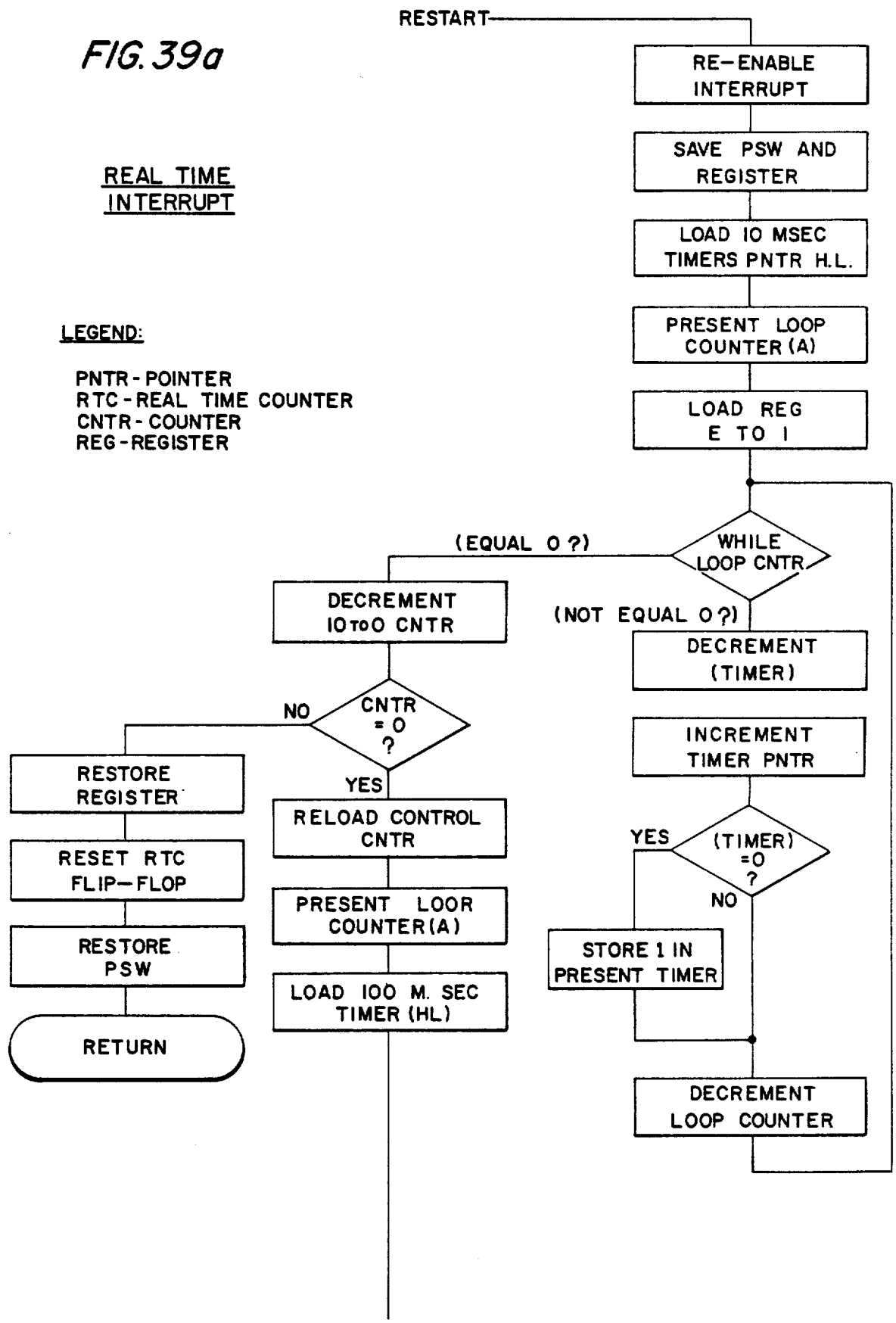
FIGS. 39a and 39b comprise a flow chart of the real time interrupt routines.
Figure 39B:
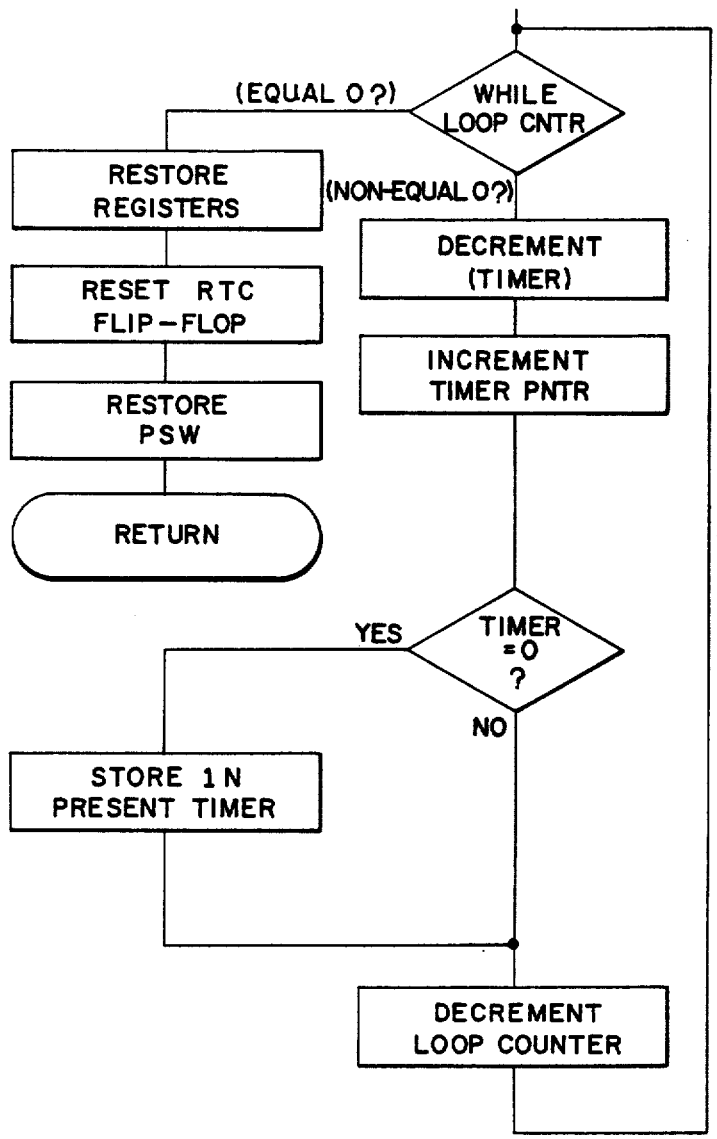

Referring particularly to FIG. 39 and TABLE X, the Real Time interrupt routine is entered in the same manner as the interrupt routines previously described, entry being in response to a specific RESTART instruction code assigned to the Real Time interrupt. On entry, the interrupt is re-enabled and the register contents stored. The timer pointer (PNTR) for the first class of timers (i.e. 10 msec TIMERS) is loaded, and a loop counter identifying the number of timers of this class (i.e. 10 msec TIMERS) preset. A control register (E REG) is loaded and a timer decrementing loop is entered for the first timer. The loop decrements the particular timer, increments the timer pointer (PNTR) to the location of the next timer in this class, checks the timer count, and decrements the loop counter. The decrementing loop routine is repeated for each timer in the class (i.e. 10 msec TIMERS) following which a control counter (CNTR) for the second group of timers (i.e. 100 msec TIMERS) is decremented by one and the count checked.

The control counter (CNTR) is initially set to a count equal to the number of times the first timer interval is divisible into the second timer interval. For example, For example, if the first class of timers are 10 msec timers and the second timer class are 100 msec timers, the control counter (CNTR) is set at 10 initially and decremented on each Real Time interrupt by one down to zero.

If the count on the control counter (CNTR) is not zero, the registers are restored, Real Time interrupt flip flop 856 reset, and the routine exited. If the count on the control counter is zero, the counter is reloaded to the original maximum count (i.e. 10) and a loop is entered decrementing individually the second group of timers (i.e. 100 msec TIMERS). On completion, the routine is exited as described previously. Other TIMERS can be envisioned which are implemented in the same manner.

In the following TABLES:

"@"-is used to indicate flags, counters and subroutine names.

"#"-is used to indicate input signals.

"$"-is used to indicate output signals.

":"-is used to indicate macro instructions, system subroutines, system flags, and data, etc.

For further explanation of the mnemonics and particular instructions utilized by the following routines, the reader is directed to Intel Corporation's two volume "Programming Manual For the 8080 Microcomputer System", Preliminary Edition, May 1974.

TABLE I

INITIALIZE STATE

```
*NAR

INIT: SUBROUTINE
;
;               INITIALIZE STATE- EXECUTED AFTER EACH START OR RESTART. SETS
;               ALL POINTERS, FLAGS, AND DATA TO INITIAL VALUES REQUIRED TO
;               START EXECUTION OF ANY CONTROL ALGORITHMS. ALWAYS EXITS TO
;               :NOT READY: STATE.
;
         INIT:
  3E0A           MVI   A,10              INITIALIZE TO 10
  3252FD         STA   DIVD:10           INITIALIZE TO 10
  32F5FC         STA   SLOWTOGL
  211907         LXI   H,EV@STBY:        H&L = ADDR OF STBY EVENT TABLE
  2264FD         SHLD  EV@PTR:           SAVE FOR MACH.CLK ROUTINE
  21FFFF         LXI   H,XIFFFF:         INIT INSTRUMENTATION REMOTE
  2272FB         SHLD  INS@PTRR                   ADDR PNTR TO END OF RAM
  21FFFF         LXI   H,AD@RAMT-1       SET PNTR TO RAM CNTRL TABLE
  2278FB         SHLD  TAR@STRT          SAVE PNTR
  3E7F           MVI   A,X'7F'           INIT TO UN-BYPASS
  32ADFC         STA   JAM@BYPS                   ALL JAM SWS
;
;               TIMER INITIALIZATION
;               MUST BE DONE BEFORE ANY TIMERS CAN BE USED
;
  211FF9         LXI   H,AVAIL:=B+X'1F'  SET H&L TO END OF AVAIL: TABLE
  36FF           MVI   M,X'FF'           STORE X'FF' IN LAST TABLE ADDR
  3E1F           MVI   A,31              SET A-REG TO VALUE TO BE STORED
         REPEAT:
  2D             DCR   L                 STEP TO NEXT TABLE LOCATION
  77             MOV   M,A               STORE INITIALIZATION VALUE
  3D             DCR   A                 STEP TO NEXT VALUE
         UNTIL:
  C22600         LXI   H,ADR(DATA,TIME:OUT)  IS INITIALIZATION COMPLETE
  2120FE         SHLD  INPTR:            TO INITIALIZE TIME:OUT TABLE
  2261FD         SHLD  OUTPTR:           SET IN/OUT POINTERS TO
                                         BEGINNING OF TIME:OUT TABLE
;
;               INITIALIZE SPOOL
;               POINTERS
;
  2140FE         LXI   H,ADR(DATA,SPL:TBL)
  226AFD         SHLD  SPL:IN            SET PNTRS
  226CFD         SHLD  SPL:OUT                    TO START OF TABLE
;
;               CHECK IF PAPER WAS PRESENT WHEN POWER WENT DOWN
;
  3AC9E2         RNVN1B: MOV A,NV@JAM@BN  A = JAM INFO FROM POWER DOWN
  0F             RRC                      SET CARRY TO FDR JAM INFO
  D25A00         IF:    CC,C,S            WAS THERE PAPER IN FDR AREA
  47             MOV   B,A                YES, SAVE JAM INFO
  213CFD         SFBIT:P FDR@JAM,FDR@MJAM SET FEEDER JAMS
  3E0C
  86
  77
  2121F9         SFBIT:P ON@X@2,ON@X@3    SIGNAL TRANSPT CLEARANCE REQ'D
```

```
154   05 00050  3E03                      SFLG   CLRØREQD                      TELL FLT HNDLR CLEARANCE REQD
      05 00052  86
      05 00053  77
      05 00054  3E80
      05 00056  3267F4
      05 00059  78                        MØV    A,R                           RESTORE THE A-REG
155                              ENDIF
156   05 0005A  0F                        RRC
157   05 0005B  D27100                    IFI    CC,C,S                        SET CARRY TO IMEDØØN!
158                                                                            WAS THERE AN IMEDØØN!
159
160   05 0005E  2EFF                      MVI    L,MSK(FBIT,LØPRØFLT,JAM2ØFLT,JAM3ØFLT,JAM4ØFLT,
161                                              JAM5ØFLT,JAM6ØFLT,RET1ØFLT,RET2ØFLT)
162                                                                            SETS ALL JAM FBITS IN REG-L
163   05 00060  2603                      MVI    H,MSK(FBIT,SØSØJAM,MISSTRIP)  SETS ADDITIONAL FBITS IN H
164                                                                            MOVE FBITS INTO FBYTES
165   05 00062  223BFD                    SHLD   ADR(FBYT,PAP11)               TELL FLT HNDLR CLEARANCE REQD
166   05 00065  3E80                      SFLG   CLRØREQD
      05 00067  3267F4
      05 0006A  2120F9
167   05 0006D  3E21                      SFBIT,P TSØFUS,TSØX82                TURN ON UNDEDICATED MAP LAMPS
      05 0006F  86
      05 00070  77
168                              ENDIF
169                              IF!
170   05 00071  E60C                      XBYT,A,AND,J                         IS EITHER SRT JAM FLAG SET
      05 00073  CAAA00                    MSK(NVØIT,NVØLØWØJ,NVØUPØJ),NZ 'IN NVNIB
171   05 00076  FE0C                      IFI    XBYT,A,EQ,I                   YES, ARE BOTH SET
172   05 00078  C28300                           MSK(NVØLØWØJ,NVØUPØJ)
173   05 0007B  3EA0                             SFLG   TWØACT                 TELL SRT THAT THERE WAS A JAM
      05 0007D  3261F4
174   05 00080  C3A700                    ELSE!
175   05 00083  0F                        RRC
176                                       IDIREAD  NVØLØWØJ                    GET NVØLØWØJ TO SIGN BIT 6
177                                       MØDFLG   LOWØMØD                     TELL SRT IF UP OR LOW JAM
178   05 00084  3237F4                    ENDIF
179   05 00087  CD0000                    CALL   JAMØSET                       LET SRT SET JAM FLAGS & LAMPS
180                              ENDIF
181   05 0008A  3E80                      SFLG   SRTØRDY                       SIGNAL SRT NOT IN USE (READY)
      05 0008C  328CF7
182   05 0008F  3287F7                    MØDFLG  PROGØRDY                     SET PRØG ROUTINE READY
183   05 00092  3268F4                    MØDFLG  2SDØENAB                     ALLOW SELECTION OF DUPLEX MODE
184   05 00095  3EF2                      MVI     A,X1F2!                      RE-ENAPLE
185   05 00097  3200E6                    STA     RSINTFF!                              INTERRUPT SYSTEM
186   05 0009A  FB                        FI
187   05 0009B  CD0000                    SØBIT,S  NPFØSØN,24VØSPL             PFØ OFF (INVT!D) & 24V ON
      05 0009E  02
      05 0009F  E4R0
      05 000A1  EEA0
188   05 000A3  CD0000                    STIMR   FLTØDLY,25000,FLTØCHK        START LENS FAULT TIMER
      05 000A6  12
      05 000A7  FA
189   05 000A8  0000                      CALL    DØCØCLP                                                  (1)
190   05 000AA  CD0000                    STA     CFØDIGIT                     INITIALIZE DOCØNUM TO 1
191   05 000AD  327AFC                    MVI     A,MSK(FBIT,POPØRS)           ENABLE 'O' IN QTY FLASHED  (2)
192   05 000B0  3E08                      STA     XPØPREV                      TELL FLT ASSUME BRUSH HOUSE ØPN
193   05 000B2  3286FC                    MVI     A,INRDY
      05 000B5  3E02                                                           INIT SICK
194   05 000B7  3254FD                    STA     ISTATE!
195   05 000BA  3253FD                    STA     STATE!                       SYNCHRONIZED BACKGROUND CONTROL LOOP
196   05 000BD  CD3702                    CALL    NRDY;PRL                     INIT CONTROL TO NOT-READY STATE
```

```
;*************************************************
;*                                               *
;*   S Y C R O N I Z E D   B A C K G R O U N D   C O N T R O L   L O O P S   *
;*                                               *
;*************************************************

PRIORITIES:
                                         FIRST           10MS TIME OUT REQUESTS
                                         SECOND          10MS CALLS
                                         THIRD           SPOOLED CALLS
                                         FOURTH          20MS CALLS
                                         FIFTH           100MS CALLS
                                         SIXTH           100MS TIME OUT REQUESTS 05 00C0   2151FD         A       LXI     H,ADR(DATA,SB:RQST)   SET MEM PNTR TO SB BYTE
                                 REPEAT                         LOOP-3 FROM HLT ON ALL INTER'S
                                   REPEAT                       LOOP-2 BACK AFTER EACH 100MS
                                     REPEAT                     LOOP-1 BACK AFTER EACH 20MS
05 00C3   7E             A         MOV    A,M                   A= SYNC BKGND REQUESTS FROM RTC
                                   ID:READ  SB:RQST
05 00C4   07             A         RLC                          TEST FOR 10MS
05 00C5   D2F700         N         IF!    CC,C,S                  SA REQUEST
;*****
                                                                 TIMER SERVICE REQUESTS
                                                                 'CALLS TIMED OUT TIMER SUBRS
                                                                 USING WRAP AROUND TABLE AND
                                                                 IN/OUT PNTRS - RTCI SETS
                                                                 INPTR: & ENTERS CALL ADDR 05 00C8   3A5FFD         N         WHILE!  XBYT,INPTR,NE,OUTPTR: ARE PNTRS AT SAME TABL
05 00CB   2161FD         A
05 00CE   BE             A
05 00CF   CAE500         N
05 00D2   6E             A         MOV    L,M            SET L-REG TO ADDR(L) IN TABLE
05 00D3   26FE           A         MVI    H,HADR(DATA,TIME:OUT)  MEM PNTR NOW SET TO
05 00D5   5E             A         MOV    E,M                     HAVE CALL ADDR(L) TO E
05 00D6   23             A         INX    H                       STEP TO NEXT TABLE BYTE
05 00D7   56             A         MOV    D,M                     MOVE CALL ADDR(H) TO D
05 00D8   23             A         INX    H                       STEP TO NEXT TABLE BYTE
05 00D9   7D             A         MOV    A,L                     PREPARE TO UPDATE PNTR
                                   ID:READ                        DYNAMIC TABLE CONTAINING ADDRS
                                   MODBYT  A,AND,I
                                           TIME:MSK
05 00DA   E62F           A         STA    ADR(DATA,OUTPTR:)  PNTR TO ADDR OF LAST SE
05 00DC   3261FD         A         CALL   DE:IND              DO TIMEOUT CALL
05 00DF   CD0000         N         ENDWHILE                   YES, ALL TIME OUTS SERVICED
05 00E2   C3C800         N                                    END TIMER SECTION 05 00E5   2A55FD         A         LHLD   10:CALLS       GET PROPER 10MS CALL TABLE
05 00E8   CDC000         N         CALL   ML:IND          DO 10MS CALLS
05 00EA   2151FD         A         LXI    H,ADR(DATA,SB:RQST) SET MEM PNTR TO SB BYTE
05 00ED   F3             A         CI
05 00EE   7E             A         MODBYT M,AND, 10:RQST REMOVE 10MS REQUEST
05 00EF   E67F           A
05 00F1   77             A
                                   ID:ALTR  SB:RQST
05 00F2   FB             A         FI                   (WATCH OUT FOR UNPRINTABLE NOT)
05 00F3   C31501         N         ELSE:                  DO ANY SPOOLED ROUTINES
05 00F4   3A6AFD         A         IF!    XBYT,SPL:IN,NE,SPL:OUT
```

```
                                         MOV    L,M
                                         MVI    H,ADR(DATA,SPL:TBL)
                                         MOV    E,M
                                         INX    H
                                         MOV    D,M
                                         INX    H
                                         MOV    A,L
                                         ANDBYT A,AND,SPL:MSK
                                         STA    ADR(DATA,SPL:OUT)
                                         CALL   DE:IND
                                  ENDIF
                                  LXI    H,ADR(DATA,SB:RQST)
                                  MOV    A,M
                                  ENDIF
                          ID:READ SB:RQST
                                  RLC                            TEST FOR 20MS
                                  RLC
                                  IF:    CC,C,S                  SB REQUEST
                                         LHLD   20PNTR           SET MEM PTR TO CALL IN 20MS TAB
                                         MOV    E,M              MOVE CALL ADDR(L) TO E
                                         INX    H                STEP MEM PTR TO ADDR(H)
                                         IF:    XBYT,M,EQ,X'FF'  IS POINTER AT END OF TABLE

LHLD   20:PNTR   YES, SET MOVING POINTER
                                                SHLD   20PNTR    BACK TO BEGINNING OF TABLE
                                                LXI    H,ADR(DATA,SB:RQST)  SET MEM PNTR TO
                                                DI
                                                MODBYT M,AND,20:RQST REMOVE 20MS REQUEST

ID:ALTR SB:RQST
                                         ELSE:
                                                MOV    D,M       NO, MOVE CALL ADDR(H) TO D
                                                INX    H         STEP TO NEXT CALL IN TABLE
                                                SHLD   20PNTR    SAVE FOR NEXT LOOP-1
                                                CALL   DE:IND
                                                LXI    H,ADR(DATA,SB:RQST) SET MEM PNTR TO SB BY
                                         ENDIF
                                  UNTIL: XBYT,M,AND,20:RQST,Z MORE 20MS CALLS TO DO (LOOP-1)

ID:READ SB:RQST
                                  IF:    XBYT,M,AND,100:RQST,NZ TEST FOR 100MS SB REQUEST

ID:RFAD SB:RQST
                                         LHLD   100PNTR          SET MEM PNTR TO CALL IN 100 TAB
                                         MOV    E,M              MOVE CALL ADDR(L) TO E
                                         INX    H                STEP MEM PNTR TO ADDR(H)
                                         IF:    XBYT,M,EQ,X'FF'  IS PNTR AT END OF TABLE
```

| | | | |
|---|---|---|---|
| 251 | 05 000FA | 216CFD | N |
| 252 | 05 000FD | 6E | A |
| 253 | 05 000FE | CA1101 | N |
| 254 | 05 00101 | 6E | A |
| 255 | 05 00102 | P6FE | A |
| 256 | 05 00105 | 5E | A |
| 257 | 05 00106 | 23 | A |
| 258 | 05 00107 | 56 | A |
| 259 | 05 00108 | 70 | A |
| 260 | 05 00109 | E64F | A |
| 261 | 05 0010B | 326CFD | A |
| 262 | 05 0010E | CD0000 | N |
| 263 | 05 00111 | 2151FD | A |
| 264 | 05 00114 | 7E | A |
| 265 | | | |
| 266 | 05 00115 | 07 | A |
| 267 | 05 00116 | 07 | A |
| 268 | 05 00117 | D24201 | N |
| 269 | 05 0011A | 2A59FD | N |
| 270 | 05 0011D | 5E | A |
| 271 | 05 0011E | 23 | A |
| 272 | 05 0011F | 7E | A |
| 273 | 05 00120 | FEFF | A |
| 274 | 05 00122 | C23701 | N |
| 275 | 05 00125 | 2A57FD | N |
| 276 | 05 00128 | 2259FD | A |
| 277 | 05 0012B | 2151FD | A |
| 278 | 05 0012E | F3 | A |
| 279 | 05 0012F | 7E | A |
| 280 | 05 00130 | E6DF | A |
| 281 | 05 00132 | 77 | A |
| 282 | 05 00133 | FB | A |
| 283 | 05 00134 | C34201 | N |
| 284 | 05 00137 | 56 | A |
| 285 | 05 00138 | 23 | N |
| 286 | 05 00139 | 2259FD | N |
| 287 | 05 0013C | CD0000 | N |
| 288 | 05 0013F | 2151FD | A |
| 289 | 05 00142 | 7E | A |
| 290 | 05 00143 | E640 | A |
| 291 | 05 00145 | C2C300 | N |
| 292 | 05 00148 | 7E | A |
| 293 | 05 00149 | E620 | A |
| 294 | 05 0014B | CA9E01 | N |
| 295 | 05 0014E | 2A5DFD | N |
| 296 | 05 00151 | 5E | A |
| 297 | 05 00152 | 23 | A |
| 298 | 05 00153 | 7E | A |
| 299 | 05 00154 | FEFF | A |
| 300 | 05 00156 | C29301 | N |

| Line | Addr1 | Addr2 | Code | Flag | Label | Op | Operand | Comment |
|---|---|---|---|---|---|---|---|---|
| 296 | 05 | 0159 | 2A5BFD | N | | LHLD | 100PNTR | YES, SET MOVING PNTR BACK |
| 297 | 05 | 015C | 225DFD | N | | SHLD | 100PNTR | TO BEGINNING OF TABLE |
| 298 | | | | | | | | |
| 299 | | | | | | | | 100MS TIMER SERVICE |
| 300 | | | | | | | | DECREMENTS TIMERS AND CALLS |
| 301 | | | | | | | | SUBROUTINE REQUESTED WHEN |
| 302 | | | | | | | | TIMER TIMES OUT |
| 303 | | | | | | | | USES 3 TABLES ON 3 CONSECUTIVE |
| 304 | | | | | | | | RAM PAGES -100:CNT W/TIMER |
| 305 | | | | | | | | -100:LS W/ADDR(L) |
| 306 | | | | | | | | -100:LS W/ADDR(H) |
| 307 | | | | | | | | |
| 308 | | | | | | | | ADDR IS FOR REQSTED SUBR |
| 309 | 05 | 015F | 2130FA | N | | LXI | H,100:CNT | STARTING ADDR OF 100MS TIMERS |
| 310 | 05 | 0162 | 1614 | A | | MVI | D,100:TMAX | D-REG SET TO QTY OF 100MS TMRS |
| 312 | | | | | | | | CONDITIONAL HOLD OF 100MS TMRS |
| 314 | 05 | 0164 | 3A45FD | A | | IF: | FBIT,STDBPNB,T IS STAND-BY RELAY OPEN |
| | 05 | 0167 | E640 | A | | | | |
| | 05 | 0169 | CA6E01 | N | | | | |
| 315 | 05 | 016C | 1611 | A | | MVI | D,100:TMAX | YES, HOLD SPECIFIED NUMBER |
| 316 | | | | | | | | -HOLDTMRS OF TIMERS |
| 317 | | | | | | ENDIF | | |
| 318 | | | | | | | | |
| 319 | | | | | | REPEAT | | LOOP TO DECR & SERVICE TIMEOUTS |
| 320 | | | | | | IF: | VBYT,M,NZ IS TIMER ACTIVE |
| 321 | 05 | 016E | 7E | A | | | | |
| 322 | 05 | 016F | A7 | A | | DCR | M | DECR TIMER |
| 323 | 05 | 0170 | CA8201 | N | | IF: | CC,Z,S HAS TIMER TIMED OUT |
| 324 | 05 | 0173 | 35 | A | | | PUSH | D SAVE # TIMRS TO SERVICE |
| 325 | 05 | 0174 | C28201 | N | | | PUSH | H SAVE ADDR OF CURRENT TIMER |
| 326 | 05 | 0177 | D5 | A | | | INR | H STEP TO NEXT RAM PAGE |
| 327 | 05 | 0178 | E5 | A | | | MOV | E,M MOVE CALL ADDR(L) TO E |
| 328 | 05 | 0179 | 24 | A | | | INR | H STEP TO NEXT RAM PAGE |
| 329 | 05 | 017A | 5E | A | | | MOV | D,M MOVE CALL ADDR(H) TO D |
| 330 | 05 | 017B | 24 | A | | | CALL | DE:IND |
| 331 | 05 | 017C | 56 | A | | | POP | H RECALL ADDR OF CURRENT TMR |
| 332 | 05 | 017D | CD0000 | N | | | POP | D RECALL NUMBER OF TIMERS |
| 333 | 05 | 0180 | E1 | A | | | | YET TO BE SERVICED |
| 334 | 05 | 0181 | D1 | A | | ENDIF | | |
| 335 | 05 | 0182 | 23 | A | | INX | H | STEP TO NEXT TIMER ADDR |
| 336 | 05 | 0183 | 15 | A | | DCR | D | DECR NUMBER OF 100MS TIMERS |
| 337 | 05 | 0184 | C26E01 | N | | UNTIL: | CC,Z,S | HAVE ALL TIMERS BEEN SERVICED |
| 338 | | | | | | | | END 100MS TIMER SECTION |
| 339 | 05 | 0187 | 2151FD | A | | LXI | H,ADR(DATA,SB:RQST) SET MEM PNTR TO SB BYTE |
| 340 | 05 | 018A | F3 | A | | CI | | |
| 341 | 05 | 018B | 7E | A | | MOBBYT | M,AND, 100:RQST REMOVE 100MS REQUEST |
| | 05 | 018C | E6DF | | | | | |
| | 05 | 018E | 77 | | | | | |
| 342 | 05 | 018F | FB | A | | ID:ALTR | SB:RQST | |
| 343 | | | | | | FI | | |
| 344 | 05 | 0190 | C39E01 | N | | ELSE: | | |
| 345 | 05 | 0193 | 56 | A | | MOV | D,M | NO, MOVE CALL ADDR(H) TO D |
| 346 | 05 | 0194 | 23 | A | | INX | H | STEP PNTR TO NEXT CALL |
| 347 | 05 | 0195 | 225DFD | N | | SHLD | 100PNTR | SAVE FOR NEXT LOOP-2 |
| 348 | 05 | 0198 | CD0000 | N | | CALL | DE:IND | |
| 349 | 05 | 019B | 2151FD | A | | LXI | H,ADR(DATA,SB:RQST) SET MEM PNTR TO SB BYTE |
| 350 | | | | | | ENDIF | | |
| 351 | | | | | | UNTIL: | VBYT,M,Z | |
| 352 | 05 | 019E | 7E | A | | | | MORE SB CALLS TO DO (LOOP-2) |

```
                              ID:READ   SB:POST
05 0019F  A7                    HLT                         COOL IT UNTIL INTERRUPT RESTART
05 001A0  C2C300                                            WAS INTERRUPT RTC (LOOP-3)
                              UNTIL:                        ONLY KIDDING BEFORE, BUT THIS
05 001A3  76            A      DI        CC,Z,C             TIME REALLY STOP (ABORT)
05 001A4  CAC300        N      HLT
05 001A7  F3            A
05 001A8  76            A

;
                           ;  SUBR TO SET CALL TABLE POINTERS
                           ;  CALLED BY EACH STATE PROLOG
                           ;  POSITION SBiTABLE POINTER
05 001A9  3A53FD        N   SBIPNTRS  LDA     STATE1         WHAT STATE IS WANTED
05 001AC  110600        N             LXI     D,X'06'        LOAD D&E WITH SKIP NUMBER
05 001AF  210501        N             LXI     H,SBITABLE-X'06'  H&L-6'<'TABLE ADDR
                                    REPEAT                   SKIP THREE WORDS
05 001B2  19            A             DAD     D
05 001B3  3D            A             DCR     A              DECR STATE LOOP COUNTER
05 001B4  F28201        N           UNTIL:    CC,S,S         IS POINTER AT CORRECT STATE

;
                           ;  TRANSFER ADDRS TO VARIABLE SB POINTERS
                           ;
05 001B7  1155FD        N             LXI     D,10ICALLS     SET D&E TO FIRST OF SB PNTRS
05 001BA  0602          A             MVI     B,2            LOAD 101CALLS
05 001BC  CDCE01        N             CALL    MVIWORDS
05 001BF  2B            A             DCX     H              ADJUST 'FROM' PNTR  & 20;PNTR
05 001C0  2B            A             DCX     H                                  BACK 1 WORD
05 001C1  0602          A             MVI     B,2            LOAD 20PNTR
05 001C3  CDCE01        N             CALL    MVIWORDS
05 001C6  2B            A             DCX     H              ADJUST 'FROM' PNTR  & 100;PNTR
05 001C7  2B            A             DCX     H                                  BACK 1 WORD
05 001C8  CDCC01        N             CALL    MVIWORD        LOAD 100PNTR
                                      ID:ALTR 101CALLS,20;PNTR,20PNTR,;  DATA WORDS MODIFIED
                                              100;PNTR,100PNTR              BY THIS SUBR
05 001CB  C9            A             RET

;
                           ;  MVIWORD/MVIWORDS SUBROUTINES
                           ;
                           ;  SUBR TO TRANSFER WORDS (2BYTES) FROM MEMORY POINTED TO BY <H&L>
                           ;  TO MEMORY POINTED TO BY <D&E>. CALL MVIWORD FOR 1 TRANSFER,
                           ;  AND CALL MVIWORDS (WITH B-REG # WORDS TO TRANSFER) FOR
                           ;  MULTIPLE TRANSFERS. USES ALL BUT C-REG.
05 001CC  0601          A   MVIWORD   MVI     B,1            B= # WORDS TO BE MOVED
                              MVIWORDS  REPEAT
05 001CE  7E            A             MOV     A,M            A= 1ST 'FROM' BYTE
05 001CF  12            A             STAX    D              STORE IN 1ST 'TO' LOCATION
05 001D0  23            A             INX     H              ADVANCE 'FROM'
05 001D1  13            A             INX     D                  AND 'TO' PNTRS
05 001D2  7E            A             MOV     A,M            A= 2ND 'FROM' BYTE
05 001D3  12            A             STAX    D              STORE IN 2ND 'TO' LOCATION
05 001D4  23            A             INX     H              ADVANCE 'FROM'
05 001D5  13            A             INX     D                  AND 'TO' PNTRS
05 001D6  05            A             DCR     B              DECRM # OF WORDS CNTR
05 001D7  C2CE01        N           UNTIL:    CC,Z,S         LOOP UNTIL ALL WORDS TRANSFERRD
05 001DA  C9            A             RET

;
                           ;  TABLE OF SB CALL POINTERS
                           ;  FOR EACH STATE
                           ;
```

```
                                                        SB:TABLE  DW      COMP10
                05 001DB    0906            N                    DW      COMP20
                05 001DD    0A06            N                    DW      COMP100
                05 001DF    1206            N                    DW      TREP10
                05 001E1    A105            N                    DW      TREP20
                05 001E3    B505            N                    DW      TREP100
                05 001E5    C305            N                    DW      NRDY10
                05 001E7    4202            N                    DW      NRDY20
                05 001E9    4602            N                    DW      NRDY100
                05 001EB    5202            N                    DW      RDY10
                05 001ED    AF02            N                    DW      RDY20
                05 001EF    B302            N                    DW      RDY100
                05 001F1    BF02            N                    DW      PRNT10
                05 001F3    AB03            N                    DW      PRNT20
                05 001F5    B203            N                    DW      PRNT100
                05 001F7    C803            N                    DW      RUNN10
                05 001F9    1905            N                    DW      RUNN20
                05 001FB    1D05            N                    DW      RUNN100
                05 001FD    2F05            N

; SUBR TO DO EPILOGS & PROLOGS LAST CALL IN EVERY 100MS TABLE
                                                        ;
                05 001FF    2153FD          A           STATICHG LXI     H,ADR(DATA,STATE1)     A= PRESENT STATE # IF UNCHANGED
                05 00202    7E              A                    MOV     A,M                    OR NEXT STATE IF CHANGED
                05 00203    23              A                    INX     H                      H&L= ADDR (FORMER STATE) GLOBAL
                05 00204    BE              N                    IF:     XBYT,A,NE,M            HAS THERE BEEN A STATE CHANGE
                05 00205    CA3602          A 05 00208    46              A                    ID:READ STATE:;STATE:          YES, B= FORMER STATE
                05 00209    77              A                    MOV     B,M                    UPDATE 'FORMER' TO 'PRESENT'
                                                                 MOV     M,A
                05 0020A    78              A                    ID:ALTR ;STATE:                DO EPILOG FOR FORMER STATE
                05 0020B    111F02          N                    CASE:   VBYT,B
                05 0020E    FE06            A
                05 00210    CD0000          N                    C,0     COMP:EPL               COMPONENT CONTROL STATE
                05 00213    1806            N                    C,1     TREP:EPL               TECH RFP STATE
                05 00215    0B05            N                    C,2     NRDY:EPL               NOT-READY STATE
                05 00217    7A02            N                    C,3     RDY:EPL                READY STATE
                05 00219    E302            N                    C,4     PRNT:EPL               PRINT STATE
                05 0021B    E603            N                    C,5     RUNN:EPL               SYSTEM RUNNING, NOT PRINT STATE
                05 0021D    4105            N
                                                                 ENDCASE
                05 0021F    3A53FD          N                    CASE:   VBYT,STATE:            DO PROLOG FOR PRESENT STATE
                05 00222    113602          N
                05 00225    FE06            A
                05 00227    CD0000          N                    C,0     COMP:PRL               COMPONENT CONTROL STATE
                05 0022A    FF05            N                    C,1     TREP:PRL               TECH RFP STATE
                05 0022C    A505            N                    C,2     NRDY:PRL               NOT-READY STATE
                05 0022E    3702            N                    C,3     RDY:PRL                READY STATE
                05 00230    A602            N                    C,4     PRNT:PRL               PRINT STATE
                05 00232    1603            N                    C,5     RUNN:PRL               SYSTEM RUNNING, NOT PRINT STATE
                05 00234    0B05            N
                                                                 ENDCASE
                                                                 FNDIF
                05 00236    C9              A                    RET                            RETURN TO 100 MSEC SYNC BKGND
                                                        ;
                                                        ;                N O T   R E A D Y   S T A T E
                                                        ;
                                                        *NAR   NOT READY STATE- EXECUTES AFTER INITIALIZE UNTIL ALL READY CONDITIONS
                                                        *      ARE MET. THIS STATE CAN ALSO BE ENTERED FROM 'RUN NOT PRINT','RFADY'
                                                        *      AND 'TECH REP'. CONTROL EXITS TO EITHER 'READY' OR 'TECH REP' STATES.
```

```
471                           *
472                           * NRDY:PRL  CALL    SBIPNTRS            SYNC BKG PNTRS TO NEW STATE
473  05 0237 CDA901      N             CALL    INSTBTPR,1000,NEXTBFLT UPDATES INST FLT CODE IN STBY
474  05 023A CD0000      N
     05 023D 49          A
     05 023E 64          N
475  05 0241 C9          A    RET
477                           * CALLS FOR NOT READY 10 MS SYN BACKGROUND
479  05 0242 CD0000      N    NRDY10    CALL    ADH0CTRL
480  05 0245 C9          A    RET
482                           * CALLS FOR NOT READY 20 MS SYN BACKGROUND
484  05 0246 0000        N    NRDY20    DW      NRDY0SKS
485  05 0248 0000        N              DW      HN0ELVAS
486  05 024A 0000        N              DW      OSPL0CTL
487  05 024C 0000        N              DW      LMP0CTRL
488  05 024E 0000        N              DW      INSTRU
489  05 0250 FFFF        A              DW      X'FFFF'              END OF TABLE
491                           * CALLS FOR NOT READY 100 MS SYN BACKGROUND
493  05 0252 0000        N    NRDY100   DW      NRILKRCK
494  05 0254 0000        N              DW      RED0BGND
495  05 0256 0000        N              DW      DVL0DUMP
496  05 0258 0000        N              DW      RECAPER
497  05 025A 0000        N              DW      BIN0CHK
498  05 025C 0000        N              DW      MINIPHS1
499  05 025E 0000        N              DW      RIL0JMP0
500  05 0260 0000        N              DW      FUS0ROUT
501  05 0262 0000        N              DW      FLT0100              1
502  05 0264 0000        N              DW      FLT0CTRL             2
503  05 0266 0000        N              DW      FLT0CLRN
504  05 0268 0000        N              DW      PR0G25JM             1
505  05 026A 0000        N              DW      2SC0STFY             2
506  05 026C 0000        N              DW      XMP0STRY             3
507  05 026E 0000        N              DW      JAMRST
508  05 0270 0000        N              DW      KFY0CNTR
509  05 0272 0000        N              DW      TSTRLPL
510  05 0274 84C2        N              DW      NRDY:CLG             TEST IF OK TO
511  05 0276 FF01        N              DW      STAT:CHG             LEAVE NOT READY
512  05 0278 FFFF        A              DW      X'FFFF'              END OF TABLE
514                           * EPILOG
516  05 027A CDC000      N    NRDY:EPL  CALL    WAIT0                INSURE WAIT OFF AT NRDY EXIT
517  05 027D F9FF        N              CFLG    STRT:PRT             DIS-ABLE TRANSFER TO 'PRINT'
     05 027F AF          A
     05 0280 325BF4      N
518  05 0283 C9          A    RET
520                           *
521                           * SUBR FOR INST-READY, 100MS SYNC BKGND
522                           *    TESTS FOR CHANGE TO 'READY' OR 'TREP REP'
523                           *
524  05 0284 CDCF05      N    NRDY:CHG  CALL    TREP:CHG             TEST FOR STATE CHANGE TO 'TREP
525  05 0287 7E          A              IF1     XBYT,M,NE,TREP       DID IT CHANGE TO 'TREP STATE
     05 0288 FE01        A
```

```
526                             ID:READ STATE:
527    05 0028D   CD9402          CALL    RDYTEST:          TEST ALL 'READY' FLAGS
528    05 00290   CD0R03          CALL    NRDYIRDY          MOVE TO EITHER INRDY OR IRDY
529                             ENDIF
530    05 00293   C9       A      RET

532                             ;
533                             ;   SUBR TO TEST ALL 'READY' FLAGS IN A LOOP
534                             ;
535    05 00294   2184F7   A    RDYTEST: LXI    H,RDYFLGS:    H&L= START ADDR OF READY FLAGS
536    05 00297   0609     A      MVI    B,RDYFNUM:          B= # OF READY FLAGS TO CHK
537                             REPEAT
538    05 00299   7E       A      MOV    A,M                A= <PRESENT READY FLAG>
539    05 0029A   07       A      RLC                        SET C IF FLAG SET (READY)
540    05 0029B   DAA002   N      IF:    MVI    CC,C,C       IS PRESENT FLAG INDICATING RDY
541    05 0029E   0601     A             MVI    B,1         NO, DON'T TEST ANY FURTHER
542                             ENDIF
543    05 002A0   23       A      INX    H                  MOVE TO NEXT FLAG LOCATION
544    05 002A1   05       A      DCR    B                  DECRM LOOP CNTR (# READY FLAGS)
545    05 002A2   C29902   N    UNTIL: CC,Z,S                LOOP UNTIL ALL FLAGS CHECKED
546                             ID:READ    LENSRDY,ELVSRDY,FUSSRDY,:     FLAGS READ
547                                        PROGRDY,ILCKSRDY,XMMSRDY,XMTRDY
548                                        FLTBRDY,ADHSNMSV,SRTSRDY
549    05 002A5   C9       A      RET                        RETURN

551                             ;
552                             ;    R E A D Y   S T A T E
553                             ;
554                             ;    READY STATE- EXECUTES WHEN MACHINE IS READY TO GO INTO PRINT STATE.
555                             ;    CONTROL CAN GO BACK TO 'NOT READY' OR GO TO 'TECH REP' IF REQUIRED.
556                             ;
558                             •NAR    PROLOG
560    05 002A6   CD0000   N    RDY:PRL   SOBIT,S   READY8
561    05 002A9   E701     A              CALL    SB;PNTRS          SYNC BKG PNTRS TO NEW STATE
562    05 002AB   CDA901   N              RET
       05 002AE   C9       A
564                             ;   CALLS FOR READY 10MS SYN BACKGROUND
566    05 002AF   CD0000   N    RDY10   CALL   ADH8CTRL
567    05 002B2   C9       A            RET
569                             ;   CALLS FOR READY 20MS SYN BACKGROUND
571    05 002B3   0000     N    RDY20    DW    RDY8SWS
572    05 002B5   0000     N             DW    MN8ELVRS
573    05 002B7   0000     N             DW    DSPL8CTL
574    05 002B9   0000     N             DW    LMP8CTRL
575    05 002BB   0000     N             DW    INSTRU
576    05 002BD   FFFF     A             DW    X'FFFF:
578                             ;   CALLS FOR READY 100MS SYN BACKGROUND
580    05 002BF   0000     N    RDY100   DW    R:N8CHK
581    05 002C1   0000     N             DW    MINIPHS:
582    05 002C3   0000     N             DW    R:L8JMP8
583    05 002C5   0000     N             DW    DVL8DUMP
584    05 002C7   0000     N             DW    RECAPER
585    05 002C9   0000     N             DW    FUS8RDUT                    1
586    05 002CB   0000     N             DW    FLT8100                     2

END OF TABLE
                                                                            1
```

```
                                                                                    2
587  05 002CD  0000      N         DW      FLTRCTRL
588  05 002CF  0000      N         DW      NRILKACK
589  05 002D1  0000      N         DW      REDBUGAD
590  05 002D3  0000      N         DW      25RSTRY
591  05 002D5  0000      N         DW      XMMBSTPY
592  05 002D7  0000      N         DW      JAMBRST
593  05 002D9  0000      N         DW      KEYRCNTR
594  05 002CA  0000      N         DW      TSTRLP4
595  05 002DD  E9C2      N         DW      RDY;CHG                    TEST IF OK TO
596  05 002DF  FFC1      N         DW      STAT;CHG                   LEAVE READY
597  05 002E1  FFFF      A         DW      X'FFFF'                    END OF TABLE

599                                *       FPILOG
601  05 002E3  CDC000    N  RDY;EPL  CALL  COBIT;S  READY;
602  05 002E6  E7FE      A         RET
     05 002F8  C9        A

604                                *       CHANGE OF STATE ROUTINES

606                                *
607                                *  SUBR FOR 'READY' 100MS SYNC BKGND
608                                *  TESTS FOR CHANGE TO 'NOT-READY' OR 'TECH REP'
609                                *
610  05 002E9  CDDF05    N  RDY;CHG  CALL  TREP;CHG                   TEST FOR STATE CHANGE TO 'TREP
611  05 002EC  7E        A         IF;     XBYT,M,AE,;TREP            DID IT CHANGE TO 'TREP STATE
     05 002ED  FE01      A
     05 002EF  CA0A03    N
612  05 002F2  CD9402    N         IO;READ   STATE;                   TEST ALL 'READY' FLAGS
613  05 002F5  CDCA03    N         CALL    RDYTEST;                   MOVE TO EITHER 'NRDY OR 'RDY
614  05 002F8  3A5BF4    N         CALL    NRDY;RDY                   IS START PRINT REQUESTED
615  05 002FA  07        A         IF;     FLG;STRT;PRT,T
616  05 002FC  D20A03    N                 LXI   H,ADR(DATA,STATE);RDY   SET MEM PNTR
617  05 002FF  7E        A                 IF;   XBYT,M,EQ,;RDY           OK TO GO TO PRINT
     05 00302  FE03      A
     05 00303  C20A03    N
618  05 00305            N                 IO;READ  STATE;
619  05 00308  3604      A                 MVI      M,;PRNT             CHG TO PRT STATE
620                                         IO;ALTR  STATE;
621                                         ENDIF
622                                         ENDIF
623  05 0030A  C9        A         RET
624
626                                *
627                                *  SUBR TO USE INFO FROM 'RDYTEST;' AND EXECUTE THE PROPER CHANGE OF STATE
628                                *
629  05 0030B  2153FD    A  NRDY;RDY LXI    H,ADR(DATA,STATE);          SET MEM PNTR
630  05 0030E  3603      A         MVI      M,;RDY                      ASSUME GOING TO 'READY' STATE
631                                         IO;ALTR  STATE;
632  05 00310  DA1503    N         IF;      CC,C,C                      ARE ALL 'READY' FLAGS SET
633  05 00313  3602      A         MVI      M,;NRDY                     NO, MOVE TO 'NOT-READY' STATE
634                                         IO;ALTR  STATE;
635                                         ENDIF
636  05 00315  C9        A         RET
```

```
                               *NAR
                               *
                               *     P R I N T   S T A T E
                               *
                               *     PRINT STATE- EXECUTES WHILE MACHINE IS PRODUCING COPIES,
                               *     ENTERED FROM 'READY' AND EXITS TO 'RUN NOT PRINT'.
                               *
638                                  PROLOG
639
640
641
642
643
645
647  05 00316  2160FE   N  PRNT:PRL  CLR;MEM  16,SHIFTREG              CLEAR SHIFT REGISTER
     05 00319  0610     A
     05 0031B  CD0000   N
     05 0031E  3E60     A           MVI      A,LADR(DATA,SHIFTREG)     FORCE SHIFT REG TO START AT
648  05 00320  3263FD   A           STA      ADR(DATA,SR@PTR)          BEGINNING OF SHIFTREG TABLE
649                                 CLR;MEM  SD1@DLY-TIME@DN!+1,,      CLEAR THE FOLLOWING FLAGS
650  05 00323  21A7F4   N                    ADR(FLG,TIME@DN!)
     05 00326  0609     A
651  05 00328  CD0000   N
652                          ID1CLR          TIME@DN!,TIMED@DN!,,
653                                          CYCL@DN!,NORM@DN!,QWIK!OUT,,
654                                          IMGMADF!,SD1@TIMA,SD1@DLY
655  05 0032B  3E80     A    SFLG            910@DDNE                  ALLOW FIRST PITCH RESET
     05 0032D  326FF4   N
656  05 00330  AF       A           XRA      A                         INIT CYCLE-UP CNTR TO 0
657  05 00331  3266FD   N           STA      CYCUPCT!                  INIT 'NEW SR VALUE' TO 0
658  05 00334  3269FD   N           STA      SR@VALU!                  INIT PLL SHUTDOWN CONTROL TO 0
659  05 00337  3250FA   N           STA      PLL@INFO                  INIT SAMPLE COPY CNTR TO 0
660  05 0033A  3268FD   N           STA      SMPL@CT!
661  05 0033D  3E03     A           MVI      A,3                       INIT 'NO IMAGE CNTR' TO 3
662  05 0033F  3267FD   N           STA      NOIMGCT!                  SHIFT REG SCHEDULER (INIT SR#0)   (1)
663  05 00342  CD0000   N           CALL     SRSK                      CALC SHIFTED IMAGE VALUES         (1)
664  05 00345  CD0000   N           CALL     TIM@MAD                   SET 'OVER-RUN EVENT' TIMER        (2)
665  05 00348  CD0000   N           STIMR    935;TMR,810,RETURN;
     05 0034B  22       A
     05 0034C  51       A
     05 0034D  0000     A
666  05 0034F  CD0000   N           CALL     TBLD@PPT                  BUILD NEW PITCH TABLE
667  05 00352  CD0000   N           S@BIT,S  PRNT@RLY,PR@COOL          PRINT RELAY & COOLING FAN ON      (3)
     05 00355  02       A
     05 00356  EA08     A
     05 00358  F608     A
668  05 0035A  AF       A    CTIMR           PR@COOL                   CLEAR COOLING FAN TIMER
669  05 0035B  3232FA   N    C@BIT,S         NPFOS@N                   TURN OFF PFO (INVERTED DRIVER)
     05 0035E  CD0000   N
670  05 00361  E47F     A           IF!      FLG,ADM@SELC,T
     05 00363  3A@0F4   N
     05 00366  07       A
     05 00367  D27003   N
671  05 0036A  CD0000   N           CALL     ADM@MOTN
672  05 0036D  C37503   N           ELSE;
673  05 00370  3E80     A           SFLG     ADM@MTEN
     05 00372  32CCF4   N
674                                 ENDIF
675  05 00375  CD0000   N           CALL     TRM@R@D                   CHK PAPER WIDTH FOR FUSER         (1)
676  05 00378  CD0000   N           CALL     PAP@SIZE                  CHK WHICH EDGE FADE OUT           (2)
677  05 0037B  CD0000   N           CALL     EDGE@FA
678  05 0037E  CD0000   N           CALL     PAP@PPL3
679  05 00381  CD0000   N           CALL     PROG@UP                   PROG INITIALIZATION SUBR
680  05 00384  CD0000   N           CALL     PRG@UF1                   CHECK FEEDER SELECTION
681  05 00387  CD0000   N           CALL     FDR@PQT                   READ BILLING BREAK_POINTS
682  05 0038A  CD0000   N           CALL     RLG@BKPT
```

```
683   05 00380   CD0000          N    CALL    DONELV                         CAUSE FLV TO EXECUTE
684   05 00390   3A5F4           A            FLG,SRTSEL,T                   IS SORTER BEING USED
685   05 00393   07              A    IF!
686   05 00394   D29F03          Z            CALL    SRT!INIT              INITIALIZE SORTER JAM DETECT
687   05 00397   CD0000          N            MVI     A,-MSK(NV@FJAM;)       SETS ALL 4 JAM CONDITIONS
                                                      NV@IMED,NV@LOW@J,NV@UP@J)
688   05 0039A   3E0F            A    ELSE!
689   05 0039C   C3A403          N            RNVNIB  NV@JAM@N               READ SAVED PREVIOUS SRT JAMS
690   05 0039F   3AC9E2          N            MODBYT  A,OR,MSK(NV@IT,)       & SET !MED ON K FOR JAM
                                                      NV@FJAM,NV@IMED)
691   08 003A2   F603            A    ENDIF
692                                   WNVNIB  NV@JAM@N                        STORE IN CASE OF PWR ON
693   05 003A4   32C9E2          A    IDIALTR NV@FJAM,NV@IMED,NV@LOW@J,     SEE ABOVE IF!/FLSE!
694                                                   NV@UP@J
695
696   05 003A7   CDA901          N            CALL    SB:PNTPS               SYNC BKG PNTRS TO NEW STATE
697   05 003AA   C9              A            RET
698
699                                   *       CALLS FOR PRINT 10 MS SYN BACKGROUND
700
701   05 003AB   CD0000          N    PRNT10  CALL    ADH@CTPL
702   05 003AE   CDC004          N            CALL    PRT!!MD
703   05 003B1   C9              A            RET
704
705                                   *       CALLS FOR PRINT 20 MS SYN BACKGROUND
706
707   05 003B2   0000            N    PRNT20  DW      PRT@SWS
708   05 003B4   0000            N            DW      TON@DIS
705   05 003B6   0000            N            DW      PAP@TGL3
710   05 003B8   0000            N            DW      LMP@CTPL
711   05 003BA   0000            N            DW      FDR@BKFD
712   05 003BC   0000            N            DW      SARTER@
713   05 003BE   0000            N            DW      FLV@PRNT
714   05 003C0   0000            N            DW      SOS@JMNT
715   05 003C2   0000            N            DW      DSPL@CTL
716   05 003C4   0000            N            DW      INSTRU
717   05 003C6   FFFF            A            DW      X'FFFF!                END OF TABLE
718
719                                   *       CALLS FOR PRINT 100 MS SYN BACKGROUND
720
721   05 003C8   0000            N    PRNT100 DW      RILK@CK
722   05 003CA   0000            N            DW      2S@BRUN
723   05 003CC   0000            N            DW      LITE@OFF
724   05 003CE   0000            N            DW      XMM@PRNT
725   05 003D0   0000            N            DW      FUS@RNUT
726   05 003D2   0000            N            DW      READY@CK
727   05 003D4   0000            N            DW      JAM@RST
728   05 003D6   0000            N            DW      MINTPH@B
729   05 003D8   0000            N            DW      SPPL@CPY
730   05 003DA   4F06            N            DW      RXCYCLDN               STUB IN US !MG
731   05 003DC   0000            N            DW      KEY@CNTR
732   05 003DE   0000            N            DW      TST@LP4
733   05 003E0   2C04            N            DW      PRT!CHG
734   05 003F2   FF01            N            DW      STAT!CHG
735   05 003E4   FFFF            A            DW      X'FFFF!                TEST IF OK TO LEAVE PRINT
736                                   EPILOG                                  END OF TABLE
737
738
739   05 003E6   CD0000          N    PRNT!EPL CALL   AX@EPTY                (1)
740   05 003E9   CD0000          N            CALL   FDM@EPL3               (2)
741   05 003EC   CD0000          N            CALL   FDA@EPL3               (3)
742   05 003EF   CD0000          N            CALL   TRN@EPI3
```

```
743           CALL    DVL@NRDY
744   05 003F2  CD0000  CALL    DVL@NRDY
745                     C@RIT,S FUS$CAP,FUS$LOAD,ILL@SPL,,
                                FF@S11,EF@S12@S,SMPL@CPY,READY@

05 003F5  CD0000
      05 003F8  07
      05 003F9  E6F7
      05 003FB  FDFD
      05 003FB  F2F7
      05 003FD  ECF7
      05 003FF  EBF7
      05 0401   E2FE
      05 0403   E7FE
      05 0405   CD0000
746   05 0407  S@BIT,S  NPF@S@N                 TURN OFF PF0 (INVERTED DRIVER)
      05 0407   E480
747   05 040C  CFLG     ELV@AUT0                DISABLE AUTO-TRAY SWITCHING
      05 040C   AF
      05 040D   3222F4
748   05 0410  CALL     PAP@EPL3
      05 0410   CD0000
749   05 0413  CALL     ABORT
      05 0413   CD1704
750   05 0416  RET
      05 0416   C9

752   ..       SUBROUTINE
753
754   ..       ABORT 756   05 0417  DI
      05 0417   F3                              TURN OFF INTERRUPT SYSTEM
757   05 0418  CFLG     TBLD@FIN                SIGNAL NEW PITCH TABLE REQ'D
      05 0418   AF
758   05 041C  LXI      H,EV@STBY;              ADDR OF STBY EVENT TABLE
      05 041C   325DF4
759   05 041F  SHLD     EV@PTR:                 SAVE FOR MACH CLK ROUTINE
      05 041F   211907
760   05 0422  C@BIT,S  BTR$L@AD,PRNT$RLY       UN-LOAD BTR & DROP PRINT RELAY
      05 0422   2264FD
      05 0425   CD0000
      05 0425   02
761   05 0426  EI
      05 0426   E17F
762   05 0428  RET
      05 0428   EAF7
      05 042A   FB
      05 042B   C9

764   05 042C  PRT1CHG  IF:    XBYT,CYCUPCT;EQ,2   CHECK FOR PROLOG 2 OR CYCLE OUT
      05 042C   3A66FD
      05 042F   FEC2
      05 0431   C23C04
765   05 0434           SFLG   PRT@PR02            YES, SET 1PRINT PROLOG 2' FLAG
      05 0434   3E8C
      05 0436   3271F4
766   05 0439           @RIF:  XBYT,A,EQ,3         NO, IS CYCLE UP CNTR=3
      05 0439   C37004
      05 043C   FEC3
767   05 043E           AND1F: FLG,PRT$PR02,T     YES, AND IS PRPLOG 2 FLAG SET
      05 043E   C27004
      05 0441   3A71F4
      05 0444   07
      05 0445   D27004
768   05 0448  CFLG     PRT@PR02                  YES, OR PROLOG 2 AND CLR FLAG
      05 0448   AF
      05 0449   3271F4

769   ..       PRINT STATE BACKGROUND- PROLOG 2
770
771
772   05 044C  CALL     PAP@PRL2                  RETN XPORT OFF IF NOT SIDE 1
      05 044C   CD0000
773   05 044F  CALL     PR0G@UP2
      05 044F   CD0000
774   05 0452  IF:      FLG,IMGMADE1,T            HAS 1ST IMAGE BEEN MADE
      05 0452   3AADF4
      05 0455   07
      05 0456   D25C04
775   05 0459  CALL     PROG@UP                   YES, CALL PROG INITIALIZATION
      05 0459   CD0000
776   05 045C  ENDIF
777   05 045C  IF:      VBYT,MINIBYTE,NZ          IS MINI.PHYSICAL ACTIVE
      05 045C   3A57FA
      05 045F   A7
      05 0460   CA7004
778   05 0463  CFLG     DSPL@IST                  YES, ENABLE DISPLAY UPDATE
      05 0463   AF
```

| Line | Addr1 | Addr2 | Code | Flag | Label | Op | Operand | Comment |
|---|---|---|---|---|---|---|---|---|
| 779 | 05 | 0046A | 329AF4 | A | | INR | A | DISPLAY QUANTITY |
| 780 | 05 | 00467 | 3C | A | | STA | DSPLQST1 | COMPLETE |
| 781 | 05 | 00468 | 3250FA | N | | MVI | A,6 | SET DOCUMENT TOTAL TO |
| 782 | 05 | 0046B | 3EC6 | A | | STA | DOCQTQTL | 6 FOR ADH DOCUMENT CHECK |
| 783 | 05 | 0046D | 326FFA | N | | | | |
| 784 | | | | | | ENDIF | | |
| 786 | | | | | | ENDIF | | |
| 788 | | | | | | END PROLOG? | | |
| 789 | | | | | | | | |
| 790 | | | | | | BUILD FLAG BYTE | | |
| 791 | 05 | 00470 | 0608 | A | | MVI | B,8 | NUMBER OF FLAGS REQ'D |
| 792 | 05 | 00472 | AF | A | | XRA | A | CLEAR A-REG |
| 793 | 05 | 00473 | 57 | A | | MOV | D,A | CLEAR D-REG |
| 794 | 05 | 00474 | 21A9F4 | A | | LXI | H,ADR(FLG,IMED@DNI) | STARTING ADDR OF PRTICHG FLAGS |
| 795 | | | | | | REPEAT | | |
| 796 | 05 | 00477 | 7E | A | | MOV | A,r | LOAD A W/CONTENTS OF FLAG ADDR |
| 797 | 05 | 00478 | 07 | A | | RLC | | ROTATE FLAG(D7) INTO CARRY |
| 798 | 05 | 00479 | 7A | A | | MOV | A,D | LOAD A W/FLAGS BILT INTA BYTE |
| 799 | 05 | 0047A | 17 | A | | RAL | | PUT FLAG IN D0 & SHIFT LEFT |
| 800 | 05 | 0047B | 57 | A | | MOV | D,A | SAVE RESULT IN D-REG |
| 801 | 05 | 0047C | 23 | A | | INX | H | STEP TO NEXT FLAG |
| 802 | 05 | 0047D | 05 | A | | DCR | B | DECR NUMBER OF FLAGS REQID |
| 803 | 05 | 0047E | C27704 | N | UNTIL: | CC,Z,S | | LOOP UNTIL ALL FLAGS IN BYTE |
| 804 | | | | | ID:READ | IMED@DNI,CYCL@DNI,NORM@DNI,; | | FLAGS READ |
| 805 | | | | | | QWIKINUT,IMGMADE,SD10TIMO,; | | |
| 806 | | | | | | SD10DLY,ADH@SELC | | |
| 807 | | | | | | | | |
| 808 | | | | | | | | |
| 809 | | | | | | TEST FOR STATE CHANGE TO !RUNN | | |
| 810 | 05 | 00481 | 3A67FD | N | | LDA | NOIMGCT! | MOV CURRENT NO IMAGE COUNTER |
| 811 | 05 | 00484 | 5F | A | | MOV | E,A | TO THE E-REG |
| 812 | 05 | 00485 | 060E | A | | MVI | B,14 | LOOP CNTR FOR STATE CHG TESTS |
| 813 | 05 | 00487 | 21E104 | N | | LXI | H,CYCIBUT | TABLE ADDR OF PRTICHG TESTS |
| 814 | | | | | | REPEAT | | |
| 815 | 05 | 0048A | 7A | A | | MOV | A,D | MOV FLAG BYTE TO THE A-REG |
| 816 | 05 | 0048B | A6 | A | | MODBYT | A,AND,M | MASK FOR DESIRED FLAGS |
| 817 | 05 | 0048C | 23 | A | | INX | H | STEP TO STATUS TEST |
| 818 | 05 | 0048D | AE | A | | MODBYT | A,XAR,M | TEST FLAG STATUS |
| 819 | 05 | 0048E | C29F04 | A | | IF: | CC,Z,S | DID TEST PASS |
| 820 | 05 | 00491 | 23 | A | | INX | H | YES, STEP TO NOIMGCT! TEST |
| 821 | 05 | 00492 | 7B | A | | INX | H | IS NOIMGCT: AT CORRECT VALUE |
| 822 | 05 | 00493 | BE | | | IF: | XBYT,E,GE,M | |
| 823 | 05 | 00494 | DA9E04 | N | | MVI | A,!RUNN | YES, CHANGE STATE |
| 824 | 05 | 00497 | 3E05 | A | | STA | STATE! | TO RUN NOT PRINT |
| 825 | 05 | 00499 | 3253FD | N | | MVI | B,1 | FORCE END OF TESTS (EARLY OUT) |
| 826 | 05 | 0049C | 0601 | A | | ENDIF | | |
| 827 | | | | | | ENDIF | | |
| 828 | 05 | 0049E | 2B | A | | DCX | H | ADJ PNTR BACK TO NO IMG TEST |
| 829 | | | | | | ENDIF | | |
| 830 | 05 | 0049F | 23 | A | | INX | H | STEP OVER NO IMG TEST |
| 831 | 05 | 004A0 | 23 | A | | INX | H | STEP TO MASK FOR NEXT TEST |
| 832 | 05 | 004A1 | 05 | A | | DCR | B | DECR LOOP COUNTER |
| 833 | 05 | 004A2 | C28A04 | N | UNTIL: | CC,Z,S | | ALL TESTS COMPLETE OR STATE CHG |
| 834 | 05 | 004A5 | 7A | A | | MOV | A,D | MOV FLAG BYTE TO A-REG |
| 835 | 05 | 004A6 | E662 | A | | MODBYT | A,AND,D61D5101 | MASK AND TEST FOR FLAGS TRUE |
| 836 | 05 | 004A8 | CAPF04 | N | ID:READ | NORM@DNI,CYCL@DNI,SD10DLY | FROM ABOVE BYTF BUILD |
| | | | | | IF: | CC,Z,C | | ARE ANY FLAGS TRUE |

```
837  05 004AB  2166FD      A              LXI     H,ADR(DATA,CYCUPCT)    PREPARE TO TEST OR MODIFY
838  05 004AE  7E          A              IF:                            HAS PROG PUSHED IT TO 0
     05 004AF  FE03        A
     05 004B1  DAB604      N

839                                               ID:READ   CYCUPCT:
840                                               MVI       M,2
841                                               ID:ALTR   CYCUPCT:
842                                       ENDIF
843  05 004B4  3602        A              COBIT,S   ILLM+SPL             NO, FORCE CYCLE-UP MODE AGAIN 844  05 004B6  CD0000      N
     05 004B9  F2F7        A              CFLG      SMPL&FLG             ILLM SPL OFF DURING DEAD CYCLE
     05 004BB  AF          A
     05 004BC  324CF4      A                                             CANCEL SAMPLE COPY SEQUENCE

845                                       ENDIF
846  05 004BF  C9          A              RET 848  05 004C0  3A49F4      A     PRT:IMD  IF:      FLGS,IMEDDWN,AND,,    IS IMEDIATE DOWN REQUESTED
849  05 004C3  2150F4      A              TBLD2FIN,T                     AND HAS PROB BEEN DETECTED
     05 004C6  A6          A
     05 004C7  F2D004      N
     05 004CA  CD1704      N
     05 004CD  C3E004      N
     05 004D0  3A47F4      A
     05 004D3  07          A
     05 004D4  D2E004      N 850  05 004D7  21E1FF      A              CALL      AB27                 IF TIMED DWN REQ'D DROP OUT
851  05 004DA  3E7F        A                        FLG,TIMEDWN,T
     05 004DC  F3          A
     05 004DD  A6          A
     05 004CE  77          A
     05 004DF  FB          A 852  05 004E0  C9          A              COBIT     BTP+LOAD             BIAS TRANS ROLL (ASAP)

ENDIF
                                          RET

TABLE OF FLAG STATUS TESTS
                                                                         AND NO IMAGE COUNTER VALUES
                                                                         USED TO DETERMINE IF STATE
                                                                         SHOULD CHANGE FROM PRINT TO
                                                                         RUN NOT PRINT 853  05 004E1  48          A     CYC:OUT  DB        D6ID3
854  05 004E2  40          A              DB        D6
856  05 004E3  00          A              DB        0
857  05 004E4  5C          A              DB        D6ID4ID3ID2

858  05 004E5  4C          A              DB        D6ID3ID2
859  05 004E6  10          A              DB        16
860  05 004E7  5C          A              DB        D6ID4ID3ID2
861  05 004E8  48          A              DB        D6ID3
862  05 004E9  08          A              DB        11

865  05 004EA  68          A              DB        D6ID5ID3
866  05 004EB  20          A              DB        05
867  05 004EC  00          A              DB        0

868  05 004ED  75          A              DB        D6ID5ID4ID2ID0
869  05 004EE  04          A              DB        D2
```

```
                                 D7 6 5 4 3 2 1 0  (X=DON'T CARE)
                                 I C N O I S S A D  N C
                                 M Y Z G V M D D D  O E
                                 E U R K H I O N N  I U
                                 D L H K E B I T E  N T
                                 D I A R B R T I E  D R
                                 O M R I N M M E Q  I A
                                 W M O A L K O R U  T L
                                 N   L T D   U   E   I
                                 R       E   T       R
                                                     E
                                                     D

X 1 X X 0 X X X    00    1
                                 X 1 X 0 1 1 X X    16    2

X 1 X 0 1 0 X X    11    3

X 0 1 X 0 X X X    00    4

X 0 0 0 X 1 X 0    36    5
```

| | | | | | | |
|---|---|---|---|---|---|---|
| 882 | 05 004EF | 24 | A | DB | 36 | X 0 0 0 X 1 X 1 20 | 6 |
| 883 | 05 004F0 | 75 | A | DB | 06;05;04;03;02;00 | |
| 884 | 05 004F1 | 05 | A | DB | 02;00 | |
| 885 | 05 004F2 | 14 | A | DB | 20 | |
| 886 | 05 004F3 | 70 | A | DB | 06;05;04;03;02;00 | X 0 1 0 1 1 X 0 36 | 7 |
| 887 | 05 004F4 | 2C | A | DB | 05;03;02 | |
| 888 | 05 004F5 | 24 | A | DB | 36 | |
| 889 | 05 004F6 | 7D | A | DB | 06;05;04;03;02;00 | X 0 1 0 1 1 X 1 20 | 8 |
| 890 | 05 004F7 | 20 | A | DB | 05;03;02;00 | |
| 891 | 05 004F8 | 14 | A | DB | 20 | |
| 892 | 05 004F9 | 75 | A | DB | 06;05;04;03;02;00 | X 0 0 0 X 0 X 0 21 | 9 |
| 893 | 05 004FA | 00 | A | DB | 0 | |
| 894 | 05 004FB | 15 | A | DB | 21 | |
| 895 | 05 004FC | 7D | A | DB | 06;05;04;03;02;00 | X 0 1 0 1 0 X 0 21 | 10 |
| 896 | 05 004FD | 28 | A | DB | 05;03 | |
| 897 | 05 004FE | 15 | A | DB | 21 | |
| 898 | 05 004FF | 75 | A | DB | 06;05;04;03;02;00 | X 0 0 0 X 0 X 1 13 | 11 |
| 899 | 05 00500 | 01 | A | DB | 00 | |
| 900 | 05 00501 | 00 | A | DB | 13 | |
| 901 | 05 00502 | 7D | A | DB | 06;05;04;03;02;00 | X 0 1 0 1 0 X 1 13 | 12 |
| 902 | 05 00503 | 29 | A | DB | 05;03;00 | |
| 903 | 05 00504 | 0D | A | DB | 13 | |
| 904 | 05 00505 | 10 | A | DB | 04 | |
| 905 | 05 00506 | 10 | A | CB | 04 | X X X 1 X X X X 11 | 13 |
| 906 | 05 00507 | 08 | A | DB | 11 | |
| 907 | 05 00508 | 80 | A | DB | 07 | 1 X X X X X X X 00 | 14 |
| 908 | 05 00509 | A0 | A | DB | 07 | |
| 909 | 05 0050A | 00 | A | DB | 0 | |
| 912 | | | | *NAR | | |
| 913 | | | | • | | |
| 914 | | | | • | R U N  N O T  P R I N T  S T A T E | |
| 915 | | | | • | | |
| 916 | | | | | RUN NOT PRINT; EXECUTES WHILE MACHINE IS COMPLETING A COPY RUN. | |
| 917 | | | | | ENTERED FROM (PRINT) AND EXITS TO (NOT READY'. | |
| 919 | | | | • PROLOG | | |
| 921 | 05 00508 | C00000 | N | RUN1PRL CALL | DOBELV | CAUSE ELV TO EXECUTE |
| 922 | 05 0050E | C00000 | N | CALL | RUN1ITMR,2500,RUNN0CHG | STAY IN RUNN 2.5 SEC |
| | | 2F | A | | | |
| | | FA | | | | |
| | | 7505 | N | | | |
| 923 | 05 00515 | CDA901 | N | CALL | SB;PNTRS | SYNC BKG PNTRS TO NEW STATE |
| 924 | 05 00518 | C9 | A | RET | | |
| 926 | | | | • CALLS FOR RUN NOT PRINT 10 MS SYN BACKGROUND | | |
| 928 | 05 00519 | C00000 | N | RUNN10 CALL | ADHBCTRL | |
| 929 | 05 0051C | C9 | A | RET | | |
| 931 | | | | • CALLS FOR RUN NOT PRINT 20 MS SYN BACKGROUND | | |
| 933 | 05 0051D | 0000 | N | RUNN20 DW | RUNNBSWS | |
| 934 | 05 0051F | 0000 | N | DW | SORTERS | |
| 935 | 05 00521 | 0000 | N | DW | SOSOJMNT | |
| 936 | 05 00523 | 0000 | N | DW | FLVBPRNT | |
| 937 | 05 00525 | 0000 | N | DW | LMP0CTRL | |
| 938 | 05 00527 | 0000 | N | DW | PAPBTGL4 | |
| 939 | 05 00529 | 0000 | N | DW | DSPLBCTL | |
| 940 | 05 0052B | 0000 | N | DW | INSTRU | |
| 941 | 05 0052D | FFFF | A | DW | X'FFFF'; | END OF TABLE |

```
943                              * CALLS FOR RUN NOT PRINT 100 MS SYN BACKGROUND
945  05 0052F  0000        N     RUN@100   DW      JAM@RST
946  05 00531  0000        N               DW      RILK&CK
947  05 00533  0000        N               DW      FUS@RDUT
948  05 00535  0000        N               DW      PS@@RUN
949  05 00537  0000        N               DW      XMM@PRNT
950  05 00539  0000        N               DW      LITE@@FF
951  05 0053B  FF01        N               DW      TST@LP4            TEST IF OK TO LEAVE RUN NOT PRT
952  05 0053D  FFFF        N               DW      STAT:CHG           END OF TABLE
953  05 0053F  FFFF        A               DW      X'FFFF'

955  05 00541  CD0000      N     RUN@@EPL  CALL    DEL@CK             CALC COPIES DELIVERED
956  05 00544  CD0000      N               CALL    PAP@EPL            'RUNNPRT' PAPER PATH MOP UP SUB
957  05 00547  CD0000      N               CALL    MOT@OFF            TURN OFF SORTER MOTORS
958  05 0054A  CD0000      N               CALL    DR@ELV             CAUSE FLV TO EXECUTE
959  05 0054D  AF          A               CFLG    AXF06FLT           RESFT FOR USE DURING NEXT RUN
960  05 0054E  323FF4      A               CFBIT,P TF@XMM0            STOP BLINKING OF XMM 'OTHER'
     05 00551  2123FC      A
     05 00554  3EFE        A
     05 00556  A6          A
     05 00557  77          A
961  05 00558  CD0000      N     COBIT,S   CALL    SOS*SMPL
     05 0055B  FFFD        A 962  05 0055D  CD7805      N               CALL    NV@JAM             STORE RECAP DATA IN RAM
963  05 00560  CD0000      N               CALL    RCP@STRE
964  05 00563  CD0000      N               CALL    AD@@MATF
965  05 00566  3ECR        A               MVI     A,R                SET COUNTER FOR 7 TIMEOUTS
     05 00568  3285FA      A               STA     C@@LCNT
966  05 0056B  CD0000      N               CALL    PR@FAN             (1)
967  05 0056E  CD0000      N               CALL    FLT@EPL5           (2) LOG HISTORY DATA FOR RUN
968  05 00571  CD0000      N               CALL    HIST@FLE           (3)
969  05 00574  C9          A               RET 972  05 00575  2153FD      N     RUN@@CHG  LXI     H,STATE1           SET H&L TO ADDR OF STATE1
973  05 00578  3602        A               MVI     M,:NRDY            CHANGE STATE1 TO NOT READY
974                                        IDIALTR STATE1

975  05 0057A  C9          A               RET
977  05 0057B  3A66F4      A     NV@JAM    RFLG    UP@JAM             LOAD A WITH SRT UPPER JAM FLAG
     05 0057E  07          A 978  05 0057F  3A36F4      A               LDAFLG  L@W@JAM            & SAVE IT IN THE CARRY BIT
979  05 00582  17          A               RAL                        LOAD A WITH SRT LOWER JAM FLAG
980  05 00583  17          A               RAL                        & MOVE CARRY &
981  05 00584  07          A               RLC                        L@W@JAM INTO THEIR POSITIONS
982  05 00585  07          A               RLC
983  05 00586  E60C        A               MODBYT  A,AND,MSK(NVBIT,)  MASK FOR DESIRED BITS
                                                   NV@L@H@;J,NV@UP@J)
985  05 00588  47          A               MOV     B,A                & SAVE IT IN THE B-REG
986  05 00589  3AA9F4      A               IF:     FLG,IM@D@DN1,T      WAS THERE AN TP@D ON CONDITION
     05 0058C  07          A
987  05 0058D  D29605      N 988  05 00590  78          A               MOV     A,P                YES,RESTORE A-PEG
989                                        MODBYT  A,AO,MSK(NVBIT,J   & SET NV JAM BITS
                                                   NV@IMED)
990  05 00591  F603        A               ELSE;
991  05 00593  C3A105      N                 IF:   FBITS,FDR@AJAM,OR,FDR@MJAM,T IS EITHER JAM CONDITION TRUE
992  05 00596  3A3CFD      A
     05 00599  E60C        A
993  05 0059E  CA9F05      N                 STC                       YES,SET CARRY
994  05 00598  37          A               ENDIF
```

```
995    05 0059F          17    A          RAL                               ROTATE INTO DO
996    05 005A0          B0    A          MODBYT  A,AR,B                    'OR' IN SRT JAM BITS
997                            A   ENDIF
998    05 005A1       32C9E2   A   WNVNIB          NV@JAM@N
999                            A   IDIALTR         NV@FJAM,NV@IMED,NV@LOW@J,NV@UP@J
1000   05 005A4          C9    A          RET                               RETURN TO STATE CHECKER
1002                            *NAR
1003                            *
1004                            *   T E C H   R E P   S T A T E
1005                            *
1006                            *   THE TECH REP STATE IS ENTERED WHEN THE SERVICE KEY IS ON IN
1007                            *   'NOT READY' & 'READY' STATES. THIS ALLOWS THE TECH REP TO PERFORM SUCH
1008                            *   TASKS AS ACCESS NON-VOLATILE MEMORY & COMPONENT CONTROL.
1010                            *
1011                            *   PROLOG
1012                            *
1013   05 00545      C00000   N   TREP:PRL COBIT,S  WAIT$                   INSURE WAIT OFF AT TREP ENTRANC
1014   05 005A8        E9FE   A                    DGN@PRL                  DIAGNOSTIC PROLOG
1015   05 005AA      CDA901   N          CALL      SB:PNTRS                 SYNC BKG PNTRS TO NEW STATE
1016   05 005AD          C9    A          RET
1019                            *   CALLS FOR TECH REP 10MS SYN BACKGROUND
1021   05 005B1      C00000   N   TREP10   CALL    ADH@CTRL
1022   05 005B4          C9    A          RET
1024                            *   CALLS FOR TECH REP 20MS SYN BACKGROUND
1026   05 005B5        0000   N   TREP20   DW      TREP@SWS
1027   05 005B7        0000   N          DW        MN@ELV@S
1028   05 005B9        0000   N          DW        LMP@CTPL
1029   05 005BB        0000   N          DW        DSPL@CTL
1030   05 005BD        0000   N          DW        DCN@BKG
1031   05 005BF        0000   N          DW        INSTRU
1032   05 005C1        FFFF   A          DW        X'FFFF'                  END OF TABLE
1034                            *   CALLS FOR TECH REP 100MS SYN BACKGROUND
1036   05 005C3        0000   N   TREP100  DW      NRILKACK
1037   05 005C5        0000   N          DW        PSD@STPY
1038   05 005C7        0000   N          DW        XMM@STPY
1039   05 005C9        0000   N          DW        RED@BGND
1040   05 005CB        0000   N          DW        RIN@CHK
1041   05 005CD        0000   N          DW        JAM@RST
1042   05 005CF        0000   N          DW        NVL@DUMP
1043   05 005D1        0000   N          DW        FUS@RDUT
1044   05 005D3        0000   N          DW        TST@LP4
1045   05 005D5        DF05   N          DW        TREP:CHG                 TEST IF OK TO LEAVE TREP REP
1046   05 005D7        FF01   N          DW        STAT:CHG
1047   05 005D9        FFFF   A          DW        X'FFFF'                  END OF TABLE
1049                            *
1050                            *   EPILOG (TECH REP STATE)
1051                            *
1052   05 005DB      C00000   N   TREP:EPL CALL    DGN@EPL                  DIAGNOSTIC EPILOG
1053   05 005DE          C9    A          RET
1055                            *   CHANGE OF STATE CHECK
```

```
                                                              PREPARE FOR POSSIBLE STATE CHG
1057  05 005DF  2153FD      A  TREP:CHG LXI     H,ADR(DATA,STATE1)   DO NOT CHG STATE IF IN COMP
1058  05 005E2  7E          A       IF:         XBYT,M,NE,:COMP
      05 005E3  FE00        N
1059  05 005E5  CAFE05      A       IF:             FLG,SER@ACT,T    IF SERVICE KEY IS ON AND IF
      05 005E8  3A49F4      A
      05 005EB  07          N
1060  05 005EC  D2FC05      A       ANDIF:      FAIT,DGN@PRT@,F      IN DIAG PRINT PROGRAM
      05 005EF  3A20FC      A
      05 005F2  E6C2        N
1061  05 005F4  C2FC05      A       ELSE:   MVI     M,TREP           CHG TO TREP STATE
1062  05 005F7  3601        A               MVI     M,INRDY          IF KEY IS TURNED OFF
1063  05 005F9  C3FE05      A       ENDIF                            CHG TO NOT READY STATE
1064  05 005FC  3602        A           ID:ALTR  STATE:
1065                                ENDIF
1066                                RET
1067  05 005FE  C9          A
```

TABLE II

```
96                                  FIXED PITCH EVENT TABLE
97                                  ;
98                                  ; EVENTS MUST BE IN SEQUENTIAL ORDER STARTING
99                                  ; WITH THE EVENT CLOSES TO PITCH RESET FIRST
100                                 ;
101                                 ; THERE CAN BE NO MORE THAN 256 COUNTS BETWEEN EVENTS
102                                 ;
103                                 ; FORMAT OF EVENTS FOR EVENT TABLE
104                                 ;
105                                 ; EVENT    X,Y,Z
106                                 ; WHERE:
107                                 ; X = ABSOLUTE COUNTS FROM RESET
108                                 ; Y = SHIFT REGISTER NEEDED IN EVENT
109                                 ; Z = EVENT NAME
110                                 ;
111                                 ;
112                                 PITCH EVENTS
113                                 ;
114                                 TABLE
115  05 0001E  0200        A       EVENT       2,3,TRN2CURR
     05 00020  03          N
     05 00021  0000        A
116  05 00023  0300        A       EVENT       3,2,ADC@ACT
     05 00025  02          N
     05 00026  0000        A
117  05 00028  0400        A       EVENT       4,3,FDR5AFLT
     05 0002A  03          N
     05 0002B  0000        A
118  05 0002D  0700        A       EVENT       7,0,SPLYS@@N
     05 0002F  00          N
     05 00030  0000        A
119  05 00032  0800        A       EVENT       8,2,FDR1AXFD
     05 00034  02          N
```

| # | | | | | |
|---|---|---|---|---|---|
| 120 | 05 00035 | 0000 | N | EVENT | 10,3,FUS0LOAD |
| | 05 00037 | 0A00 | A | | |
| | 05 00039 | 03 | | | |
| 121 | 05 0003A | 0000 | N | EVENT | 48,8,DEC0@INV | DECISION GATE FOR INVTD COPIES
| | 05 0003C | 3000 | A | | |
| | 05 0003E | 08 | | | |
| 122 | 05 0003F | 0000 | N | EVENT | 54,5,FUS0NTLD | FUSER LOADED TEST
| | 05 00041 | 3600 | A | | |
| | 05 00043 | 05 | | | |
| 123 | 05 00044 | 0000 | N | EVENT | 85,3,FDR6MFLT |
| | 05 00046 | 5500 | A | | |
| | 05 00048 | 03 | | | |
| 124 | 05 00049 | 0000 | N | EVENT | 89,2,FDR2HNFD |
| | 05 0004B | 5900 | A | | |
| | 05 0004D | 02 | | | |
| 125 | 05 0004E | 0000 | N | EVENT | 93,8,JAM6@N@N | PAPER PATH JAM SW PITCH EVENT
| | 05 00050 | 5D00 | A | | |
| | 05 00052 | 08 | | | |
| 126 | 05 00053 | 0000 | N | EVENT | 118,9,JAM5@INV | PAPER PATH JAM SW PITCH EVENT
| | 05 00055 | 7600 | A | | |
| | 05 00057 | 09 | | | |
| 127 | 05 00058 | 0000 | N | EVENT | 120,0,FSH@OFF |
| | 05 0005A | 7800 | A | | |
| | 05 0005C | 00 | | | |
| 128 | 05 0005D | 0000 | N | EVENT | 135,0,PR0G@HST | PROG HISTORY FILE UPDATE
| | 05 0005F | 8700 | A | | |
| | 05 00061 | 00 | | | |
| 129 | 05 00062 | 0000 | N | EVENT | 143,6,JAM4@CHK | PAPER PATH JAM SW PITCH EVENT
| | 05 00064 | 8F00 | A | | |
| | 05 00066 | 06 | | | |
| 130 | 05 00067 | 0000 | N | EVENT | 170,10,RET2@CHK | PAPER PATH JAM SW PITCH EVENT
| | 05 00069 | AA00 | A | | |
| | 05 0006B | 0A | | | |
| 131 | 05 0006C | 0000 | N | EVENT | 207,3,S@S@CLN |
| | 05 0006E | CF00 | A | | |
| | 05 00070 | 03 | | | |
| 132 | 05 00071 | 0000 | N | EVENT | 209,2,TRN5CURR |
| | 05 00073 | D100 | A | | |
| | 05 00075 | 02 | | | |
| 133 | 05 00076 | 0000 | N | EVENT | 227,5,JAM3@CHK | PAPER PATH JAM SW PITCH EVENT
| | 05 00078 | E300 | A | | |
| | 05 0007A | 05 | | | |
| 134 | 05 0007B | 0000 | N | EVENT | 265,2,FDR3@EDG | ENABLE AUX FDR WT SENSOR
| | 05 0007D | 0901 | A | | |
| | 05 0007F | 02 | | | |
| 135 | 05 00080 | 0000 | N | EVENT | 267,4,JAM2@CHK | PAPER PATH JAM SW PITCH EVENT
| | 05 00082 | 0B01 | A | | |
| | 05 00084 | 04 | | | |
| 136 | 05 00085 | 0000 | N | EVENT | 270,8,RET1@CHK | PAPER PATH JAM SW PITCH EVENT
| | 05 00087 | 0E01 | A | | |
| | 05 00089 | 08 | | | |
| 137 | 05 0008A | 0000 | N | EVENT | 361,3,TRN3DTCK |
| | 05 0008C | 6901 | A | | |
| | 05 0008E | 03 | | | |
| 138 | 05 0008F | 0000 | N | EVENT | 364,2,FDR4MEDG | ENABLE MAIN WT SENSOR
| | 05 00091 | 6C01 | A | | |
| | 05 00093 | 02 | | | |
| | 05 00094 | 0000 | N | | |

| # | | | | | | | |
|---|---|---|---|---|---|---|---|
| 139 | 05 | 00096 | B901 | A | EVENT | 441,9,JAM6@INV | PAPER PATH JAM SW PITCH EVENT |
| | 05 | 00098 | 09 | | | | |
| | 05 | 00099 | 0000 | N | | | |
| 140 | 05 | 0009B | C201 | A | EVENT | 450,4,FUS@UNLD | |
| | 05 | 0009D | 04 | | | | |
| 141 | 05 | 0009E | 0000 | N | EVENT | 451,2,TRN1ROLL | |
| | 05 | 000A0 | C301 | A | | | |
| | 05 | 000A2 | 02 | | | | |
| 142 | 05 | 000A3 | 0000 | N | EVENT | 500,0,DPM@SMPL | |
| | 05 | 000A5 | F401 | A | | | |
| | 05 | 000A7 | 00 | | | | |
| 143 | 05 | 000A8 | 0000 | N | EVENT | 526,3,TRN4DTCK | |
| | 05 | 000AA | 0E02 | A | | | |
| | 05 | 000AC | 03 | | | | |
| 144 | 05 | 000AD | 0000 | N | EVENT | 539,0,DVLV@OFF | TURN OFF VAR DFNS DEVELOPERS |
| | 05 | 000AF | 1B02 | A | | | |
| | 05 | 000B1 | 00 | | | | |
| 145 | 05 | 000B2 | 0000 | N | EVENT | 600,0,PIL@PLOP | TEST FOR PLATEN OPEN (BLG) |
| | 05 | 000B4 | 5802 | A | | | |
| | 05 | 000B6 | 00 | | | | |
| 146 | 05 | 000B7 | 0000 | N | EVENT | 630,5,INVTRCTL | INVTR GATE & RETURN CONTROL |
| | 05 | 000B9 | 7602 | A | | | |
| | 05 | 000BB | 05 | | | | |
| 147 | 05 | 000BC | 0000 | N | EVENT | 650,6,DECG@NON | DECISION GATE FOR NON-INVTD |
| | 05 | 000BE | 8A02 | A | | | |
| | 05 | 000C0 | 06 | | | | |
| 148 | 05 | 000C1 | 0000 | N | EVENT | 666,0,JAM@DLY | |
| | 05 | 000C3 | 9A02 | A | | | |
| | 05 | 000C5 | 00 | | | | |
| 149 | 05 | 000C6 | 0000 | N | EVENT | 700,7,JAM5@NON | PAPER PATH JAM SW PITCH EVENT |
| | 05 | 000C8 | BC02 | A | | | |
| | 05 | 000CA | 07 | | | | |
| 150 | 05 | 000CB | 0000 | N | EVENT | 800,0,PROGMODE | |
| | 05 | 000CD | 2003 | A | | | |
| | 05 | 000CF | 00 | | | | |
| 151 | 05 | 000D0 | 0000 | N | EVENT | 802,0,FSH@FNB | |
| | 05 | 000D2 | 2203 | A | | | |
| | 05 | 000D4 | 00 | | | | |
| 152 | 05 | 000D5 | 0000 | N | EVENT | 848,0,DVB@VAR | TURN ON VARIABLE-BIAS DEVELOPER |
| | 05 | 000D7 | 5003 | A | | | |
| | 05 | 000D9 | 00 | | | | |
| 153 | 05 | 000DA | 0000 | N | EVENT | 850,4,SRSK@EV | INIT SRSK & SRT MOTOR |
| | 05 | 000DC | 5203 | A | | | |
| | 05 | 000DE | 04 | | | | |
| 154 | 05 | 000DF | 0000 | N | EVENT | 852,0,PECOFFEV | TURN OFF POST EXP. COROTRON |
| | 05 | 000E1 | 5403 | A | | | |
| | 05 | 000E3 | 00 | | | | |
| 155 | 05 | 000E4 | 0000 | N | EVENT | 908,0,PECONEV | TURN ON POST EXP COROTRON |
| | 05 | 000E6 | 8C03 | A | | | |
| | 05 | 000E8 | 00 | | | | |
| 156 | 05 | 000E9 | 0000 | N | EVENT | 910,0,910@EV | |
| | 05 | 000EB | 8EC3 | A | | | |
| | 05 | 000ED | 00 | | | | |
| 157 | 05 | 000EE | 0000 | N | EVENT | 912,0,DGN&HCNT | |
| | 05 | 000F0 | 90C3 | A | | | |
| | 05 | 000F2 | 00 | | | | |
| 158 | 05 | 000F3 | 0000 | N | EVENT | 935,0,OVER@RUN | |
| | 05 | 000F5 | A703 | A | | | |
| | 05 | 000F7 | 00 | | | | |
| 159 | 05 | 000F8 | 0000 | N | ENDTABLE | | |

TABLE III

```
                                            VARIABLE PITCH EVENT TABLE
                                    *
                                    *
                        00000001    FLSH@BSE  EQU   1
                        00000019    F@@ON@BSE EQU   25
                        00000064    F@@@FF@BS EQU   100
05 00000  0100                      R@M@FSH   DW    FLSH@BSE
05 00002  00                                  DB    0
05 00003  6400                                DW    FSH@@N
05 00005  00                                  DB    0
05 00006  0000          R@M@@FF     DW    F@@OFF@S
05 00008  0000                                DW    F@@OFF
05 0000A  1900                                DW    F@@ON@BSE
05 0000C  00                                  DB    0
05 0000D  0000          R@M@@N      DW    F@@@N
05 0000F  0100                                DW    FLSH@BSE
05 00011  00                                  DB    0
05 00012  0000          R@M@FSHS    DW    FSH@@N@S
05 00014  6400                                DW    F@@@FF@S
05 00016  00                                  DB    0
05 00017  0000          R@M@@FFS    DW    F@@OFF@S
05 00019  1900                                DW    F@@ON@SE
05 0001B  00                                  DB    0
05 0001C  0000          R@M@@NS     DW    F@@ON@S
                                    *
```

TABLE IV

```
                                    BASE@CNT  SET   918           #CLK CNTS/PITCH
  00000396                          SAFE@CNT  SET   910           MIN # CLK CNTS/PITCH
  0000038E                *
                          *             PITCH TABLE BUILDER
                          *
                          *         BUILD VARIABLE PITCH EVENT TABLE INTO RAM
                          *         FROM ROM DATA + REDUCTION ADJUST & F@ TRIM
                          *
05 000FA 2A0000                     TBLD@PRT  LHLD  R@M@FSH       H&L= BASE CNT @F F@ FLASH
05 000FD EB                                   XCHG                D&E= BASE CNT @F F@ FLASH
05 000FE 2A9AFC                               LHLD  1FLSH@@N      H&L= RED ADJ
05 00101 19                                   DAD   D             H&L= BASE + ADJ
05 00102 2244FC                               SHLD  RAM@FSH       RAM@FSH = BASE + ADJ
                                    *
05 00105 2A0500                               LHLD  R@M@@FF       H&L= BASE CNT @F F@ @FF
05 00108 EB                                   XCHG                D&E= BASE CNT @F F@ @FF
05 00109 2A9CFC                               LHLD  1F@@@FF       H&L= RED ADJ + TRIM ADJ
05 0010C 19                                   DAD   D             H&L= BASE + ADJ
05 0010D 2249FC                               SHLD  RAM@@FF       RAM@@FF = BASE + ADJ
                                    *
05 00110 2A0A00                               LHLD  R@M@@N        H&L= BASE CNT @F F@ @N
05 00113 EB                                   XCHG                D&E= BASE CNT @F F@ @N
05 00114 2A9EFC                               LHLD  1F@@@N        H&L= RED ADJ + TRIM ADJ
05 00117 19                                   DAD   D             H&L= BASE + ADJ
05 00118 CDEA02                               CALL  AN@M@D        CALL M@D R@UTINE T@ M@D IF<0
05 0011B 224EFC                               SHLD  RAM@@N        RAM@@N = RESULTS OF ABOVE
```

```
187                                    *
188                                          IF:    FLG,IMG@SFT,T        IS THERE IMAGE SHIFT
189  05 0011E  3A31F4   A
190  05 00121  07       A                    MVI    A,6                  YES,# OF VAR EVENTS TO USE = 6
191  05 00122  D25601   N                    MOV    B,A                  SET UP B-REG FOR LOOP CONTROL
192  05 00125  3E06     A                    STA    TBLD@NUM             STORE # OF VAR EVENTS
193  05 00127  47       A                    DCR    A                    SET UP # OF TIMES TO GO
194  05 00128  3262FA   N                    STA    TBLD@TMP             THRU SORT
     05 00128  3D       A
     05 0012C  3263FC   N
195                                    *                                 UPDATE ROM@FSHS TO
196  05 0012F  2A0F00   A                    LHLD   ROM@FSHS             INCLUDE RED MODE ADJ + SHIFT
197  05 00132  EB       A                    XCHG                        ADJ AND SAVE FOR THE
198  05 00133  2AA0FC   N                    LHLD   2FLSH@@N             IMAGE SHIFT
199  05 00136  19       A                    DAD    D                    FLASH EVENT
     05 00137  2253FC   N                    SHLD   RAM@FSHS
200                                    *                                 UPDATE ROM@OFFS TO INCLUDE
201  05 0013A  2A1400   A                    LHLD   ROM@OFFS             RED MODE ADJ + TRIM ADJ +
202  05 0013D  EB       A                    XCHG                        SHIFT ADJ AND SAVE
203  05 0013E  2AA2FC   N                    LHLD   2F@@OFF              FOR THE IMAGE SHIFT
204  05 00141  19       A                    DAD    D                    FADE BUT EVENT
205  05 00142  2258FC   N                    SHLD   RAM@OFFS
206                                    *                                 UPDATE ROM@ONS TO INCLUDE
207  05 00145  2A1900   A                    LHLD   ROM@ONS              RED MODE ADJ + TRIM ADJ +
208  05 00148  EB       A                    XCHG                        SHIFT ADJ
209  05 00149  2AA4FC   N                    LHLD   2F@@ON
210  05 0014C  19       A                    DAD    D
211  05 0014D  CDEA02   N                    CALL   ON@MOD               CALL MOD ROUTINE TO MOD IF <0
212  05 00150  225DFC   N                    SHLD   RAM@ONS              SAVE THE RESULTS
213                                    ELSE:
214  05 00153  C36001   N                    MVI    A,3                  IF IMAGE SHIFT NOT SET
215  05 00156  3E03     A                    MOV    B,A                  # OF VAR EVENTS TO USE = 3
216  05 00158  47       A                    STA    TBLD@NUM             SET UP B-REG FOR LOOP CONTROL
217  05 00159  3262FA   N                    DCR    A                    STORE # OF VAR EVENTS & SETUP
218  05 0015C  3D       A                    STA    TBLD@TMP             # OF TIMES TO GO THRU SORT
219  05 0015D  3263FA   N
220                                          ENDIF
221
440                                    *
441                                    *     SUBROUTINE TO DETERMINE IF MODIFIED F0 ON EVENT
442                                    *     CLK COUNT IF CLK COUNT RESULTS ARE NEGATIVE OR 0
443                                    *
444  05 002EA  7C       A     ON@MOD:  MOV    A,H                        A= MS PART OF ABS CLK COUNT
445  05 002EB  07       A                    RLC                         CARRY= SIGN OF ABS CLK COUNT
446  05 002EC  D20203   N              IF:   CC,C,S                      IS THE ABS CLK CNT NEG
447  05 002EF  119603   N                    LXI    D,RASE@CNT           YES,ADD # CLK COUNTS PER PITCH
448  05 002F2  19       A                    DAD    D                    TO NEG #
449  05 002F3  118E03   N              IF:   XHRD,H,GE,SAFE@CNT          IS RESULTS GE SAFE # CLK/PITCH
     05 002F6  CD0000   N
     05 002F9  DAFF02   N
     05 002FC  210100   N                    LXI    H,1                  YES,MOVE TO TURN ON LATER
450
451                                          ENDIF
452  05 002FF  C30E03   N              ORIF: XHRD,H,EQ,0                 IF RESULTS = 0, MOVE LATER IN
     05 00302  110000   N
     05 00305  CD0000   N
     05 00308  C20E03   N
453  05 0030B  210100   N                    LXI    H,1                  PITCH BECUASE EVENT MUST BE > 0
454                                          ENDIF
455  05 0030E  C9       A                    RET
456                                          END
```

TABLE V

```
CONTROL SECTION SUMMARY: 01 00000   PT 0   02 00000   PT 0   03 00000   PT 0   04 OFFD8   PT 2
                        05 0030F   PT 1

* NO UNDEFINED SYMBOLS
** ERROR SEVERITY LEVEL: 0
* NO ERROR LINES

252                                                SORTS VARIABLE RAM EVENT TABLE BY
253                                                ABS CLK COUNT & LOWEST ENDS IN EVBRAM
254
255                                                SORTS ONLY 1ST 3 IF NO IMAGE SHIFT, OTHERWISE SORTS ALL 6
256
257 05 0017E 214FFC    N    LXI     H,EVBRAM              H&L= ADDR OF TOP OF VAR RAM TBL
258 05 00181 3A63FA    N    WHILE1  XBYT,TBLD@TMP,NE,0    TIMES TO GO THRU OUTER LOOP
259 05 00184 FE00      N
260 05 00186 CAFD01    A            STA     INBLP@CT      INTER LOOP CNT=OUTER LOOP CNT
261 05 00189 3253FA    N            SFLG    TBLD@1ST      SET 1ST FLAG FOR THIS POSITION
262 05 0018C 3EF0      N            SHLD    FIX@ADDR      ADDR OF POSITION TO FULL
263 05 0018E 325EF4    A            ORA     A             CLEAR Z CONDITION BIT
264 05 00191 2252FB    A            WHILE1  CC,Z,C
265 05 00194 B7        N            MOV     E,H           E= LS PART OF ABS CLK COUNT
266 05 00195 CAEF01    A            INX     H
267 05 00198 5E        N            MOV     D,M           D= MS PART OF ABS CLK COUNT
268 05 00199 23        A            PUSH    D             STORE ABS CLK CNT OF FILL POS
269 05 0019A 56        N            IF1     FLG,TBLD@1ST,T IS IT 1ST TIME FOR THIS POS
    05 0019B 05        A
    05 0019C 3A5EF4    A
    05 0019F 07        N
270 05 001A0 D2AE01    A            CFLG    TBLD@1ST      YES, CLEAR ITS FLAG
    05 001A3 AF        N
271 05 001A4 325EF4    A            INX     H             AND INCREMENT
272 05 001A7 23        A            INX     H             POINTER TO LS PART OF
273 05 001A8 23        A            INX     H             ABS CLK COUNT OF NEXT
274 05 001A9 23        A            INX     H             EVENT
275 05 001AA 23        A    ELSE:
276 05 001AB C38601    A            LHLD    VAR@ADDR      H&L= ADDR
277 05 001AE 2A5CFB    A            INX     H             OF LS PART OF
278 05 001B1 23        A            INX     H             ABS CLK COUNT TO
279 05 001B2 23        A            INX     H             COMPARE TO FILL
280 05 001B3 23        A            INX     H             POSITION
281 05 001B4 23        A            INX     H
282 05 001B5 23        A    ENDIF
283 05 001B6 225CFB    N            SHLD    VAR@ADDR      STORE POINTER TO COMPARE EVENT
284 05 001B9 5E        A            MOV     E,M           E= LS PART OF COMPARE ABS CLK
285 05 001BA 23        A            INX     H
286 05 001BB 56        A            MOV     D,M           D= MS PART OF COMPARE ABS CLK
287 05 001BC 23        A            POP     H             H&L= ABS CLK COUNT OF FILL POS
288 05 001BD E1        A            IF1     XWRD,D,LT,H   IS CLK OF COMPARE < FILL
    05 001BE EB        N
289 05 001C1 CD0000    A            LHLD    VAR@ADDR      YES, SWITCH THE 2 EVENTS
290 05 001C4 D2E501    A            XCHG                  D&E= ADDR LOWER CLK VALUE
291 05 001C7 EB        N            LHLD    FIX@ADDR      H&L= ADDR LARGER CLK VALUE
292 05 001C8 2A5CFB    A            MVI     A,-5          INITIALIZE LOOP COUNTER TO 5
293 05 001CB 3EFB      N            STA     TSW@NUM       WHICH = # OF ITEMS TO MOVE
294 05 001CD 3265FA    A            ORA     A             CLEAR Z CONDITION BIT
295 05 001D0 B7        N            WHILE1  CC,Z,C
    05 001D1 CAE501    A
```

TABLE VI

```
296  05 001D4  1A        A    LDAX  D           A= CONTAINS OF COMPARE EVENT
297  05 001D5  46        A    MOV   B,M         B= CONTAINS OF FILL POS
298  05 001D6  77        A    MOV   M,A         UPDATE FILL POS
299  05 001D7  78        A    MOV   A,D         UPDATE COMPARE POS
300  05 001D8  12        A    STAX  D           WITH NEW VALUE
301  05 001D9  13        A    INX   D           MOVE POINTERS TO
302  05 001DA  23        A    INX   H           NEXT ITEM
303  05 001DB  3A65FA    N    LDA   TSW@NUM     INC MOVE
304  05 001DE  3C        N    INR   A           LOOP CENTRAL
305  05 001DF  3265FA    N    STA   TSW@NUM     COUNTER
306  05 001E2  C3D101    N    ENDIF
307           ENDWHILE
308                      DECBYT  IN@LP@CT        DECRM INNER LOOP CNTR 309  05 001E5  2153FA    N    LHLD  FIX&ADDR     H&L= ADDR OF FILL POSITION
310  05 001E8  35        N    ENDWHILE
311  05 001E9  2A52FB    N    LXI   D,5          MOVE H&L TO LOOK AT NEXT EVENT
312  05 001EC  C39501    N    DAD   D            POSITION TO FILL
313  05 001EF  110500    A    LDA   TBLD@TMP     DECREMENT # OF EVENTS
314  05 001F2  19        A    DCR   A            TO SORT
315  05 001F3  3A63FA    N    STA   TBLD@TMP
316  05 001F6  3D        N    ENDWHILE
     05 001F7  3263FA
     05 001FA  C38101
```

TABLE VI

```
                          MOVE THE SR# & EVENT ADDR FROM ROM TABLE
                          TO RAM TABLE, MOVES ONLY THE FIRST 3 IF
                          NO IMAGE SHIFT, OTHERWISE MOVES ALL 6

223  05 00160  1144FC    N    LXI   D,RAM@FSH    D&E = ADDR OF RAM TABLE
224  05 00163  210000    N    LXI   H,ROM@FSH    H&L = ADDR OF ROM TABLE
225  05 00166  B0        N    ORA   R            CLEAR Z CONDITION BIT
226  05 00167  CA7E01    N    WHILE! CC,Z,C
227  05 0016A  23        A    INX   H            INCREMENT H&L AND D&E
228  05 0016B  13        A    INX   D            POINTERS OVER THE
229  05 0016C  23        A    INX   H            ABS CLK COUNT
230  05 0016D  13        A    INX   D
231  05 0016E  7E        A    MOV   A,M          LOAD A WITH SR#
232  05 0016F  12        A    STAX  D            STORE SR# IN RAM TABLE
233  05 00170  23        A    INX   H            MOVE POINTERS TO LS
234  05 00171  13        A    INX   D            ADDR OF EVENT
235  05 00172  7E        A    MOV   A,M          LOAD A WITH LS ADDR OF EVENT
236  05 00173  12        A    STAX  D            & STORE IT IN RAM TABLE
237  05 00174  23        A    INX   H            MOVE POINTERS TO MS
238  05 00175  13        A    INX   D            ADDR OF EVENT
239  05 00176  7E        A    MOV   A,M          MOVE MS ADDR OF EVENT
240  05 00177  12        A    STAX  D            TO RAM
241  05 00178  23        A    INX   H            MOVES POINTERS TO
242  05 00179  13        A    INX   D            LS PART OF ABS CLK COUNT
243  05 0017A  05        N    DCR   B            DECREMENT LOOP COUNTER
244  05 0017B  C36701    N    ENDWHILE
```

TABLE VII

MERGE VARIABLE PITCH EVENT TABLE & FIXED EVENT
TABLE CALCULATING THE REL DIFFERENCE WITH THE
RESULTS GOING INTO THE RUN EVENT TABLE

```
318                                LHLD    EV@RAM              INITIALIZE VAR@CLK TO ABS CLK
319   05 001FD  2A44FC    N        SHLD    VAR@CLK             COUNT OF 1ST VAR PITCH EVENT
320   05 00200  225EFB    N        LXI     H,EV@RAM            INITIALIZE VAR@ADDR TO ADDR OF
321   05 00203  2144FC    N        SHLD    VAR@ADDR            1ST VAR PITCH EVENT
322   05 00206  225CFB    N        LXI     H,EV@RAM            INITIALIZE FIX@ADDR TO ADDR OF
323   05 00209  211E00    N        SHLD    FIX@ADDR            1ST FIXED PITCH EVENT
324   05 0020C  2252FB    N        SFLG    TBL@1ST             NOTES 1ST EVENT TO RUN TABLE
325   05 0020F  3E80      A
326   05 00211  3259F4    A        MVI     A,TABLENUM          INITIALIZE TSW@NUM TO # OF
327   05 00214  3E2C      A        STA     TSW@NUM             EVENTS IN FIXED PITCH TABLE
328   05 00216  3265FA    A        LHLD    FV@ROM              INITIALIZE DRE WITH ABS CLOCK
329   05 00219  2A1E00    N        XCHG                        COUNT OF 1ST FIXED EVENT
330   05 0021C  EB        A        CFLG    VAR@DONE            FLAG DENOTES VAR EVENTS
331   05 0021D  AF        A
332   05 0021E  3259F4    A        WHILE:  FLG,VAR@DONE,F      WHILE THERE ARE MORE VAR EVENTS
333   05 00221  3A5FF4    A
334   05 00224  07        N
335   05 00225  DA6F02    N                IF:     XWRD,VAR@CLK,LE,O   IS VAR CLK CNT <= FIXED CLK CNT
336   05 00228  2A5EFB    A
      05 0022B  CD0000    N
      05 0022E  DA3402    N
337   05 00231  C25902    N                        LHLD    VAR@ADDR            YES, H&L = VAR EVENT ADDR
338   05 00234  2A5CFB    A                        CALL    TBL@UPD             PLACE VAR EVENT AT END RUN TBL
339   05 00237  CD9302    N                        LDA     TBL@NUM             DECREMENT # OF
340   05 0023A  3A62FA    A                        DCR     A                   VARIABLE EVENTS LEFT
341   05 0023D  3D        N                        STA     TBL@NUM             TO MERGE
342   05 0023E  3262FA    A                        IF:     CC,Z,S              DIC TBL@NUM GO TO 0
343   05 00241  C24C02    N                                SFLG    VAR@DONE    YES,DENOTE NO MORE VAR EVENTS
      05 00244  3E80      A
344   05 00246  3259F4    A
345   05 00249  C35602    N                        SHLD    VAR@ADDR            STORE ADDR OF NEXT VAR EVENT
346   05 0024C  225CFB    A                        MOV     E,M                 UPDATE VAR@CLK TO
347   05 0024F  5E        N                        INX     H                   VALUE OF ABS CLK COUNT
348   05 00250  23        A                        MOV     D,M                 OF PRESENT VARIABLE
349   05 00251  56        A                        XCHG                        EVENT
      05 00252  EB        A
350   05 00253  225EFB    N                        SHLD    VAR@CLK
                          ENDIF
351                       ELSE:
352   05 00256  C36602    N                        LHLD    FIX@ADDR            IF FIXED TABLE CLK COUNT IS
353   05 00259  2A52FB    A                        CALL    TBL@UPD             LESS THEN VAR TABLE UPDATE THE
354   05 0025C  CD9302    N                        SHLD    FIX@ADDR            RUN TABLE WITH THAT EVENT
355   05 0025F  2252FB    A                        LXI     H,TSW@NUM           UPDATE TO NEXT FIXED EVENT
356   05 00262  2165FA    A                        DCR     M                   DECREMENT # OF FIXED EVENTS
357   05 00265  35        N                                                    LEFT
358                       ENDIF
359   05 00266  2A52FB    A                        LHLD    FIX@ADDR
360   05 00269  5E        N                        MOV     E,M                 UPDATE D&L TO =
361   05 0026A  23        A                        INX     H                   ABS CLK CNT VALUE
362   05 0026B  56        A                        MOV     D,M                 OF PRESENT FIXED TABLE
363   05 0026C  C32102    N        ENDWHILE
364   05 0026F  3EFF      A        MVI     A,'XIFF'            CLEAR Z CONDITION
365   05 00271  B7        N        ORA     A                   BIT FOR LOOP
366   05 00272  2A52FB    A        LHLD    FIX@ADDR            NO MORE VAR EVENTS, USE FIXED
367   05 00275  CA8402    N        WHILE:  CC,Z,C              DONE WITH FIXED TABLE
```

```
368              CD9302    N           CALL    TBL@UPD             NO,UPDATE RUN TABLE
369              EB        A           XCHG                        SAVE H&L IN D&E
370              2165FA    A           LXI     H,TSW@NUM           DECREMENT # OF FIXED
371              35        A           DCR     M                   EVENTS LEFT
372              EB        A           XCHG                        RESTORE H&L
373              C37502    N  ENDWHILE
374              2A58FB    N           LHLD    P@TBL@A             H&L=ADDR OF LAST MS ADDR IN RUN
375              2B        A           DCX     H                   MOVE H&L POINTER BACK TO POINT
376              2B        A           DCX     H                   AT THE BEGINNING OF THE LAST
377              2B        A           DCX     H                   EVENT (OVER@RUN) & STORE IT
378              2264FD    N           SHLD    EV@PTR;             FOR MACH CLK INTERRUPT HANDLER
379              3E80      A           MVI     TBL@FIN             DENOTES PITCH TABLE IS COMPLETE
                 325DF4    N           SFLG
380              C9        A           RET
382         ;     SUBROUTINE TO CALCULATE REL DIFFERENCE BETWEEN
383         ;     2 EVENTS & MOVE REST OF TABLE TO RUN TABLE
385
386              3A5EF4    A  TBL@UPD IF:     FLG,TBL@DIST,T
387              07        N                                       THIS IS THE FIRST EVENT
                 D2AF02    N
                 AF        A  CFLG    TBL@DIST                     YES, CLR FLAG TO KEEP OUT
388              325EF4    A           MOV     A,H                 A= LS OF 1ST EVENT ABS CLK CNT
389              7E        A           STA     EV@T@TIM            USED AT PITCH RESET
390              3251FA    N           MOV     E,A                 E=LS OF 1ST EVENT ABS CLK CNT
391              5F        A           INX     H                   H&L=ADDR OF 1ST EVENT ABS CLK CNT
392              23        A           MOV     D,M                 D=MS OF 1ST EVENT ABS CLK CNT
393              56        A           XCHG                        D&E= ADDR OF MS ABS CLK CNT
394              EB        A           SHLD    LCLK@CNT            STORE ABS CLK OF 1ST EVENT
                 2256FB    N           LXI     H,EV@BASE:          H&L = ADDR OF RUN TABLE
395              21E8FE    N
396              C30802    N  ELSE:
397              5E        A           MOV     E,M                 E=LS CLK CNT OF NEW EVENT
398              23        A           INX     H                   H&L= ADDR OF MS ABS CLK CNT
399              56        A           MOV     D,M                 D=MS CLK CNT OF NEW EVENT
400              E5        A           PUSH    H                   SAVE ADDR OF MS ABS CLK CNT
401              2A56FB    N           IF:     XHRD,LCLK@CNT,GE,D  IS LAST CLK CNT GE NEW CLK CNT
                 CD0000    N
                 DAC502    N
402              23        A           INX     H                   H&L= LAST CLK CNT + 1
403              2256FB    N           SHLD    H                   STORE IT FOR NEXT TIME
404              3E01      A           MVI     LCLK@CNT            PUT THIS EVENT AT THE NEXT CLK
                 C3CC02    N                   A,1
405         ELSE:
406              45        A           MOV     B,L                 B=LS CLK CNT OF LAST EVENT
407              EB        A           XCHG                        H&L=ABS CLK CNT OF NEW EVENT
408              2256FB    N           SHLD    LCLK@CNT            STORE IT FOR THE NEXT TIME
409              7D        A           MOV     A,L                 A=LS CLK CNT OF NEW EVENT
410              90        A           SUB     B                   FIND DIFF (ONLY NEED LS IF CLK
411         ENDIF                                                  CNTS BETWEEN EVENTS <256)
412              D1        A           POP     D                   D&E=ADDR OF MS OF CLK OF NEW EV
413              2A58FB    N           LHLD    P@TBL@A             H&L= ADDR OF END OF LAST RUN EV
414              2B        A           DCX     H                   MOVE H&L POINTER
415              2B        A           DCX     H                   TO REL DIFF OF LAST
416              2B        A           DCX     H                   EVENT IN RUN TABLE
417              77        A           MOV     M,A                 MOVE REL DIFF TO RUN TABLE
418              23        A           INX     H                   INCREMENT RUN TABLE
419              23        A           INX     H                   POINTER OVER LAST
420              23        A           INX     H                   EVENT
421              23        A
422         ENDIF
423              23        A           INX     H                   H&L= ADDR OF S@# IN RUN TABLE
```

```
424  05 002D9   13          A              INX    D                    D&E= ADDR OF SR#
425  05 002DA   1A          A              LDAX   D                    MOVE SR# FROM TABLE TO
426  05 002DB   77          A              MOV    M,A                  RUN TABLE
427  05 002DC   23          A              INX    H                    MOVE POINTERS TO LS 8 BITS
428  05 002DD   13          A              INX    D                    OF EVENT ADDR
429  05 002DE   1A          A              LDAX   D                    MOVE LS 8 BITS OF ADDR
430  05 002DF   77          A              MOV    M,A
431  05 002E0   23          A              INX    H                    MOVES POINTER TO MS 8 BITS
432  05 002E1   13          A              INX    D                    OF EVENT ADDR
433  05 002E2   1A          A              LDAX   D                    MOVES MS 8 BITS OF ADDR
434  05 002E3   77          A              MOV    M,A
435  05 002E4   225BFB      A              SHLD   PTBLØA               STORE ADDR OF RUN TABLE
436  05 002E7   13          N              INX    D                    POINTER TO LS 8 BITS OF CLK CNT
437  05 002E8   EB          A              XCHG                        H&L= ADDR OF LS 8 BITS OF CLK
438  05 002E9   C9          A              RET
440                                *
441                                *       SUBROUTINE TO DETERMINE IF MODIFIED FØ ON EVENT
442                                *       CLK COUNT IF CLK COUNT RESULTS ARE NEGATIVE OR 0
443                                *
444  05 002EA   7C          A      ONØMOD  MOV    A,H                  A= MS PART OF ABS CLK COUNT
445  05 002EB   07          A              RLC                         CARRY= SIGN OF ABS CLK COUNT
446  05 002EC   D20203      N              IF:    CC,C,S               IS THE ABS CLK CNT NEG
447  05 002EF   119603      A                     LXI    D,PASE@CNT    YES,ADD # CLK COUNTS PER PITCH
448  05 002F2   19          A                     DAD    D             TO NEG #
449  05 002F3   118E03      A                     IF:    XWRD,H,GE,SAFE@CNT  IS RESULTS GE SAFE # CLK/PITCH
         002F6   CD0000      A
     05  002F9   DAFF02      A
450  05  002FC   210100      A                            LXI    H,1        YES,MOVE TO TURN ON LATER
451                                              ENDIF
452  05  002FF   C30E03      N              ORIF:  XWRD,H,EQ,0              IF RESULTS = 0, MOVE LATER IN
         00302   110000      N
     05  00305   CD0000      N
     05  00308   C20E03      N                     LXI    H,1              PITCH BECUASE EVENT MUST BE > 0
453  05  0030B   210100      A              ENDIF  LXI    H,1
454                                              RET
455                                              END
456  05  0030E   C9          A

CONTROL SECTION SUMMARY: 01 00000  PT 0   02 00000  PT 0   03 00000  PT 0   04 OFFD8  PT 2
                         05 0030F  PT 1

* NO UNDEFINED SYMBOLS
* ERROR SEVERITY LEVEL: 0
* NO ERROR LINES
```

TABLE VIII

```
; PITCH RESET INTERRUPT HANDLER
;
219                      RSET:   EI                              A   RE-ENABLE INTERRUPTS
220     06 000F9   FB            PUSH    PSW                     A   SAVE A-REG & CONDITION BITS
221     06 000FA   F5            IF:     FLG,TBLDBFIN,T          N   IS PITCH TABLE BUILD FINISHED
        06 000FB   3A5DF4
223     06 000FD   07
224     06 000FE   D26201
225     06 000FF   E5            PUSH    H                       A   SAVE HKL
        06 0100            IF:     FLGS,SR@DONE,J            N   YES, IS THERE A NEW SR VALUE
226     06 0102                   AND,910@DONE,T               YES, DID 910 EVENT GET DONE.
227     06 0103   3A4DF4
228     06 0106   216FF4
        06 0109   A6
        06 010A   F25501
229     06 010D   AF            CFLG    910@DONE                N   YES, RESET & MACH CLK TIMING O.

230     06 010E   326FF4        MODFLG  SR@DONE                 A   CLR FLAG UNTIL NEXT SR EVENT
231     06 0111   3240F4        LXI     H,ADR(DATA,SR@PTR)      A   LOAD RELATIVE
232     06 0114   2163FD        MOV     A,M                     A                PNTR TO SR #0
233     06 0117   7E            MODBYT  A,ADD,15                A   MOVE PNTR BACK
234     06 0118   C60F          MODBYT  A,AND,SR@ADJ            A                         BY 1 (CIRCULAR)
235     06 011A   E66F          MOV     M,A                     A   SAVE NEW REL SR PNTR IN SR@PTR
236     06 011C   77            MVI     H,HADR(DATA,SHIFTREG)   A   H&L = ABS ADDR
237     06 011D   26FE          MOV     L,A                     A                       OF SR #0
238     06 011F   6F            LDA     ADR(DATA,SR@VALU)       A   A = NEW SR VALUF FROM SRSK
        06 0120   3A69FD
239     06 0123   77            MOV     M,A                     A   UPDATE CONTENTS OF SR#0
240     06 0124   3A51FA        LDA     ADR(DATA,EV@1@TIM)      A   INIT MCLK:CNT
        06 0127   326EFD        STA     ADR(DATA,MCLK:CNT)      A
241     06 012A   21EAFE        LXI     H,ADR(CATA,EV@BASE)     A   INIT EV@PTR TO 1ST EVENT TIME
242     06 012D   2264FD        SHLD    ADR(DATA,EV@PTR)        A   INIT EV@PTR: TA 1ST EVENT ADDR
                                IF:     FLGS,NORMODN:,J         A   IS NORMAL SHUTDOWN REQUESTED
243     06 0130   3AA0F4                AND,CYCLE@DN:,J         A   NO, IS CYCLE-DOWN REQUESTED
244     06 0133   21AAF4                AND,SD1@DLY,F           A   NO, IS PROC DEAD CYCLING
245     06 0136   R6
246     06 0137   21AFF4
        06 013A   B6
        06 013D   FA5201
247     06 013D   2166FD        LXI     H,ADR(DATA,CYCUPCT:)    N   NO, LOAD CYCLE-UP CNTR
248     06 013E   7E            IF:     XBYT,M,NE,5             A   IS PROC IN CYCLE-UP MODE
        06 0141   FE05
        06 0142   CA5201
249     06 0144   FE04                  IF:     XBYT,A,EO,4     N   YES, IS IT RDY TO MAKE 1ST IMG
250     06 0147   C25101                        SFLG   IMGMADE: N   YES, SIGNAL 1ST IMAGE MADE
        06 0149   3E80
        06 014C   32ADF4
251                                     ENDIF
252     06 014E   34                    INR     M               A   INCRM CYCLE-UP CNTR (UNTIL = 5)
253                             ENDIF
254                             ELSE:
255     06 0151   C36101                SFLG    IMED@DN:        N   NEW SR VALUE NOT AVAILABLE
256     06 0155   3E80                                          A   REQUEST AN IMED SHUTDOWN
        06 0157   32A9F4
257     06 015A   2132FD        SFRIT,P E@PR@FLT                A   SIGNAL EARLY PITCH RESET FAULT
        06 015D   3E40
        06 015F   R6
        06 0160   77
```

TABLE IX

```
258              ENDIF
259              POP       H              RESTORE H&L
260     ENDIF
261 06 00161 3EFE     MVI  A,RSETFF;     RESET PITCH RESET
262 06 00162 3200E6 A STA  ADR(EQU,RSINTFF) RESTORE A-REG & CONDITION BITS
263 06 00167 F1    A POP  PSW            INT FLIP-FLOP
264 06 00168 C9    A RET                 RETURN TO INTERRUPTED ROUTINE

*
* MACHINE CLOCK INTERRUPT HANDLER
*
 57
 58
 59
 61 06 0002B         ORIGIN  X'38'          INTERRUPT TRAP CELL LOCATION 64 06 00038 F5    A MCLK:  PUSH PSW           SAVE A-REG & CONDITION CODES
 65 06 00039 3A6EFD A        LDA  ADR(DATA,MCLK:CNT)
 66 06 0003C 3D     A        DCR  A
 67 06 0003D C26600 N        IF:  CC,Z,S           IS THERE A PITCH EVENT TO DO
 68 06 00040 E5    A          PUSH H               YES, SAVE ALL REMAINING REGS
 69 06 00041 D5    A          PUSH D
 70 06 00042 C5    A          PUSH B
 71 06 00043 2A64FD A          LHLD ADR(DATA,EV@PTR1)  H&L= 1ST LOC OF NEXT PE TO DO
 72 06 00046 7E    A          MOV  A,M            SAVE RELATIVE DIFFERENTIAL TO
 73 06 00047 326EFD A          STA  ADR(DATA,MCLK:CNT) NEXT EVENT (# CLOCK COUNTS)
 74 06 0004A 23    A          INX  H              MOVE PNTR TO RFL SR IN TABLE
 75 06 0004B 3A63FD A          LDA  ADR(DATA,SR@PTR1) LOAD REL POSITION OF SR #0
 76 06 0004E 86    A          MODBYT A,ADD,M     C= LS PORTION OF ADDR OF THE
 77 06 0004F E66F  A          MODBYT A,AND,SR@ADJ REQUESTED SHIFT REGISTER
 78 06 00051 4F    A          MOV  C,A            POSITION (FOR USE WITHIN PE)
 79 06 00052 06FE  A          MVI  B,HADR(SHIFTREG) B&C= ADDR REQUESTED SR POSITION
 80 06 00054 0A    A          LDAX B              A= <REQUESTED SR POSITION>
 81 06 00055 23    A          INX  H              E= LS PORTION OF ADDR OF THE
 82 06 00056 5E    A          MOV  E,M                REQUESTED PITCH EVENT
 83 06 00057 23    A          INX  H              D= MS PORTION OF ADDR OF THE
 84 06 00058 56    A          MOV  D,M                REQUESTED PITCH EVENT
 85 06 00059 23    A          INX  H              SAVE PNTR TO NEXT PITCH EVENT
 86 06 0005A 2264FD A          SHLD ADR(DATA,EV@PTR1)
 87 06 0005D CD0000 N          CALL DE:IND         VECTOR TO REQUESTED PITCH EVENT
 88 06 00060 C1    A          POP  B              RESTORE    SAVED    REGISTERS
 89 06 00061 D1    A          POP  D
 90 06 00062 E1    A          POP  H
 91 06 00063 C37000 N        ELSE:  STA  ADR(DATA,EV@PTR1) NO PE; SAVE DECR'D 'MCLKCNT'
 92 06 00066 326EFD A          STA  ADR(DATA,MCLK:CNT)
 93 06 00069 0F    A          RRC                 IS IT TIME FOR A REFRESH
 94 06 0006A 027000 N          IF:  CC,C,S
 95 06 0006D 3202E6 A          REFRESH RFMOTES (1 MSEC) YES, REFRESH RFMOTES (1 MSEC)
 96              ENDIF
 97         ENDIF
 98 06 00070 FB    A EI                           RE-ENABLE INTERRUPT SYSTEM
 99 06 00071 3EFD  A MVI  A,MCLKFF;                RESET MCLK
100 06 00073 3200E6 A STA  ADR(EQU,RSINTFF)        INTRRUPT FLIP-FLOP
101 06 00076 F1    A POP  PSW                     RESTORE A-REG & CONDITION CODES
102 06 00077 C9    A RET                          RETURN TO INTERRUPTED ROUTINE
```

TABLE X

```
                            ; REAL TIME CLOCK INTERRUPT HANDLER
                            ;
139                 RTC:    EI                              RE-ENABLE INTERRUPTS
140  06 00081  FB           PUSH    PSW                     SAVE A-REG & CONDITION BITS
141  06 00082  F5           MVI     A,RTCFF!                RESET RTC
143  06 00083  3EF7         STA     ADR(EQU,RS;NTFF!)
144  06 00085  3200E6       PUSH    D                       SAVE DRE REGS
145  06 00088  D5           PUSH    H                       SAVE H&L REGS
146  06 00089  E5           PUSH    B                       SAVE 'B' REGISTER
147  06 0008A  C5
148
149                 DECBYT   GLBITIMR                       DECREMENT THE CLOCK CELL
150
151  06 0008B  2150FD
152  06 0008E  35           MOV     A,M                     A = <GLBITIMR>  ( 0 TO 255 )
153  06 0008F  7E           INX     H                       MEM. PTR. TO SM;ROST BYTE
154  06 00090  23           IF:     XBYT,A,AND,X'01',NZ     IS IT 20 MSEC TIME YET
     06 00091  E601
     06 00093  CA9D00
155                          MODBYT  H,OR,10;ROST;20;ROST   YES = BOTH 10 AND 20 BKGD
     06 00096  7E
     06 00097  F6C0
     06 00099  77
156                 ELSE:
157                          MODBYT  M,OR,10;ROST           NO - 10 BKGD ONLY
     06 0009A  C3A100
     06 0009D  7E
     06 0009E  F680
     06 000A0  77
158                 ENDIF
159  06 000A1  23           INX     H                       MEM. PTR. TO DIVD;0 CNTR
160  06 000A2  35           DCR     M                       DECREMENT 10 TO 0 COUNTER
161  06 000A3  C2AD00       IF:     CC,Z,S                  HAS 100 MSEC PASSED
162  06 000A6  36CA         MVI     M,10                    YES - RESET THE 10 TO 0 COUNTER
163  06 000A8  2U           DCX     H                       MEM. PTR. BACK TO SB;RQST
164  06 000A9  7E           MODBYT  H,OR,100;ROST           ADD 100 BKGD TO REQUEST BYTE
     06 000AA  F620
     06 000AC  77
165                 ENDIF
166                 REPEAT                                  NOW CHECK FOR TIME OUTS
167  06 000AD  2150FD       LXI     H,GLB;TIMR              LOAD (B) WITH QUANTITY TO LOOK
168  06 000B0  46           MOV     B,M                     FOR (CLOCK CELL VALUE)
169  06 000B1  16FB         MVI     D,COUNT!                SET 'D' FOR TABLE TO SEARCH
170  06 000B3  CD0000       CALL    FIND;LOC                GO LOOK IN ACTIVE LIST
171  06 000B6  CAF000       IF:     CC,Z,C                  HAS A MATCH BEFN FOUND
172  06 000B9  E5           PUSH    H                       YES - SAVE LOCATION ON STACK
173  06 000BA  26FC         MVI     H,ID:                   SEGWAY MEM PTR TO ID: TABLE
174  06 000BC  5E           MOV     E,M                     NOW ASSEMBLE
175  06 000BD  1600         MVI     D,0                     ADDRESS OF TIMER
176  06 000BF  21C8F4       LXI     H,TMR;FLGS              FLAG INTO THE
177  06 000C2  19           DAD     D                       MEMORY POINTER
178  06 000C3  0600         MVI     B,0                     GET SET TO CLEAR THE FLAG
179  06 000C5  F3           DI                              NO INTERRUPTIONS NOW, PLEASE
180  06 000C6  7E           MOV     A,M                     GET FLAG
181  06 000C7  07           RLC                             INTO THE CARRY BIT
182  06 000C8  D2EC00       IF:     CC,C,S                  IS FLAG SET
183  06 000CB  70           MOV     M,B                     YES - RESET AND NOW
184  06 000CC  FB           EI                              EVERYBODY CAN INTERRUPT AGAIN
185  06 000CD  E1           POP     H                       LOCATION FROM STACK TO MEM PTR
186  06 000CE  26FD         MVI     H,LS;ADDR               SEGWAY MEM PTR TO LS: TABLE
187  06 000D0  5E           MOV     E,M                     GET LS TIME-OUT ADDRESS
188  06 000D1  24           INR     H                       SEGWAY MEM PTR TO MS; TABLE
```

TABLE XI

```
189  06 00002  56           MOV    D,M              GET MS TIME-OUT ADDRESS
190  06 00003  45           MOV    B,L              LOCATION TO 'B' TEMPORARILY
191  06 00004  2A5FFD       LHLD   INPTR            STUFF TIME-OUT ADDRESS INTO
192  06 00007  73           MOV    M,E              INTO TABLE OF-TIME-OUT
193  06 00008  23           INX    H                ADDRESSES THAT IS CHECKED
194  06 00009  72           MOV    M,D              FOR ENTRIES EVRY 10 MSECONDS
195  06 0000A  23           INX    H                BY THE STATE CHECKER
196  06 0000B  70           MODBYT L,AND,TIME,MSK   FORCE A CIRCULAR TABLE
     06 0000C  E62F
197  06 0000E  6F           SHLD   INPTR            SAVE NEW ADDRESS LOCATION
198  06 0000F  225FFD       MOV    E,B              LOCATION BACK TO 'E'
199  06 000E2  58           CALL   DEACTIV          TAKE OUT OF ACTIVE TIMER LIST
200  06 000E3  CD0000       CALL   PUT              AND MAKE LOCATION AVAILABLE
201  06 000E6  CD0000                               * FLAG IS NOT SET S9
202  06 000E9  C3EE00                               LET INTERRUPTIONS OCCUR
203  06 000EC  FB           EI                      MAKE THE STACK RIGHT AND
204  06 000ED  E1           POP    H                FORCE NON-ZERO CONDITION TO
                            ENDIF                   STAY IN UNTIL LOOP
205  06 000EE  F601         MODBYT A,OR,1
206                         ENDIF                   ** NO MATCH - RTC COMPLETE
207  06 000F0  C2AD00       UNTIL: CC,Z,S           WILL FALL THROUGH THIS CRACK 208                                                 
209  06 000F3  E1           POP    H                RESTORE THE
210  06 000F4  44           MOV    B,H              'B' REGISTER
211  06 000F5  E1           POP    H                RESTORE H&L REGS
212  06 000F6  D1           POP    D                RESTORE D&E REGS
213  06 000F7  F1           POP    PSW              RESTORE A-REG & CONDITION CODES
214  06 000F8  C9           RET                     RETURN TO 'FLOAT' BACKGROUND
```

```
*************************************************************
* COMMON SWITCH SCAN SUBR. ENTER WITH SWITCH BYTE IN A-REG (FROM BIT OR BYTE *
* FILTERING SUBROUTINES), ADDR OF PRIOR SWITCH CONDITION BYTE IN MEMORY (H&L *
* REGS), AND E-REG SET TO SWITCH BYTE (AND 'CASE!' GROUP) NUMBER (5 TO 0).   *
*************************************************************

151  05 0007D  47           SWS@SCAN MOV   B,A                R= LATEST 'READ' DATA
152  05 0007E  7E                    MOV   A,M                A= PRIOR 'READ' DATA
153  05 0007F  70                    MOV   M,B                UPDATE 'PRIOR' TO 'LATEST'
154  05 00080  A8                    MODBYT A,XOR,B           A= 1 WHERE SWS JUST CHANGED
155  05 00081  A0            IF:     XAY,A,AND,B,NZ           WERE ANY SWS JUST PUSHED
     05 00082  CA5501
     05 00085  26FF 157                                                           
158  05 00087  24                    MVI   H,X'IFF'           YES, INIT BIT POSITION CNTR
159  05 00088  17           REPEAT   INR   H                  LOOP 'UNTIL' NO BITS= 1 IN BYTE
                                     RAL                      H= POSITION OF SW (D3 TO D7)
160                                                           PUT SW INFO INTO 'C' BIT
161  05 00089  D25101        IF:     CC,C,S
162  05 0008C  F5                    PUSH  PSW                HAS THIS SW JUST BEEN PUSHED
163  05 0008D  D5                    PUSH  D                  YES, SAVE REGS OVER 'CASE!'
164  05 0008E  E5                    PUSH  H
165  05 0008F  78                    MOV   A,E                RELOAD 'BYTE #' CNTR
166  05 00090  E61F                  ANI   X'IF'              ELIM.POSS.OF POSITIVE #
167  05 00092  07                    RLC                      MULTIPLE
168  05 00093  07                    RLC                      A-REG
169  05 00094  07                    RLC                      BY 8
170  05 00095  84                    CASE: XBYT,A,ADD,H       USE BYTE # & BIT # AS A PNTR
171  05 00096  114E01
```

```
                                ****************************************************
                                * ACTIVE SWITCHES FOR STAND-BY (NOT READY & READY STATES) *
                                ****************************************************
177   05 00099
178   05 0009B
179
180   05 0009E   0000              C,00    DIGIT@IN         DIGIT 1
181   05 000A0   0000              C,01    DIGIT@IN         DIGIT 2
182   05 000A2   0000              C,02    DIGIT@IN         DIGIT 3
183   05 000A4   0000              C,03    DIGIT@IN         DIGIT 4
184   05 000A6   0000              C,04    DIGIT@IN         DIGIT 5
185   05 000A8   0000              C,05    DIGIT@IN         DIGIT 6
186   05 000AA   0000              C,06    DIGIT@IN         DIGIT 7
187   05 000AC   0000              C,07    DIGIT@IN         DIGIT 8
188
189   05 000AE   0000              C,08    DIGIT@IN         DIGIT 9
190   05 000B0   0000              C,09    KYB@0O           DIGIT 0
191   05 000B2   0000              C,10    RECALL@          
192   05 000B4   9301              C,11    @CLEAR           CLEAR
193   05 000B6   9301              C,12    IMAGE@SFT        IMAGE SHIFT
194   05 000B8   9301              C,13    SPARE
195   05 000BA   0000              C,14    STRT@PRT         START PRINT
196   05 000BC   0000              C,15    ST@P@PRT         STOP PRINT
197
198   05 000BE   0000              C,16    VAR@DENS         VARIABLE DENSITY
199   05 000C0   0000              C,17    AX@TRAY          AUX TRAY
200   05 000C2   9301              C,18    SPARE
201   05 000C4   9301              C,19    SPARE
202   05 000C6   9301              C,20    SPARE
203   05 000C8   0000              C,21    PEC@ON           PASTE UP SUPPRESSION
204   05 000CA   0000              C,22    2SD@CPY          2 SIDED COPY
205   05 000CC   9301              C,23    SPARE
206
207   05 000CE   9401              C,24    RX
208   05 000D0   9401              C,25    RX
209   05 000D2   9401              C,26    RX
210   05 000D4   9401              C,27    RX
211   05 000D6   0000              C,28    98@REDN          98% REDUCTION
212   05 000D8   0000              C,29    74@REDN          74% REDUCTION
213   05 000DA   0000              C,30    65@REDN          65% REDUCTION
214   05 000DC   0000              C,31    RX@Z00M          RANK ZOOM LENS
215
216   05 000DE   0000              C,32    ADH@JREC         ADH JOB RECOVERY
217   05 000E0   0000              C,33    ADH@MULT         ADH MULTIPLE FEED
218   05 000E2   0000              C,34    ADH@SGNL         ADH SINGLE FEED
219   05 000E4   9401              C,35    RX
220   05 000E6   0000              C,36    SRT@JOBS         SORTER JOB SUPPLEMENT
221   05 000E8   0000              C,37    SRT@SETS         SORTER SETS
222   05 000EA   0000              C,38    SRT@STKS         SORTER STACKS
223   05 000EC   9301              C,39    SPARE
224
225   05 000EE   9301              C,40    SPARE
226   05 000F0   9301              C,41    SPARE
227   05 000F2   9301              C,42    SPARE
228   05 000F4   9301              C,43    SPARE
229   05 000F6   0000              C,44    SERVICE          TECH REP KEY SWITCH
230   05 000F8   0000              C,45    FAULT@CD         DISPLAY FAULT CODE
231   05 000FA   0000              C,46    LVDGNPRG         LEAVE DIAGNOSTIC PROGRAM
232   05 000FC   9301              C,47    SPARE
```

```
                *************************************************
                * ACTIVE SWITCHES FOR PRINT STATE *
                *************************************************
235  05 000FE 0000  N            C,48   RECALL@        RECALL QUANTITY
236  05 00100 0000  N            C,49   ADH@MUL        ADH MULTIPLE FEED
237  05 00102 0000  N            C,50   ADH@PSIN       ADH SINGLE FEED
238  05 00104 9301  N            C,51   SPARE
239  05 00106 0000  N            C,52   SMPL@CPY       SAMPLE COPY (START PRINT)
240  05 00108 0000  N            C,53   PRT@STOP       STOP PRINT
241  05 0010A 0000  N            C,54   CNTR@RST       DIAGNOSTIC COUNTER RESET
242  05 0010C 0000  N            C,55   AX@PRNT        AUX TRAY
243
244         *************************************************
245         * ACTIVE SWITCHES FOR TECH REP (NOT READY,READY STATES) *
246         *************************************************
247  05 0010E 0000  N            C,56   DIGIT@TR       DIGIT 1
248  05 00110 0000  N            C,57   DIGIT@TR       DIGIT 2
249  05 00112 0000  N            C,58   DIGIT@TR       DIGIT 3
250  05 00114 0000  N            C,59   DIGIT@TR       DIGIT 4
251  05 00116 0000  N            C,60   DIGIT@TR       DIGIT 5
252  05 00118 0000  N            C,61   DIGIT@TR       DIGIT 6
253  05 0011A 0000  N            C,62   DIGIT@TR       DIGIT 7
254  05 0011C 0000  N            C,63   DIGIT@TR       DIGIT 8
255  05 0011E 0000  N            C,64   DIGIT@TR       DIGIT 9
256  05 00120 0000  N            C,65   KYRD@OTR       DIGIT 0
257  05 00122 0000  N            C,66   DRECALL@
258  05 00124 0000  N            C,67   DCLEAR@
259  05 00126 0000  N            C,68   SERVICE        TECH REP KEY SWITCH
260  05 00128 0000  N            C,69   DIAG@PRG       DIAGNOSTIC PROGRAM
261  05 0012A 0000  N            C,70   STRT@DG        START PRINT
262  05 0012C 0000  N            C,71   STOP@DG        STOP PRINT
263
264         *************************************************
265         * ACTIVE SWITCHES FOR MINI PHYSICAL (NOT READY & READY STATE) *
266         *************************************************
267  05 0012E 0000  N            C,72   MINI@MIS       MISFEED CLEAR
268  05 00130 0000  N            C,73   RECALL@        RECALL QUANTITY
269  05 00132 9301  N            C,74   SPARE
270  05 00134 0000  N            C,75   FAULT@CD       DISPLAY FAULT CODE
271  05 00136 0000  N            C,76   LVDGNPRG       LEAVE DIAGNOSTIC PROGRAM
272  05 00138 0000  N            C,77   MINI@PRT       MINI PHYSICAL AT PRINT
273  05 0013A 0000  N            C,78   STOP@PRT       STOP PRINT
274  05 0013C 0000  N            C,79   ADH@JREC       ADH JOB RECOVERY
275
276         *************************************************
277         * ACTIVE SWITCHES FOR MINI PHYSICAL (PRINT STATE & RUNNNT PRINT STATE) *
278         *************************************************
279  05 0013E 9301  N            C,80   SPARE
280  05 00140 9301  N            C,81   SPARE
281  05 00142 0000  N            C,82   RECALL@        RECALL QUANTITY
282  05 00144 9301  N            C,83   SPARE
283  05 00146 9301  N            C,84   SPARE
284  05 00148 9301  N            C,85   SPARE
285  05 0014A 9301  N            C,86   SPARE
286  05 0014C 0000  N            C,87   PRT@STOP       STOP PRINT
287                              ENDCASE
288  05 0014E E1    A            POP    H              RESTORE
289  05 0014F D1    A            POP    D
290  05 00150 F1    A            POP    PSW                SAVED REGS
291                              ENDIF
292  05 00151 B7    A N          UNTILI XBYT,A,OR,A,Z     END WHEN NO BITS IN THIS BYTE
     05 00152 C28700
293                              ENDIF
294  05 00155 C9    A            RET                       RETURN TO STDBY OR PRINT BKGND
```

TABLE XII

```
                                * ROUTINE CALLED BY SWITCH SCAN WHEN DIAGNOSTIC PROGRAM BUTTON IS PUSHED
                                * IN NON TECH REP STATES
328
329
330
331
332  05 001F4  3A4EFA    N   LVDGNPRG IF:    VBYT,DGN@NUM,NZ         IS THERE AN ACTIVE DGN PROGRAM
     05 001F7  A7        A
     05 001F8  CA0102    N
333  05 001FB  CD2703    N            CALL   DGN@ABT                 ABORT OPERATING DGN PRG
334  05 001FE  C30602    N        ELSE:
335  05 0201   3E80      N            SFLG   SER@ACT                 SIGNAL STCK TO GO TO TECH-REP
     05 0203   3249F4    A
336                                   ENDIF
337  05 00206  C9        A            RET
338
339                             * ROUTINE CALLED WHEN SERVICE KEY IS TURNED :ON:
340
341  05 00207  CD0000    N   SERVICE  STIMR  KEY@REL,250,KEY@OFF     LOOK FOR KEY RELEASE
     05 0020A  45        A
     05 0020B  19        N
     05 0020C  2A02      N
342  05 0020E  3A1BF4    N            IF:    FLG,DGN@ERR,T           IS THERE ERROR PENDING
     05 00211  07        A
     05 00212  D22902    N
343  05 00215  3A4EFA    N            ANDIF: VBYT,DGN@NUM,Z          WAS IT A PROGRAM # ENTRY ERROR
     05 00218  A7        A
     05 00219  C22902    N
344  05 0021C  3A4FFA    N            LDA    DG@SAV                  PUT DISPLAY BACK
345  05 0021F  326DFC    N            STA    DG@DIGIT                CANCEL ERROR
346  05 00222  AF        A            CFLG   DGN@ERR
     05 00223  321BF4    N
347  05 00226  CD4101    N            CALL   DIAG@PRG                GIVE NUMBER RETRY FOR VALID
                                                                     ENTRY
348
349                                   ENDIF
350  05 00229  C9        A            RET
351
352                             * ROUTINE CALLED TO LOOK FOR KEY TURN OFF
353
354  05 0022A  2E2B      A   KEY@OFF  IF:    1BIT,SERVICE#,T
     05 0022C  CD0000    N
     05 0022F  D23C02    N
355  05 00232  CD0000    N            STIMR  KEY@REL,250,KEY@OFF     KEY STILL ON
     05 00235  45        A
     05 00236  19        N
     05 00237  2A02      N
356  05 00239  C35E02    N        @RIF: VBYT,DGN@NUM,NZ              IS DGN PROGRAM ACTIVE
     05 0023C  3A4EFA    N
     05 0023F  A7        A
357  05 00240  CA5E02    N            CALL   NVT@@CK
358  05 00243  CD7103    N            IF:    CC,Z,C                  CLEAR IF NOT DISCLOSED
359  05 00246  CA5E02    N                   XBYT,STATE:,LT,:PRNT    IS IT A RUNNING STATE
     05 00249  3A53FD    N
     05 0024C  FE04      N
360  05 0024E  D25702    N            CALL   DGN@ABT                 YES ABORT DIAGNOSTIC PROGRAM
361  05 00251  CD2703    N        ELSE:
362  05 00254  C35E02    N            STIMR  KEY@REL,250,KEY@OFF     KEEP LOOKING AT KEY RELEASE
     05 00257  CD0000    N
     05 0025A  45        A
```

TABLE XIII

```
363      05 0025C  2A02       N                                    UNTIL MACHINE STOPS
364                                      ENDIF
365                                     ENDIF
366      05 0025E  C9         A         RET
367
368      *                              ROUTINE CALLED IN TECH-REP STATE PROLOGUE
369      *
370      *
371      05 0025F  CDCB02     N  DGNPRL CALL    DSPLBDC            PUT DC-- IN DISPLAY
372      05 00262  3E80       A         SFLG    DSPLBDGN           USE DIAGNOSTIC DISPLAY
373      05 00264  321FF4     N         LDA     PREVBIN+1
374      05 00267  3A63FC     A         ORI     X'04'              INHIBIT IMMEDIATE CALL TO
375      05 0026A  F604       N         STA     PREVBIN+1          DIAGBPRG
376      05 0026C  3263FC     A         RET
377      05 0026F  C9         A

272      *
273      *                              ROUTINE CALLED BY SWITCH SCAN WHEN DIAGNOSTIC PROGRAM BUTTON IS PUSHED
274      *                              IN TECH REP STATE ONLY
275      *
276      *
277      05 00141  3A4EFA     N  DIAGBPRG IFI   VBYT,DGNBNUM,NZ    IS DGN PROGRAM ACTIVE
         05 00144  A7         A
278      05 00145  CA7A01     Z         IFI     XBYT,STATE1,EQ,ICOMP   IS IT COMP CTRL STATE
         05 00148  3A53FD     N
         05 0014B  FE00       A
279      05 0014D  C25601     Z         CALL    COMPICHG           TELL STATE CK TO GO TO TRP
280      05 00150  CD0000     Z         ELSE!
281      05 00153  C37701     Z         CALL    DSPLBTIM
         05 00156  CD0000     Z
282      05 00159  4A         A         XRA     A                  CLEAR DIAG PRG 20,21,22 TIMER
283      05 0015A  AF         A         STA     FALTBPTR
284      05 0015B  326EFB     N         IF1     XBYT,DGNBNUM,NE,DGNPRG29 DIAG 29 NOT ACTIVE  SET UP FOR RESTART OF PRG. 20
         05 0015E  3A4EFA     N
         05 00161  FE10       A
285      05 00163  CA7101     Z         ANDIF!  XBYT,DGNBNUM,NE,DGNPRG28 DIAG 28 NOT ACTIVE
         05 00166  3A4EFA     N
         05 00169  FE0F       A
286      05 0016B  CA7101     Z         ELSE!
287      05 0016E  C37401     Z         CALL    ADH29EPL           CLEAN UP OPERATING ADH DIAGNOST
288      05 00171  CD0000     Z                                    ABORT ADH SKEW TEST
289                                     ENDIF
290      05 00174  CDCB02     N         CALL    DSPLBDC            PUT DC-- IN DISPLAY
291                          Z         BRIF!    FLG,DGNBERR,T      IF ERROR IS PENDING
         05 00177  C3F301     Z
         05 0017A  3A1BF4     N
         05 0017D  07         A
292      05 0017E  D28701     Z         CALL    DSPLBDC            PUT DC-- IN DISPLAY
293      05 00181  CDCB02     N         BRIF!    XWRD,DGNBDSPL,EQ,X'DC00'
         05 00184  C3F301     Z
         05 00187  1100DC     N
         05 0018A  2A6BFC     N
         05 0018D  CD0000     Z
294      05 00190  C29A01     Z         CFLG    SERBACT            EXIT TECH REP STATE
         05 00193  AF         A
         05 00194  3249F4     N
295      05 00197  C3F301     Z         ELSE!
```

```
296  05 0019A   2600      A    MVI     H,0                        CONVERT TO BINARY
297  05 0019C   CD0000    N    CALL    4BCDIBIN
298  05 0019F   7D        A    IFI     XBYT,L,GE,LSTDKEY+1
     05 001A0   FE25      A
     05 001A2   DAA801    N
299  05 001A5   C3C101    N    ORIFI   XBYT,A,LT,1STDKEY
     05 001A8   FE0A      A
     05 001AA   D2E101    N
300  05 001AD   3F        A    CMC
301  05 001AE   C3C101    N    ORIFI   XBYT,A,GE,1STDKEY
     05 001B1   FE14      A
     05 001B3   DABC01    N
302  05 001B6   D604      A    SUI     1STDKEY-LSTDKEY+1
303  05 001B8   3F        A    CMC
304  05 001B9   C3C101    N    ORIFI   XBYT,A,GE,LSTDKEY+1
     05 001BC   FE10      A
305                            ENDIF
306  05 001C1   0ACA01    N    IFI     CC,C,C
307  05 001C4   CDAE02    N    CALL    DSPLBERR                   BAD ENTRY BLINK DISPLAY
308  05 001C7   C3F301    N    ELSEI
309  05 001CA   D609      A    SUI     9
310  05 001CC   47        A    MOV     B,A
311  05 001CD   CD7103    N    CALL    NVTBDCK                    IS THIS ENTRY DISCLOSED YET
312  05 001D0   CAE101    N    IFI     CC,Z,C                     CLEAR IF NOT DISCLOSED
313  05 001D3   2E2B      A    ANDIFI  1BIT,SERVICE#,F
     05 001D5   CD0000    N
314  05 001D8   DAE101    N    CALL    DSPLBERR                   NO,SHOW ERROR
315  05 001DB   CDAE02    N    ELSEI
316  05 001DE   C3F301    N    MOV     A,B
317  05 001E1   78        A    STA     DGNDNUM                    USE NEW PROGRAM NUMBER
318  05 001E2   324EFA    N    CALL    DSPLDCLR                   BLANK THE DISPLAY
319  05 001E5   CDEE02    N    SFBIT,P BNDDIAG
     05 001E8   2121FC    N
     05 001EB   3E02      A
     05 001ED   86        A
320  05 001EE   77        A    XRA     A
321  05 001EF   AF        A    STA     FALTDPTR                   CAUSES IFCI TO BE DISP PRO 20
322  05 001F0   326EFB    N                                       TO INDICATE PROGRAM ACTIVE
323                            ENDIF
324                            ENDIF
325                            ENDIF
326  05 001F3   C9        A    RET
```

TABLE XIV

```
                                ROUTINE TO DETERMINE IF DIAGNOSTIC PROGRAM HAS BEEN DISCLOSED BY
                                THE TECH-REP BY SEARCHING NV BYTE FOR ENABLE
473
474
475
476
477  05 00371   FE06      A    NVTBDCK IFI     XBYT,A,LE,LSTDKEY-1STDKEY+1 IS IT DISCLOSURE RANGE
     05 00373   DA7903    N
     05 00376   C28503    N
478  05 00379   CD8603    N    CALL    NVDMASK                    BUILD MASK BASED ON A REG
479  05 0037C   E5        A    PUSH    H                          SAVE MASK
480  05 0037D   CD0000    N    RNVBYT  TRPBDSCL                   GET DISCLOSED INFO
     05 00380   5F        A
     05 00381   E3        A
```

```
481  05 00382  E1           A           POP    H
482  05 00383  A4           A           MODBYT A,AND,H
483  05 00384  94           A           MODBYT A,SUB,H
484                                     ENDIF
485                         ;
486                         ; ZERO CC IS CLEARED IF PROGRAM IS NOT DISCLOSED
487                         ;
488  05 00385  C9           A           RET
```

TABLE XV

```
                                ;
                                ; PROGRESSIVE DISCLOSURE DIAGNOSTIC PROGRAM USED BY THE TECH-REP
                                ; TO GIVE ADVANCED OPERATORS ADDITIONAL DIAGNOSTIC CAPABILITY
                                ;
1240 05 00971 2A68FC    N  VALID@33 LHLD   DGN@DSPL            WHAT IS IN DISPLAY
1241 05 00974 7C        A           IF:    VBYT,H,Z            IS DISPLAY GT 99
     05 00975 A7        A
1242 05 00976 C29A09    N    ANDIFI     XBYT,L,GE,1ST@NKEY+6
     05 00979 7D        A
     05 0097A FE10      A
     05 0097C DA9A09    N
1243 05 0097F FE16      A    ANDIFI     XBYT,A,LT,LST@NKEY+7
     05 00981 D29A09    N
1244 05 00984 D60F      A             SUI    15                CONVERT TO BINARY AND SUB 9
1245 05 00986 47        A             MOV    B,A
1246 05 00987 CD8603    N             CALL   NV@MASK           BUILD MASK FOR ENABLING
1247 05 0098A E5        A             PUSH   H                 OR DISABLING REQUESTED PRG
1248 05 0098B CD0000    N             RNV8YT TRP@DSCL
1249 05 0098E 5F        A             POP    H                 H HAS MASK
1250 05 0098F E3        A             MOV    L,A
1251 05 00990 E1        A             XRA    A
1252 05 00991 6F        A             DCR    A
1253 05 00992 AF        A             MOD    KYBD5INH          CLEAR ZERO CONDITION CODE
     05 00993 3D        A                    MODFLG            INHIBIT KEYBOARD ENTRY
     05 00994 3234F4    N
1254 05 00997 C39E09    N    ELSE:  CALL   DSPL@ERR            BAD NUMBER BLINK DISPLAY
1255 05 0099A CDAE02    N           XRA    A                   SET ZERO CONDITION CODE
1256 05 0099D AF        A
1257                         ENDIF
1258                         RET
1259                  ;
1260                  ; PROGRESSIVE DISCLOSURE BACKGROUND PROGRAM
1261                  ;
1262 05 0099E C9       A  DGN@T@33 IF:  FLG,RCALL@DG,T          IS RECALL REQUESTED
1263 05 0099F 3A2AF4   N            CALL    VALID@33
     05 009A2 07       A            IF:     CC,Z,C             CLEAR IF GOOD NUMBER
     05 009A3 D2D109   N                    IBIT,RECALL#,T
1264 05 009A6 CD7109   N
1265 05 009A9 CACE09   N
     05 009AC 2E00     A
     05 009AE CD0000   N
     05 009B1 D2CB09   N
1266 05 009B4 78       A             MOV    A,B
1267 05 009B5 CD7103   N             CALL   NVT@CK              CHECK IF IN TABLE
1268 05 009B8 C2C309   N             IF:    CC,Z,S              SET IF IN TABLE
1269 05 009BB CD0000   N                    S@BIT,S  READY,     TURN ON READY LIGHT
1270 05 009BE E701     A             ELSE:
1271 05 009C0 C3C809   N                    S@BIT,S  JMP$ICMP  TURN ON JOB INCOMPLETE
     05 009C3 CD0000   N
```

```
                                    FNDIF
1272  05 009C6  F4C1                ELSE1
1273  05 009C8  C3EE09                    CALL      NA&DGN
1274  05 009CB  CD6F00                                                  TURN OFF READY LIGHT CLR RECALL
1275                                 ENDIF                              FLAG
1276                                 ENDIF
1277                           ORIF:                                    IS START PRINT PUSHED
1278  05 009CE  C3000A              CALL      FLG,STRT@DGN,T
      05 009D1  3A3FF4
      05 009D4  07
1279  05 009D5  D2F009              CALL      VALID@33
1280  05 009D8  C07109        IFI       CC,Z,C                         CLEAR IF GOOD NUMBER
1281  05 009DB  CAED09                MOV       A,L
      05 009DE  7D                   BRA       H                        PUT NEWLY DISCLOSED PROGRAM
1282  05 009DF  84                   WNVBYT    TRP@DSCL                 IN NV TABLE
1283  05 009E0  325EE3
      05 009E3  0F
      05 009E4  0F
      05 009E5  0F
      05 009E6  0F
1284  05 009E7  325FE3              ENDIF
1285  05 009EA  CDEE02              CALL      DSPL@CLR                 BUTTON PUSHED CLEAR DISPLAY
1286                           ORIF:                                    IS STOP PRINT PUSHED
      05 009ED  C3000A              CALL      FLG,STOP@DGN,T
      05 009F0  3A33F4
      05 009F3  07
1287  05 009F4  D2DD0A              CALL      VALID@33
1288  05 009F7  C07109        IFI       CC,Z,C                         CLEAR IF GOOD NUMBER
1289  05 009FA  CA0D0A                MOV       A,H
      05 009FD  7C                   CHA       L                        PUT MASK IN A
1290  05 009FE  2F                   ANA                                BUILD CANCEL MASK
1291  05 009FF  A5                   WNVBYT    TRP@DSCL                 CANCEL PROGRAM FROM TABLE
1292  05 00A00  325EE3
      05 00A03  0F
      05 00A04  0F
      05 00A05  0F
      05 00A06  0F
1293  05 00A07  325FE3              ENDIF
1294  05 00A0A  CDEE02              CALL      DSPL@CLR                 BUTTON PUSHED CLEAR DISPLAY
1295                                 ENDIF
1296  05 00A0D  CD9100              CALL      CLR@CK
1297  05 00A10  C9                  RET
```

TABLE XVI

```
************************************************************************
* TECH REP DIGIT INPUT ROUTINE IS CALLED BY SWITCH SCAN IN THE TECH REP STATE *
* WHEN A NUMERIC KEY IS PUSHED ON THE PROGRAMMER KEYBOARD. THIS ROUTINE LOADS *
* A NUMBER INTO DGN@DSPL WORD                                            *
************************************************************************

231                           DIGIT@TR  RRC                             RECOVER NUMBER FROM SWITCH SCAN
232  05 000F1  0F                    SUI       55
233  05 000F2  D637                  MOV       E,A
234  05 000F5  5F                    MVI       D,0
235                                  IFI       FLG,KYBD5INH,F          IS THE ENTRY INHIBITED
237  05 000F7  1600
238  05 000F9  3A34F4
239                                  
240  05 000FA  07
241  05 000FB  DA0001
```

| | | | | | | |
|---|---|---|---|---|---|---|
| 242 | 05 00FE | 2A6BFC | N | LHLD | DGN0DSPL | | GET PREVIOUS VALUE |
| 243 | 05 0101 | 7C | A | MOV | A,H | |
| 244 | 05 0102 | 29 | A | DAD | H | |
| 245 | 05 0103 | 29 | A | DAD | H | | MULTIPLY PREVIOUS VALUE BY 10 |
| 246 | 05 0104 | 29 | A | DAD | H | |
| 247 | 05 0105 | 29 | A | DAD | H | |
| 248 | 05 0106 | 19 | A | DAD | D | | MERGE NEW UNITS DIGIT |
| 249 | 05 0107 | FEDC | N | IFI | XBYT,A,NE,X'DC' | | IS IT DIAGNOSTIC PROGRAM ENTRY |
| 250 | 05 0109 | CA2301 | N | | | | NO-IS IT PROG 20 OR 22 ENTRY |
|     | 05 010C | FEFC | N | ANDIFI | XBYT,A,NE,X'FC' | |
| 251 | 05 010E | CA2301 | N | | CALL | DIG0FIX | NO-JUST PLAIN OLD ENTRY |
| 252 | 05 0111 | CD0000 | N | | MOV | B,A | SAVE DIGIT FIX RESULT |
| 253 | 05 0114 | 47 | A | | IFI | XBYT,A,EQ,X'0F' | IS DISPLAY FULL |
| 254 | 05 0115 | FE0F | N | | | SFLG | KYBD5INH | INHIBIT FURTHER ENTRY |
|     | 05 0117 | C21F01 | N | | | | |
|     | 05 011A | 3E80 | N | | | | |
|     | 05 011C | 3234F4 | A | | | | |
| 255 | 05 011F | 78 | A | ENDIF | | | |
| 256 | 05 0120 | C33601 | N | ELSEI | MOV | A,B | |
| 257 | 05 0123 | 67 | A | | MOV | H,A | PUT BACK 'DC' OR 'FC' |
| 258 | 05 0124 | 7D | A | | IFI | XBYT,L,GE,X'10' | |
| 259 | 05 0125 | FE10 | N | | | | |
| 260 | 05 0127 | DA3401 | N | | | SFLG | KYBD5INH | INHIBIT FURTHER ENTRY |
|     | 05 012A | 3E80 | N | | | | |
|     | 05 012C | 3234F4 | A | | MVI | A,X'0F' | ALL DIGITS ON |
| 261 | 05 012F | 3E0F | N | ELSEI | | | |
| 262 | 05 0131 | C33601 | N | | MVI | A,X'0D' | TENS DIGIT BLANK |
| 263 | 05 0134 | 3E0D | N | | | | |
| 264 |         |        |   | ENDIF | | | |
| 265 |         |        |   |       | SHLD | DGN0DSPL | UPDATE MEMORY |
| 266 | 05 0136 | 226BFC | N | | STA | DG0DIGIT | UPDATE MEMORY |
| 267 | 05 0139 | 326DFC | N | | CFLG | DSPL0IST | UPDATE DISPLAY |
| 268 | 05 013C | AF     | A | | | | |
|     | 05 013D | 329AF4 | N | | | | |
| 269 |         |        |   | ENDIF | | | |
| 270 | 05 0140 | C9     | A | RET   | | | |

TABLE XVII

| | | | | | | |
|---|---|---|---|---|---|---|
| 502 | 05 02CF | 3A34F4 | A | DGN0T013 IFI | FLG,KYBD5INH,F | 1ST TIME FOR DIAG #13 |
|     | 05 02D2 | 07 | A | | | |
|     | 05 02D3 | DAE302 | N | | | |
| 503 | 05 02D6 | 3E80 | N | | SFLG | KYBD5INH | SET ONE TIME(INHIBIT KEYBOARD) |
|     | 05 02D8 | 3234F4 | A | | | |
| 504 | 05 02DB | 3E01 | N | | MVI | A,1 | INITIALIZE PNTR TO LAST GAP TIM |
| 505 | 05 02DD | 3283FA | N | | STA | OUTPNTR | DISPLAY SELECT SWITCH PUSHED |
| 506 | 05 02E0 | C30B03 | N | | ORIFI | FLG,RCALL0DG,T | |
|     | 05 02E3 | 3A2AF4 | A | | | |
|     | 05 02E6 | 07 | A | | | |
| 507 | 05 02E7 | D2F602 | N | | CFLG | RCALL0DG | ACKNOWLEDGE PUSH |
|     | 05 02EA | AF | A | | | |
| 508 | 05 02EB | 322AF4 | N | | MVI | A,TABLNGTH | FETCH TABLE SIZE |
| 509 | 05 02EE | 3E09 | N | | CALL | ADH0DINC | UPDATE DISPLAY |
| 510 | 05 02F0 | CD1E03 | N | | ORIFI | FLG,STRT0DGN,T | START PRINT PUSHED |
|     | 05 02F3 | C30B03 | N | | | |
|     | 05 02F6 | 3A3FF4 | A | | | |
|     | 05 02F9 | 07 | A | | | |
|     | 05 02FA | D20803 | N | | | |

```
511  05 002FD  AF                       CFLG  STPT@DGN              ACKNOWLEDGE PUSH
512  05 002FE  323EF6        A                LDA   OUTPNTR         FETCH CURRENT GAP TIME IDENTIFI
513  05 00301  3A83FA        N                DCR   A               MOV ID TO NEXT GAP TIME PAIR
514  05 00304  3D            A                IF!   CC,Z,C          NOT AT LAST GAP TIME
515  05 00305  CA0R03        N                      CALL  ADH@DINC  UPDATE DISPLAY
516  05 00308  CD1E03        N                ENDIF
517                                           ENDIF
518  05 0030B  C9            A                RET
```

TABLE XVIII

```
521                              * THE FOLLOWING TABLE DEFINES THE DISPLAYED GAP TIMES
522                              *   THE GAP TIME IS DEFINED AS:
523                              *     (ARGUMENT(2)-ARGUMENT(1))X10MS
524                              * NOTE:CODE GENERATED IS NOT NECESSARILY IN
525                              *       THE SAME ORDER AS THE ARGUMENTS*
526                              *       (SEE @RDITBL PROC DEFINITION)
527
528
530                  ADH@ROMT,TAB@2 @RDITBL  ADH@CPDC,ADHRL3DC,;    1ST GAP TIME
531  05 0030C  CA  A                         ADH@L3DC,ADH@L4DC,;    2ND GAP TIME
532  05 0030D  C8  A                         ADHRT3DC,ADHRT3DC,;    3RD GAP TIME
533  05 0030E  C7  A                         ADHRT3PC,ADH@T4DC,;    4TH GAP TIME
534  05 0030F  C6  A                         ADH@SFCC,ADH@FL3DC,;   5TH GAP TIME
535  05 00310  C3  A                         ADH@FL3DC,ADH@T2DC,;   6TH GAP TIME
536  05 00311  C2  A                         ADH@T2DC,ADHFT3DC,;    7TH GAP TIME
537  05 00312  C1  A                         ADH@T1DC,ADH@L1DC,;    8TH GAP TIME
538  05 00313  C0  A                         ADH@SFDC,ADH@L2DC      9TH GAP TIME
     05 00314  C4  A
     05 00315  CB  A
     05 00316  C6  A
     05 00317  C5  A
     05 00318  C4  A
     05 00319  C2  A
     05 0031A  C1  A
     05 0031B  C0  A
     05 0031C  AF  A
     05 0031D                                
```

TABLE XIX

| | | | | | | |
|---|---|---|---|---|---|---|
| 540 | 05 0031E | 3283FA | N | ADH@INC STA | OUTPNTR | UPDATE IDENTIFIER |
| 541 | 05 00321 | CD0000 | N | CALL | DSPL@TIM,510,ADH@DSPL | UPDATE DISPLAY IN .5SEC |
| | 05 00324 | 4A | | | | |
| | 05 00325 | 33 | | | | |
| 542 | 05 00326 | 3103 | N | STIMR | | |
| 543 | 05 00328 | CD0000 | N | CALL | DSPL&CLR | BLANK THE DISPLAY |
| | 05 0032B | 3E80 | | SFLG | KYBD5INH | RE-INHIBIT KEYBOARD |
| 544 | 05 0032D | 3234F4 | A | | | |
| | 05 00330 | C9 | | RET | | |
| 546 | 05 00331 | 3A83FA | N | ADH@DSPL LDA | OUTPNTR | FETCH IDENTIFIER |
| 547 | 05 00334 | 2A78FB | N | LHLD | TAB@STRT | SET PNTR TO START OF CONTROL TA |
| 548 | | | | | | (MINUS ONE) |
| 549 | 05 00337 | 1600 | A | MVI | D,0 | |
| 550 | 05 00339 | 5F | A | MOV | E,A | SET PAIR TO ID OFFSET |
| 551 | 05 0033A | 19 | A | DAD | D | OFFSET PNTR TO CURRENT ID |
| 552 | 05 0033B | 46 | A | MOV | B,H | SAV PRIOR DIAG CNTR OFFSET |
| 553 | 05 0033C | 1E09 | A | MVI | E,TABLNGTH | |
| 554 | 05 0033E | 19 | A | DAD | D | MOV PNTR TO 2ND PART OF CONTROL |
| 555 | 05 0033F | 6E | A | MOV | L,M | FETCH SUBSEQUENT DIAG CNTR OFFS |
| 556 | 05 00340 | 26FC | A | MVI | H,H@ADDR | MOV PNTR TO SUBSEQUENT DIAG CNT |
| 557 | 05 00342 | 7E | A | MOV | A,M | FETCH SUBSEQUENT DC TIME |
| 558 | 05 00343 | 68 | A | MOV | L,B | MOV PNTR TO PRIOR DIAG CNTR |
| 559 | 05 00344 | 96 | A | SUB | M | CALCULATE GAP TIME |
| 560 | 05 00345 | CD0000 | N | CALL | BINRIBCD | CONVERT TO BCD |
| 561 | 05 00348 | 29 | A | DAD | H | |
| 562 | 05 00349 | 29 | A | DAD | H | ADD TRAILING ZERO(MULTIPLY BY T |
| 563 | 05 0034A | 29 | A | DAD | H | |
| 564 | 05 0034B | 29 | A | DAD | H | |
| 565 | 05 0034C | CD0000 | N | CALL | DSPL@HL | PUT GAP TIME IN DISPLAY |
| 566 | 05 0034F | 216DFC | A | LXI | H,DG@DIGIT | SET PNTR TO DIGIT DISPLAY ENABL |
| 567 | 05 00352 | 3E01 | A | MVI | A,00 | |
| 568 | 05 00354 | B6 | A | ORA | M | ENABLE ZERO GAP TIME |
| 569 | 05 00355 | 77 | A | MOV | M,A | |
| 570 | 05 00356 | C9 | A | RET | | |

TABLE XX

| | | | | | | |
|---|---|---|---|---|---|---|
| 423 | 05 001CE | 3A3EF4 | A | DGN@T@28 IF: | FLG,STPT@DGN,T | START PRINT PUSHED |
| | 05 001D1 | 07 | A | | | |
| | 05 001D2 | D21502 | N | | | |
| 424 | 05 001D5 | AF | A | | CFLG | STPT@DGN | ACKNOWLEDGE PUSH |
| 425 | 05 001D6 | 323EF4 | A | IF: | FLG,ADDR@ACT,T | ADH CLEARED |
| | 05 001D9 | 3A05F4 | A | | | |
| | 05 001DC | 07 | A | | | |
| | 05 001DD | D21202 | N | | | |
| 426 | 05 001E0 | 3A08F4 | A | ANDIF: | FLG,ADH@MSEL,T | RE-SELECTED |
| | 05 001E3 | 07 | A | | | |
| 427 | 05 001E4 | D21202 | N | ANDIF: | FLG,ADH@NMOV,T | AND READY |
| | 05 001E7 | 3A8AF7 | A | | | |
| | 05 001EA | 07 | A | | | |
| | 05 001EB | D21202 | N | | | |
| 428 | 05 001EE | AF | A | | CFLG | ADDR@ACT | RESET SEQUENCE |
| | 05 001EF | 3205F4 | A | | | |

```
429   05 001F2  2F                    CMA                              INHIBIT KEYBOARD
430   05 001F3  3234F4        A       MODFLG  KYRDSINH                 FETCH GAP TIME IDENTIFIER
431   05 001F6  2A6AFC        N       LHLD    DGN@DSPL
432   05 001F9  7C            A       IFI     VBYT,H,Z
      05 001FA  A7            N
433   05 001FB  C20F02        N       ANDIF   XBYT,LT,TABLNGTH+1       IDENTIFIER IN RANGE
      05 001FE  70            A
      05 001FF  FE0A          N
434   05 00201  D20F02        N       STA     OUTPNTR                  SAV IDENTIFIER OFFSET
435   05 00204  3283FA        A       MVI     A,X'FF'                  FETCH 'SET' MASK
436   05 00207  3EFF          N       CALL    CYCLSTRT                 START ADH RECYCLING
437   05 00209  CDR602        N       CALL                             IDENTIFIER OUT OF RANGE
438   05 0020C  CD1202        N       ELSE:
439   05 0020F  CD0000        N       CALL    DSPL@ERR
440                                   ENDIF
441                           N       ORIF!   FLG,STOP@DGN,T           STOP PRINT PUSHED
442   05 00212  C38502        N
      05 00215  3A33F4        A
      05 00218  07            N
443   05 00219  C22002        N       CFLG    STOP@DGN                 ACKNOWLEDGE PUSH
      05 0021C  AF            A
444   05 0021D  3233F4        A       CMA
445   05 00220  2F            N       MODFLG  ADDR@ACT                 INDICATE ADH CLEARED
446   05 00221  3205F4        A       CALL    ADH@CLR                  ABORT(CLEAR) ADH
      05 00224  CDCD00        N       CALL    DSPL@CLR                 CLEAR DISPLAY
447   05 00227  CD0000        N       CALL    FLG,CLR@DGN,T            CLEAR SWITCH PUSHED
      05 0022A  C38502        N       ORIF!
      05 0022D  3A16F4        A
      05 00230  07            N
448   05 00231  D23E02        N       CFLG    CLR@DGN
      05 00234  AF            A
449   05 00235  3216F4        A       CALL    ADH@MULT                 SELECT ADH
450   05 00238  CD9D00        N       ORIF!   FLG,RCALL@DG,T           DISPLAY SELECT PUSHED
      05 0023B  C38502        N
      05 0023E  3A2AF4        A
      05 00241  07            N
451   05 00242  D25902        N       CFLG    RCALL@DG                 ACKNOWLEDGE PUSH
      05 00245  AF            A
452   05 00246  2F            N       CMA
453   05 00247  3234F4        A       MODFLG  KYRDSINH                 INHIBIT THE KEYBOARD
454   05 0024A  3A83FA        A       LDA     OUTPNTR                  FETCH LAST IDENTIFIER
455   05 0024D  2600          N       MVI     H,0
456   05 00250  6F            A       MOV     L,A
457   05 00251  CD0000        N       CALL    DSPL@HL                  DISPLAY LAST IDENTIFIER
458   05 00254  C38502        N       ELSE:   LMP@UPDT                 NO BUTTONS PUSHED
      05 00257  CD9602        N       CALL    FLG,ADH@JOBR,T           UPDATE JOB$,ICMP & READY$ LAMPS
459   05 0025A  3A07F4        A       IFI                              ADH CYCLE STARTED
460   05 0025D  07            N
461   05 00260  D28502        N       LDA     OUTPNTR                  FETCH CURRENT IDENTIFIER
      05 00263  3A83FA        A
462   05 00266  3D            N       DCR     A
463   05 00267  FA8502        A       IFI     CC,S,C                   ID NOT ZERO
464   05 0026A  2A78FB        N       LHLD    TAB@STRT                 FETCH START OF CONTROL TABLE
465   05 0026D  111200        N       LXI     D,TABLNGTH*2             SET OFFSET TO END OF CONTROL TA
466   05 00270  47            A       MOV     B,A                      SAV ID OFFSET
467   05 00271  7B            A       MOV     A,E                      MOV OFFSET TO SUBSEQUENT DIAGNO
468   05 00272  90            N       SUB     B                        COUNTER OF CURRENT GAP TIME PA
469   05 00273  5F            A       MOV     E,A
470   05 00274  19            N       DAD     D                        MOV PNTR TO SUBSEQUENT CNTR IN
471   05 00275  6E            A       MOV     L,M                      SET PNTR TO ACTUAL
472   05 00276  26FC          A       MVI     H,H$ADDR                 SUBSEQUENT COUNTER
```

TABLE XXI

| | | | | | | | |
|---|---|---|---|---|---|---|---|
| 473 | 05 00278 | 3A84FA | N | | LDA | ADH@DGNL | | FETCH LAST VALUE OF COUNTER |
| 474 | 05 00278 | BE | A | | IF! | XBYT,A,NE,M | | HAS THERE BEEN A CHANGE |
| 475 | 05 0027C | CA8502 | N | | | | | SAV NEW COUNTER VALUE |
| 476 | 05 0027F | 3284FA | N | | STA | ADH@DGNL | | CALC & DISPLAY NEW GAP TIME |
| 477 | 05 00282 | CD3103 | N | | CALL | ADH@DSPL | | |
| 478 | | | | | ENDIF | | | |
| 479 | | | | | ENDIF | | | |
| 480 | | | | | ENDIF | | | |
| 481 | 05 00285 | C9 | A | | RET | | | |

| | | | | | | | |
|---|---|---|---|---|---|---|---|
| 385 | 05 0015F | 3A3EF4 | A | DGN@T@29 IF! | FLG,STRT@DGN,T | | | START PRINT PUSHED |
| 386 | 05 00162 | 07 | A | | | | | |
| 387 | 05 00163 | D2A101 | N | | | | | ACKNOWLEDGE PUSH |
| 388 | 05 00166 | AF | A | | CFLG | STRTDGN | | |
| | 05 00167 | 323EF4 | N | | IF! | FLG,ADDR@ACT,T | | ADH READY TO START (SELECTED) |
| | 05 0016A | 3A05F4 | A | | | | | |
| | 05 0016D | 07 | A | | | | | |
| | 05 0016E | D29E01 | N | | ANDIF! | FLG,ADH@NH@V,T | | AND NO JAM PENDING |
| | 05 00171 | 3A8BF7 | A | | | | | |
| | 05 00174 | 07 | A | | | | | |
| 389 | 05 00175 | D29E01 | N | | CFLG | ADDR@ACT | | CLEAR READY TILL NEXT SEQUENCE |
| | 05 00178 | AF | A | | | | | |
| 390 | 05 00179 | 3205F4 | N | | LXIFLG | D,ADH@29@1 | | SET PNTR TO 1ST HLT FLAG |
| 391 | 05 0017C | 11P1F4 | N | | LHLD | DGN@DSPL | | FETCH STATION CODE |
| 392 | 05 0017F | 2A60FC | N | | DCR | L | | JUSTIFY STATION CODE OFFSET |
| 393 | 05 00182 | 2D | A | | M@V | A,H | | |
| 394 | 05 00183 | 7C | A | | @RA | A | | CHECK MSBYT OF STATION CODE |
| 395 | 05 00184 | B7 | A | | IF! | CC,Z,S | | MSRYT @F CODE ZERO |
| 396 | 05 00185 | C29R01 | N | | ANDIF! | XBYT,L,LT,MAX@CNT+1 | | LSBYT @F CODE IN RANGE(>0&<MAXC |
| | 05 00188 | 70 | | | | | | |
| | 05 00189 | FE05 | A | | | | | |
| 397 | 05 0018B | D29B01 | N | | DAD | D | | SET PNTR TO PR@PER FLAG |
| 398 | 05 0018E | 19 | A | | MVI | A,X'FF' | | FETCH 'SET' MASK |
| 399 | 05 0018F | 3EFF | A | | M@V | M,A | | SET HLT FLAG |
| 400 | 05 00191 | 77 | A | | M@DFLG | KYBDSINH | | INHIBIT KEYBOARD |
| 401 | 05 00192 | 3234F4 | N | | CALL | CYCLSTRT | | START ADH RECYCLING |
| 402 | 05 00195 | C08602 | N | | | | | STATION CODE OUT OF RANGE |
| 403 | 05 00198 | C39E01 | N | | ELSE! | | | |
| 404 | 05 0019D | CD0000 | N | | CALL | DSPL@ERR | | START BLINKING THE DISPLAY |
| 405 | | | | | ENDIF | | | |
| 406 | 05 0019E | C3C901 | N | @RIF! | FLG,STP@DGN,T | | | STOP PRINT PUSHED |

| | | | | | | | |
|---|---|---|---|---|---|---|---|
| 407 | 05 001A1 | 3A33F4 | A | | | | | |
| | 05 001A4 | 07 | A | | | | | |
| | 05 001A5 | D2R901 | N | | | | | ACKNOWLEDGE PUSH |
| 408 | 05 001A8 | AF | A | | CFLG | STPDGN | | |
| 409 | 05 001A9 | 2F | A | | CMA | | | INDICATE ADH READY FOR CYCLE IS |
| 410 | 05 001AC | 3205F4 | N | | M@DFLG | ADDR@ACT | | CANCELL OLD CYCLE |
| 411 | 05 001AD | CDC800 | N | | CALL | ADH@CLR | | RE-SELECT ADH |
| 412 | 05 001B0 | CD4800 | N | | CALL | ADH@SGNL | | CLEAR SWITCH PUSHED |
| | 05 001B3 | C3C901 | N | @RIF! | FLG,CLR@DGN,T | | | |
| | 05 001B6 | 3A16F4 | A | | | | | |
| | 05 001B9 | 07 | A | | | | | |
| | 05 001BC | D2C601 | N | | | | | |

| | | | | | | |
|---|---|---|---|---|---|---|
|413|05 001C0|CD0000| |CALL|DSPL0CLR|CLEAR THE DISPLAY|
|414|05 001C3|C3C901| |CALL| |UPDATE FRONT PANEL LIGHTS|
|415|05 001C6|CD9602|N|ELSE:|LMP&UPDT|UPDATE JOB$ICMP & READY$ LAMPS|
|416| | |N|ENDIF| | |
|417|05 001C9|C9|A|RET| | |
| | | | | | | |
|419|05 001CA|C0C800|N|ADH29EPL CALL|ADH0CLF|CLEAR ADH|
|420|05 001CD|C9|A|RET| | |

TABLE XXII

| | | | | | | |
|---|---|---|---|---|---|---|
|854| | | |ADH0CTRL IF:|FLG,ADH0SELC,T|ADH SELECTED|
|855|05 00546|3A0F4|A|CALL|SEN&READ|CHECK ADH INPUT SENSORS|
|856|05 00549|07|N|IF:|CC,Z,C|CHANGE STATE IF SENSOR CHANGE|
|857|05 0054A|D2E805|N|MOV|D,A|SAVE CHANGE MASK IN D REG|
|858|05 0054D|CDA004|N|ANA|B|FIND LEAD EDGES|
|859|05 00550|CAE505|N|MOV|E,A|SAVE LEAD EDGES IN E REG|
|860|05 00553|57|A| | | |
|861|05 00554|A0|A|CMA| | |
|862|05 00555|5F|N|ANA|D|FIND TRAIL EDGES|
|863|05 00556|2F|N|LXI|H,TEDGINH|SET PNTR TO TEDG INHIBIT MASK|
|864|05 00557|A2|N|ANA|M|MASK OUT INHIBITED SENSORS|
|865|05 00558|21B9FC|N|IF:|CC,Z,C|ANY TRAIL EDGES THIS READ|
|866|05 0055B|A6|N|MOV|D,A|SAVE TRAIL EDGES IN D REG|
|867|05 0055C|CA9E05|N|INX|H|MOV PNTR TO TEDG BYPASS MASK|
|868|05 0055F|57|N|ANA|M|MASK OUT INDETERMINENT TRAIL ED|
|869|05 00560|23|N|MOV|B,A|SAVE VALID TRAIL EDGES|
|870|05 00561|A6|N|INX|H|MOV PNTR TO TRAIL EDGE EXPECTED|
|871|05 00562|47|N|MOV|A,M|FETCH EXPECTED TRAIL EDGES|
|872|05 00563|23|N| | | |
|873|05 00564|7E|N|ANA|B|COMPARE ACTUAL AND EXPECTED TRA|
|874|05 00565|2F|N|CMA| |NO UNEXPECTED TRAIL EDGES|
|875|05 00566|A0|N|ANA|B| |
|876|05 00567|C29605|N|IF:|CC,Z,S|RESTORE TRAIL FDG BYE/SET CC FB|
|877|05 0056A|B2|N|ARA| |CLR CASE BRANCH TABLE POINTER|
|878|05 0056B|1600|N|MVI|D,0| |
|879|05 0056D|17|A|REPEAT| | |
|880|05 0056E|D2BE05|N|RAL| | |
|881|05 00571|D5|N|IF:|CC,C,S| |
|882|05 00572|F5|A|PUSH|D| |
|883|05 00573|7A|N|PUSH|PSW| |
|884|05 00574|11BC05|N|CASE:|VBYT,D| |
|885|05 00577|FE08|N| |C,0|TEDGFDOF FEED-OFF TRAIL EDGE ROUT|
|886|05 00579|CD0000|A| |C,1|TEDGWAIT WAIT TRAIL EDGE ROUTINE|
|887|05 0057C|0108|A| |C,2|TEDGRET RETURN TRAIL EDGE ROUTINE|
|888|05 0057E|C408|A| |C,3|SPARF SPARE POSITION|
|889|05 00580|F308|A| |C,4|TEDGEXIT EXIT TRAIL EDGE ROUTINE|
|890|05 00582|FE05|A| |C,5|TEDGKICK KICK TRAIL EDGE ROUTINE|
|891|05 00584|0208|A| |C,6|SPARE SPARE POSITION|
|892|05 00586|3A09|A| |C,7|TEDGIEMP INPUT EMPTY TRAIL EDGE R|
|893|05 00588|EE05|A| |ENDCASE| |
|894|05 0058A|5409|A| |POP|PSW|
| |05 0058C|F1|A| |POP|D|
| |05 0058D|D1|A| |ENDIF| |
| |05 0058E|14|A| |INR|D|INCREMENT CASE TABLE POINTER|

```
                                    ORA    A            CHECK FOR ADDITIONAL INPUTS...
                              UNTIL:       CC,Z,S       LOOP UNTIL NO MORE TRAIL EDGES
                          ELSE:
                              LXIFBYT      H,ADH11      SET PNTR TO PRIMARY FAULT BYTE
                              ORA   M                   SAVE INVALID TRAIL EDGES IN FAU
                              MOV   M,A
                              CALL  ADH@ABRT           ABORT ADH
                          ENDIF

MOV   A,E                    SET PNTR TO LEAD EDGE INHIBIT M
                          LXI   H,LEDGINH
                          ANA   M                      MASK BUT INHIBITED SENSORS
                          IF:          CC,Z,C          LEAD EDGES THIS READ
                              MOV   E,A               SAVE VALID LEAD EDGES
                              INX   H                 MOV PNTR TO LEAD EDGE BYPASS MA
                              ANA   M                 MASK OUT INDETERMINENT LEAD EDG
                              MOV   B,A               SAVE VALID LEAD EDGES IN B-REG
                              INX   H                 MOV PNTR TO LEAD EDGE EXPECTED
                              MOV   A,M               FETCH EXPECTED LEAD EDGES
                              CMA
                              ANA   B                 COMPARE ACTUAL WITH EXPECTED LE
                              IF:          CC,Z,C
                                  LXIFBYT  H,ADH11    SET PNTR TO PRIMARY FAULT BYTE
                                  ORA   M             SAVE INVALID LEAD EDGES
                                  MOV   M,A
                                  CALL  ADH@ABRT     ABORT ADH
                              ELSE:
                                  ORA   E            FETCH LEAD EDGES (IF ANY)
                                  MVI   D,0          SET POINTER TO ZERO
                                  REPEAT:
                                      RAL                   CC,C,S
                                      IF:               E,A
                                          MOV          D       SAVE LEAD EDGE BYTE
                                          PUSH
                                          CASE:  VBYT,D
                                              C,0
                                              C,1
                                              C,2
                                              C,3
                                              C,4
                                              C,5
                                              C,6
                                              C,7
                                          ENDCASE
                                          POP   D
                                          MOV   A,E        RESTORE LEAD EDGE BYTE
                                      ENDIF
                                      INR   D
                                      ORA   A            CC,Z,S
                                  UNTIL                   LOOP UNTIL NO MORE LEAD EDGES
                              ENDIF
                          ENDIF
                      ELSE:
                          SFLG  ADH@NMOV              ADH NOT SELECTED
                                                      INDICATE NO ADH PROBLEMS
                      ENDIF
                      RET
```

LEDGFDOF FEED-OFF LEAD EDGE ROUTI
LEDGWAIT WAIT LEAD EDGE ROUTINE
LEDGRET RETURN LEAD EDGE ROUTINE
SPARE SPARE POSITION
LEDGEXIT EXIT LEAD EDGE ROUTINE
LEDGKICK KICK LEAD EDGE ROUTINE
SPARE SPARE POSITION
LEDGIEMP INPUT EMPTY LEAD EDGE RO

TABLE XXIII

```
;**********************************************
;*                                            *
;*  LEDGEXIT:ROUTINE CALLED WHEN LEAD         *
;*  EDGE IS DETECTED AT EXIT SENSOR           *
;*  IF PAPER IS MOVING FORWARD THE            *
;*  WAIT SENSOR IS ENABLED,THE FEED           *
;*  COUNTER IS PULSED,AND THE MISFEED         *
;*  AND TO LONG OVER EXIT TIMING SEQ          *
;*  ARE STARTED, THE SLOW WAIT TO EXIT        *
;*  TIMING SEQUENCE IS STOPPED.               *
;*  IF MOVING RFVERSE,ORIGINALS FLASH         *
;*  ED IS UPDATFD,SLOW-OFF FAULT SEQ          *
;*  IS STOPPED,SLOW EXIT TO RETURN SEQ        *
;*  IS STARTED AND THE PATTERN ARE            *
;*  TURNED ON                                 *
;*                                            *
;**********************************************
```

| Line | Addr | | Code | | Label | Op | Operand | Comment |
|---|---|---|---|---|---|---|---|---|
| 1100 | 05 0682 | | 3A04F4 | A | LEDGEXIT IF: | | FLG,ADH@FORW,T | DOCUMENT MOVING FORWARD |
| | 05 0685 | | 07 | A | | | | |
| 1101 | 05 0686 | | D22007 | N | IF: | | FLG,ADH@29@1,F | NO DIAGNOSTIC ABORT PENDING |
| | 05 0689 | | 3A81F4 | A | | | | |
| | 05 068C | | 07 | A | | | | |
| 1102 | 05 068D | | DA1607 | N | | SOBIT | ADH@WT | ENABLE WAIT SENSOR |
| | 05 06C0 | | 21EEFF | A | | | | |
| | 05 06C3 | | 3E02 | A | | | | |
| | 05 06C5 | | F3 | A | | | | |
| | 05 06C6 | | B6 | A | | | | |
| | 05 06C7 | | 77 | A | | | | |
| | 05 06C8 | | FB | A | | | | |
| 1103 | 05 06C9 | | 21E8FF | A | | SOBIT | ADH$FDCT | START FEED COUNT PULSE |
| | 05 06CC | | 3E04 | A | | | | |
| | 05 06CE | | F3 | A | | | | |
| | 05 06CF | | B6 | A | | | | |
| | 05 06D0 | | 77 | A | | | | |
| | 05 06D1 | | FB | A | | | | |
| 1104 | 05 06D2 | | 2A60FB | N | | LHLD | TLT@A@FD | INCREMENT SOFTWARE FEED COUNTER |
| 1105 | 05 06D5 | | CD0000 | N | | CALL | BCD@INC | |
| 1106 | 05 06D8 | | 2260FB | N | | SHLD | TLT6A@FD | |
| 1107 | 05 06DB | | CD0000 | N | | CTIMR | ADH@0 | STOP SLOW WAIT TO EXIT |
| | 05 06DE | | 00 | A | | | | |
| 1108 | 05 06DF | | CD0000 | N | | CTIMR | ADH@6 | STOP SLOW OUT FAULT TIMER |
| | 05 06E2 | | 06 | A | | | | |
| 1109 | 05 06E3 | | CD0000 | N | | STIMR | ADH@1,350,EXIT@FLT | START TO LONG OVER EXIT SEQ OF |
| | 05 06E6 | | 01 | A | | | | |
| | 05 06E7 | | 23 | A | | | | |
| | 05 06E8 | | E109 | A | | | | |
| 1110 | 05 06EA | | CD0000 | N | | STIMR | ADH@2,800,MISSFEED | START MISFEED SEQUENCE OF 800MS |
| | 05 06ED | | 02 | A | | | | |
| | 05 06EE | | 50 | A | | | | |
| | 05 06EF | | 200A | A | | | | |
| 1111 | 05 06F1 | | CD0000 | N | | STIMR | ADH@3,200,MULTFEED | ALLOW 200MS TO CLEAR WAIT SENSO |
| | 05 06F4 | | 03 | A | | | | |
| | 05 06F5 | | 14 | A | | | | |
| | 05 06F6 | | 850A | A | | | | |
| 1112 | 05 06F8 | | 3A50FD | N | | DIAG@CT | ADHFL3DC | SAVE LEDG EXIT(FORWARD PATH) TI |
| | 05 06FB | | 32C5FC | N | | | | |

Figure 40A:
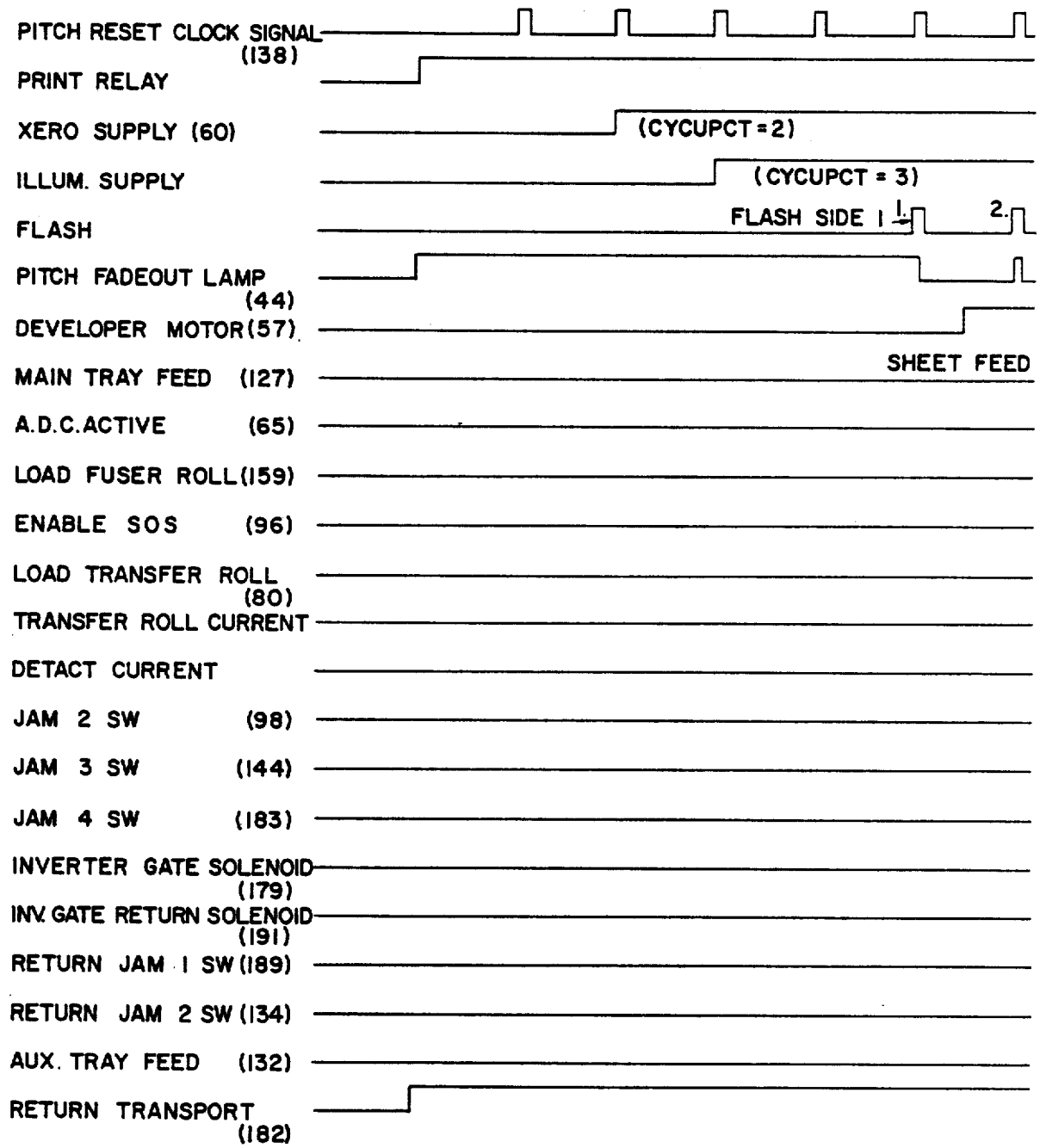
FIGS. 40a, 40b, 40c comprise a timing chart of the principal operating components of the host machine in an exemplary copy run.
Figure 40B:
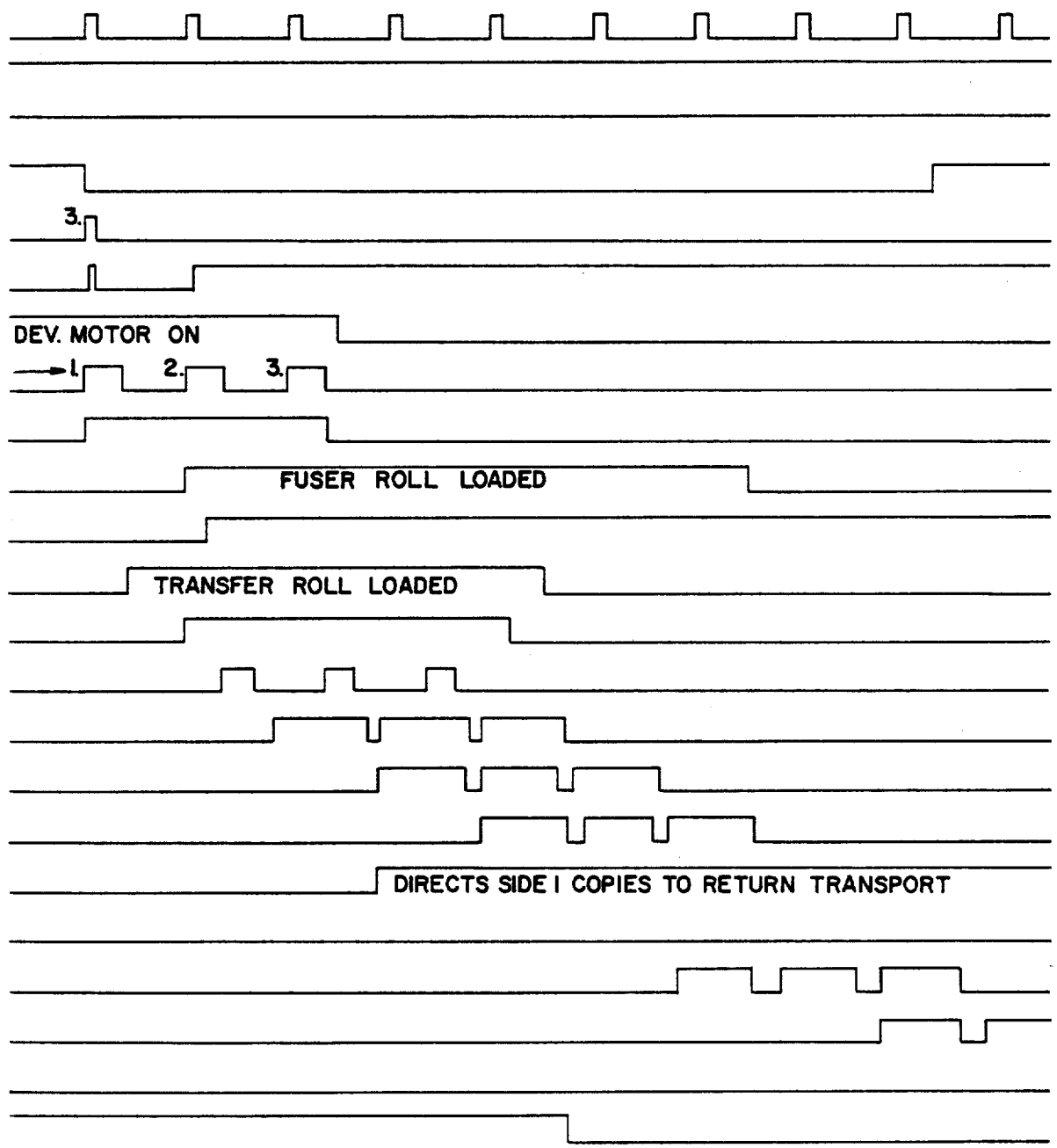
Figure 40C:
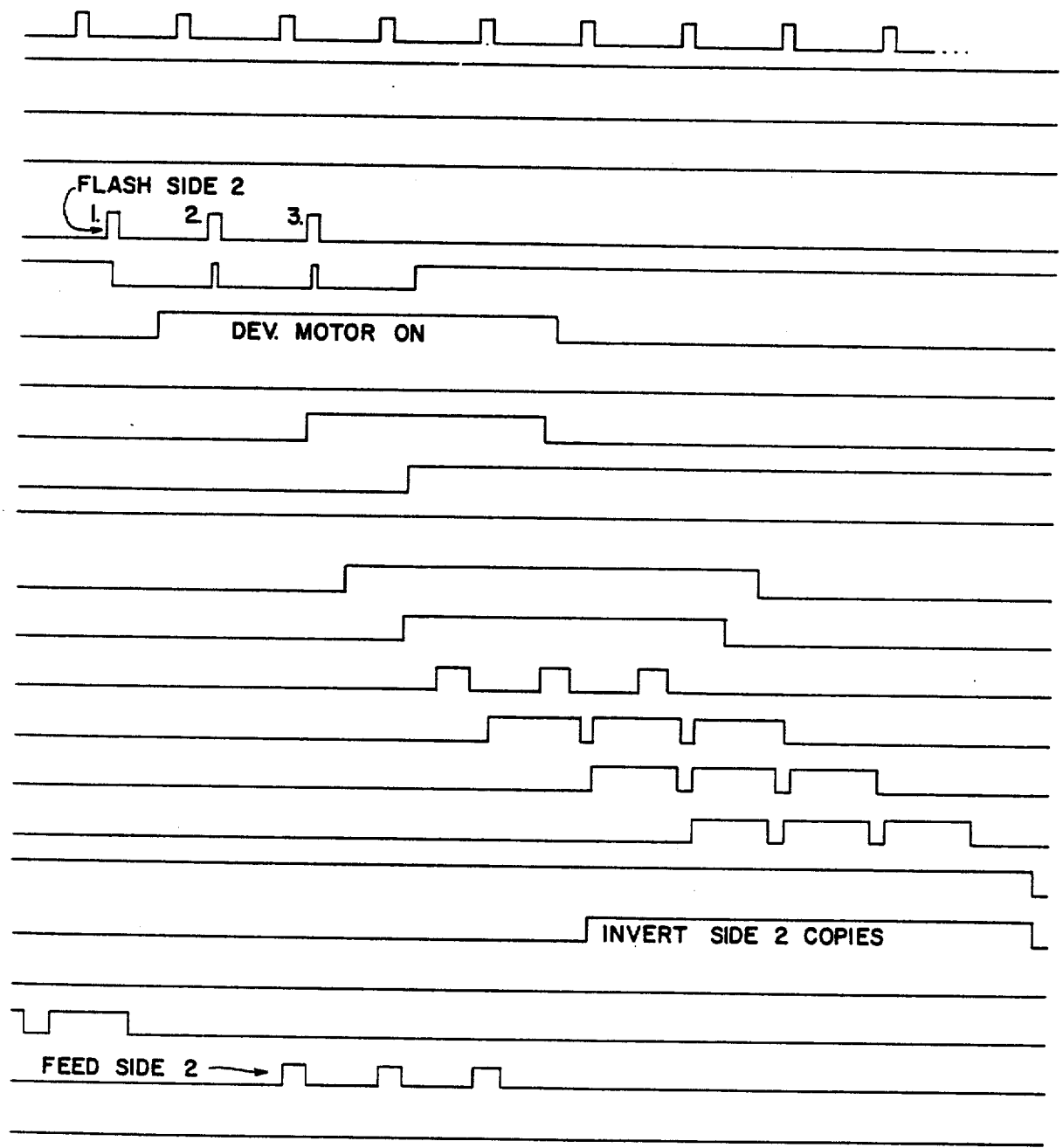

Referring particularly to the timing chart shown in FIG. 40, an exemplary copy run wherein three copies of each of two simplex or one-sided originals in duplex mode is made. Referring to FIG. 32, the appropriate button of copy selector 808 is set for the number of copies desired, i.e. 3 and document handler button 822, sorter select button 825 and two sided (duplex) button 811 depressed. The originals, in this case, two simplex or one-sided originals are loaded into tray 233 of document handler 16 (FIG. 14) and the Print button 805 depressed. On depression of button 805, the host machine 10 enters the PRINT state and the Run Event Table for the exemplary copy run selected is built by controller 18 and stored in RAM section 546. As described, the Run Event Table together with Background routines serve, via the multiple interrupt system and output refresh (through D.M.A.) to operate the various components of host machine 10 in integrated timed relationship to produce the copies programmed.

Figure 41:
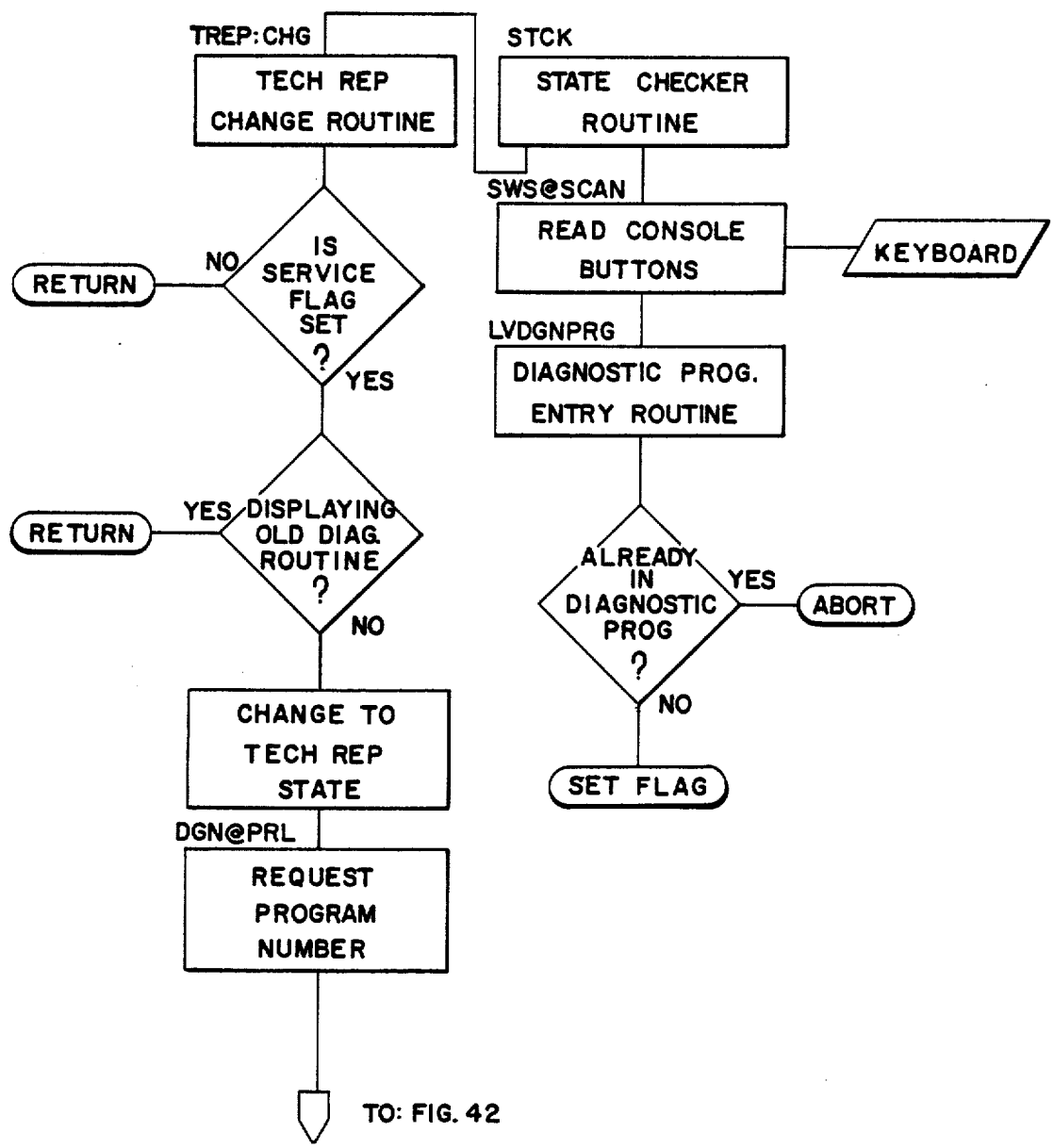
FIGS. 41-42, 43a and 43b, are flow charts which illustrate the sequence of events for entering the machine into a diagnostic program, as well as determining whether the user has access to the particular program requested.

During the run, the first original is advanced onto platen 35 by document handler 16 where, as seen in FIG. 41, three exposures (1ST FLASH SIDE 1) are made producing three latent electrostatic images on belt 20 in succession. As described earlier, the images are developed at developing station 28 and transferred to individual copy sheets fed forward (1ST FEED SIDE 1) from main paper tray 100. The sheets bearing the images are carried from the transfer roll/belt nip by vacuum transport 155 to fuser 150 where the images are fixed. Following fusing, the copy sheets are routed by deflector 184 (referred to as an inverter gate in the tables) to return transport 182 and carried to auxiliary tray 102. The image bearing sheets entering tray 102 are aligned by edge pattern 187 in preparation for refeeding thereof.

Following delivery of the last copy sheet to auxiliary tray 102, the document handler 16 is activated to remove the first original from platen 35 and bring the second original into registered position on platen 35. The second original is exposed three times (FLASH SIDE 2), the resulting images being developed on belt 20 at developing station 28 and transferred to the opposite or second side of the previously processed copy sheets which are now advanced (FEED SIDE 2) in timed relationship from auxiliary tray 102. Following transfer, the side two images are fused by fuser 150 and routed, by gate 184 toward stop 190, the latter being raised for this purpose. Abutment of the leading edge of the copy sheet with stop 190 causes the sheet trailing edge to be guided into discharge chute 186, effectively inverting the sheet, now bearing images on both sides. The inverted sheet is fed onto transport 181 and into an output receptacle such as sorter 14 where, in this example, the sheets are placed in successive ones of the first three trays 212 of either the upper of lower arrays 210, 211 respectively depending on the disposition of deflector 220.

DIAGNOSTICS

In addition to the copy control program described above, the reproduction machine of the present invention includes several diagnostic programs stored in ROM memory 545 to aid the user or service personnel to maintain the reliability of the machine. Some of the programs are more complex than others, with the most complex programs bearing significant meaning only to trained service personnel. Accordingly, the machine is conditioned to prohibit the casual user from accessing the most complex programs. However, some of the programs of lesser complexity can be useful to the trained user depending upon the extent of her familiarity with the machine. Accordingly, the machine of the present invention has the capability of permitting service personnel to progressively disclose more complex diagnostic programs to the user as her training correspondingly increases, while at the time reserving the most complex programs for use only by the service personnel. Similarly, means are also provided to prevent access to prior disclosed programs, for example, in the event that a new operator is assigned to the machine.

Figure 42:
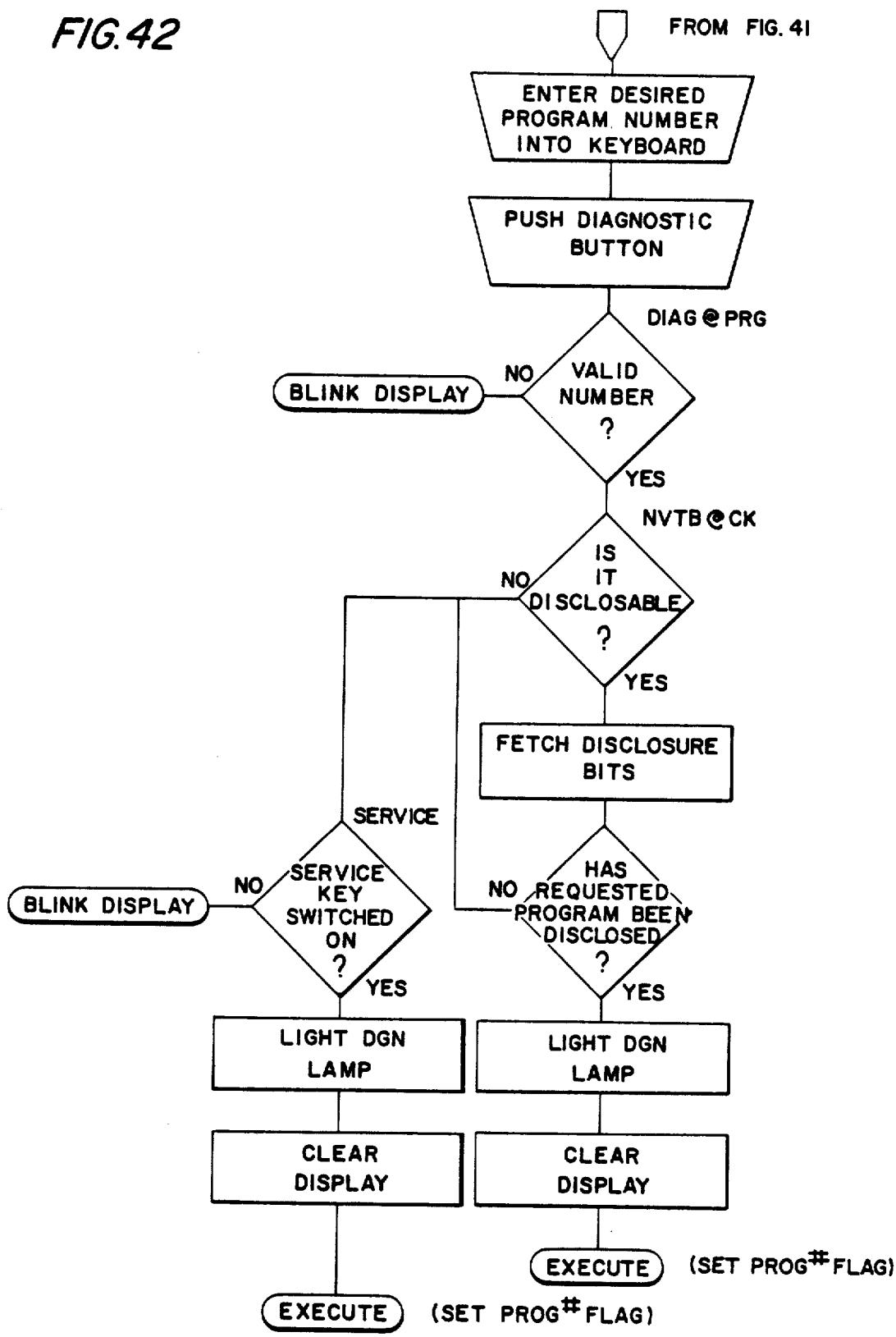

Referring now to FIGS. 41 and 42, along with the illustration of the operator console as shown in FIG. 32, a routine for selecting a desired diagnostic program will be explained. It will be remembered that the machine is normally being instructed by the copy control program comprising STATE routines numbers 0-4 shown in Table I. Each STATE routine periodically calls a Switch Scan routine (SWS@SCAN) reproduced in Table XI. To enter a diagnostic program, the operator presses diagnostic console button 801 which is read by the Switch Scan routine thereby causing it to call a Diagnostic Program Entry routine (LVDGNPRG of Table XII). This routine checks to see if there is an active diagnostic program in progress. If so, it causes the operating program to cease. Normally, there will not be another diagnostic program running. Consequently, a service flag (SER@ACT) will be set indicating that the user desires to enter a diagnostic program.

The copy control program periodically calls the Tech Rep Change (TREP:CHG) subroutine which monitors the computer memory to determine whether the service flag has been set. If it has been set and there is no diagnostic routine information being displayed, the controller 18 will change instruction from the copy control program to the Tech Rep STATE (also shown in Table I). This routine serves as an interface to provide access to different operating programs and will periodically call the Diagnostic Prologue (DGN@PRL) routine also shown in Table XII which puts a "dC" in the console display 230 thereby requesting that the operator enter the two digit access code corresponding to the diagnostic program desired. After doing so, the diagnostics button 801 is then again pushed which, in turn, is picked up by the diagnostic program routine (DIAG@PRG of Table XIII). This routine determines whether the numbers entered in the display 230 correspond to valid diagnostic program numbers. For example, if numbers 10–36 are valid diagnostic access codes and a number 52 was pushed, it would not be a valid number, with this program indicating such an error by blinking the display 230.

If it is a valid number, a Nonvolatile Memory Table Check routine (NVTB@CK) shown in Table XIV is called. This routine first checks to determine whether the requested program number is disclosable, i.e., whether this particular program can be accessed by an operator other than the sevice personnel. For example, assume that program numbers 10–15 can be, but need not be, disclosed to the user, with the remaining programs being reserved for the service personnel. Then, if the requested program number is within the 10–15 range this routine will check particular addresses in the nonvolatile memory 610 to determine whether the service personnel has stored the access code corresponding to the requested program in the memory, i.e. disclosed the program to the user. If it has been disclosed, the display 230 is cleared and the light on the console above the diagnostic button 801 is turned on indicating that the machine is now under the control of the diagnostic program desired.

On the other hand, if it was determined that the requested program was not disclosable to the user, the controller makes another check to determine whether the service key 828 has been switched on or off via the SWITCH SCAN routine and periodically called subroutines SERVICE and KEY@OFF of Table XII. Normally, only the service personnel possesses this key. When the key is turned on, all of the diagnostic programs are accessible. However, if the requested program number has not been disclosed to the user nor has the service key been switched on, the display 230 will be caused to blink thereby indicating the error. Conversely, if the program is accessible, the program number flag is set signalling the controller to execute the requested program.

Figure 43A:
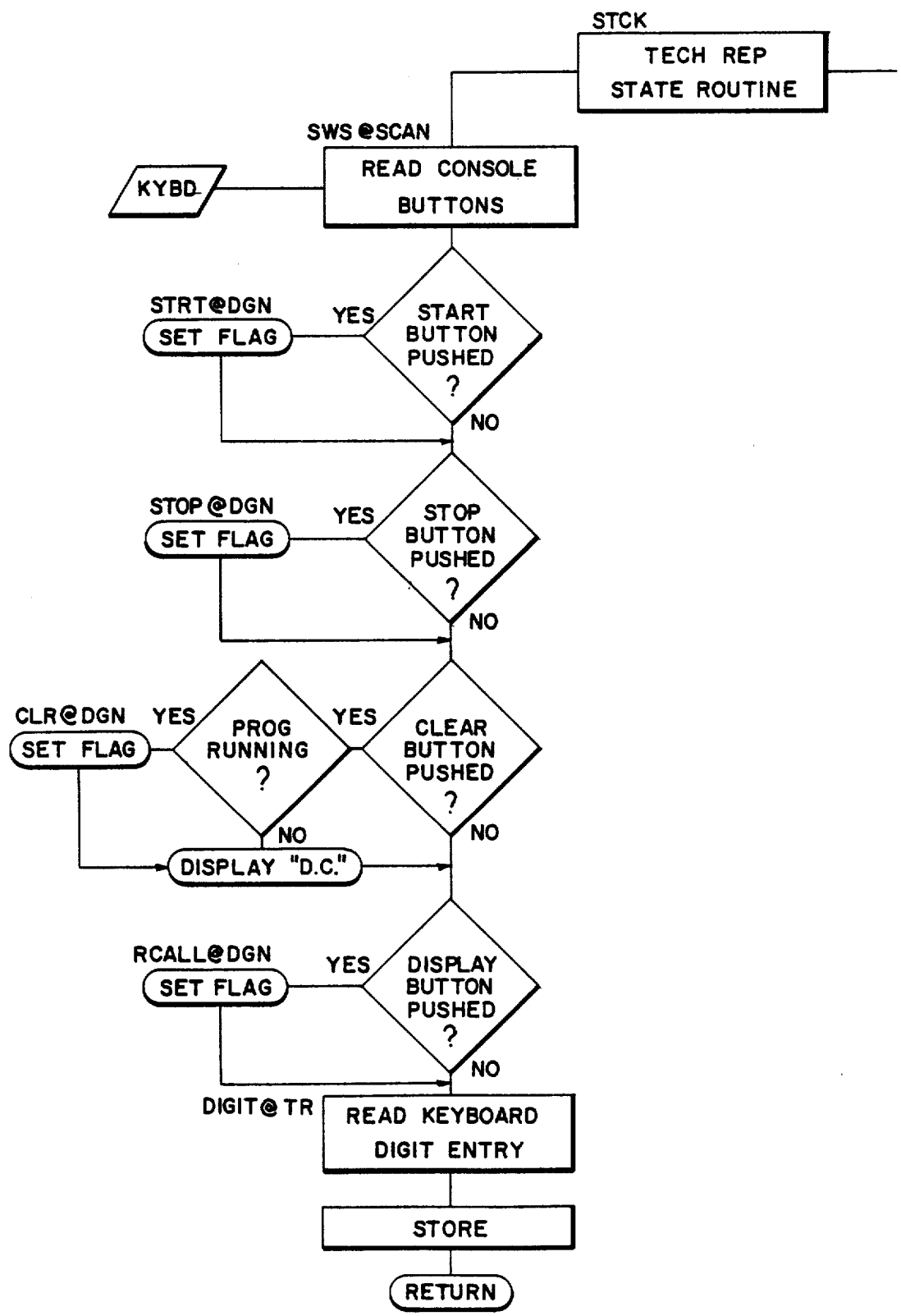
Figure 43B:
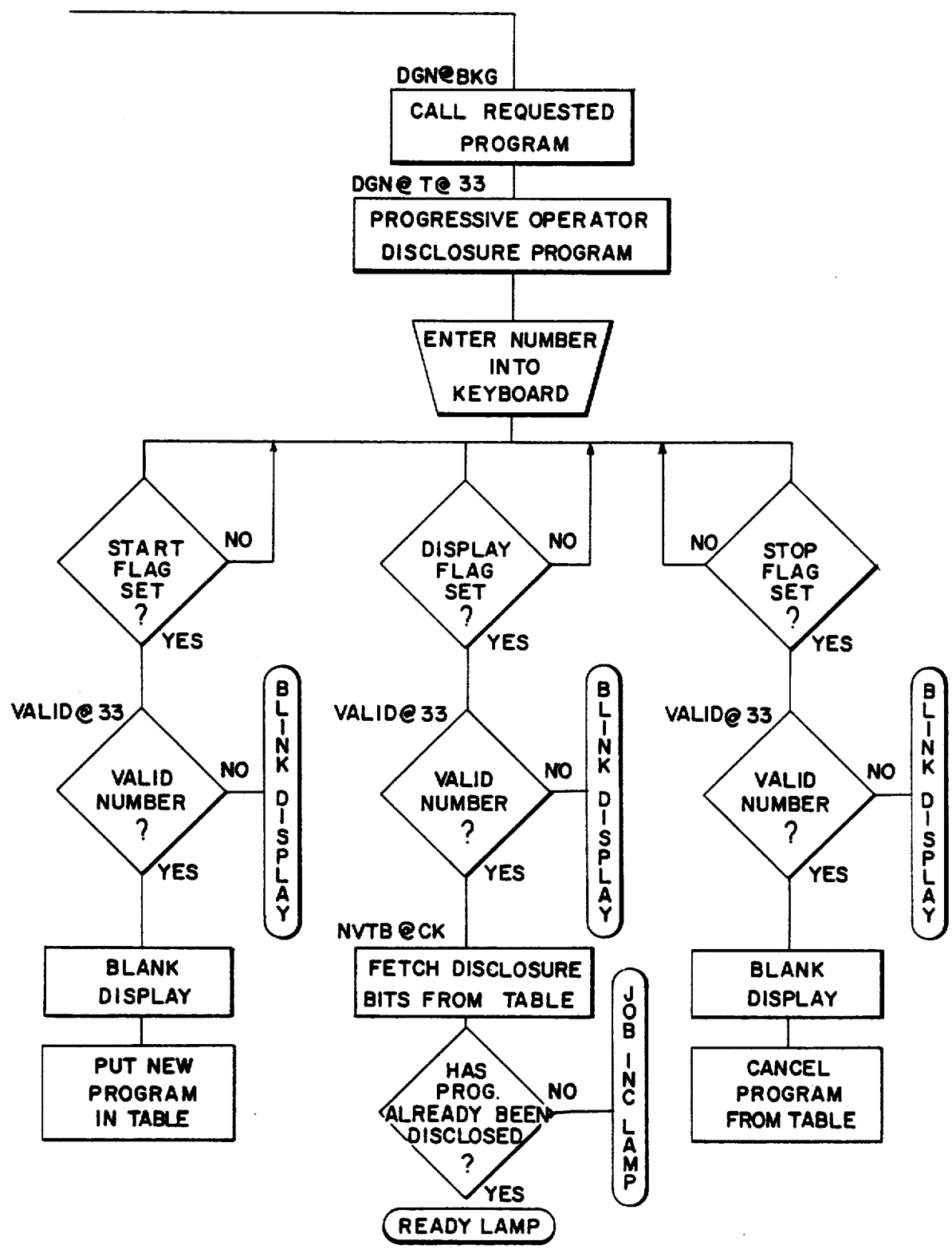

Referring to FIG. 43, in order to disclose more complex programs to the user as she becomes more familiar with the machine, the service personnel utilizes the Progressive Operator Disclosure Program (DGN@T-33) shown in Table XV. This program is not disclosable to the user and can be accessed only by the service personnel through the use of his service key. With the switch 828 turned on, the program is entered in the manner set forth above. To determine whether a particular program has already been disclosed, he enters the program number into keyboard 808 and pushes the Display button 809. The Switch Scan routine (SWS@SCAN) reads the various console buttons to determine whether they have been pushed, and, in this state, sets a flag, RCALL@DGN, indicating that the Display button 809 has been pushed. Similarly, another routine (DIGIT@TR of Table XVI) reads the numbers entered in the keyboard 808 and stores them in a register or memory location for further use.

The Disclosure program (DGN@T@33) cause the controller to read the Display flag and calls a subroutine (VALID@33) which, in turn, checks the entered number to determine whether it is within a predetermined range. If it is not a valid number, the display 230 will blink indicating that the numberdoes not correspond to a designated program number. If this test is passed, the controller 18 interrogates the non-volatile memory 610 via routine NVTB@CK. As described above, this routine interrogates the memory to determine whether the access code for the requested routine has been stored in the memory thereby indicating that it has already been disclosed. As known in the art, the access code must be converted to binary electrical signals to be stored in the memory. If it has been disclosed, one of the console lamps 830 (READY) will be turned on. If it has not been disclosed, another lamp (JOB INCOMPLETE) is lit. Accordingly, the service personnel can determine whether a particular program has already been disclosed to the user.

If he wishes to disclose a new program, he merely enters its access code into keyboard 808 and press Start button 805. If it is a valid number, it will be converted to a binary signal which is stored in memory 610 so that the user can now access the disclosed program. Conversely, if he wishes to cancel a program already disclosed, the stop button 806 is pushed instead. This removes the entered program number from memory 610 so that only the service personnel can access the diagnostic program. By storing the disclosed program access code information in the nonvolatile memory 610, it is insured that the information will not be lost in the event of a power failure, etc.

Figure 44:
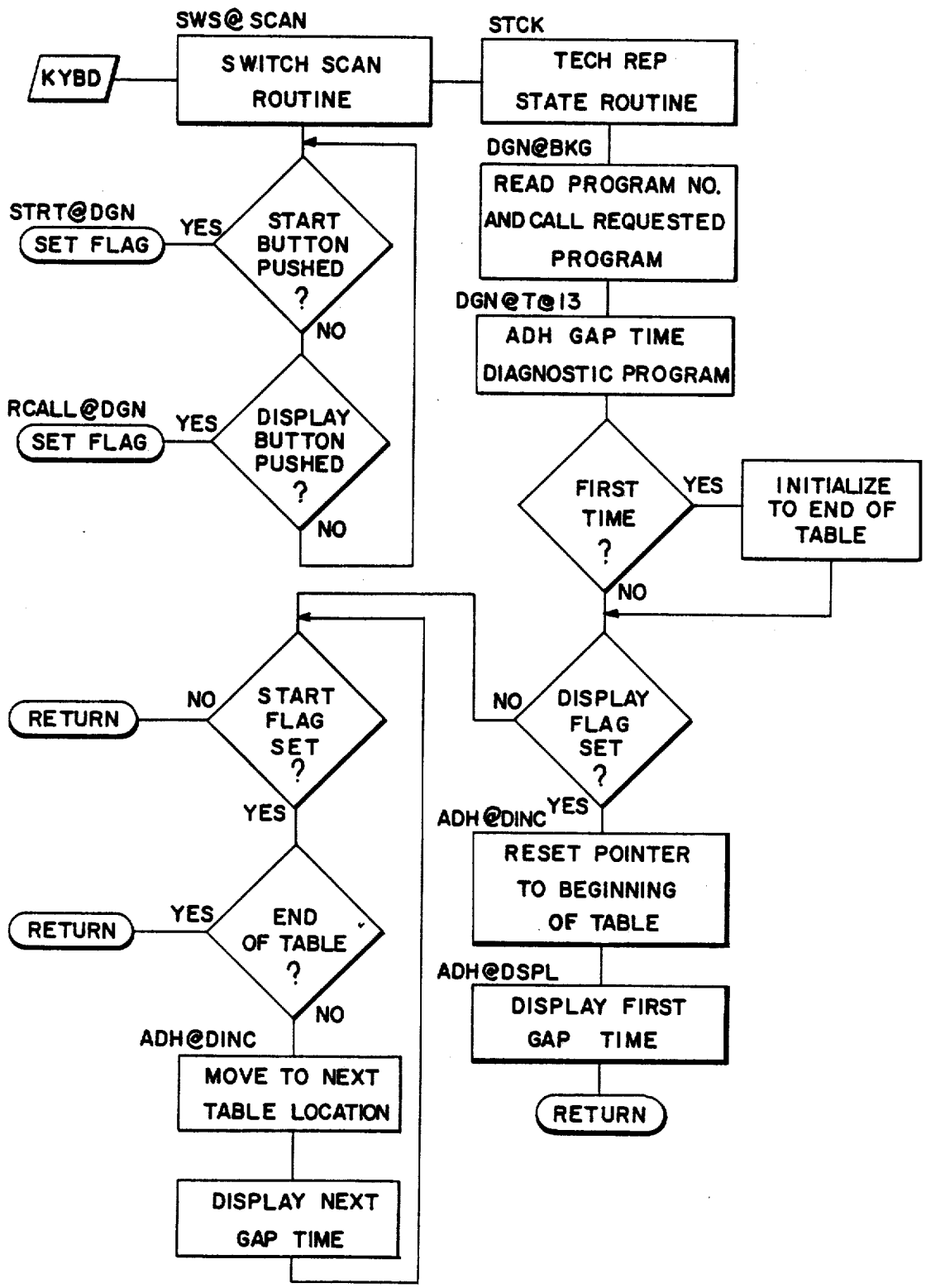
FIG. 44 is a flow chart which illustrates the operation of a diagnostic program for displaying document travel times in the document handler.

Referring now to FIGS. 44 and 14, a diagnostic program for the automatic document handler (ADH) 16 will be described. Document handler 16 includes four paper path sensors hereinafter referred to as the kick sensor 246, the wait sensor 280, the exit sensor 281, and the return sensor 282. As the original documents 2 cycle through the ADH as previously described, each sensor senses the leading and trailing edge of the document. For example, if the photocell sensor goes from light to dark, then it is sensing a leading edge. However, if the sensor goes from dark to light, it is sensing a trailing edge. Each of the sensors are coupled to a free running global counter or timer, referred to as a diagnostic counter, DIAG@CT, in the tables. The diagnostic counter can be any of a variety of known counting devices. In the preferred embodiment, it is a specified register which is periodically set and then decremented by the machine clock signal 202.

When each sensor senses a leading or trailing edge of the document 2, the controller reads the time of the diagnostic counter and stores it in a specified address in the RAM memory 546. These times are accessed by the ADH Gap Time Diagnostic program (DGN@T@13) shown in Table XVII. This routine reads the addresses of the stored times from the Gap Time Table shown in TABLE XVIII. The Gap Time Table defines a plurality of stations or gap times, i.e. the time it takes for a document to travel between various preselected sensors. For example, one gap time may be the time it takes the leading edge of the document to travel from the exit sensor 281 to the return sensor 282. In such case, when the exit sensor 281 senses a leading edge of a document, it will read the diagnostic counter and store that time in the table (see, e.g. Lead Edge Exit routine (LEDGEXIT) of Table XXIII). Similarly, when the return sensor 282 senses the document, it also will store that time in the table. Consequently, to read that gap time, a pointer, e.g. an index register, is set to the particular address of the Gap Time Table which, in turn, contains the addresses in RAM memory 546 of these two times. One time is then subtracted from the other to determine the particular gap time, i.e. the time of document travel between these sensors. It should be realized that a particular "gaps" defined in the Gap Time Table can be changed if desired.

Referring now especially to FIG. 44, the ADH Gap Time Diagnostic (DGN@T@13) program is entered in the usual manner as previously described to determine if this program has been disclosed to the user. If so, the program checks to determine whether this is the first time that this particular program has been requested. If it is the first time, the pointer is initialized by setting it to the end of the Gap Time Table. The routine then checks to see if the display flag (RCALL@DGN) has been set by the operator pushing the display select button 809 on console 800. If this button has been pushed, the switch scan routine will set a flag (RCALL@DGN) which is tested by the Diagnostic routine. If it has been set, the pointer will be decremented by the ADH Display Decrementing routine (ADH@DINC) shown in Table XIX. This will cause display 230 to blank for approximately one-half second in order to permit the viewer to distinguish between the gap time about to be displayed and an old gap time that may be currently displayed.

Then the gap time identified by the pointer (or identifier as sometimes referred to in the tables) is calculated and displayed in the display 230 via the ADH display routine (ADH@DSPL) which is also shown in Table XIX. Accordingly, the first gap time of the previous document run will appear in the display. The operator or service personnel can compare this gap time with standard times and make necessary adjustments to the machine, if required, thereby insuring proper synchronism with the machine processor.

In order to display the next gap time the operator pushes start button 805. This sets the start flag (STRT@DGN) which is picked up by the Diagnostic program. It will check if the pointer is set at the end of the table. If not, the pointer is moved to the next table location and the next gap time is calculated and displayed in the display 230 as previously described. In order to display the next gap time the start button 805 is again pushed and the next gap time is analogously displayed. This operation occurs until the pointer reaches the end of the table.

Figure 45A:
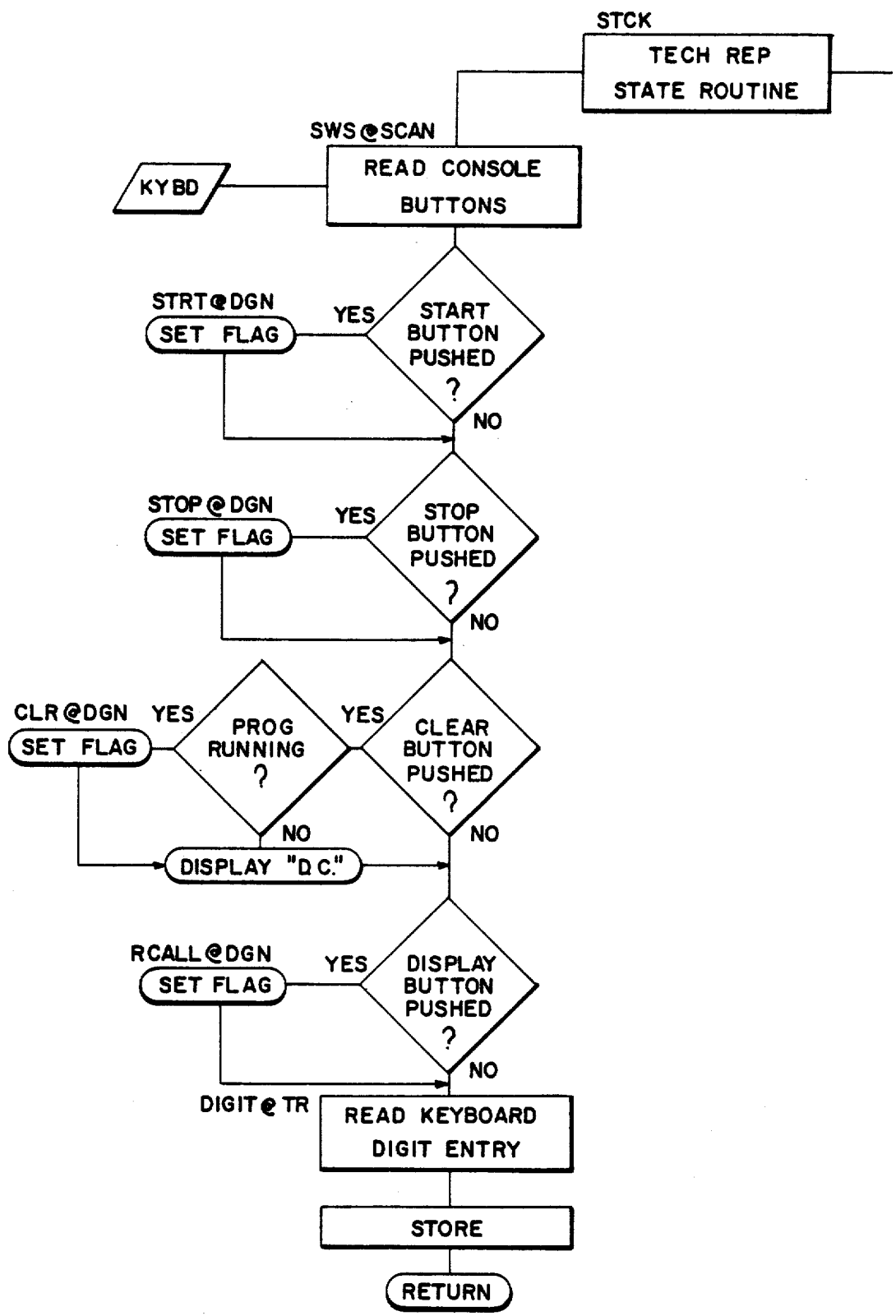
FIGS. 45a and 45b are flow charts which illustrate the operation of a diagnostic program for continuously cycling documents through the document handler and, if desired, displaying successive document travel times between various stations therein.
Figure 45B:
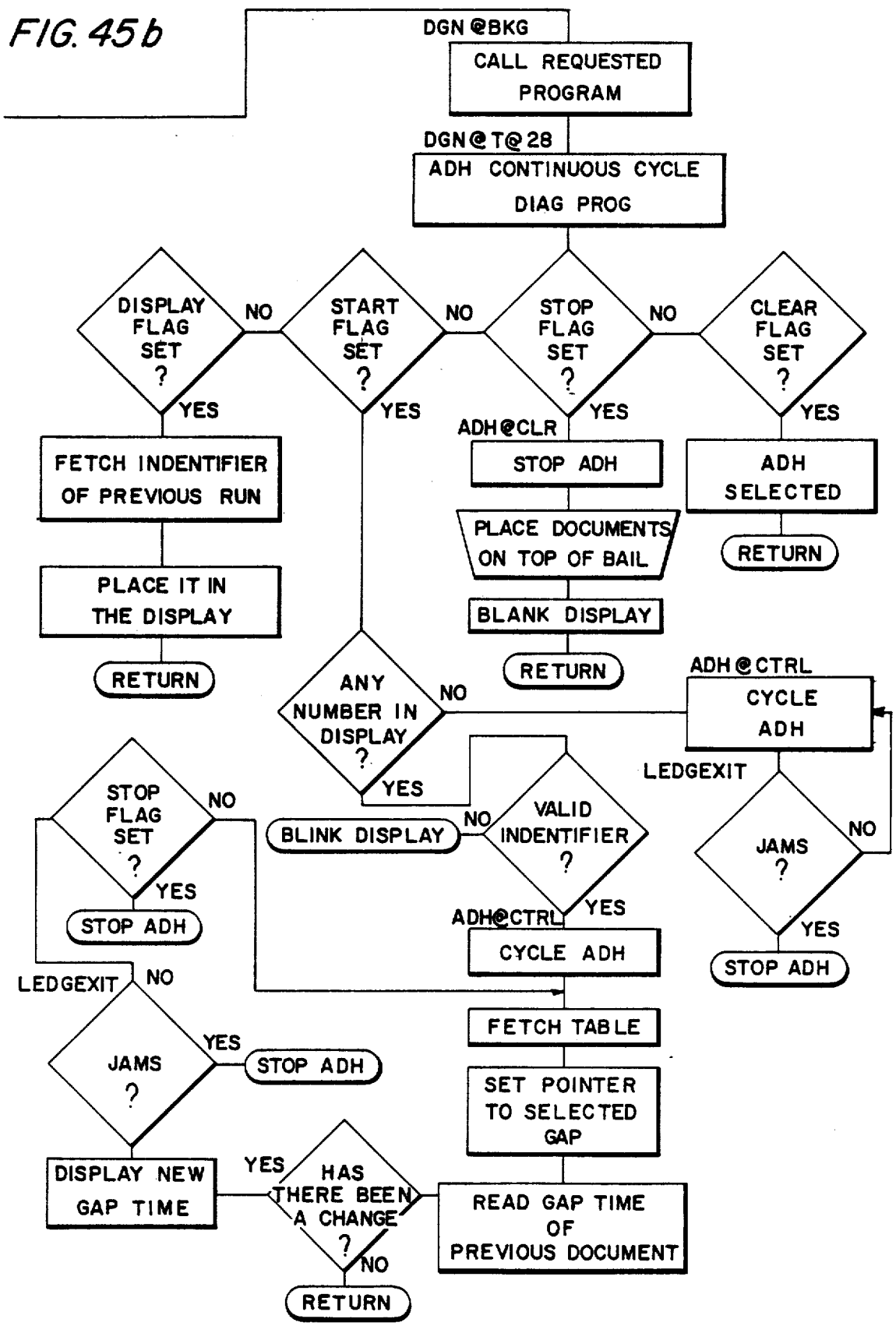

The previous program provides the ability to check the gap times of an earlier run during normal ADH operation. However, in some instances it is desirable to activate or cycle the ADH without making copies in order to check for potential problem areas. The ADH Continuous Cycle Diagnostic program (DVN@T@28 as shown in Table XX) provides this ability. It should be noted that due to the complexity of this routine it is not disclosable to the casual operator and can be accessed only by the service personnel by switching the key switch 828 on. As illustrated in FIG. 45, this routine interacts not only with the start button 805 and display select button 809 as in the previous routine, but also with the clear button 817, stop button 806 and keyboard 808. Pushing each of these buttons will set a specific flag as previously discussed.

By pushing the stop button 805, the ADH will come to a stop and display 230 will blank. At this time the operator should place the test documents on top of separator or bail bar 235 as shown in FIG. 14. After this is done, the clear button 817 is pushed thereby selecting and preparing the document handler 16 for continuously cycling original documents through the ADH paper paths without making copies therefrom.

The operator then decides whether he wishes to display gap times as the documents cycle through the ADH. If so, he enters the desired gap time code number into the keyboard 808. If he wishes to display the same gap time as previously requested, for example, as requested in the ADH Gap Time program (DGN@T@13) previously described, then the display button 809 is pushed which automatically places that gap time number into the display 230. The start button 805 is then pushed. If there is no number in the display the ADH begins to continuously cycle the documents 2 through the paper path under the control of the ADH Control routine (ADH@CTRL) shown in Table XXII. If any jam occurs, as sensed by the sensors 246, 280, 281, and 282 (see, e.g. the Lead Edge Exit routine of Table XXIII) the ADH will be automatically stopped thereby by permitting the user to identify the potential problem areas.

If a number has been entered into the display indicating that it is desired to display selected gap times, the program checks to see if the entered digits correspond to a valid gap time identifier. It will be remembered that there are several gap times in the Gap Time Table which can be displayed. If it is valid identifier, the ADH is automatically started. The gap time table is then fetched and the pointer is set to the selected gap time desired to be displayed. It will be remembered that the table will contain the times of the previous document run, as these times are being continually updated every time a document travels through the ADH. Therefore, the program will read the gap time of the previous document and compare it with the new gap time of each document as it cycles through the ADH. It will then compare the two gap times to determine if there has been a change. If so, it will display the new gap time. This sequence of events continues until the stop button 806 is pushed. Hence, this routine provides the ability to continually display the gap times for each document as it travels through the document handler 16. By visually monitoring the display 230 the service personnel can readily determine whether there is an undesirable fluctuation in the gap times for the various documents. To display and monitor a different gap time, a new number is entered into keyboard 808 and the same sequence as described above is followed.

Document misalignment is often a potential source of problems in the document handler 16, often leading to a jam condition. The ADH skew Test program (DGN@T@29) as shown in Table XXI is utilized to check for proper document alignment. Again this program is entered in the manner as previously described.

Figure 46A:
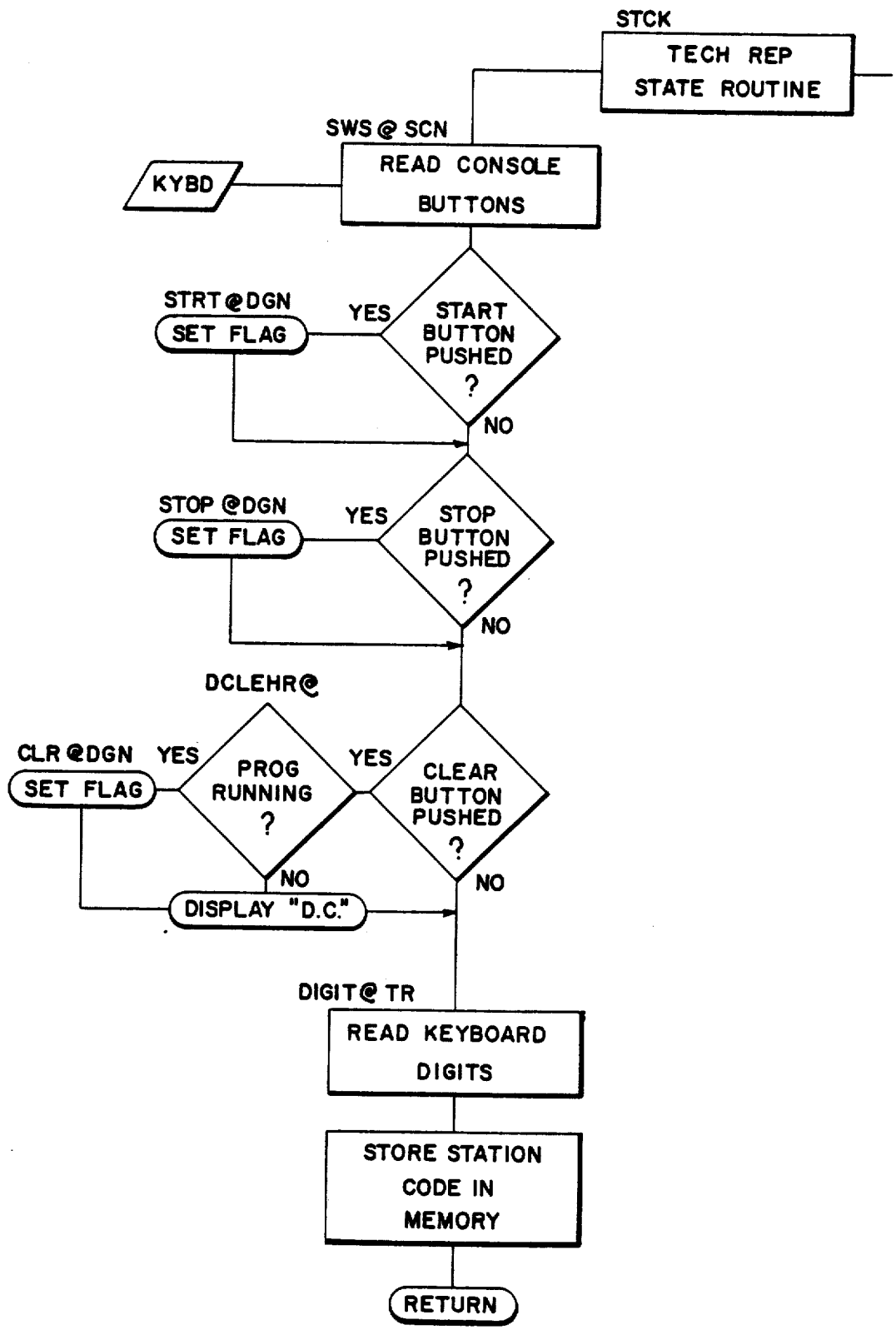
FIGS. 46a and 46b are flow charts which illustrate the operation of a diagnostic program which automatically moves documents to preselected stations in the document handler to check for proper alignment.
Figure 46B:
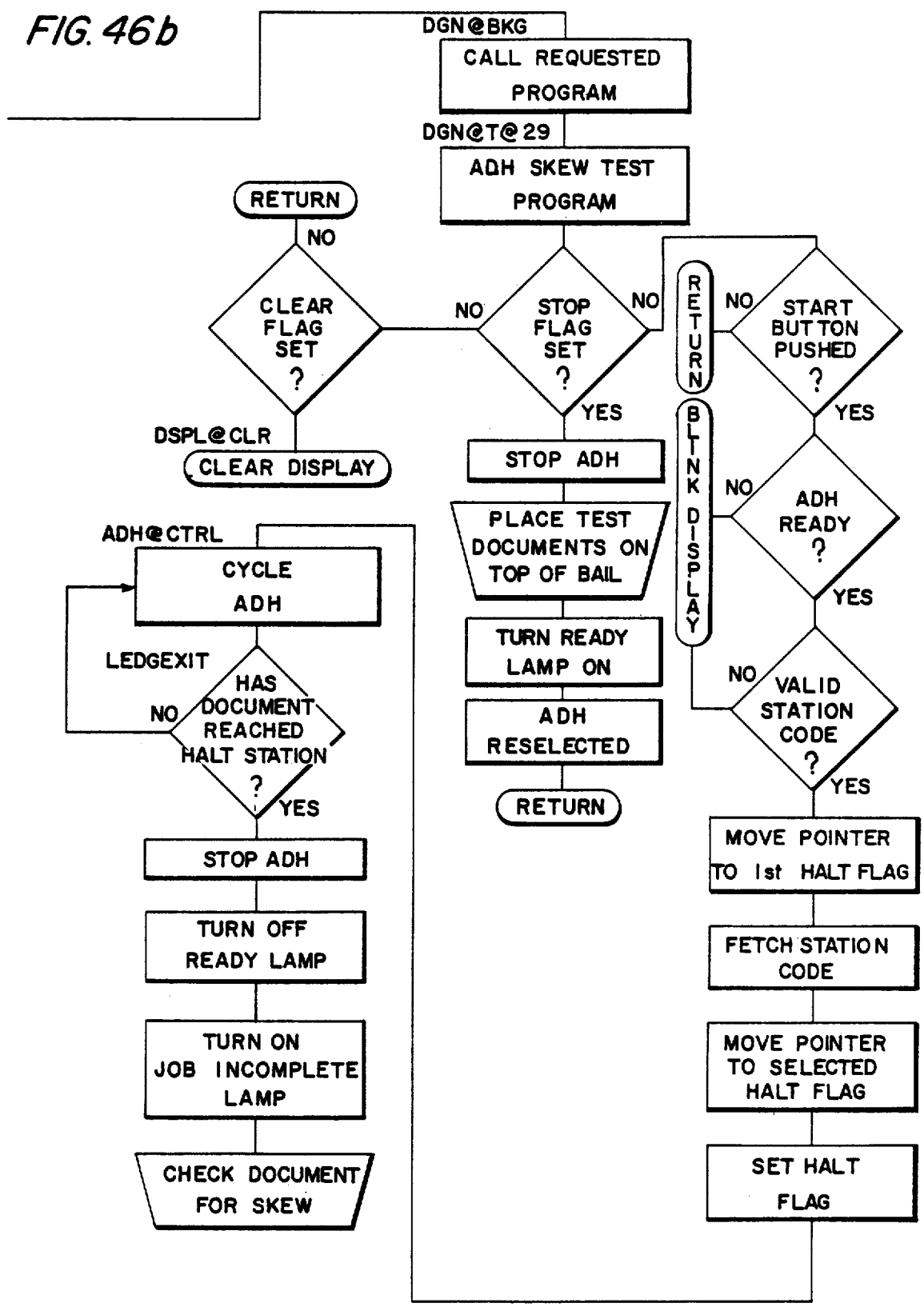

Referring to FIG. 46, by pushing the stop button 806, document handler 16 will come to a halt permitting the operator to clear the documents from the ADH 16 and place the test documents on top of bail bar 235. When the appropriate covers (not shown) are closed, an appropriate console light 830 will be activated to indicate that the ADH has been reselected and is ready for further operation.

The operator then enters a one digit station code into the keyboard 808. The station code corresponds to selected stations in document handler 16. For example, station code number 1 corresponds to the station in the document handler with the leading edge of the document 2 underneath exit sensor 281 on its forward path towards platen 35. Other station codes for other stations are defined in a similar manner. In the preferred embodiment there are 5 valid station codes. As previously described, the digit read routine (DIGIT@TR) will read the enter digit and store it in a specified memory location. When the start button 805 is pushed, the controller will read that memory location and determine whether that is a valid station code, i.e. in this embodiment whether the digit entered is between the numbers 1 and 5. If so, the controller checks to make sure that there are no jams pending in the document handler 16 and that it is ready to be cycled again. If neither of the above tests are met, the display 230 is blinked to indicate the error. If the tests are met, a software pointer such as described previously, is moved to the address of the first of 5 halt flags which are stored in RAM memory 546. The halt flags correspond to sensors 246, 280, 281 and 282. The controller combines the address of the first halt flag with the station code entered to move the pointer to the halt flag corresponding to the selected station. The correct halt flag is then set.

After the appropriate halt flag has been set, the document handler 16 is then cycled, moving the test documents 2 from paper tray 233 throughout the paper path cycle under the control of the ADH control routine (ADH@CTRL) of Table XXII. When the arrival of the document 2 is detected by sensors 246, 280, 281, 282, the controller checks to see if its corresponding halt flag is set. If so, the ADH is stopped. For example, when a document passes underneath sensor 281 on its forward path to platen 35, the Lead Edge Exit routine (TABLE XXIII) checks to see if its corresponding halt flag (ADH@29@1) is set. If so, the ADH is stopped.

After the document handler 16 has been stopped with the document 2 at the selected station, appropriate indicator lamps 830 on the console 800 are turned on to indicate that the operator may now check for document alignment. By entering new codes into the keyboard 808 the ADH can be recycled to bring the document to another station for inspection. Accordingly, this routine provides the service personnel with the ability to visually check the documents for skew at various locations throughout the document handler 16 thereby insuring proper operation.

It can now be realized that the machine of the present invention has considerably more flexibility than those of the prior art. Not only is it controlled by a computer with a particular program for instructing the components in a timed sequence to make copies, but it includes other operating programs which can be selectively accessed to operate the machine in a different manner. For example, the ADH Continuous Cycle Diagnostic program continuously cycles the documents through document handler 16 to pinpoint potential problem areas without making copies therefrom as normally done when the copy control program (STCK) has been accessed. Other operating programs which perform different functions can be envisioned and they need not necessarily be directed to diagnosing malfunctions.

For example, a common machine processor, such as machine processor 12, can be utilized with a plurality of different input and output devices. The same processor can be utilized to make copies from original documents presented to the processor by an automatic document handler or from another input device, such as a laser beam exposure device which presents originals in the form of a modulated beam controlled by stored electronic representations of the matter to be copied. The timing of the machine components may be different depending on which input device is used. Through the use of this invention, a manufacturer can market a common processor and a plurality of input/output device options. The processor would include the control system having a program stored therein for each possible option, with the appropriate program being accessed to control the machine depending upon the option utilized with the processor.

Therefore, while this invention has been described in connection with particular examples thereof, the spirit of this invention should be judged in light of the following claims.

What is claimed is:

1. In a reproduction machine having a console and a controller for the activation of various reproduction machine components, the controller including first and second memory sections, the improvement comprising the method of:
   assigning access codes to each of a plurality of operating programs;
   storing the operating programs in the first memory section;
   storing certain ones of said access codes in the second memory section;
   entering an access code into the console; and
   denying access to the program corresponding to the access code entered into the consol if its corresponding access code has not been stored in the second memory section.

2. The method of claim 1 wherein the step of storing includes storing said access codes in a non-volatile section of the memory.

3. The method of claim 1 including the step of removing an access code from the second memory section to prevent access of the program corresponding to the removed access code.

4. In a reproduction machine having a plurality of processing components and a controller, said controller enabling actuation of the processing components in a timed relationship to produce copies from originals, the improvement comprising:
   means for storing a plurality of programs in the controller, the plurality of programs being defined as a program set, each program instructing said controller to operate the components in a predetermined manner;
   access containing data means for accessing a first subset of the program set, access being denied to the remainder of the programs in the set; and
   means for altering the data contained in the access means whereby a second subset of program set is accessed with access being denied to the remainder of the programs in the set, the second subset being different than the first subset.

5. In a reproduction system for producing copies from originals the combination of
   a plurality of discrete operating components;
   a photosensitive member cooperable with the discrete operating components;
   a controller for actuating the photosensitive member and the operating components to produce the copies, the controller having a first memory section and a second memory section, a plurality of diagnostic programs being stored in the first memory section, a plurality of access codes being stored in the second memory section, each of the access codes being associated with a respective one of the diagnostic programs, an operator console having a code entering device; and
   means responsive to a predetermined access code entered by the entering device for interrogating the second memory section to determine if said predetermined access code has been stored thereon.

6. The system of claim 5 wherein the means for interrogating includes a service key switch.

7. The reproduction system of claim 5 including means for storing an additional access code in the second memory section.

8. The reproduction system of claim 5 including means for removing an access code from the second memory section.

9. The reproduction system of claim 5 including means for accessing a respective one of the diagnostic programs in the first memory section when said respective one of the diagnostic programs has an access code stored in the second memory section which matches said predetermined access code whereby the controller activates at least one of the operating components so as to to identify improper machine operation.

10. A method of operating a reproduction machine in a diagnostic mode, the reproduction machine having a photosensitive member and a plurality of discrete operating components cooperable with one another and the photosensitive member to electrostatically produce impressions on support material, a console with a diagnostic program activator, and a controller for actuating the discrete operating components in cooperation with the photosensitive member, the controller having a first memory section and a second memory section, a plurality of diagnostic programs being stored in the first memory section, at least one diagnostic program access code being stored in the second memory section, said access code corresponding to one of the diagnostic programs so as to permit access thereto, the method comprising the steps of:

enabling the diagnostic program activator for initiating a diagnostic program request, setting a flag in response to the activator so as to indicate a diagnostic program request;

placing the reproduction machine in a diagnostic mode in response to the flag;

entering a selected access code at the console, the access code corresponding to a diagnostic program requested;

checking the validity of the selected access code to determine if it corresponds to a potentially accessable program;

interrogating the second memory section to determine if the access code stored therein corresponds to the selected access code; and operating the reproduction machine under control of the diagnostic program corresponding to said selected access code when the selected access code is valid and matches the code stored in the second memory.

11. In a reproduction machine having a plurality of operating components and a controller for reproducing images, the controller including a first memory section having a plurality of diagnostic programs stored therein, the diagnostic programs being provided with corresponding access codes, and a second memory section for storing certain ones of said access codes, the diagnostic programs being accessible if the corresponding access codes are stored in the second memory, the method of updating the access codes in the second memory comprising the steps of:

accessing the second memory section;

determining if a particular access code is stored in the second memory section; and altering the content of the second memory section to store said particular access code if it is determined that such access code is not in the second memory section.

12. A method of operating a reproduction machine in a diagnostic mode, the reproduction machine having a read only memory section, a non-volatile memory section, and an operator console including a service key, a plurality of diagnostic programs being stored in the read only memory section, the diagnostic programs being provided with corresponding access codes, certain ones of said access codes being stored in the non-volatile memory section, the operator console providing access to the diagnostic programs corresponding to the particular access codes stored in the non-volatile memory, the method comprising the steps of:

activating the service key at the operator console;

interrogating the contents of the non-volatile memory to determine the access codes stored in the non-volatile memory, the presence of an access code in the non-volatile memory indicating that the program corresponding to the access code is accessible at the operator console;

altering the contents of the non-volatile memory for updating the codes stored therein and thus changing access to the diagnostic programs; and inactivating the service key whereby only the diagnostic programs corresponding to the altered content of the non-volatile memory are available at the operator console.

* * * * *